US008676615B2

(12) United States Patent
Callaghan et al.

(10) Patent No.: US 8,676,615 B2
(45) Date of Patent: Mar. 18, 2014

(54) METHODS AND SYSTEMS FOR COMPUTER AIDED EVENT AND VENUE SETUP AND MODELING AND INTERACTIVE MAPS

(75) Inventors: James Paul Callaghan, Los Angeles, CA (US); Dennis Denker, Scottsdale, AZ (US)

(73) Assignee: Ticketmaster LLC, West Hollywood, CA (US)

( * ) Notice: Subject to any disclaimer, the term of this patent is extended or adjusted under 35 U.S.C. 154(b) by 0 days.

(21) Appl. No.: 13/289,337

(22) Filed: Nov. 4, 2011

(65) Prior Publication Data

US 2012/0323612 A1 Dec. 20, 2012

Related U.S. Application Data

(63) Continuation of application No. 13/160,789, filed on Jun. 15, 2011.

(51) Int. Cl.
*G06Q 10/00* (2012.01)

(52) U.S. Cl.
USPC ................................ 705/5; 705/1.1; 348/222

(58) Field of Classification Search
USPC ....................................... 705/1.1, 5; 348/222
See application file for complete search history.

(56) References Cited

U.S. PATENT DOCUMENTS 3,581,072 A 5/1971 Nymeyer
3,622,995 A 11/1971 Dilks
4,412,287 A 10/1983 Braddock, III
4,603,232 A 7/1986 Kurland et al.
4,788,643 A 11/1988 Trippe et al.
4,789,928 A 12/1988 Fujisaki
4,799,156 A 1/1989 Shavit et al.
4,816,904 A 3/1989 McKenna et al.
4,845,739 A 7/1989 Katz
4,862,357 A 8/1989 Ahlstrom et al.
4,889,280 A 12/1989 Grald et al.
4,980,826 A 12/1990 Wagner
5,077,665 A 12/1991 Silverman et al.

(Continued)

FOREIGN PATENT DOCUMENTS

AU 20000229843 8/2006
AU 2006203419 1/2008

(Continued)

OTHER PUBLICATIONS http://www.businesstraveller.com/news/see-where-you-friends-are-sitting-with-malaysia, "Malaysia Airlines lets you see where your friends are sitting", Feb. 28, 2011.*

(Continued)

*Primary Examiner* — Shannon Campbell
(74) *Attorney, Agent, or Firm* — Kilpatrick Townsend & Stockton LLP

(57) ABSTRACT

Described are systems and methods for designing certain aspects of an event venue and for communicating information regarding the event and the event venue to others. Certain embodiments provide a dynamic seat map via which an operator can assign certain characteristics to specific seats and/or seating sections. Certain embodiments generate interactive maps for users, via which information from a plurality of sources may be integrated and visually displayed. The user may specify certain criteria, and the interactive map may identify to the user seats and/or sections that match such criteria. Certain embodiments provide an interactive seat map via which users can select seats and share information.

34 Claims, 69 Drawing Sheets

(56) References Cited

U.S. PATENT DOCUMENTS 5,101,353 A 3/1992 Lupien et al.
5,112,050 A 5/1992 Koza et al.
5,136,501 A 8/1992 Silverman et al.
5,181,786 A 1/1993 Hujink
5,237,499 A 8/1993 Garback
5,239,480 A 8/1993 Huegel
5,253,165 A 10/1993 Leiseca et al.
5,265,916 A 11/1993 Coe
5,283,734 A 2/1994 Von Kohorn
5,311,425 A 5/1994 Inada
5,329,589 A 7/1994 Fraser et al.
5,333,257 A 7/1994 Merrill et al.
5,347,306 A 9/1994 Nitta
5,408,417 A 4/1995 Wilder
5,422,809 A 6/1995 Griffin et al.
5,426,281 A 6/1995 Abecassis
5,428,778 A 6/1995 Brookes
5,475,585 A 12/1995 Bush
5,489,096 A 2/1996 Aron
5,496,991 A 3/1996 Delfer et al.
5,518,239 A 5/1996 Johnston
5,537,684 A 7/1996 Cassidy et al.
5,553,145 A 9/1996 Micali
5,557,518 A 9/1996 Rosen
5,559,707 A 9/1996 DeLorme et al.
5,592,375 A 1/1997 Salmon et al.
5,598,477 A 1/1997 Berson
5,627,915 A * 5/1997 Rosser et al. ................. 382/219
5,634,101 A 5/1997 Blau
5,664,115 A 9/1997 Fraser
5,724,520 A 3/1998 Goheen
5,737,363 A 4/1998 Dinkins
5,742,763 A 4/1998 Jones
5,754,654 A 5/1998 Hiroya et al.
5,757,917 A 5/1998 Rose et al.
5,774,873 A 6/1998 Berent et al.
5,794,207 A 8/1998 Walker et al.
5,794,210 A 8/1998 Goldhaber et al.
5,794,219 A 8/1998 Brown
5,797,126 A 8/1998 Helbling et al.
5,797,127 A 8/1998 Walker et al.
5,812,670 A 9/1998 Micali
5,818,914 A 10/1998 Fujisaki
5,826,241 A 10/1998 Stein et al.
5,835,896 A 11/1998 Fisher et al.
5,845,265 A 12/1998 Woolston
5,845,266 A 12/1998 Lupien et al.
5,850,442 A 12/1998 Muftic
5,890,138 A 3/1999 Godin et al.
5,918,209 A 6/1999 Campbell et al.
5,930,761 A 7/1999 O'Toole
6,023,685 A 2/2000 Brett et al.
6,023,686 A 2/2000 Brown
6,026,383 A 2/2000 Ausubel
6,031,545 A 2/2000 Ellenby et al.
6,038,537 A 3/2000 Matsuoka
6,044,363 A 3/2000 Mori et al.
6,047,264 A 4/2000 Fisher et al.
6,048,271 A 4/2000 Barcelou
6,067,532 A 5/2000 Gebb
6,070,146 A 5/2000 Mimata
6,082,620 A 7/2000 Bone, Jr.
6,085,164 A 7/2000 Smith et al.
6,085,169 A 7/2000 Walker et al.
6,085,976 A 7/2000 Sehr
6,094,640 A 7/2000 Goheen
6,107,932 A 8/2000 Walker et al.
6,119,096 A 9/2000 Mann et al.
6,119,945 A 9/2000 Muller et al.
6,175,922 B1 1/2001 Wang
6,192,349 B1 2/2001 Husemann et al.
6,216,227 B1 4/2001 Goldstein et al.
6,223,166 B1 4/2001 Kay
6,230,146 B1 5/2001 Alaia et al.
6,240,396 B1 5/2001 Walker et al.
6,243,691 B1 6/2001 Fisher et al.
6,246,996 B1 6/2001 Stein et al.
6,308,159 B1 10/2001 Strohl
6,313,833 B1 11/2001 Knight
6,332,129 B1 12/2001 Walker et al.
6,341,353 B1 1/2002 Herman et al.
6,418,415 B1 7/2002 Walker et al.
6,434,398 B1 8/2002 Inselberg
6,446,045 B1 9/2002 Stone et al.
6,446,917 B2 9/2002 Dieckmann et al.
6,449,346 B1 9/2002 Katz
6,466,917 B1 10/2002 Goyal et al.
6,470,451 B1 10/2002 Weinstein
6,477,503 B1 11/2002 Mankes
6,484,153 B1 11/2002 Walker et al.
6,496,809 B1 12/2002 Nakfoor
6,523,037 B1 2/2003 Monahan et al.
6,556,548 B1 4/2003 Kirkby et al.
6,603,568 B1 8/2003 Sansone
6,604,107 B1 8/2003 Wang
6,614,729 B2 9/2003 Griner et al.
6,658,390 B1 12/2003 Walker et al.
6,662,230 B1 12/2003 Eichstaedt et al.
6,679,421 B2 1/2004 Shin et al.
6,685,093 B2 2/2004 Challa et al.
6,690,794 B1 2/2004 Terao et al.
6,704,489 B1 3/2004 Kurauchi et al.
6,704,713 B1 3/2004 Brett et al.
6,736,322 B2 5/2004 Gobburu et al.
6,820,201 B1 11/2004 Lincoln et al.
6,829,644 B2 12/2004 Aufderheide
6,842,741 B1 1/2005 Fujimura
6,845,361 B1 1/2005 Dowling
6,847,969 B1 1/2005 Mathai et al.
6,850,901 B1 2/2005 Hunter et al.
6,854,651 B2 2/2005 Smith et al.
6,873,969 B2 3/2005 Stone et al.
6,877,661 B2 4/2005 Webb et al.
6,877,665 B2 4/2005 Challa et al.
6,901,429 B2 5/2005 Dowling
6,907,405 B2 6/2005 Brett
6,910,019 B2 6/2005 Dorr
6,910,627 B1 6/2005 Simpson-Young et al.
6,920,428 B2 7/2005 Greene
6,937,998 B1 8/2005 Swartz et al.
6,944,599 B1 9/2005 Vogel et al.
6,952,737 B1 10/2005 Coates et al.
6,963,854 B1 11/2005 Boyd et al.
6,965,914 B2 11/2005 Dowling
6,999,936 B2 2/2006 Sehr
7,003,485 B1 2/2006 Young
7,004,388 B2 2/2006 Kohta
7,010,494 B2 3/2006 Etzioni et al.
7,031,945 B1 4/2006 Donner
7,044,362 B2 5/2006 Yu
7,058,602 B1 6/2006 La Mura et al.
7,069,243 B2 6/2006 Dinwoodie
7,076,460 B2 7/2006 Dinwoodie
7,076,558 B1 7/2006 Dunn
7,080,026 B2 7/2006 Singh et al.
7,080,030 B2 7/2006 Eglen et al.
7,080,328 B1 7/2006 Sawyer
7,080,882 B2 7/2006 Stitt
7,083,081 B2 8/2006 McGee et al.
7,085,818 B2 8/2006 Brown et al.
7,092,892 B1 8/2006 Sobalvarro et al.
7,093,130 B1 8/2006 Kobayashi et al.
7,099,841 B1 8/2006 Hall et al.
7,110,960 B2 9/2006 Phillips et al.
7,114,179 B1 9/2006 Ritter et al.
7,124,062 B2 10/2006 Gebhart
7,127,404 B1 10/2006 Poon
7,127,408 B2 10/2006 Rosen
7,133,848 B2 11/2006 Phillips et al.
7,139,916 B2 11/2006 Billingsley et al.
7,149,549 B1 12/2006 Ortiz et al.
7,152,043 B2 12/2006 Alaia et al.
7,162,454 B1 1/2007 Donner et al.
7,171,472 B2 1/2007 O'Brien et al.

(56) References Cited

U.S. PATENT DOCUMENTS 7,177,945 B2 2/2007 Hong et al.
7,191,147 B2 3/2007 Heene et al.
7,213,754 B2 5/2007 Eglen et al.
7,228,350 B2 6/2007 Hong et al.
7,248,888 B2 7/2007 Inselberg
7,333,943 B1 2/2008 Charuk et al.
7,403,993 B2 7/2008 John et al.
7,418,496 B2 8/2008 Macey et al.
7,450,003 B2 * 11/2008 Weber et al. ............... 340/539.2
7,555,361 B2 6/2009 Nakamura et al.
7,555,466 B2 6/2009 Eglen et al.
7,577,620 B1 8/2009 Donner
7,584,123 B1 9/2009 Karonis et al.
7,587,372 B2 9/2009 Eglen et al.
7,634,503 B2 12/2009 Venugopal et al.
7,647,269 B2 1/2010 Brett
7,698,210 B2 4/2010 Brett
7,720,746 B2 5/2010 Brett
7,747,507 B2 6/2010 Brett
7,765,299 B2 7/2010 Romero
7,769,673 B2 8/2010 Brett
7,778,853 B2 8/2010 Sussman et al.
7,849,133 B2 12/2010 Denker et al.
7,865,379 B2 1/2011 Sussman et al.
7,865,598 B2 1/2011 Denker et al.
7,868,821 B2 * 1/2011 Hoshizaki ................ 342/357.42
7,917,398 B2 3/2011 Gibson et al.
7,945,463 B2 5/2011 Sussman et al.
7,949,595 B2 5/2011 Sussman et al.
7,979,291 B2 7/2011 Sussman et al.
7,979,504 B2 7/2011 Denker et al.
7,996,536 B2 8/2011 Denker et al.
8,024,234 B1 9/2011 Thomas et al.
8,164,599 B1 * 4/2012 Kadous et al. ................ 345/634
8,174,931 B2 * 5/2012 Vartanian et al. ............... 367/99
8,233,913 B2 * 7/2012 Mendis ...................... 455/456.1
8,249,626 B2 8/2012 Huston
8,275,397 B2 9/2012 Huston
8,275,414 B1 9/2012 Athsani et al.
2001/0005833 A1 6/2001 Asami et al.
2001/0032115 A1 10/2001 Goldstein
2001/0034639 A1 10/2001 Jacoby et al.
2001/0034687 A1 10/2001 Bushonville et al.
2001/0049652 A1 12/2001 Nakajima
2001/0056374 A1 12/2001 Joao
2002/0004762 A1 1/2002 Izumoto
2002/0023955 A1 2/2002 Frank et al.
2002/0029296 A1 3/2002 Anuff et al.
2002/0035605 A1 3/2002 McDowell et al.
2002/0040308 A1 4/2002 Hasegawa et al.
2002/0040346 A1 4/2002 Kwan
2002/0042729 A1 4/2002 Yajima et al.
2002/0042749 A1 4/2002 Yugami et al.
2002/0052758 A1 5/2002 Arthur et al.
2002/0052774 A1 5/2002 Parker et al.
2002/0052965 A1 5/2002 Dowling
2002/0062236 A1 5/2002 Murashita et al.
2002/0062265 A1 5/2002 Poon
2002/0065763 A1 5/2002 Taylor et al.
2002/0065783 A1 5/2002 Na et al.
2002/0072999 A1 6/2002 Andres et al.
2002/0082879 A1 6/2002 Miller et al.
2002/0082969 A1 6/2002 O'Keeffe et al.
2002/0087456 A1 7/2002 Abeshouse et al.
2002/0091555 A1 7/2002 Leppink
2002/0094090 A1 7/2002 Iino
2002/0095357 A1 7/2002 Hunter et al.
2002/0095383 A1 7/2002 Mengin et al.
2002/0099831 A1 7/2002 Tsunogai
2002/0103849 A1 8/2002 Smith
2002/0107726 A1 8/2002 Torrance et al.
2002/0107779 A1 8/2002 Maltzman
2002/0116343 A1 8/2002 Nakamura et al.
2002/0116348 A1 8/2002 Phillips et al.
2002/0120492 A1 8/2002 Phillips et al.
2002/0128922 A1 9/2002 Joao
2002/0133424 A1 9/2002 Joao
2002/0138325 A1 9/2002 Mashimo et al.
2002/0138751 A1 9/2002 Dutta
2002/0138770 A1 9/2002 Dutta
2002/0138771 A1 9/2002 Dutta
2002/0143860 A1 10/2002 Catan
2002/0152458 A1 10/2002 Eyer et al.
2002/0156715 A1 10/2002 Wall et al.
2002/0169623 A1 11/2002 Call et al.
2002/0169694 A1 11/2002 Stone et al.
2002/0174026 A1 11/2002 Pickover et al.
2002/0178018 A1 11/2002 Gillis et al.
2002/0178093 A1 11/2002 Dean et al.
2002/0178226 A1 11/2002 Anderson et al.
2002/0188523 A1 12/2002 Hyyppa et al.
2002/0188551 A1 12/2002 Grove et al.
2002/0194267 A1 12/2002 Flesner et al.
2003/0023500 A1 1/2003 Boies et al.
2003/0024988 A1 2/2003 Stanard
2003/0040943 A1 2/2003 Bates et al.
2003/0061303 A1 3/2003 Brown et al.
2003/0067464 A1 4/2003 Gathman et al.
2003/0069762 A1 4/2003 Gathman et al.
2003/0069763 A1 4/2003 Gathman et al.
2003/0069764 A1 4/2003 Gathman et al.
2003/0069789 A1 4/2003 Gathman et al.
2003/0069810 A1 4/2003 Gathman et al.
2003/0069827 A1 4/2003 Gathman et al.
2003/0069829 A1 4/2003 Gathman et al.
2003/0093387 A1 5/2003 Nakfoor
2003/0105641 A1 6/2003 Lewis
2003/0120502 A1 6/2003 Robb et al.
2003/0154142 A1 8/2003 Ginsburg et al.
2003/0154169 A1 8/2003 Yanai
2003/0163373 A1 8/2003 Cornateanu
2003/0164400 A1 9/2003 Boyd
2003/0171960 A1 9/2003 Skinner
2003/0177022 A1 9/2003 Francis
2003/0185197 A1 10/2003 Banerjee et al.
2003/0187802 A1 10/2003 Booth
2003/0200137 A1 10/2003 Drummond
2003/0229790 A1 12/2003 Russell
2003/0233337 A1 12/2003 Yanase et al.
2003/0236736 A1 12/2003 Harmon et al.
2004/0006497 A1 1/2004 Nestor et al.
2004/0019571 A1 1/2004 Hurwitz et al.
2004/0039635 A1 2/2004 Linde et al.
2004/0039696 A1 2/2004 Harmon et al.
2004/0049412 A1 3/2004 Johnson
2004/0054574 A1 3/2004 Kaufman et al.
2004/0073439 A1 4/2004 Shuster
2004/0083156 A1 4/2004 Schulze
2004/0086257 A1 5/2004 Werberig et al.
2004/0093175 A1 5/2004 Tan
2004/0093302 A1 5/2004 Baker et al.
2004/0111303 A1 6/2004 Francis
2004/0128257 A1 7/2004 Okamoto et al.
2004/0128516 A1 7/2004 Okamoto et al.
2004/0138962 A1 7/2004 Kopelman et al.
2004/0148219 A1 7/2004 Norris
2004/0172270 A1 9/2004 Sugimoto et al.
2004/0186765 A1 9/2004 Kataoka
2004/0189675 A1 9/2004 Pretlove et al.
2004/0204990 A1 10/2004 Lee et al.
2004/0204991 A1 10/2004 Monahan et al.
2004/0215527 A1 10/2004 Grove et al.
2004/0220821 A1 11/2004 Ericsson et al.
2004/0225540 A1 11/2004 Waytena et al.
2004/0260659 A1 12/2004 Chan et al.
2005/0001711 A1 1/2005 Doughty et al.
2005/0004819 A1 1/2005 Etzioni et al.
2005/0015303 A1 1/2005 Dubin et al.
2005/0015308 A1 1/2005 Grove et al.
2005/0021364 A1 1/2005 Nakfoor
2005/0021365 A1 1/2005 Nakfoor
2005/0021417 A1 1/2005 Kassan
2005/0021450 A1 1/2005 Nakfoor
2005/0027608 A1 2/2005 Wiesmuller et al.

(56) References Cited

U.S. PATENT DOCUMENTS

| | | | | |
|---|---|---|---|---|
| 2005/0027641 | A1 | 2/2005 | Grove et al. | |
| 2005/0027863 | A1 | 2/2005 | Talwar et al. | |
| 2005/0043994 | A1 | 2/2005 | Walker et al. | |
| 2005/0055275 | A1 | 3/2005 | Newman et al. | |
| 2005/0060271 | A1 | 3/2005 | Vig | |
| 2005/0065866 | A1 | 3/2005 | Grove et al. | |
| 2005/0071245 | A1 | 3/2005 | Norins, Jr. et al. | |
| 2005/0091069 | A1 | 4/2005 | Chuang | |
| 2005/0131809 | A1 | 6/2005 | Watt, II et al. | |
| 2005/0132267 | A1 | 6/2005 | Aviv | |
| 2005/0138175 | A1 | 6/2005 | Kumar et al. | |
| 2005/0139661 | A1 | 6/2005 | Eglen et al. | |
| 2005/0139662 | A1 | 6/2005 | Eglen et al. | |
| 2005/0140675 | A1 | 6/2005 | Billingsley et al. | |
| 2005/0144115 | A1 | 6/2005 | Brett | |
| 2005/0149458 | A1 | 7/2005 | Eglen et al. | |
| 2005/0160020 | A1 | 7/2005 | Asher et al. | |
| 2005/0165758 | A1 | 7/2005 | Kasten et al. | |
| 2005/0193333 | A1 | 9/2005 | Ebert | |
| 2005/0198107 | A1 | 9/2005 | Cuhls et al. | |
| 2005/0209954 | A1 | 9/2005 | Asher et al. | |
| 2005/0228722 | A1 | 10/2005 | Embree | |
| 2005/0240453 | A1 | 10/2005 | Lyons | |
| 2005/0273405 | A1 | 12/2005 | Chen | |
| 2006/0010029 | A1 | 1/2006 | Gross | |
| 2006/0017541 | A1 | 1/2006 | Nguyen | |
| 2006/0069780 | A1 | 3/2006 | Batni et al. | |
| 2006/0085396 | A1 | 4/2006 | Evans et al. | |
| 2006/0095344 | A1 | 5/2006 | Nakfoor | |
| 2006/0100985 | A1 | 5/2006 | Mark et al. | |
| 2006/0105783 | A1 | 5/2006 | Giraldin et al. | |
| 2006/0108418 | A1 | 5/2006 | Rice | |
| 2006/0111959 | A1 | 5/2006 | Tarr et al. | |
| 2006/0111967 | A1 | 5/2006 | Forbes | |
| 2006/0116916 | A1 | 6/2006 | Bowman et al. | |
| 2006/0124734 | A1 | 6/2006 | Wallerstorfer et al. | |
| 2006/0126201 | A1 | 6/2006 | Jain | |
| 2006/0129476 | A1 | 6/2006 | Chin et al. | |
| 2006/0140374 | A1 | 6/2006 | Light et al. | |
| 2006/0143094 | A1 | 6/2006 | Kohout et al. | |
| 2006/0143109 | A1 | 6/2006 | Goel | |
| 2006/0143698 | A1 | 6/2006 | Ohara | |
| 2006/0144946 | A1 | 7/2006 | Kuriyama et al. | |
| 2006/0147024 | A1 | 7/2006 | Dezonno et al. | |
| 2006/0148566 | A1 | 7/2006 | Lakshminarasimha | |
| 2006/0155659 | A1 | 7/2006 | DiCesare | |
| 2006/0155857 | A1 | 7/2006 | Feenan et al. | |
| 2006/0161474 | A1 | 7/2006 | Diamond et al. | |
| 2006/0167756 | A1 | 7/2006 | VonBergen et al. | |
| 2006/0178930 | A1 | 8/2006 | Kim | |
| 2006/0187867 | A1* | 8/2006 | Panje | 370/315 |
| 2006/0190387 | A1 | 8/2006 | Molloy | |
| 2006/0190388 | A1 | 8/2006 | Molloy | |
| 2006/0190389 | A1 | 8/2006 | Molloy | |
| 2006/0190390 | A1 | 8/2006 | Molloy | |
| 2006/0195356 | A1 | 8/2006 | Nerenhausen et al. | |
| 2006/0208074 | A1 | 9/2006 | Eglen et al. | |
| 2006/0232110 | A1 | 10/2006 | Ovadia | |
| 2006/0244564 | A1 | 11/2006 | Madsen | |
| 2006/0249572 | A1 | 11/2006 | Chen et al. | |
| 2006/0256109 | A1* | 11/2006 | Acker et al. | 345/419 |
| 2006/0271462 | A1 | 11/2006 | Harmon | |
| 2006/0277130 | A1 | 12/2006 | Harmon | |
| 2006/0287898 | A1 | 12/2006 | Murashita et al. | |
| 2006/0293929 | A1 | 12/2006 | Wu et al. | |
| 2006/0293994 | A1 | 12/2006 | Stuart | |
| 2007/0012765 | A1 | 1/2007 | Trinquet et al. | |
| 2007/0017979 | A1 | 1/2007 | Wu et al. | |
| 2007/0022020 | A1 | 1/2007 | Bernstein | |
| 2007/0027794 | A1 | 2/2007 | Brett | |
| 2007/0027798 | A1 | 2/2007 | Brett | |
| 2007/0033131 | A1 | 2/2007 | Brett | |
| 2007/0038582 | A1 | 2/2007 | Brett | |
| 2007/0055440 | A1 | 3/2007 | Denker et al. | |
| 2007/0055554 | A1 | 3/2007 | Sussman et al. | |
| 2007/0087756 | A1 | 4/2007 | Hoffberg | |
| 2007/0124232 | A1 | 5/2007 | Brett | |
| 2007/0143185 | A1 | 6/2007 | Harmon et al. | |
| 2007/0162301 | A1 | 7/2007 | Sussman et al. | |
| 2007/0197229 | A1* | 8/2007 | Kalliola et al. | 455/456.1 |
| 2007/0245351 | A1 | 10/2007 | Sussman et al. | |
| 2007/0250400 | A1 | 10/2007 | Eglen et al. | |
| 2007/0276944 | A1 | 11/2007 | Samovar et al. | |
| 2008/0021998 | A1 | 1/2008 | Wentink | |
| 2008/0027827 | A1 | 1/2008 | Eglen et al. | |
| 2008/0059384 | A1 | 3/2008 | Eglen et al. | |
| 2008/0065566 | A1 | 3/2008 | Eglen et al. | |
| 2008/0065567 | A1 | 3/2008 | Eglen et al. | |
| 2008/0103934 | A1 | 5/2008 | Gibson et al. | |
| 2008/0154623 | A1 | 6/2008 | Derker et al. | |
| 2008/0192048 | A1 | 8/2008 | Nabais Nobre | |
| 2008/0194987 | A1 | 8/2008 | Boecker | |
| 2008/0215452 | A1 | 9/2008 | Eglen et al. | |
| 2008/0215507 | A1 | 9/2008 | Eglen et al. | |
| 2008/0221948 | A1 | 9/2008 | Eglen et al. | |
| 2008/0235110 | A1 | 9/2008 | Carter et al. | |
| 2008/0243838 | A1 | 10/2008 | Scott et al. | |
| 2008/0262903 | A1 | 10/2008 | Keser et al. | |
| 2009/0043637 | A1 | 2/2009 | Eder | |
| 2009/0063219 | A1 | 3/2009 | Raufaste et al. | |
| 2009/0063667 | A1 | 3/2009 | Smith et al. | |
| 2009/0132904 | A1 | 5/2009 | Holloway et al. | |
| 2009/0276364 | A1 | 11/2009 | Iaia et al. | |
| 2009/0278949 | A1* | 11/2009 | McMahan et al. | 348/222.1 |
| 2009/0292593 | A1 | 11/2009 | Seki et al. | |
| 2010/0080163 | A1 | 4/2010 | Krishnamoorthi et al. | |
| 2010/0087230 | A1* | 4/2010 | Peh et al. | 455/566 |
| 2010/0088126 | A1 | 4/2010 | Iaia et al. | |
| 2010/0106653 | A1 | 4/2010 | Sandholm et al. | |
| 2010/0113072 | A1 | 5/2010 | Gibson et al. | |
| 2010/0113161 | A1* | 5/2010 | Walker et al. | 463/42 |
| 2010/0164990 | A1 | 7/2010 | Van Doorn et al. | |
| 2010/0169130 | A1 | 7/2010 | Fineman et al. | |
| 2010/0217629 | A1 | 8/2010 | Brett | |
| 2010/0228576 | A1 | 9/2010 | Marti et al. | |
| 2010/0257002 | A1 | 10/2010 | Brett | |
| 2010/0328344 | A1 | 12/2010 | Mattila et al. | |
| 2011/0035284 | A1* | 2/2011 | Moshfeghi | 705/14.58 |
| 2011/0060834 | A1 | 3/2011 | Denker et al. | |
| 2011/0289147 | A1* | 11/2011 | Styles et al. | 709/205 |
| 2012/0019557 | A1 | 1/2012 | Aronsson et al. | |
| 2012/0092368 | A1 | 4/2012 | Baek | |
| 2012/0166231 | A1* | 6/2012 | Denker et al. | 705/5 |
| 2012/0214507 | A1 | 8/2012 | Vartanian | |
| 2012/0242656 | A1 | 9/2012 | Mcardle | |
| 2012/0249588 | A1 | 10/2012 | Tison et al. | |
| 2012/0256917 | A1 | 10/2012 | Lieberman et al. | |
| 2012/0262558 | A1 | 10/2012 | Boger | |

FOREIGN PATENT DOCUMENTS

| | | | |
|---|---|---|---|
| AU | 2007214305 | | 9/2009 |
| CA | 2399155 | | 2/2000 |
| EP | 0828223 | A2 | 3/1998 |
| EP | 1069539 | A2 | 1/2001 |
| EP | 1257941 | | 8/2001 |
| EP | 1325460 | | 2/2002 |
| EP | 1435737 | | 7/2004 |
| EP | 1436800 | | 12/2005 |
| EP | 1875299 | | 10/2006 |
| EP | 1922614 | | 2/2007 |
| EP | 1868153 | | 12/2007 |
| EP | 1980999 | | 10/2008 |
| EP | 2446380 | | 12/2010 |
| EP | 2410490 | | 1/2012 |
| EP | 2444941 | | 4/2012 |
| EP | 2444942 | | 4/2012 |
| JP | 5204952 | | 8/1993 |
| JP | 5266049 | | 10/1993 |
| JP | 10-289281 | | 10/1998 |
| JP | 11-031186 | | 2/1999 |
| JP | 11031204 | A | 2/1999 |
| JP | 3061933 | | 6/1999 |
| JP | 11-353361 | | 12/1999 |

(56) References Cited

FOREIGN PATENT DOCUMENTS

| | | |
|---|---|---|
| JP | 2001236459 A | 8/2001 |
| JP | 2009-032176 | 2/2009 |
| JP | 4394858 | 10/2009 |
| WO | WO 88/03295 | 5/1988 |
| WO | WO 98/10361 | 3/1998 |
| WO | WO 99/06928 | 2/1999 |
| WO | WO 99/18533 | 4/1999 |
| WO | WO 99/27476 | 6/1999 |
| WO | WO 99/38129 | 7/1999 |
| WO | WO 99/60489 | 11/1999 |
| WO | WO 00/62260 | 10/2000 |
| WO | WO 00/74300 A1 | 12/2000 |
| WO | WO 00/75838 A1 | 12/2000 |
| WO | WO 01/03040 A1 | 1/2001 |
| WO | WO 01/08065 A1 | 2/2001 |
| WO | WO 01/41021 A1 | 6/2001 |
| WO | WO 01/41085 A2 | 6/2001 |
| WO | WO 01/44892 A2 | 6/2001 |
| WO | WO 01/52139 A1 | 7/2001 |
| WO | WO 01/59649 A1 | 8/2001 |
| WO | WO 01/59658 A1 | 8/2001 |
| WO | WO 01/71669 A2 | 9/2001 |
| WO | WO 01/84473 | 11/2001 |
| WO | WO 02/03174 | 1/2002 |
| WO | WO 02/35322 A2 | 5/2002 |
| WO | WO 03/027808 A2 | 4/2003 |

OTHER PUBLICATIONS http://www.loopt.com/about/tag/background-location/, "Loopt Adds 'Ping All' Feature—Reforms How Mobile Users Can Meet Up with Friends", Aug. 9, 2010.* http://www.loopt.com/about/2010/10/loopt-integrates-with facebook, "Loopt Integrates with Facebook Places, Plots Your Friends on One Map", Oct. 19, 2010.* http://www.loopt.com/about/tag/location/, "Loopt Hits the Windows Phone Marketplace", Nov. 7, 2010.*

May, Kevin, "Malaysia Airline puts full booking, check-in, seat pick into Facebook", Feb. 26, 2011.*

U.S. Appl. No. 10/731,410, filed Dec. 9, 2003, Denker et al.

"Acteva and Enspot.com Sign Agreement to Provide On-Line Ticketing, Broader Distribution", Business Wire (Dec. 3, 1999).

Article from Smart Card News, "Major Players Form Proton World International", Aug. 1998, pp. 141-160.

Article: Business Wire: Season Ticket Solutions Announces Availability of Ticket Exchange for Sporting Teams and Entertainment Venues; Jul. 30, 2001; 3 pages.

Asokan, et al. "SEMPER Consortium: Advanced Services, Architecture and Design", Deliverable D10 of ACTS Project AC026, Mar. 15, 1999.

"AuctionNet Still One-Of-A-Kind", Automotive News, S12 (Sep. 20, 1993).

Banâtre, "Distributed Auction Bidding System", International Computing Symposium, vol. 4, No. 4 (Aug. 1981).

Banks, "PSL Put Owners on the Hot Seat", St. Petersburg Times, p. 10C (Oct. 31, 1993).

Beam et al, "Electronic Negotiation through Internet-Based Auctions", CITM Working Paper 96-W-P1019, http://haas.berkeley.edu/citm/publications/papers/wp-1019.pdf (Dec. 1996).

Blau, "Dormitories See Departure from Previous Years' Trends", The Tech, vol. 116, No. 38 (Aug. 30, 1996).

Boyes et al, "Auctions as an Allocation Mechanism in Academia: The Case of Faculty Offices", Journal of Economic Perspectives, vol. 3, No. 3, pp. 37-40 (Summer 1989).

"Cathay Pacific Airways Auctions a Boeing 747-400 Worth of Seats in Third Cybertraveler Auction", Business Wire (Apr. 29, 1996).

"Cathay Pacific Airways-USA Receives More than 1,300 Bids During First Five Days of CyberAuction", Business Wire (Oct. 18, 1995).

"Cathay Pacific Airways-USA to Hold First-Ever Internet CyberAuction", Business Wire (Sep. 26, 1995).

Chui, et al. "Auction on the Internate—A Preliminary Study", Department of Marketing, HK Univiersity of Science and Technology; 1999, pp. 1-7.

Collier, "Columbia, S.C.-Based Internet Firm Helps Buy, Sell Sports Tickets", The State, (Oct. 23, 2000).

U.S. Appl. No. 09/702,794, filed Nov. 1, 2000.

Article from Website; Sports Venue Technology; "Pacific Bell Park, San Francisco"; (5 pages).

Article from Website; Tech Web; "Byter Up: Ballparks Go High-Tech"; Mar. 31, 1999 (4 pages).

International Search Report and Written Opinion (dated Apr. 11, 2008); International Application No. PCT/US07/86651; Filed Dec. 6, 2007.

International Search Report and Written Opinion; PCT/US08/72364 (filing date: Aug. 6, 2008); mailed Jan. 30, 2009.

Office Action dated Mar. 9, 2009 (Japanese Patent Application No. 2001-558899, (English Translation).

County, Pascal, An Economic Guide to Ticket Pricing in the Entertainment Industry, London Business School, pp. 167-192.

Dickey, "Raider PSL Without Permanent Place", San Francisco Chronicle, p. B2 (Jun. 26, 1997).

Dickey, "Raiders' PSLs May Be for Life", San Francisco Chronicle, p. D5 (Mar. 26, 1997).

"E-TicketBoard Launches PSL Xchange for Eight NFL Teams", PR Newswire (Jul. 18, 2000).

"E-TicketBoard Launches Revolutionary New Site—SeatsandSuites", PR Newswire (Oct. 17, 2000).

European Search Report dated Jan. 29, 2008; European Application No. 07 01 8280.

Final Office Action under U.S. Appl. No. 10/731,410 dated Apr. 8, 2011.

Fisher, "Secondary Market in Consolidation Mode", Street & Smith's Sports Business Journal, p. 3 (Jul. 23, 2007).

Flint, "Cyber Hope or Cyber Hype?", Air Transport World (Oct. 1996).

Fujimura, "XML Ticket: Generalized Digital Ticket Definition Language", The W3C Signed XML Workshop—Copyright © 1999, 33 pages.

Fujimura, et al. "Digital-Ticket-Controlled Digital Ticket Circulation", NTT Information Sharing Platform Laboratories, USENIX Security Symposium, Aug. 23-26, 1999.

Fujimura, et al. "General-purpose Digital Ticket Framework", NTT Information and Communication Systems Labs, USENIX Workshop on Electronic Commerce; Aug. 31-Sep. 1998.

Garza, "Space Cruise", Reason (May 2000).

Happel, "Creating a Futures Market for Major Event Tickets: Problems and Prospects", Cato Journal, vol. 21, No. 3 (Winter 2002).

Harlan, "At Least it isn't the Team's Ball that's in Somebody Else's Court", Wall Street Journal (Jun. 4, 1991).

Hayashi, Nobuyuki, "Great-bargain Malls Come to Your Home: Attractive, Easy-to-get-hooked Internet Auction" MAC POWER, ASCII Corporation, Dec. 1, 1999, 10th volume, 12th ssue, pp. 252 to 257, (with partial English translation).

Hes, et al. "At Face Value" On biometrical identification and privacy, Registratiekamer, Sep. 1999; 78 pages.

Holbrook, "Oakland, Calif., Professional Football Team Sees Gain in Seat License Sales", Contra Costa Times (Feb. 26, 2001).

Hylton, "Dorm Lottery Starts Strong", The Tech, vol. 114, No. 34 (Aug. 29, 1994).

In, Shirley Siu Weng, "*A Proposed* Electronic Ticket Management for trading Service in Internet", Feb. 9, 2001; 7 pages.

International Search Report for PCT Application—PCT/US06/10295, mailing date Sep. 14, 2007.

Isokawa, Akiko, the 25th "Using Convenient Internet Sites", Nikkei PC21, Nikkei Business Publications, Inc., Jan. 1, 2000, 5th Volume, 1st issue, pp. 248 to 251 (with partial English translation).

Jackson, "Media Futures: This Bazaar Could Put Retailers Under the Hammer", Financial Times (May 25, 1995).

Jenkins, "Giants Draw Fans into Web Team Helps Season-Ticket Holders Get Mileage Out of Plans", USA Today, p. 3C (Jun. 27, 2000).

Kasper, "Purchase Griz Playoff Tickets Now", Missoulian Online (May 3, 2001).

(56) References Cited

OTHER PUBLICATIONS

"Keyware Unveils Multi-Application Smart Card Suite", Card News, vol. 16, No. 10 (May 30, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Krueger, Alan B., "Music Sales Slump, Concert Ticket Costs Jump and Rock Fans Pay the Price", Oct. 17, 2002, New York Times Late Edition, pp. C.2.
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Matsuyama, et al. "Distributed Digital-Ticket Management for Rights Trading System", E-Commerce, 1999; pp. 110-118.
Menezes et al, "Simultaneous Pooled Auctions", The Journal of Real Estate Finance and Economics, vol. 17(3), pp. 219-232 (Nov. 19, 1996).
Milwaukee Journal Sentinel, "Riverside comedy show canceled", Aug. 2, 1996, Wilwaukee, Wis. p. 7.
Moldovanu et al, "The Optimal Allocation of Prizes in Contests", http://www.sfb504.uni-mannheim.de/publications/dp99-75.pdf (Jul. 14, 1999).
Muret, "More Teams Gearing up to Offer Option of Stored-Credit Tickets", Street & Smith's Sports Business Journal, p. 12 (Jul. 9, 2007).
Nestor et al, "Transforming Tickets from a Commodity into a Valuable Strategic Asset", Global eTicket Exchange whitepaper, Oct. 13, 2000.
New Straits Times, "Wanted Live in Concert postponed to after Raya", Oct. 25, 2000, Kuala Lumpur, p. 15.
Office Action Dated Oct. 8, 2009, U.S. Appl. No. 11/702,993.
Office Action Dated Nov. 25, 2008, U.S. Appl. No. 11/386,4590.
Office Action dated Apr. 13, 2010, U.S. Appl. No. 12/187,295.
Office Action dated Apr. 7, 2010, U.S. Appl. No. 12/187,272.
Office Action Dated May 26, 2009, U.S. Appl. No. 11/386,459.
Office Action Dated Jun. 26, 2009, U.S. Appl. No. 11/702,344.
Office Action Dated Jul. 21, 2009, U.S. Appl. No. 11/699,283.
Office Action Dated Jul. 27, 2009, U.S. Appl. No. 11/702,803.
Office Action Dated Aug. 5, 2009, U.S. Appl. No. 11/702,733.
Office Action in U.S. Appl. No. 11/453,286, mailed Nov. 5, 2007.
Office Action mailed on Aug. 2, 2007 in U.S. Appl. No. 11/453,286.
Office Action mailed on Jul. 27, 2007 in U.S. Appl. No. 11/475,733.
Office Action under U.S. Appl. No. 10/731,410 dated Sep. 1, 2010.
Office Action under U.S. Appl. No. 10/731,410 dated Oct. 2, 2009.
O'Neil, "Q and A", St. Louis Post-Dispatch, p. 4D (Jan. 19, 1995).
"Online Movie Ticket Site Launched in China", China Online (Dec. 23, 1999).
"OnSale Brings Thrill of the Auction to the Web", Link-up p. 34 (Jul./Aug. 1995).
Onsale; "Onsale and EZLinks offer reserved tee times through online auctions . . . " Business Wire, Sep. 28, 1998; Dialog file 810 #0913089, 2 pgs.
PCT Search International Search Report and Written Opinion, PCT Application No. PCT/US09/42889, dated Aug. 24, 2009.
Pelline, "Cathay Pacific to Auction Off Airline Tickets on the Internet", San Francisco Chronicle, p. C4 (Apr. 30, 1996).
Pelline, Jeff; "Going once, going twice, going online," San Francisco Chronicle, Nov. 13, 1995; Dialog file 640 #08317011, 2 pgs.
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
"Season Ticket Solutions Announces Availability of Ticket Exchange for Sporting Teams and Entertainment Venues", Business Wire (Jul. 30, 2001).
Scheff, Joanne, Factors Influencing Subscription and Single-Ticket Purchases at Performing Arts Organizations, 1999, International Journal of Arts Management, pp. 16-27.
Shulman, "VICS and Quick Response: Priority Issues for Mass Merchandisers", Supermarket Business, vol. 44, No. 10, p. 13(4) (Oct. 1989).
Stevenson, "Frosh Get at Least Fifth Choice Dorm: Women Find Shortage of Single-Sex Rooms", The Tech, vol. 115, No. 37 (Aug. 31, 1995).
Stubhub, "Buyer Handbook", Apr. 2, 2002, www.stubhub.com.
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
"WBGH to Hold Online Computer Auction", Link-Up, p. 10 (Sep./Oct. 1988).
Weiner, "Are the Days Numbered for the Paper Ticket?", Street & Smith's Sports Business Journal, p. 17 (Jun. 18, 2007).
www.TicketOptions.com Web Pages, as retreived from archive.org (2001).
www.trashcity.org (web archive Jan. 12, 2004).
wwwSeasonTicket.com Web Pages, as retreived from archive.org (2001).
Yael Schacher, "Ticket Scalping", Jun. 11, 2001, Gotham Gazette, http://www.gothamgazette.com/articiel120010611/200/165.
Zoltak, "Advantix Acquisitions Continue with Protix Deal", Amusement Business (Nov. 2, 1998).
International Search Report/Written Opinion mailed Feb. 17, 2012 regarding International Patent Application No. PCT/US2011/040546.
http://www.businesstraveller.com "Malaysia Airlines lets you see where your friends are sitting", Feb. 28, 2011.
http://www.loopt.com "Loopt Adds 'Ping All' Feature—Reforms How Mobile USers Can Meet Up with Friends", Aug. 9, 2010.

* cited by examiner

| Start | Count | $ Price | % Sell | # Sell | $ Total |
|---|---|---|---|---|---|
| 0 | 1747 | 0.00 | 100 | 1747 | 0.00 |
| 1 | 50 | 0.00 | 100 | 50 | 0.00 |
| 2 | 104 | 0.00 | 100 | 104 | 0.00 |
| 3 | 304 | 0.00 | 100 | 304 | 0.00 |
| 4 | 448 | 0.00 | 100 | 448 | 0.00 |
| 5 | 408 | 0.00 | 100 | 408 | 0.00 |
| 6 | 336 | 0.00 | 100 | 336 | 0.00 |
| 7 | 86 | 0.00 | 100 | 86 | 0.00 |
| 8 | 126 | 0.00 | 100 | 126 | 0.00 |
| 9 | 180 | 0.00 | 100 | 180 | 0.00 |
| 10 | 168 | 0.00 | 100 | 168 | 0.00 |
| 11 | 535 | 0.00 | 100 | 535 | 0.00 |
| 12 | 110 | 0.00 | 100 | 110 | 0.00 |
| 13 | 54 | 0.00 | 100 | 54 | 0.00 |
| 14 | 210 | 0.00 | 100 | 210 | 0.00 |
| 15 | 267 | 0.00 | 100 | 267 | 0.00 |
| 16 | 424 | 0.00 | 100 | 424 | 0.00 |
| 17 | 318 | 0.00 | 100 | 318 | 0.00 |
| 18 | 450 | 0.00 | 100 | 450 | 0.00 |
| 19 | 519 | 0.00 | 100 | 519 | 0.00 |
| 20 | 488 | 0.00 | 100 | 488 | 0.00 |
| 21 | 444 | 0.00 | 100 | 444 | 0.00 |
| 22 | 737 | 0.00 | 100 | 737 | 0.00 |
| 23 | 950 | 0.00 | 100 | 950 | 0.00 |
| 24 | 705 | 0.00 | 100 | 705 | 0.00 |
| 25 | 601 | 0.00 | 100 | 601 | 0.00 |
| 26 | 914 | 0.00 | 100 | 914 | 0.00 |
| 27 | 754 | 0.00 | 100 | 754 | 0.00 |
| 28 | 1412 | 0.00 | 100 | 1412 | 0.00 |
| 29 | 1280 | 0.00 | 100 | 1280 | 0.00 |
| 30 | 746 | 0.00 | 100 | 746 | 0.00 |

*FIG. 4*

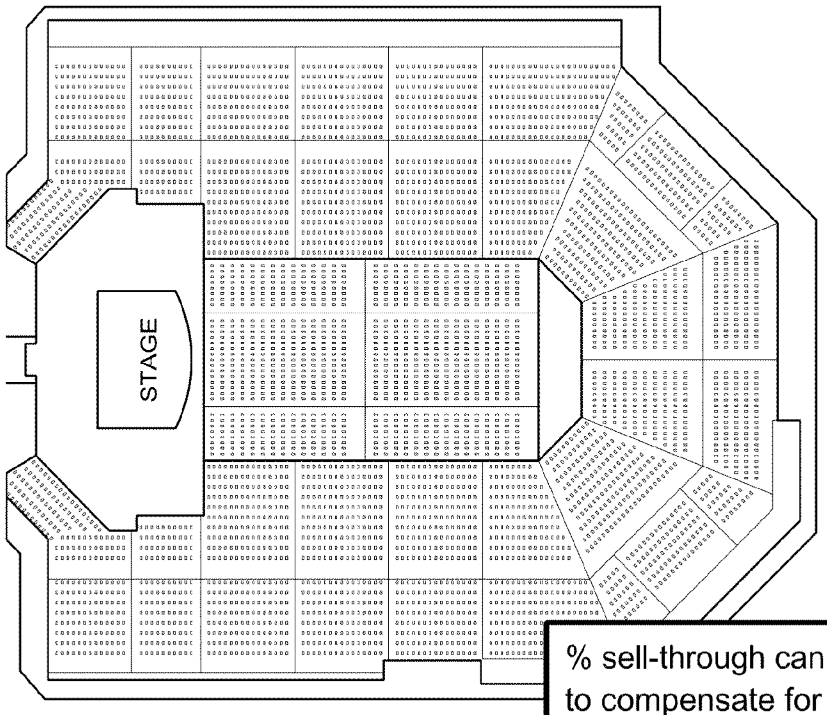

By Stratum (Editable)

| Break | Count | $ Face | $ AI | % Sell | # Sell | $ Total (F) |
|---|---|---|---|---|---|---|
| 0 | 5850 | 200.00 | 200.00 | 100 | 5850 | 1170000.00 |
| 1 | 0 | 0.00 | 0.00 | 100 | 0 | 0.00 |
| 2 | 400 | 99.00 | 99.00 | 100 | 400 | 39600.00 |
| 3 | 0 | 0.00 | 0.00 | 100 | 0 | 0.00 |
| 4 | 18 | 72.00 | 75.00 | 100 | 18 | 1296.00 |
| 5 | 0 | 100 | 100 | 100 | 0 | 0.00 |
| 6 | 193 | 50.00 | 55.00 | 100 | 193 | 4650.00 |
| 7 | 0 | 0.00 | 0.00 | 100 | 0 | 0.00 |
| 8 | 2992 | 35.00 | 42.00 | 100 | 2992 | 104720.00 |
| 9 | | 0.00 | 0.00 | 0 | 0 | 0.00 |
| 10 | | 0.00 | [illegible] | 0 | 0 | 0.00 |
| 11 | | [illegible] | 0.00 | 0 | 0 | 0.00 |
| 12 | | [illegible] | 0.00 | 0 | 0 | 0.00 |
| 13 | [illegible] | 0.00 | 0.00 | 0 | 0 | 0.00 |
| [illegible] | [illegible] | 0.00 | 0.00 | 0 | 0 | 0.00 |
| [illegible] | [illegible] | 0.00 | 0.00 | 0 | 0 | 0.00 |
| 16 | | 0.00 | 0.00 | 0 | 0 | 0.00 |
| 17 | | 0.00 | 0.00 | 0 | 0 | 0.00 |
| [illegible] | [illegible] | 0.00 | 0.00 | 0 | 0 | 0.00 |
| [illegible] | [illegible] | 0.00 | 0.00 | 0 | 0 | 0.00 |
| [illegible] | [illegible] | 0.00 | 0.00 | 0 | 0 | 0.00 |
| [illegible] | [illegible] | 0.00 | 0.00 | 0 | 0 | 0.00 |
| [illegible] | [illegible] | 0.00 | 0.00 | 0 | 0 | 0.00 |
| [illegible] | [illegible] | 0.00 | 0.00 | 0 | 0 | 0.00 |
| 24 | | 0.00 | 0.00 | 0 | 0 | 0.00 |
| 25 | | 0.00 | 0.00 | 0 | 0 | 0.00 |
| 26 | | 0.00 | 0.00 | 0 | 0 | 0.00 |
| 27 | | 0.00 | 0.00 | 0 | 0 | 0.00 |
| 28 | | 0.00 | 0.00 | 0 | 0 | 0.00 |

% sell-through can be adjusted to compensate for holds removed from inventory y Price Color by Break Avg Face: $140.20

Avg All In: $142.52 Expected Count: 9453

Sanpshot!

Calculate Total

Input From CSV

Output to CSV

Gross Potential (FACE): $1325266.00

Gross Potential (ALL IN): $1347229.00

| Seat Category | Price Level | Seat Type | Face Value | What If Face | Seat Count | Revenue Potential | Revenue Actual |
|---|---|---|---|---|---|---|---|
| OPEN | 1 | OPEN | 248.00 | 300 | 119 | 29512.00 | 0.00 |
| OPEN | 2 | OPEN | 224.00 | 200 | 528 | 118272.00 | 0.00 |
| OPEN | 3 | OPEN | 199.00 | 175 | 424 | 84376.00 | 0.00 |
| OPEN | 4 | OPEN | 161.00 | 155 | 3160 | 508760.00 | 0.00 |
| OPEN | 5 | OPEN | | 133 | 25 | 3425.00 | 0.00 |
| OPEN | 6 | OPEN | 103.00 | 100 | 10 | 1030.00 | 0.00 |
| OPEN | 7 | OPEN | 50.00 | 35 | 1228 | 61400.00 | 0.00 |
| OPEN | 8 | | 39.00 | 35 | 1276 | 49764.00 | 0.00 |
| OPEN | 9 | | 22.50 | 10 | 1592 | 35820.00 | 0.00 |
| SOLD | 1 | | 248.00 | | 4 | 992.00 | 992.00 |
| SOLD | 1 | | 248.00 | | 39 | 9672.00 | 9672.00 |
| SOLD | 1 | | 248.00 | | 48 | 1904.00 | 1904.00 |
| SOLD | 1 | | 248.00 | | 301 | 74648.00 | 74648.00 |
| SOLD | 2 | | 224.00 | | 18 | 4032.00 | 4032.00 |
| SOLD | 2 | | 224.00 | | 35 | 7840.00 | 7840.00 |
| SOLD | 2 | | 224.00 | | 1 | 224.00 | 224.00 |
| SOLD | 2 | | 224.00 | | 212 | 47488.00 | 47488.00 |
| SOLD | 3 | 3AMXG | 199.00 | | 5 | 995.00 | 995.00 |
| SOLD | 3 | ADULT | 199.00 | | 4 | 796.00 | 796.00 |
| SOLD | 3 | AMXBLU | 199.00 | | 145 | 28855.00 | 28855.00 |
| SOLD | 4 | 3AMXG | 161.00 | | 117 | 18837.00 | 18837.00 |

| Break | Count | $ Face | $ AI | % Sell | # Sell | $ Total (F) |
|---|---|---|---|---|---|---|
| 0 | 62 | 0.00 | 0.00 | 100 | 62 | 0.00 |
| 1 | 120 | 0.00 | 0.00 | 100 | 120 | 0.00 |
| 2 | 204 | 0.00 | 0.00 | 100 | 204 | 0.00 |
| 3 | 123 | 0.00 | 0.00 | 100 | 123 | 0.00 |
| 4 | 559 | 0.00 | 0.00 | 100 | 559 | 0.00 |
| 5 | 189 | 0.00 | 0.00 | 100 | 189 | 0.00 |
| 6 | 604 | 0.00 | 0.00 | 100 | 604 | 0.00 |
| 7 | 367 | 0.00 | 0.00 | 100 | 367 | 0.00 |
| 8 | 476 | 0.00 | 0.00 | 100 | 476 | 0.00 |
| 9 | 200 | 0.00 | 0.00 | 100 | 200 | 0.00 |
| 10 | 300 | 0.00 | 0.00 | 100 | 300 | 0.00 |
| 11 | 156 | 0.00 | 0.00 | 100 | 156 | 0.00 |
| 12 | 84 | 0.00 | 0.00 | 100 | 84 | 0.00 |
| 13 | 370 | 0.00 | 0.00 | 100 | | 0.00 |
| 14 | 107 | 0.00 | 0.00 | 100 | | 0.00 |
| 15 | 216 | 0.00 | 0.00 | 100 | | 0.00 |
| 16 | 110 | 0.00 | 0.00 | 100 | | 0.00 |
| 17 | 162 | 0.00 | 0.00 | 100 | | 0.00 |
| 18 | 120 | 0.00 | 0.00 | 100 | | 0.00 |
| 19 | 158 | 0.00 | 0.00 | 100 | | 0.00 |
| 20 | 230 | 0.00 | 0.00 | 100 | | 0.00 |
| 21 | 492 | 0.00 | 0.00 | 100 | | 0.00 |
| 22 | 651 | 0.00 | 0.00 | 100 | | 0.00 |
| 23 | 176 | 0.00 | 0.00 | 100 | | 0.00 |
| 24 | 208 | 0.00 | 0.00 | 100 | | 0.00 |
| 25 | 194 | 0.00 | 0.00 | 100 | | 0.00 |
| 26 | 266 | 0.00 | 0.00 | 100 | | 0.00 |
| 27 | 112 | 0.00 | 0.00 | 100 | | 0.00 |
| 28 | 485 | 0.00 | 0.00 | 100 | | 0.00 |
| 29 | 382 | 0.00 | 0.00 | 100 | | 0.00 |
| 30 | 651 | 0.00 | 0.00 | 100 | | 0.00 |
| 31 | 548 | 0.00 | 0.00 | 100 | | 0.00 |

| | Price break number | | | | |
|---|---|---|---|---|---|
| Price level | | PL 1 | PL 2 | PL 3 | PL 4 |
| Face Value | | 350 | 325 | 300 | 275 |
| All in price | | $398.13 | $369.63 | $341.25 | $312.81 |
| | 1 | 25 | 110 | 300 | |
| | 2 | | | 200 | 125 |
| | 3 | | | 500 | |

*FIG. 10*

By Stratum

| Start | Open | Sold | Held | % |
|---|---|---|---|---|
| 0 | 1747 | 0.00 | 100 | 1747 |
| 1 | 50 | 0.00 | 100 | 50 |
| 2 | 104 | 0.00 | 100 | 104 |
| 3 | 304 | 0.00 | 100 | 304 |
| 4 | 448 | 0.00 | 100 | 448 |
| 5 | 408 | 0.00 | 100 | 408 |
| 6 | 336 | 0.00 | 100 | 336 |
| 7 | 86 | 0.00 | 100 | 86 |
| 8 | 126 | 0.00 | 100 | 126 |
| 9 | 180 | 0.00 | 100 | 180 |
| 10 | 168 | 0.00 | 100 | 168 |
| 11 | 535 | 0.00 | 100 | 535 |
| 12 | 110 | 0.00 | 100 | 110 |
| 13 | 54 | 0.00 | 100 | 54 |
| 14 | 210 | 0.00 | 100 | 210 |
| 15 | 267 | 0.00 | 100 | 267 |
| 16 | 424 | 0.00 | 100 | 424 |
| 17 | 318 | 0.00 | 100 | 318 |
| 18 | 450 | 0.00 | 100 | 450 |
| 19 | 519 | 0.00 | 100 | 519 |
| 20 | 488 | 0.00 | 100 | 488 |
| 21 | 444 | 0.00 | 100 | 444 |
| 22 | 737 | 0.00 | 100 | 737 |
| 23 | 950 | 0.00 | 100 | 950 |
| 24 | 705 | 0.00 | 100 | 705 |
| 25 | 601 | 0.00 | 100 | 601 |
| 26 | 914 | 0.00 | 100 | 914 |
| 27 | 754 | 0.00 | 100 | 754 |
| 28 | 1412 | 0.00 | 100 | 1412 |
| 29 | 1280 | 0.00 | 100 | 1280 |
| 30 | 746 | 0.00 | 100 | 746 |
| 31 | 746 | 0.00 | 100 | 746 |

o means this price break can flex to this price level x means initial price level

| Price level | Price break number | PL 1 | PL 2 | PL 3 | PL 4 | PL 5 | PL 6 | PL 7 | PL 8 | PL 9 | PL 10 | PL 11 | PL 12 | PL 13 |
|---|---|---|---|---|---|---|---|---|---|---|---|---|---|---|
| Face Value | | 350 | 325 | 300 | 275 | 250 | 225 | 200 | 175 | 150 | 100 | 75 | 50 | 25 |
| All in price | | $398.13 | $369.69 | $341.25 | $312.81 | $284.38 | $398.94 | $227.50 | $199.06 | $170.63 | $113.75 | $85.31 | $56.88 | $28.44 |
| | 1 | o | x | o | o | o | | | | | | | | |
| | 2 | o | x | o | o | o | | | | | | | | |
| | 3 | o | o | x | o | o | o | | | | | | | |
| | 4 | o | o | x | o | o | o | | | | | | | |
| | 5 | o | o | o | x | o | o | | | | | | | |
| | 6 | o | o | o | x | o | o | | | | | | | |
| | 7 | o | o | o | x | o | o | | | | | | | |
| | 8 | | | | o | o | x | o | o | | | | | |
| | 9 | | | | o | o | x | o | o | | | | | |
| | 10 | | | | o | o | x | o | o | | | | | |
| | 11 | | | | o | o | o | x | o | | | | | |
| | 12 | | | | o | o | o | x | o | | | | | |
| | 13 | | | | o | o | o | x | o | | | | | |
| | 14 | | | | | | o | o | x | o | o | | | |
| | 15 | | | | | | o | o | x | o | o | | | |
| | 16 | | | | | | o | o | x | o | o | | | |
| | 17 | | | | | | o | o | x | o | o | | | |
| | 18 | | | | | | | | o | o | x | o | o | |
| | 19 | | | | | | | | o | o | x | o | o | |
| | 20 | | | | | | | | o | o | x | o | o | |
| | 21 | | | | | | | | o | o | x | o | o | |
| | 22 | | | | | | | | o | o | x | o | o | |
| | 23 | | | | | | | | o | o | x | o | o | |
| | 24 | | | | | | | | | o | o | x | o | o |
| | 25 | | | | | | | | | o | o | x | o | o |
| | 26 | | | | | | | | | o | o | x | o | o |
| | 27 | | | | | | | | | o | o | o | o | x |
| | 28 | | | | | | | | | o | o | o | o | x |
| | 29 | | | | | | | | | o | o | o | o | x |
| | 30 | | | | | | | | | o | o | o | o | x |
| | 31 | | | | | | | | | o | o | o | o | x |
| | 32 | | | | | | | | | o | o | o | o | x |

FIG. 22

FIG. 23
Confirmation Page – Auto-Pop RSVP
ticketmaster
Los Angeles & Surrounding Areas
Enter Artist, Team, or Venue
SEARCH
My Ticketmaster | Gift Cards | Retail Outlets | Help
Welcome Debbie. (Sign Out)
My Cart (0)
Home
Music
Sports
Arts & Theater
Family
Your Order Is Complete
Check Points
Email this to a friend
Share on Facebook
Debbie, tell your friends you're going to Western Conference Semifinals Los Angeles Sparks vs Seattle Storm on August 28, 2010!
Share on Facebook
Debbie, don't keep this to yourself - tell your friends you're going to Western Conference Semifinals Los Angeles Sparks vs Seattle Storm on August 28, 2010!
Not Debbie?
No Thanks
Attending
Melissa
Danielle
Limo & Car Service: Arrive in Style!
See affordable options. Find My Ride »
SEE WHO'S BEEN
Qty
Event/Item
Western Conference Semifinals Los Angeles Sparks vs Seattle Storm
Sat Aug 28, 2010 12:00 PM
Order for: Debbie Kim
Print Receipt
Special Offer
Your purchase is complete.
Click here to claim your $20.00 Cash Back
incentive on your next purchase!
Continue

FIG. 24
Confirmation Page – Initial Wall Post
ticketmaster
Los Angeles & Surrounding Areas
Home
Music
Sports
Arts & Theater
Family
Enter Artist, Team, or Venue
SEARCH
My Ticketmaster | Gift Cards | Retail Outlets | Help
Welcome Debbie. (Sign Out)
My Cart (0)
Your Order is Complete
Check Points
Email this to a friend
Share on Facebook
Debbie, tell your friends you're going to Western Conference Semifinals Los Angeles Sparks vs Seattle Storm on August 28, 2010!
Attending
Maybe
Tell friends you're going! Publish to your wall.
What's on your mind?
Western Conference Semifinals Los Angeles Sparks vs Seattle Storm
Date: Saturday, August 28
Venue: Staples Center, Los Angeles, CA
via Ticketmaster
Not Debbie?
Publish
Cancel
Qty
Event/Item
Western Conference Semifinals Los Angeles Sparks vs Seattle Storm
Melissa
Danielle
Service: Arrive in Style!
Find My Ride »
SEE WHO'S BEEN
Special Offer
Your purchase is complete.
Click here to claim your $20.00 Cash Back incentive on your next purchase!
Continue

FIG. 25A
Confirmation Page – Tag Friends & Share
Share on Facebook
Debbie, tell your friends you're going to Western Conference Semifinals Los Angeles Sparks vs Seattle Storm on August 28, 2010!
Tag who's going!
Tag up to 4 people!
View: All Selected (1)
Debbie Kim (you)
Alice Song
Amanda Raby
Andrew Wang
Ayman Luqman
Brandon Parks
Blythe Reyes
Bob Bennett
Bridget Preston
Chester Millante
Cecilia S Teng
Debbie Hsu
Choose who can see your seats on Ticketmaster.com:
Everyone
Next
Skip
« Back
Check Points
Special Offer
Continue

FIG. 25C
Facebook – Purchaser's Wall Post
facebook
Search
Home
Profile
Account
Debbie Kim
Edit My Profile
News Feed
Messages
Events
Friends
Girls
Create Group...
See All
Questions
Applications
More
Friends on Chat
News Feed
Top News · Most Recent
Share: Status Question Photo Link Video
Ed Lu
I'm pretty sure cheese can never go bad if it's encased in a wax shell, right?
23 minutes ago via TweetDeck · Like · Comment
Debbie Kim Woo hoo! Got great seats!!
SEE WHERE I'M SITTING AT: Western Conference Semifinals Los Angeles Sparks vs Seattle Storm
Date: Saturday, August 28
Venue: STAPLES Center, Los Angeles, CA, US
Who's Going: Debbie Kim, Sun Kim, Mark Ibbotson, Mark Cumayagay
25 minutes ago · Like · Comment · Buy Tickets · See Where I'm Sitting
Tommy Wooh
Somebody ate all of my Pocky at the office. Who is this mysterious Pocky robber?
26 minutes ago · Like · Comment
Lily Lam chocolate or strawberry?
9 minutes ago · Like
Sarah Elm AGAIN? somebody ate shirley's pocky before, too. we have a pocky monster on the loose.
2 minutes ago · Like
Write a comment...
Gilda Davidian likes Generationals and Tree of Codes.
50 minutes ago
Events
See All
What are you planning?
Sponsored
Create an Ad
Sony® Internet TV
TV and Internet are together at last. And it's changing how you watch TV. Click to see the world's first HDTV powered by Google TV™.
How would you use Sony Internet TV?
Tweet during shows
Check fantasy page
Post status during movie
235,017 people like Sony Electronics.
Questions
See All
Can you recommend a key copy service in Los Angeles that makes metal or plastic spare keys for 2010...
Asked by James Kung
Do Vibram Five Fingers improve your running technique?
Asked by James Kung
Is there future plans to come out with another touch phone for Verizon?
Asked by Patricia Adrian
Pokes
Chat (16)

FIG. 27
10:20 PM
Alice Song
Lower Level Loge
Jimmy Callaghan
Lower Level Loge
GPS
Chat
Facebook
Ticker
Camera
Settings

METHODS AND SYSTEMS FOR COMPUTER AIDED EVENT AND VENUE SETUP AND MODELING AND INTERACTIVE MAPS

CROSS-REFERENCE TO RELATED APPLICATIONS

The is a continuation of U.S. patent application Ser. No. 13/160,789, filed 15 Jun. 2011, the content of which is incorporated herein by reference in its entirety.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND OF THE INVENTION

1. Field of the Invention

The present invention is related to computer aided design and to electronic maps, and in particular, to computer aided event and venue setup and to interactive maps.

2. Description of the Related Art

Event ticketing typically involves pricing and selling tickets. Certain conventional techniques statically price event tickets. That is, once a price is set for a ticket or class of tickets with respect to an initial sale of those tickets, the price does not change. Further, using conventional techniques, ticket pricing is often based on insufficient information, resulting in ticket prices that are too high or too low given the actual demand for such tickets.

In addition, ever greater numbers of event ticket are sold online, rather than via telephone or brick-and-mortar outlets. However, conventional seating maps for venues presented in conjunction with such online sales tend to be static, and fail to adequately provide relevant real time dynamic data. Further, conventional seating maps fail to provide adequate interfaces for enabling users to quickly locate suitable seats.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Described herein are methods and systems for creating ticketed events and executing ticket sales (e.g., utilizing interactive ticket maps). In particular, certain methods and systems described herein are configured to create ticketed events, set ticket prices, and execute ticket sales via dynamic interactive user interfaces.

An example ticket system, configured to set ticket prices and/or to sell tickets, is networked to systems of box offices, promoters, artist managers, venue set-up personnel, social network systems, and/or potential ticket purchasers.

Certain embodiments receive and utilize information, such as event ticket sale information, timing of event, occurrence of competing attractions, and/or other information to set initial pricing and/or to adjust previously set pricing of event tickets. Certain embodiments provide interactive seating maps configured to facilitate user understanding of the available seats, prices, available discounts, seating packages, etc., by providing a comprehensive graphical view of what may be a complex set of prices and promotions.

Discussed herein is a system for providing an interactive seat map, comprising: computing hardware; a non-transitory medium storing instructions that when executed by the computing hardware, cause the computing hardware to perform operations comprising: accessing a seat map for a venue, the seat map including a definition of a plurality of sections and seats within the plurality of sections; optionally accessing pricing information associated with the plurality of venue sections and/or venue seats for a first event; providing the map to a user terminal for display as an interactive seat map including sections and/or individual seats in association with one or more of the following: an interface via which the user can specify a price range with respect to seat tickets; an interface via which the user can specify at least a first offer, wherein the first offer provides at least one of the following: a reduced price with respect to at least one seat ticket; a reduced price with respect to an ancillary product or service in association with at least one ticket purchase; an entitlement to purchase seat tickets for a certain category of seats if a corresponding offer code is supplied; receiving, via a data interface, receive relationship information with respect to the user, wherein the relationship information includes identifications of one or more friends of the user; wherein, in at least partly in response to a user specified price range and/or a user specified offer, the interactive seat map emphasizes sections and/or seats corresponding to the user specified price range and/or the user specified offer; accessing seat information with respect to one or more friends of the user; causing, at least in part, the interactive seat map to indicate sections and/or seats where at least a portion of the user's friends have tickets for; and receiving and processing a ticket purchase request for at least one seat selected by the user via the interactive seat map.

Discussed herein is a method comprising some or all of the following acts: accessing a seat map for a venue, the seat map including a definition of a plurality of sections and seats within the plurality of sections; accessing pricing information associated with the plurality of venue sections and/or venue seats for a first event; providing the map to a user terminal for display as an interactive seat map including sections and/or individual seats in association with: an interface via which a user can specify a price range with respect to seat tickets; an interface via which the user can specify at least a first offer, wherein the first offer provides at least one of the following: a reduced price with respect to at least one seat ticket; a reduced price with respect to an ancillary product or service in association with at least one ticket purchase; an entitlement to purchase seat tickets for a certain category of seats if a corresponding offer code is supplied; receiving, via a data interface, receive relationship information with respect to the user, wherein the relationship information includes identifications of one or more friends of the user; wherein, in at least partly in response to a user specified price range and/or a user specified offer, the interactive seat map emphasizes sections and/or seats corresponding to the user specified price range and/or the user specified offer; accessing seat information with respect to one or more friends of the user; causing, at least in part, the interactive seat map to indicate sections and/or seats where at least a portion of the user's friends have tickets for; and receiving and processing a ticket purchase request for at least one seat selected by the user via the interactive seat map.

Discussed herein is a system for providing an interactive seat map, comprising: computing hardware; a non-transitory medium storing instructions that when executed by the computing hardware, cause the computing hardware to perform operations comprising: accessing a seat map for a venue, the seat map including a definition of a plurality of sections and seats within the plurality of sections; accessing pricing information associated with the plurality of venue sections and/or venue seats for a first event; transmitting the map for display as an interactive seat map on a user terminal in association with: an interface via which a user can specify a price range with respect to seat tickets; receiving, via a data interface, relationship information with respect to the user, wherein the relationship information includes identifications of one or more friends of the user; accessing seat information with respect to one or more friends of the user; and wherein, in response to a user-specified price range, the interactive seat map emphasizes sections and/or seats corresponding to the user specified price range, and wherein the interactive map indicates where the one or more of the user's friends are sitting; receiving and processing a ticket purchase request for at least one seat selected by the user via the interactive seat map.

Discussed herein is a method comprising some or all of the following acts: accessing a seat map for a venue, the seat map including a definition of a plurality of sections and seats within the plurality of sections; accessing pricing information associated with the plurality of venue sections and/or venue seats for a first event; transmitting the map for display as an interactive seat map on a user terminal in association with: an interface via which the user can specify a price range with respect to seat tickets; receiving, via a data interface, relationship information with respect to the user, wherein the relationship information includes identifications of one or more friends of the user; accessing seat information with respect to one or more friends of the user; and wherein, in response to a user specified price range, the interactive seat map emphasizes sections and/or seats corresponding to the user specified price range, and wherein the interactive map indicates where the one or more of the user's friends are sitting; receiving and processing a ticket purchase request for at least one seat selected by the user via the interactive seat map.

Discussed herein is a system for providing a venue seat map, comprising: computing hardware; a non-transitory medium storing instructions that when executed by the computing hardware, cause the computing hardware to perform operations comprising: accessing a seat map for a venue, the seat map including a definition of a plurality of seats; receiving, via a data interface, relationship information with respect to a user, wherein the relationship information includes identifications of one or more friends of the user; accessing seat information with respect to one or more friends of the user; and causing the seat map to indicate where the one or more of the user's friends are sitting.

Discussed herein is a method comprising some or all of the following acts: accessing a seat map for a venue, the seat map including a definition of a plurality of seats; receiving, via a data interface, relationship information with respect to a user, wherein the relationship information includes identifications of one or more friends of the user; accessing seat information with respect to one or more friends of the user; and causing the seat map to indicate where the one or more of the user's friends are sitting.

Discussed herein is a system for providing an interactive seat map, comprising: computing hardware; a non-transitory medium storing instructions that when executed by the computing hardware, cause the computing hardware to perform operations comprising: accessing a seat map for a venue, the seat map including a definition of a plurality of sections and seats within the plurality of sections; accessing pricing information associated with the plurality of venue sections and/or venue seats for a first event; accessing status information regarding a plurality of venue seats, the status information indicating seat availability; transmitting the map for display as an interactive seat map on a user terminal, wherein the interactive map indicates seat availability; providing a user interface via which: a user may select a seat for which a ticket is already held by a ticket holder that had previously acquired the ticket, and submit an offer, including a user specified price, to purchase the ticket for the selected seat from the ticket holder; if the user submits an offer to the ticket holder, transmitting the offer to the ticket holder, and processing an acceptance or refusal of the offer from the ticket holder.

Discussed herein is a method, comprising some or all of the following acts: accessing a seat map for a venue, the seat map including a definition of a plurality of sections and seats within the plurality of sections; accessing status information regarding a plurality of venue seats, the status information indicating seat availability; transmitting the map for display as an interactive seat map on a user terminal wherein the interactive map indicates seat availability; providing a user interface via which: a user may select a seat for which a ticket is already held by a ticket holder that had previously acquired the ticket, and submit an offer, including a user specified price, to purchase the ticket for the selected seat from the ticket holder; if the user submits an offer to the ticket holder, transmitting the offer to the ticket holder, and processing an acceptance or refusal of the offer from the ticket holder.

Discussed herein is a system for providing a seat map, comprising: computing hardware; a non-transitory medium storing instructions that when executed by the computing hardware, cause the computing system to perform operations comprising: accessing a seat map for a venue, the seat map including a definition of a plurality of seats; accessing purchase process information, wherein the purchase process information indicates: a first ticket for a first seat is to be offered for sale via a first purchase process type, and a second ticket for a second seat is to be offered for sale via a second purchase process type different than the first purchase process type; accessing status information regarding a plurality of venue seats, the status information indicating seat availability; transmitting the seat map for display on a user terminal, wherein the seat map indicates seat availability, and where the seat map visually indicates that: the first ticket for the first seat is available for purchase via the first purchase process type, and the second ticket for the second seat is available for purchase via the second purchase process type; providing a user interface enabling a user: to select the first seat via the seat map and to initiate a purchase transaction for the first ticket using the first purchase process type, and/or to elect the second seat via the seat map and to initiate a purchase transaction for the second ticket using the second purchase process type.

Discussed herein is a method, comprising some or all of the following acts: accessing a seat map for a venue, the seat map including a definition of a plurality of seats; accessing purchase process information, wherein the purchase process information indicates: a first ticket for a first seat is to be offered for sale via a first purchase process type, and a second ticket for a second seat is to be offered for sale via a second purchase process type different than the first purchase process type; accessing status information regarding a plurality of venue seats, the status information indicating seat availability; transmitting the seat map for display on a user terminal, wherein the seat map indicates seat availability, and where the seat map visually indicates that: the first ticket for the first seat is available for purchase via the first purchase process type, and the second ticket for the second seat is available for purchase via the second purchase process type; providing a user interface enabling a user: to select the first seat via the seat map and to initiate a purchase transaction for the first ticket using the first purchase process type, and/or to elect the second seat via the seat map and to initiate a purchase transaction for the second ticket using the second purchase process type.

Discussed herein is a system for providing a seat map, comprising: computing hardware; a non-transitory medium storing instructions that when executed by the computing hardware, cause the computing hardware to perform operations comprising: accessing a seat map for a venue, the seat map including a definition of a plurality of seats; transmitting the seat map for display on a terminal of a first user, wherein the seat map indicates seat availability, and providing a user interface enabling the first user: to select the first seat via the seat map and to submit a first offer to purchase a corresponding first ticket for the first seat; identify a second user; condition the offer to purchase the first ticket for the first seat on an acceptance of a second offer from the second user to purchase a second ticket for a second seat; determining if the second offer to purchase the second ticket for the second seat is acceptable; determining if the first offer to purchase the first ticket for the first seat is acceptable, at least partly in response to determining that the first offer to purchase the first ticket for the first seat the second offer to purchase the second ticket for the second seat are acceptable, enabling the purchase of the first ticket to be completed.

Discussed herein is a method, comprising some or all of the following acts: accessing a seat map for a venue, the seat map including a definition of a plurality of seats; transmitting the seat map for display on a terminal of a first user, wherein the seat map indicates seat availability, and providing a user interface enabling the first user: to select the first seat via the seat map and to submit a first offer to purchase a corresponding first ticket for the first seat; identify a second user; condition the offer to purchase the first ticket for the first seat on an acceptance of a second offer by the second user to purchase a second ticket for a second seat; determining if the second offer to purchase the second ticket for the second seat is acceptable; determining if the first offer to purchase the first ticket for the first seat is acceptable, at least partly in response to determining that the first offer to purchase the first ticket for the first seat the second offer to purchase the second ticket for the second seat are acceptable, enabling the purchase of the first ticket to be completed.

Discussed herein is a system for providing a seat map, comprising: computing hardware; a non-transitory medium storing instructions that when executed by the computing hardware, cause the computing hardware to perform operations comprising: determining if user activity by a plurality of users is interfering with providing, to a plurality of user terminals, substantially real-time updates to an interactive seat map, wherein the interactive seat map enables a given user to select a specific seat via the interactive seat map and to purchase a seat ticket for the user selected seat; at least partly in response to determining that user activity is interfering with providing, to the plurality of user terminals, substantially real-time updates to the interactive seat map: preventing at least a portion of the plurality of users from using the interactive seat map to purchase user selected seats; and enabling one or more users to purchase seat tickets via a first user interface wherein the user cannot select specific seat to purchase tickets for.

Discussed herein is a method, comprising some or all of the following acts: determining if user activity by a plurality of users is interfering with providing, to a plurality of user terminals, substantially real-time updates to an interactive seat map, wherein the interactive seat map enables a given user to select a specific seat via the interactive seat map and to purchase a seat ticket for the user selected seat; at least partly in response to determining that user activity is interfering with providing, to the plurality of user terminals, substantially real-time updates to the interactive seat map: preventing at least a portion of the plurality of users from using the interactive seat map to purchase user selected seats; and enabling one or more users to purchase seat tickets via a first user interface wherein the user cannot select specific seat to purchase tickets for.

Discussed herein is a method for providing an interactive venue map, comprising some or all of the following acts: detecting that a user is at a first venue for a first event; providing an interactive venue map of the first venue for display on a mobile user terminal; identifying one or more friends of the user attending the first event at the first venue; identifying seats locations of the one or more friends of the user; including an indication on the interactive venue map as to the seating locations of the one or more friends within the first venue for the first event.

Discussed herein is a system for providing a seat map, comprising: computing hardware; a non-transitory medium storing instructions that when executed by the computing hardware, cause the computing hardware to perform operations comprising: detecting that a user is at a first venue for a first event; providing an interactive venue map of the first venue for display on a mobile user terminal; identifying one or more friends of the user attending the first event at the first venue; identifying seats locations of the one or more friends of the user; including an indication on the interactive venue map as to the seating locations of the one or more friends within the first venue for the first event.

Discussed herein is a method for providing an interactive venue map, comprising some or all of the following acts: detecting that a user is at a first venue for a first event; providing an interactive venue map of the first venue for display on a mobile user terminal; receiving current location information from the mobile user terminal while the mobile user terminal is at the first venue; estimating line duration times for a plurality of destinations of a first destination type; and transmitting to the mobile user terminal information relating to an estimated line duration time for at least one of the plurality of destinations of the first destination type.

Discussed herein is a system for providing a seat map, comprising: computing hardware; a non-transitory medium storing instructions that when executed by the computing hardware, cause the computing hardware to perform operations comprising: detecting that a user is at a first venue for a first event; providing an interactive venue map of the first venue for display on a mobile user terminal; receiving current location information from the mobile user terminal while the mobile user terminal is at the first venue; estimating line duration times for a plurality of destinations of a first destination type; and transmitting to the mobile user terminal information relating to an estimated line duration time for at least one of the plurality of destinations of the first destination type.

Discussed herein is a system for controlling an image display on a remote device, comprising: computing hardware; a non-transitory medium storing instructions that when executed by the computing hardware, cause the computing hardware to perform operations comprising: detecting the presence of the remote device at an event venue, the event venue including a plurality of seats; identifying a first user associated with the remote device; determining what is being displayed in the remote device display associated with the first user; accessing relationship information for the first user, the relationship information identifying at least a second user with whom the first user has a relationship; identifying a seating location in the event venue that is associated with the second user; at least partly in response to determining that the seating location associated with the second user is being displayed in the remote device display associated with the first user, causing computer generated data to be displayed in association with the displayed seating location, the computer generated data including an identifier of the second user and/or an indication that the first user has a relationship with second user.

Discussed herein is a method, comprising some or all of the following acts: detecting the presence of the remote device at an event venue, the event venue including a plurality of seats; identifying a first user associated with the remote device; determining what is being displayed in the remote device display associated with the first user; accessing relationship information for the first user, the relationship information identifying at least a second user with whom the first user has a relationship; identifying a seating location in the event venue that is associated with the second user; at least partly in response to determining that the seating location associated with the second user is being displayed in the remote device display associated with the first user, causing computer generated data to be displayed in association with the displayed seating location, the computer generated data including an identifier of the second user and/or an indication that the first user has a relationship with second user.

Discussed herein is a system for configuring a ticketed event, comprising: computing hardware; a non-transitory medium storing instructions that when executed by the computing hardware, cause the computing hardware to perform operations comprising: accessing a seat map for a venue, the seat map including a definition of a plurality of sections and seats within the plurality of sections; providing the venue seat map for display on a user terminal; accessing from memory and providing for display in association with the venue seat map an event name for a ticketed event that is being setup using the venue seat map; accessing from memory and providing for display in association with the venue seat map a name associated with the venue; accessing from memory and providing for display in association with the venue seat map a date of the event this is being setup using the venue map; accessing from memory and providing seat status information, the seat station information indicating how many seats are in the venue for which tickets are to be offered for sale; accessing monetary value information (e.g., the ticket face value and/or other ticket related fees (e.g., service fees, facility fees, handling fees, shipping fees, etc.)) for tickets corresponding to the seats for which tickets are to be offered for sale; calculating a potential revenue for the event based at least in part on the monetary value information and how many seats are in the venue for which tickets are to be offered for sale; providing the calculated potential event revenue for display on the user terminal; accessing from memory and providing for display a listing of a plurality of price levels, wherein a given price level is associated with a subset of the seats for which tickets are to be offered for sale; providing for display a monetary value of tickets associated with seats in the given price level; providing for display how many seats are associated with the given price level; calculating and providing for display a revenue potential for the given price level; providing for display on the user terminal a user interface via which a user can alter: a seat count associated with the given price level; and the monetary value of tickets associated with seats in the given price level; calculating and providing for display a new revenue potential for the given price level based at least in part on a user alteration of the monetary value of tickets associated with seats in the given price level and/or a user alteration of the seat count for the given price level.

Discussed herein is a method, comprising some or all of the following acts: accessing a seat map for a venue, the seat map including a definition of a plurality of sections and seats within the plurality of sections; providing the venue seat map for display on a user terminal; accessing from memory and providing for display in association with the venue seat map an event name for a ticketed event that is being setup using the venue seat map; accessing from memory and providing for display in association with the venue seat map a name associated with the venue; accessing from memory and providing for display in association with the venue seat map a date of the event this is being setup using the venue map; accessing from memory and providing seat status information, the seat station information indicating how many seats are in the venue for which tickets are to be offered for sale; accessing monetary value information (e.g., the ticket face value and/or other ticket related fees (e.g., service fees, facility fees, handling fees, shipping fees, etc.)) for tickets corresponding to the seats for which tickets are to be offered for sale; calculating a potential revenue for the event based at least in part on the monetary value information and how many seats are in the venue for which tickets are to be offered for sale; providing the calculated potential event revenue for display on the user terminal; accessing from memory and providing for display a listing of a plurality of price levels, wherein a given price level is associated with a subset of the seats for which tickets are to be offered for sale; providing for display a monetary value of tickets associated with seats in the given price level; providing for display how many seats are associated with the given price level; calculating and providing for display a revenue potential for the given price level; providing for display on the user terminal a user interface via which a user can alter: a seat count associated with the given price level; and the monetary value of tickets associated with seats in the given price level; calculating and providing for display a new revenue potential for the given price level based at least in part on a user alteration of the monetary value of tickets associated with seats in the given price level and/or a user alteration of the seat count for the given price level.

Discussed herein is a system for configuring a ticketed event, comprising: computing hardware; a non-transitory medium storing instructions that when executed by the computing hardware, cause the computing hardware to perform operations comprising some of all of the following acts: accessing a seat map for a venue, the seat map including a definition of a plurality of sections and seats within the plurality of sections; providing the venue seat map for display on a user terminal; providing for display an identifier associated with an event being defined using the venue map; providing a user interface for display via which a user can specify ticket prices for seats selected via the seat map; calculating a potential revenue for the event based at least in part on the specified tickets prices and how many seats are in the venue for which tickets are to be offered for sale; providing the calculated potential event revenue for display on the user terminal; accessing from memory and providing for display a listing of a plurality of price levels, wherein a given price level is associated with a subset of the seats for which tickets are to be offered for sale; providing for display a ticket price associated with seats in a first price level; providing for display how many seats are associated with the first price level; calculating and providing for display a revenue potential for the first price level; providing for display on the user terminal a user interface via which a user can alter a monetary value (e.g., the ticket face value and/or other ticket related fees (e.g., service fees, facility fees, handling fees, shipping fees, etc.)) of tickets associated with seats in a second price level after one or more tickets to the event have been sold; calculating and providing for display a new revenue potential for the given price level based at least in part on a user alteration of the monetary value of tickets associated with seats in the second price level.

Discussed herein is a method comprising: accessing from memory a seat map for a venue, the seat map including a definition of a plurality of sections and seats within the plurality of sections; providing the venue seat map for display on a user terminal; providing for display an identifier associated with an event being defined using the venue map; providing a user interface for display via which a user can specify ticket prices for seats selected via the seat map; calculating, using a computing device, a potential revenue for the event based at least in part on the specified tickets prices and how many seats are in the venue for which tickets are to be offered for sale; providing the calculated potential event revenue for display on the user terminal; accessing from memory and providing for display a listing of a plurality of price levels, wherein a given price level is associated with a subset of the seats for which tickets are to be offered for sale; providing for display a ticket price associated with seats in a first price level; providing for display how many seats are associated with the first price level; calculating and providing for display a revenue potential for the first price level; providing for display on the user terminal a user interface via which a user can alter a monetary value of tickets associated with seats in a second price level after one or more tickets to the event have been sold; calculating and providing for display a new revenue potential for the given price level based at least in part on a user alteration of the monetary value of tickets associated with seats in the second price level.

Discussed herein is a method comprising: accessing, via a computer system, a user interface including a seat map for a first venue for a first ticketed event, wherein the first venue includes a plurality of seats; defining a first plurality of price levels for the first ticketed event; selecting, via the seat map, one or more seats; associating the selected seats with a given price level in the first plurality of price levels; assigning monetary values to respective price levels in the first plurality of price levels; causing the computer system to calculate a first potential revenue for the first ticketed event, wherein the first potential revenue is based at least in part on the monetary values assigned to the respective price levels and how many seats are associated with respective price levels; changing a first of the monetary values assigned to a first of the price levels to a second monetary value; and causing the computer system to calculate a second potential revenue for the first ticketed event, wherein the second potential revenue is based at least in part on the monetary values assigned to the respective price levels, including the second monetary value, and how many seats are associated with respective price levels.

Discussed herein is a method comprising some of all of the following acts: accessing a seat map for a venue, the seat map including a definition of a plurality of sections and seats within the plurality of sections; providing the venue seat map for display on a user terminal; providing for display an identifier associated with an event being defined using the venue map; providing a user interface for display via which a user can specify ticket prices for seats selected via the seat map; calculating a potential revenue for the event based at least in part on the specified tickets prices and how many seats are in the venue for which tickets are to be offered for sale; providing the calculated potential event revenue for display on the user terminal; accessing from memory and providing for display a listing of a plurality of price levels, wherein a given price level is associated with a subset of the seats for which tickets are to be offered for sale; providing for display a ticket price associated with seats in a first price level; providing for display how many seats are associated with the first price level; calculating and providing for display a revenue potential for the first price level; providing for display on the user terminal a user interface via which a user can alter a monetary value (e.g., the ticket face value and/or other ticket related fees (e.g., service fees, facility fees, handling fees, shipping fees, etc.)) of tickets associated with seats in a second price level after one or more tickets to the event have been sold; calculating and providing for display a new revenue potential for the given price level based at least in part on a user alteration of the monetary value of tickets associated with seats in the second price level.

Discussed herein is a system for configuring a ticketed event, comprising: computing hardware; a non-transitory medium storing instructions that when executed by the computing hardware, cause the computing hardware to perform operations comprising: providing a user interface via which a user can assign a first user an advisor role, a second user an decision maker role, and a third user an implementer road, wherein the advisor is entitled to provisionally change at least one ticket pricing setting and evaluate a corresponding impact on a potential revenue and provide a corresponding event setup proposal to be presented to the decision maker, but the advisor is not entitled to implement the change in the at least one ticket pricing setting with respect to an on-sale event; the decision maker is entitled review the advisor proposal and approve or disapprove the advisor proposal via the system; the implementer is entitled to implement, via the system, the advisor proposal if approved by the decision maker.

Discussed herein is a method, comprising some or all of the following acts: providing a user interface via which a user can assign a first user an advisor role, a second user an decision maker role, and a third user an implementer road, wherein the advisor is entitled to provisionally change at least one ticket pricing setting and evaluate a corresponding impact on a potential revenue and provide a corresponding event setup proposal to be presented to the decision maker, but the advisor is not entitled to implement the change in the at least one ticket pricing setting with respect to an on-sale event; the decision maker is entitled review the advisor proposal and approve or disapprove the advisor proposal via the system; the implementer is entitled to implement, via the system, the advisor proposal if approved by the decision maker.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIG. 4 illustrates an example user interface via which a user can vary ticket parameters and view projected results.

FIG. 10 illustrates an example price break report.

FIG. 22 illustrates an example pricing matrix.

DETAILED DESCRIPTION OF PREFERRED EMBODIMENTS

Figure 1A:
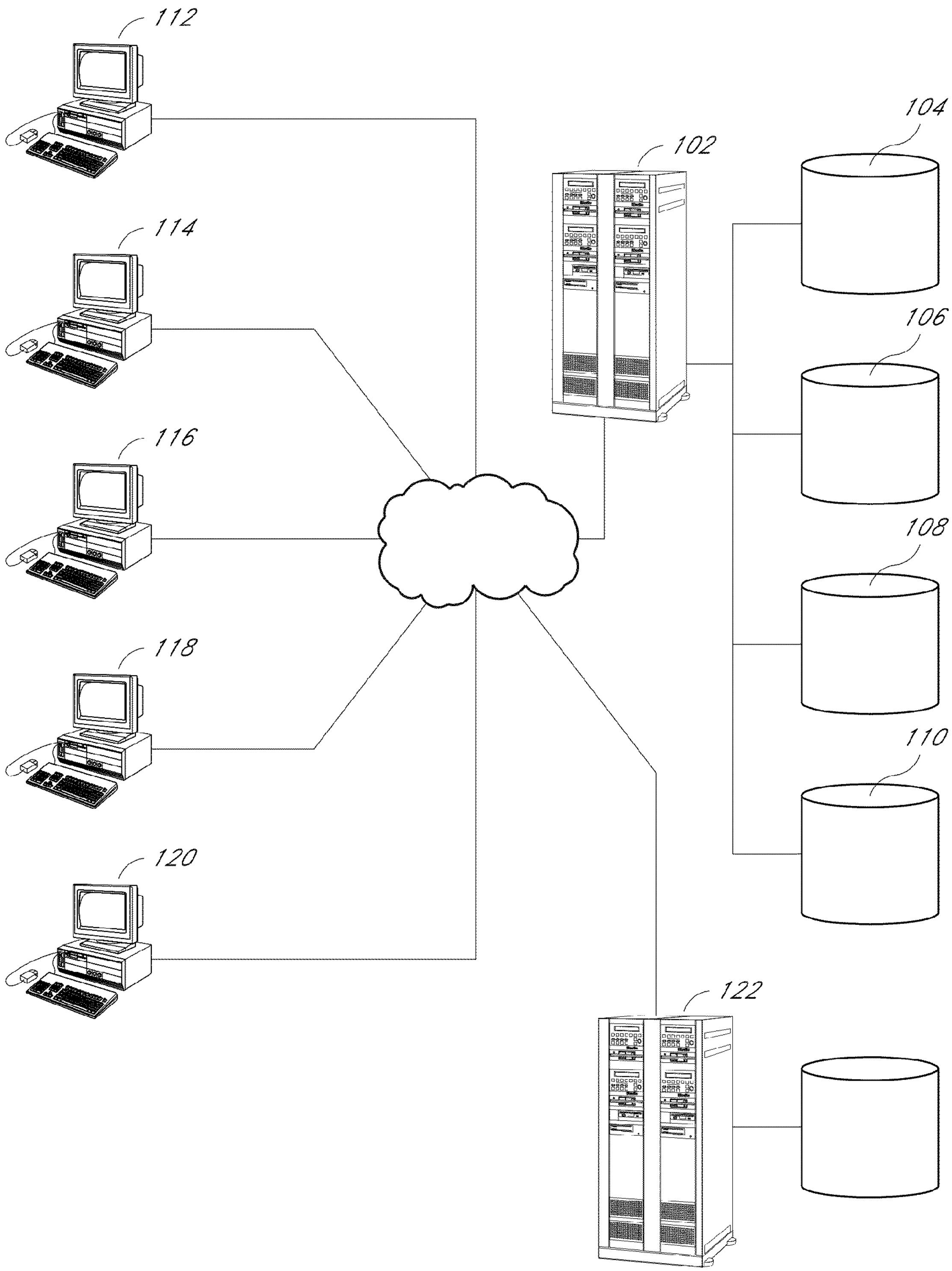
FIG. 1A illustrates an example computer-based architecture.

Conventional approaches to ticket pricing suffer from significant deficiencies. Conventional pricing techniques often set ticket prices for certain tickets at too low a price. That is, ticket purchasers would have been willing to pay more than the face price for the ticket. This under-pricing of the ticket therefore results in a loss of potential revenues to the ticket seller, the performer/artist, and the promoter. Often, conventional ticket pricing overprices tickets. That is, the ticket price is set higher than sufficient numbers ticket purchasers are willing to pay to consume the available inventory of tickets or an adequate portion of the available inventory of tickets. This overpricing of tickets therefore results in a loss of potential revenues to the ticket seller.

Further, conventional seating maps for venues presented in conjunction with ticket sales tend to be static, and fail to provide relevant real time dynamic data. In addition, conventional seating maps fail to coherently integrate and display relevant seating, ticketing, and event information.

Certain example embodiments described herein may address some or all of the deficiencies of the conventional techniques discussed above. Certain embodiments may be implemented via hardware, software stored on media, or a combination of hardware and software. For example, certain embodiments may include software/program instructions stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, WiFi, Bluetooth, T1, DSL, cable, optical, or other interface(s) which may be coupled to the Internet), content databases, customer account databases, etc.). Data stores (e.g., databases) may be used to store some or all of the information discussed herein (e.g., seating maps, pricing information, seat status, purchase information, ticket information, etc.).

By way of example, a given computing device may optionally include user interface devices, such as some or all of the following: one or more displays, keyboards, touch screens, speakers, microphones, mice, track balls, touch pads, printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc.

Described herein are methods and systems for creating ticketed events and executing ticket sales. In particular, certain methods and systems described herein are configured to create ticketed events, set ticket prices, and execute ticket sales via dynamic interactive user interfaces.

An example ticket system, configured to set ticket prices and/or to sell tickets, is networked (e.g., via the Internet or other network) to computing systems of box offices, promoters, artist managers, venue set-up personnel, social network systems, and/or potential ticket purchasers. Thus, the ticket system may receive and/or provide for display information and/or instructions described herein to one or more of the foregoing networked systems and/or other systems.

Certain embodiments receive and utilize information, such as event ticket sale information, timing of event, occurrence of competing attractions, and/or other information to set initial pricing and/or to adjust previously set pricing of event tickets. Certain embodiments provide interactive seating maps configured to facilitate user understanding of the available seats, prices, available discounts, seating packages, etc., by providing a unified view (including a graphical representation) of what may be a complex set of prices and promotions.

With respect to ticket pricing, certain embodiments utilize a model with high pricing granularity, optionally determined by statistical analysis and/or other model in combination with price level flexing/adjustment as a function of at least sell through (percentage or amount of available event tickets actually sold). Such high granularity can be two or more times the conventional granularity of four pricing points. For example, 8, 10, 16, 32, 64, or other number of pricing levels may be utilized, where different seats or seating sections can be associated with different pricing and where prices can be increased or decreased from a first pricing level to a second pricing level.

This increase in granular price levels enable ticket pricing to be set or adjusted to more precisely match user demand and/or predicted user demand. However, certain embodiments optionally set the granularity low enough of avoid or reduce operational inefficiencies and customer confusion (e.g., no more than 64 pricing levels).

Certain embodiments estimate demand and set ticket prices using the pricing levels or event-wide based on a number of characteristics optionally including, but not limited to, some or all of the following: artist, similar artist activity, recent metropolitan area activity, or day of show. Certain embodiments take into account venue sightlines in pricing tickets for a given event at a given venue.

Still further, certain embodiments combine events, such as sporting, theatrical, or concert events into a season package or a partial season package. Such a package may include high or medium demand events and relatively lower demand events to thereby enhance ticket sales for the lower demand events. The grouping may be selected to as to achieve a certain desired level of ticket sales for a given season. Demand may be measured by actual tickets sales for other events that involve a given performer/performance (e.g., a musical performer/artist, a sporting team, a play, etc.) and/or that involve a similar performer (e.g., a performer in the same genre as the performer that is being packaged).

For example, certain embodiments perform pattern matching on sales rates utilizing automated tools that analyze sales rates of a given event and current and/or past comparable events to determine the likelihood that certain seats/sections/price levels may or may not sell out at the current set price, and to indicate whether price changes may or may not be recommended in order to sell out or to achieve other sales goals and/or whether certain events should be packaged together. By way of example, an event may be determined to be comparable using one or more of the following factors and/or other factors:

performer/artist (e.g., is it the same artist)

genre (e.g., is it the same genre of music)

venues (e.g., is it a similar sized venue, is it an outdoor venue, etc.)

time of year of event;

time of day of event;

sales;

existence of competing attractions at the same or within a specified range of time and/or within a specified distance of the event (e.g., a popular sporting event, concert, new blockbuster movie, etc.).

Still further, certain embodiments address the challenge presented with respect to enhancing tickets sales, revenues, and/or profits presented by season tickets and "holds" (tickets held for the performer, promoter, or other entity, that are not available for sale to the general public). Season tickets and "holds" tend to consume much or all of the most elastic, high-demand inventory in certain venues, and yet conventionally, are not appropriately priced or offered for sale at appropriate times.

Yet further, certain embodiments may be utilized to enhance gross revenues, net revenues, and/or the number of seats filled/tickets sold. Certain embodiments may be utilized to reduce certain types of resale activity (e.g., resale activities that may not be in the public interest, such as, in certain instances, ticket scalping).

Certain example embodiments will now be described with respect to the figures.

Figure 26A:
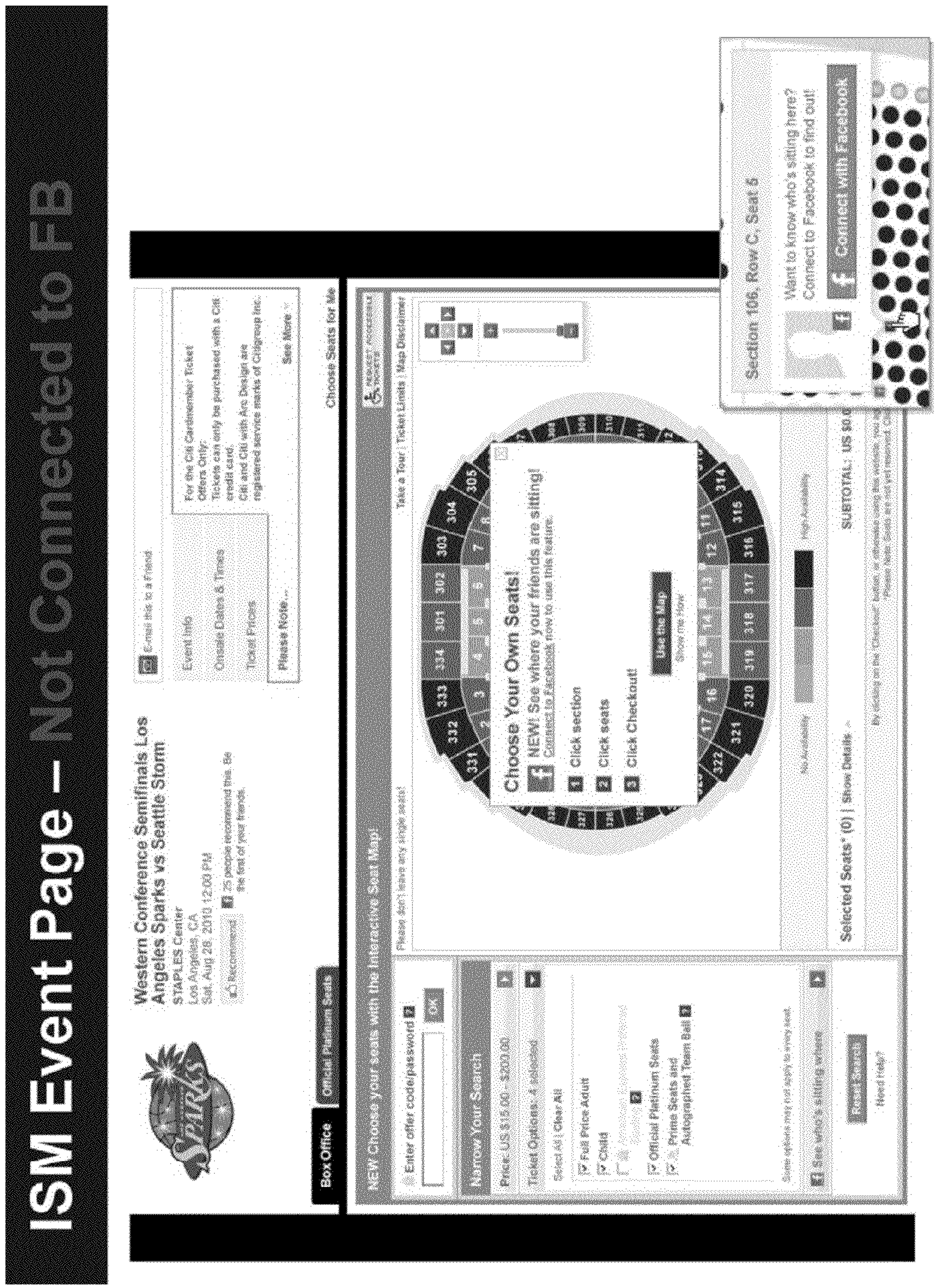
Figure 26B:
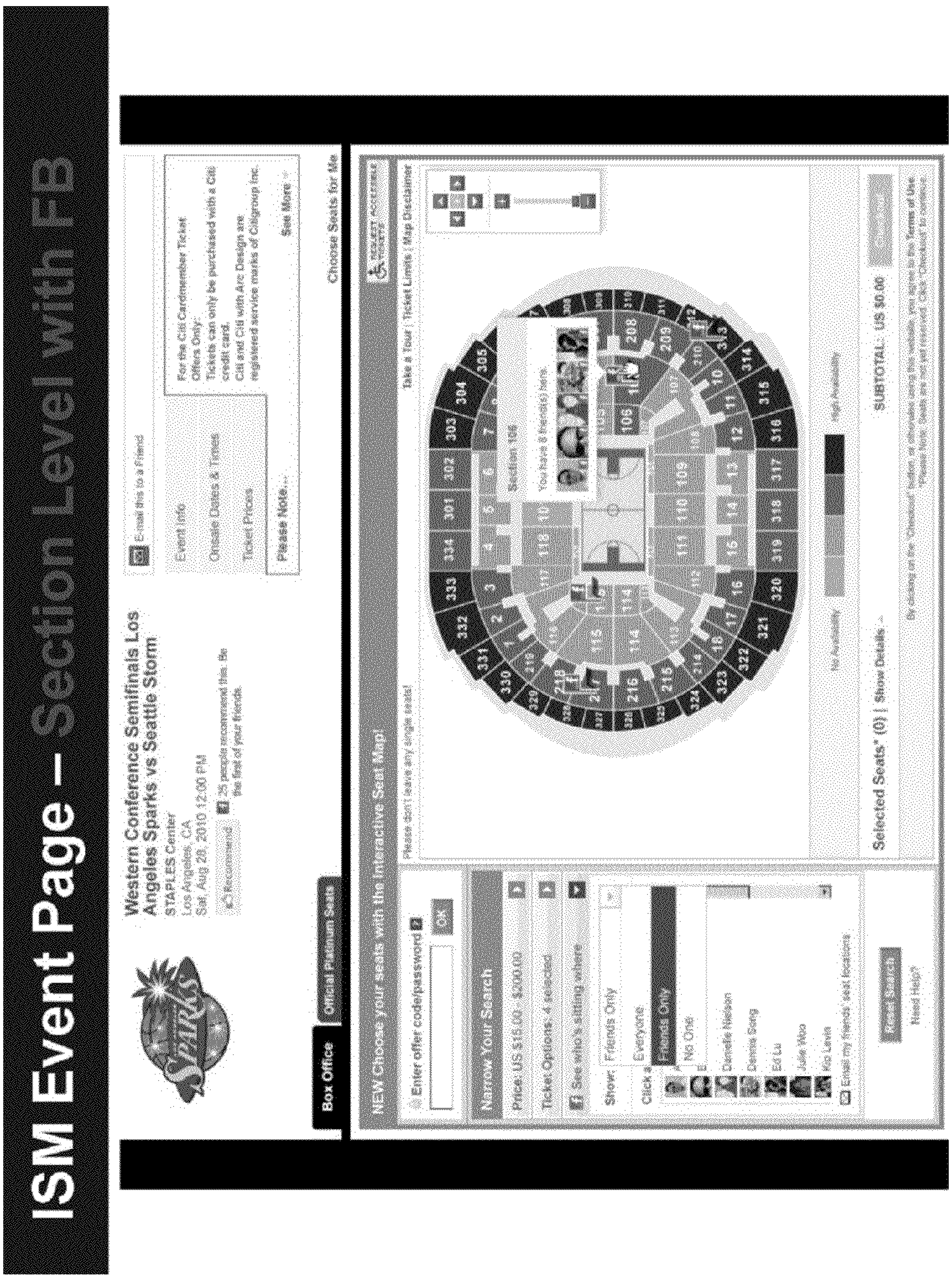
Figure 26C:
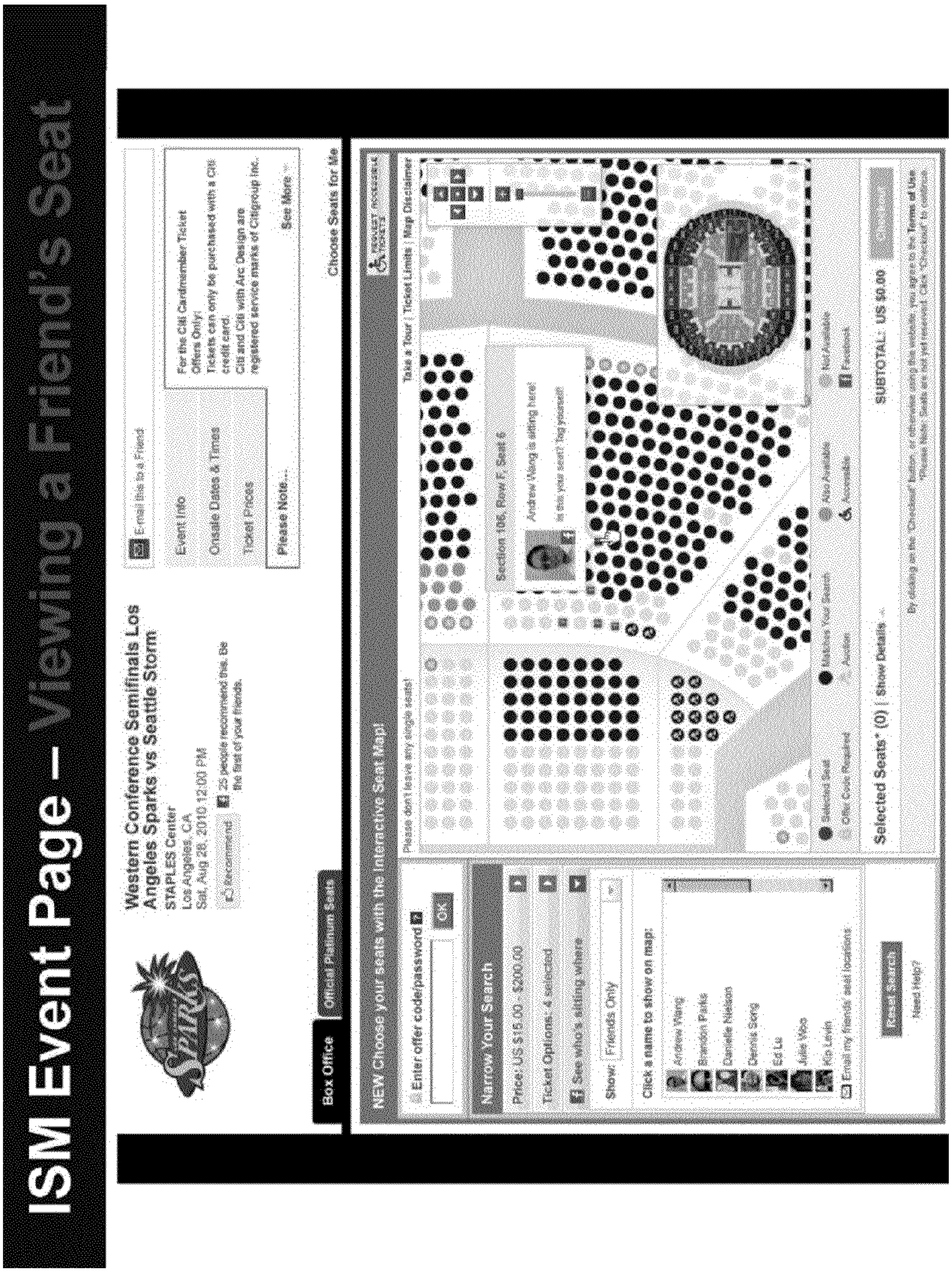
Figures 1, 26D:
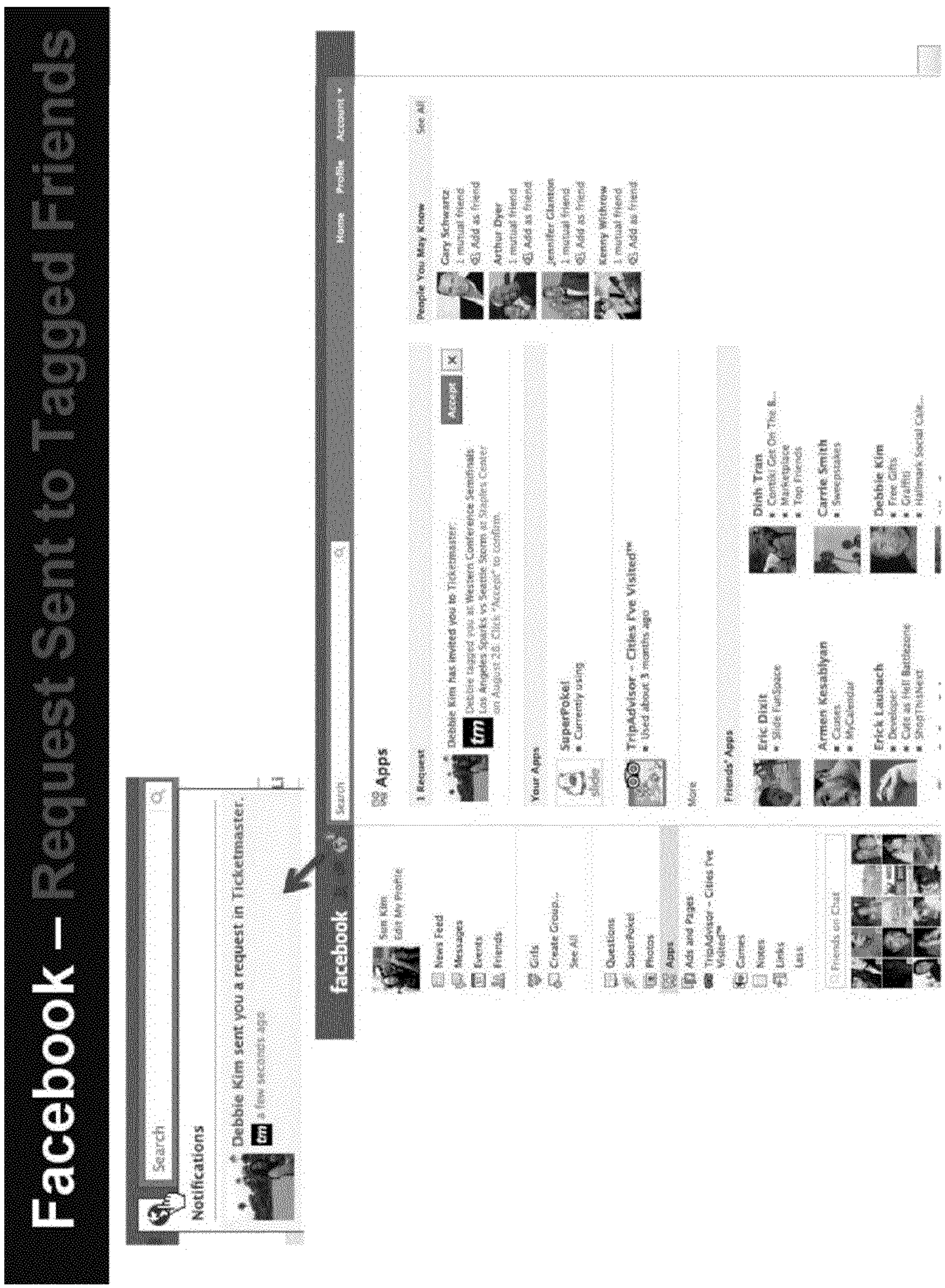
Figures 2, 26D:
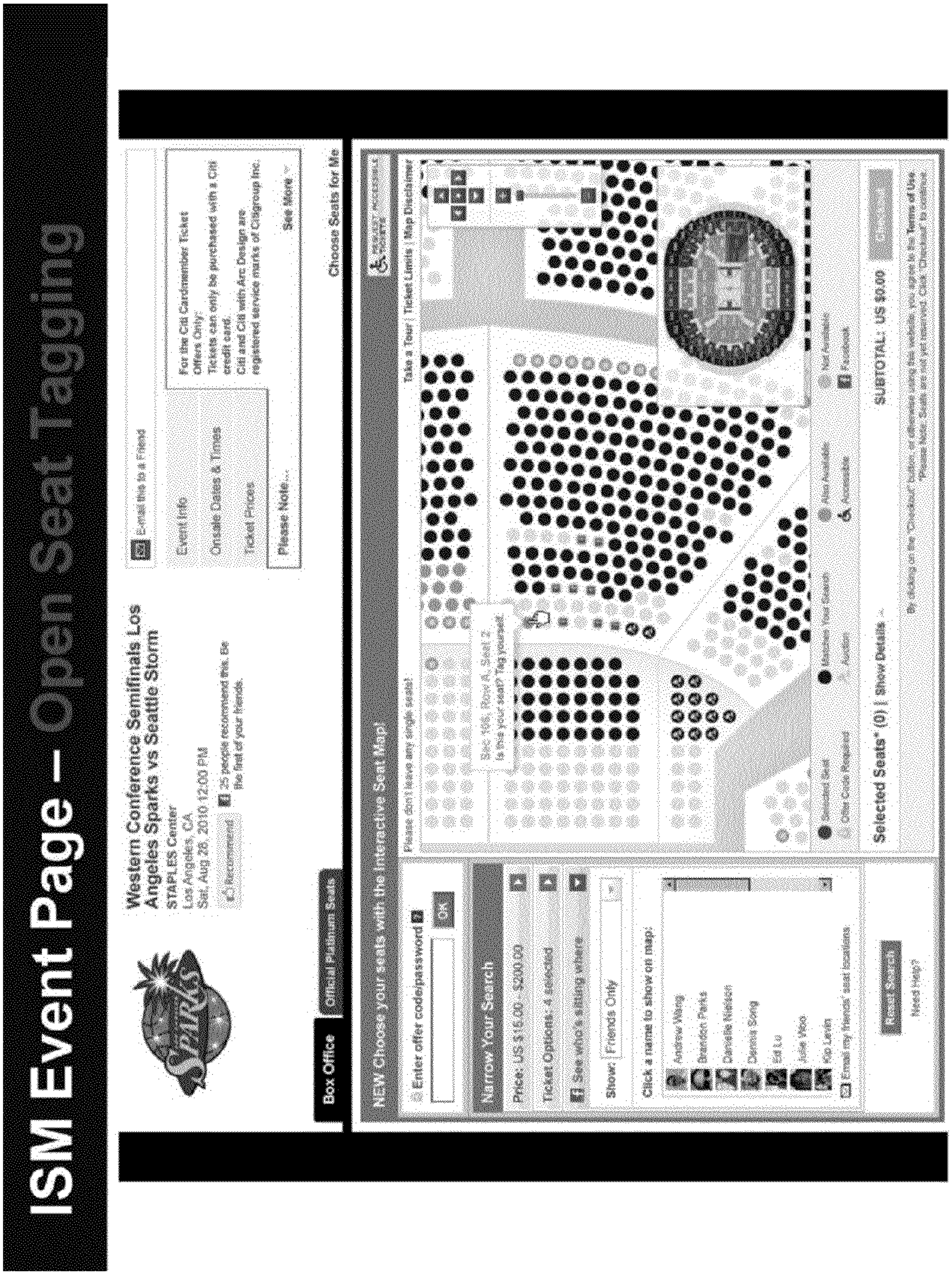

FIG. 1 illustrates an example architecture. A computer system 102, which may be a ticket system, may be in the form of a server that hosts program code configured to execute processes described herein and to provide for display over a network to one or more terminals (e.g., client computers 112, 114, 116, 118, 120) some or all of the user interfaces discussed herein. In addition, the system 102 is configured to receive user requests, instructions, and/or data provided via the terminals, carry out the user requests and/or instructions, and access data from and store data to one or more data stores (e.g., venue database 104, pricing database 106, ticketing database 108, user account database 110, social network database, etc.). The system 102 may be coupled to the terminals and/or other systems via one or more networks 112. By way of example, the terminals can include some or all of the following:

a venue operator terminal 112;

a box office terminal 114;

a promoter terminal 116;

a ticket seller terminal 118;

a ticket purchaser terminal 120.

The system 102 enables a user to define a representation or model of a venue for an event (e.g., to setup the event). For example, as described in greater detail herein, various user interfaces are provided via which a user can define ticket pricing (e.g., pricing levels) for individual seats and/or groups of seats (e.g., price breaks). Further, certain embodiments enable a user to model the impact various ticket prices have on ticket sales and revenues for an event. For example, as described in greater detail below, a user may change the price level for one or more groups of seats, and the system will calculate a projected effect on ticket sales and revenues (e.g., from ticket sales and/or concessions). The system will then generate a report that is displayed to the user that reports the projections.

The system may generate a detailed summary for executive review, which may then be transmitted to (and/or printed out and provided to) one or more designated recipients (e.g., whose approval is/are required in order to implement the event setup or changes thereto), whose approval or disapproval may be recorded by the system. The system may also keep and store an archive of certain or all changes made to the event setup. The approved detailed summary may be physically and/or electronically stored with or in association with a related contract (e.g., a contract between the ticket seller, venue, promoter, and/or performer/team).

Certain embodiments enable a user to designate and store a rank for each seat, seat block, section and/or other seating areas (e.g., where the user can select a seat displayed in a seat map and enter a ranking code such as a number, or where a formula can be applied for each seat that takes into account seat distance from the performance/stage, viewing angle relative to the performance/stage, seat height relative to the floor/performance/state, and/or other factors). The ranking may correspond to an objective or subjective quality ranking (e.g., where a first row, center seat, may have a ranking of one, and where a rearmost seat at the highest seating level may have a ranking of 18,000). This ranking may be used to designate the selling order of seats by the system (e.g., in response to "best-available" seat requests, where a user requests a ticket to whatever is designated as the best available seat). The seat ranking may also be used for ranked seat auctions, as discussed elsewhere herein.

Further, the system 102 receives substantially real time ticket sales information for one or more ongoing events, and reports the information to a user (e.g., reports an event ticket sales rate, the number of sold seats, the number of unsold seats, the number of held seats, the percentage of sold seats, a projected sell-out time, event web page visits, event web page conversions to sales, cumulative sales by day as a percent of original net capacity, cumulative audit gross by day, and/or other information discussed herein). The system 102 also has access to, and is configured to provide for display historical information for events that have concluded, including some or all of the types of information provided for ongoing events.

The system 102 optionally utilizes the event seating and ticket pricing information to provide user interfaces for display to ticket purchasers. For example, the user interfaces may display a seating chart color coded, icon coded, and/or text coded to indicate seat availability, prices, whether the seats are wheelchair accessible, whether a special code is needed to purchase ticket for a seat, whether the user has already purchased a ticket for the seat for the event, etc. The ticket purchaser user interface may provide a control via which the user can specify filtering criteria (e.g., ticket price, viewing quality, whether a special offer is available, whether the a ticket for the seat is held by a friend of the user, etc.), wherein the user interface will highlight individual seats and/or seating sections that meet the filter criteria. Optionally, the user may select (e.g., by pointing at or clicking on) an individual seat and/or seating section, and the ticket purchaser user interface will access and display additional information regarding the eat (e.g., whether a special password/offer code is required to purchase tickets for the seat, a seat number, a seat row number, a seat section number, face price, ticket related fees, combined face and fee prices, view information, whether alcohol is permitted, whether the seat is in the shade, etc.).

Optionally, the system 102 has permissions stored for various users. The permissions may be specified by an overall system of event manager. The permissions may, for example, specify who is allowed to view certain information (such as some or all of the information discussed herein), who is allowed to change properties of one or more items (e.g., ticket prices, price breaks, holds, seating setups, and/or other parameters discussed herein), who is allowed to propose changes to a decision maker, and/or who is allowed to approve changes.

The system 102 may be connected, via the network, to a social network site system 122. The social network site system 122 may include a database storing user information, photos, event information, and user and other pages, and connections between users and items, such as shared content, photograph/video tags (wherein a tag may be metadata, such as a keyword (e.g., a person's name) or term assigned to an item of information, such as a person in a photograph), friend relationships, etc. The system 102 may obtain information regarding users from the social network site system 122. For example, the system 102 may request and obtain names, photographs, the identifications and photographs of users' friends, information on user social events, postings, etc. The system 102 may also create events, wherein users may view postings regarding events and receive invitation to the events via the social network site system 122. In certain embodiments, if a user responds to an invitation or indicates which event seats the user and/or friends will be sitting in, the system 102 may construct a post and transmit the post to the social network site system 122 for display via a webpage or other interface.

Thus, the computer system 102 enables events to be configured, projections and modeling to be performed, real-time information to be gathered from multiple sources, analyzed and reported, and/or ticket sales to be managed and made via interactive seat maps.

Figure 1B:
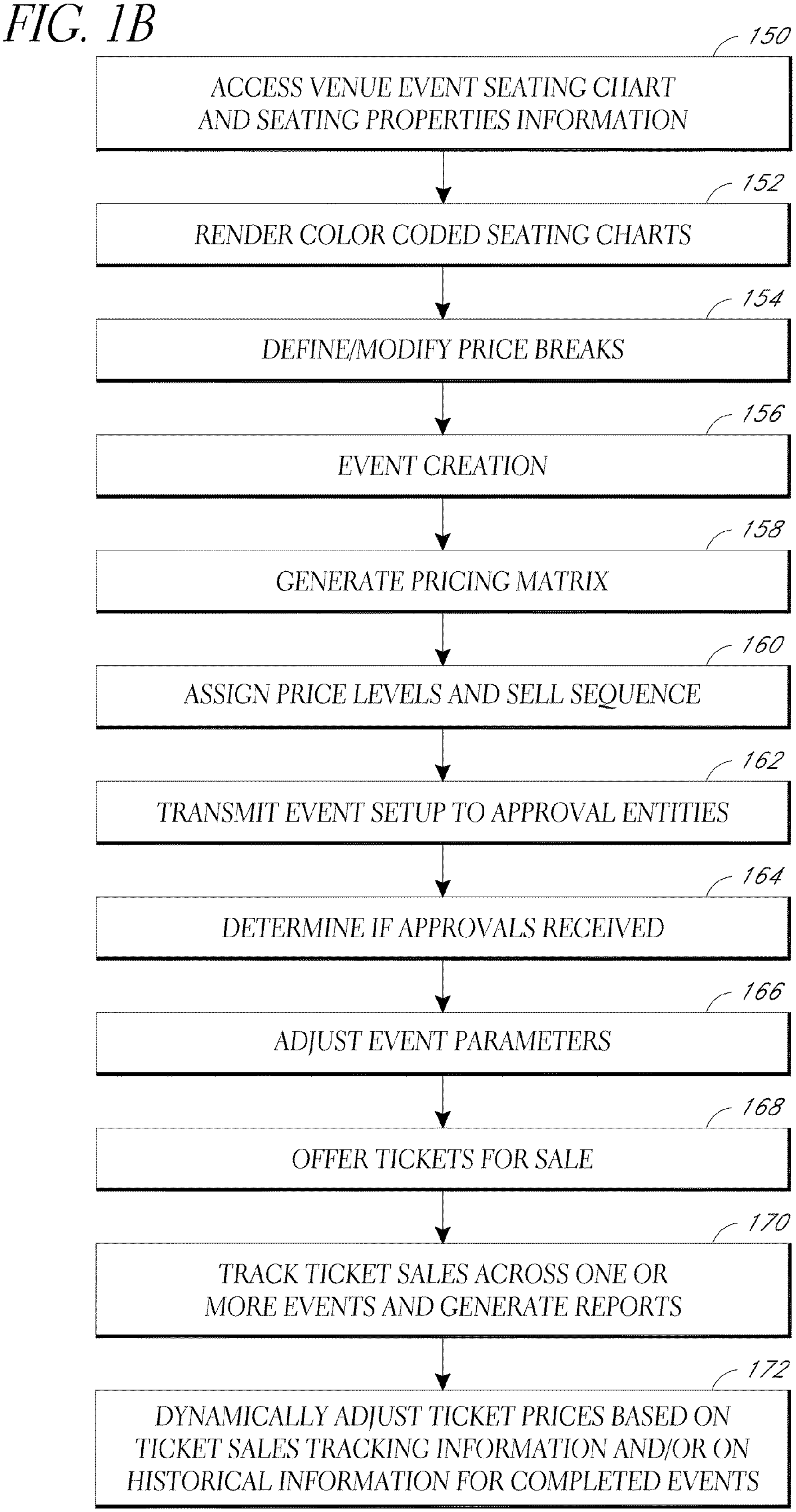
FIG. 1B illustrates an example process.

FIG. 1B illustrates an example process that may be carried out by system 102 or other configured computerized systems. At state 150, a user selects an event and/or venue to be setup (e.g., from a menu, by typing the event name and/or venue name into a corresponding field, or otherwise). At state 152, the system accesses and/or generates a seating map of the venue, which is provided for display on a terminal of the user engaged in establishing price breaks, where seats in a given price break are to be priced identically or substantially identically. The seating map may be coded using color, icons, text, and/or animation to indicate various attributes (status, price level, etc.) of seats and/or seating areas.

In an example embodiment, at state 154, the user may specify price breaks by selecting, using a mouse, touch screen, or other user interface, a section or groups of seats displayed via the seating map, and assign a price break identifier to the section or group. (e.g., group A, group B, or Group 0, Group 1, etc.). Optionally, a user interface is provided via which a user can textually enter seat identifiers (e.g., section identifier, row identifier, individual seat identifier) for a beginning seat and an end seat of a price break to thereby define a price break for the beginning and end seats, and the seats therebetween. Optionally, the user can identify certain seats within or outside of a price break as being "hold" seats (not for sale to the general public). Example interfaces for setting price breaks are described in greater detail elsewhere herein. Optionally, a user may assign seat, seat block, section and/or other seating area rankings, which correspond to relative seat block, section and/or other seating area quality or anticipated desirability.

At state 156, event creation is performed. In an example embodiment where multiple price breaks are to be established, an event is defined, in part, via the price breaks, where a given physical section and price break combination is assigned to an individual section. The number of sections (and the number of seats per section) may be used for estimating the available event capacity.

At state 158, a pricing matrix, setting pricing levels for some or all of the price breaks is generated. The price levels may be manually, automatically, or using a combination of manual and automatic processes, be generated based on preferences, historical information, and/or other parameters, such as some or all of the following:

artist/performer preferences/experiences;

promoter/manager preferences/experiences;

ticket seller preferences/experiences;

ticket media and/or transferability. For example, some tickets may be transferable and some tickets may not be transmitted. By way of further example, in certain embodiments, a ticket format may be configured to eliminate or restrict resales, such as when the ticket is a virtual/paperless or electronic ticket (e.g., where an access right is assigned to a pre-existing document, such user credit card a debit card, a driver's license, a passport, and/or a state issued identification card, and the document is presented in order to gain access to the event by scanning the document and determining whether a right of entry is associated with the document), an emailed ticket or downloadable printable ticket, or may be in the form of a more easily transferred physical ticket, such as a paper or plastic ticket specifically made for providing event access;

current ticket sales information for the event and/or for similar events; and/or historical ticket sales information for past events that have ended.

At state 160, initial price levels and/or sell sequence(s) are assigned to the price breaks, and the assignments are stored in memory. The sell order may be used to define the order in which seats/price breaks are to be offered for sale, where certain price breaks may be offered for sale at the same time, and certain price breaks may be sequentially offered at a latter time(s).

At state 162, the event setup is optionally transmitted to one or more users for approval prior to offering the tickets for sale (e.g., via an email that contains a link that when activated, causes the recipient's browser or other viewer to display user interfaces displaying the information to be approved). For example, approval may be requested from the artist/performer and/or venue operator for review (e.g., so that they can review the price levels, price breaks, specified seating capacities and availabilities, etc.). At state 164, a determination is made as to whether the requested approval has been received. If not, optionally, a follow-up communication is transmitted to the user(s) asking for approval.

If the reviewing user has responded but has requested modifications to one or more items (e.g., to the price levels, to the price breaks, to the assignment of the price levels to the price breaks, to the sell sequence, etc.), then at state 166 the various items may be adjusted via the system, and the adjustments stored in memory. Optionally, requests for approval of the adjustments may be transmitted to one or more selected users.

Optionally, certain seats or price breaks may be designated as subject to future pricing modifications even after ticket sales for the event begin, and certain seats or price breaks may be designated as fixed (not subject to change once ticket sales have begun).

At state 168, event tickets are offered for sale (e.g., via online websites, via mobile apps, via physical outlets, via phone or otherwise) in according with the pricing set as discussed above.

Example interfaces for setting price levels and setting up events are described in greater detail elsewhere herein.

The event setup user interfaces may be used during negotiations between interested parties (e.g., the performer/team, the promoter, the box office, the ticket seller, etc.) to set up different potential models of event, which may be used to estimate the potential revenues and/or ticket sales given different set-up parameters (e.g., different number of price levels, different ticket prices, different number of held seats, different number of killed seats, etc.). Once the ticket setup is agreed upon, the setup user interfaces may then be used to provide initial instructions to the venue box office and/or other entities on what the initial event setup is, and tickets may be sold in accordance with the setup. The event setup user interfaces may also be used after tickets are placed on sale to dynamically change the event setup (e.g., to change which seats are assigned to which price levels, the face value of unsold seat tickets, the number of held seats, etc.). Certain embodiments may include a data interface configured to receive dynamic pricing from a pricing engine and are configured to change the seat ticket pricing accordingly, where the changes may be automatically reflected in the change list.

An example event creation process will now be described in additional detail. Price breaks are set for a given event(s) and/or venue(s). As similarly discussed above, price breaks relate to setting prices for respective sets of seats, such that prior to the start of ticket sales for those seats, the open seats within a given price break will be priced identically or substantially identically. Optionally, "holds" may be put on one or more seats in a given price break.

Over time, or as the result of initial modeling, the price level associated with a price break may be dynamically changed (e.g., by a user or system authorized to change pricing). For example, the price levels may optionally be increased or decreased based in whole or in part on ticket sales. For example, the price levels may optionally be increased or decreased based on one or more of the following factors:

- the quantity of tickets sold for the event and/or specific seating areas for the event,
- the rate of ticket sales for the event and/or specific seating areas for the event,
- the quantity of tickets sold for other events with the same performer or for one or more similar performers,
- the rate of ticket sales for other events with the same performer or for one or more similar performers,
- the sale of a specified seat or set of seats in the inventory the expiration of a timer or a date/time alarm, and/or other parameters.

At the time of such changes in pricing, unsold ticket inventory associated with a given price break may be shifted to a new price level and its associated pricing. Seats sold prior to such shifts, and optionally available seats in the same row in the same seating section (or other seats designated in a data store with an indication that the price level is not to be changed for the event and/or as determined via a rule), as this sold inventory may remain at the price level at which they were initially sold (e.g., to facilitate appropriate refunds and/or for customer relations).

Figure 2:
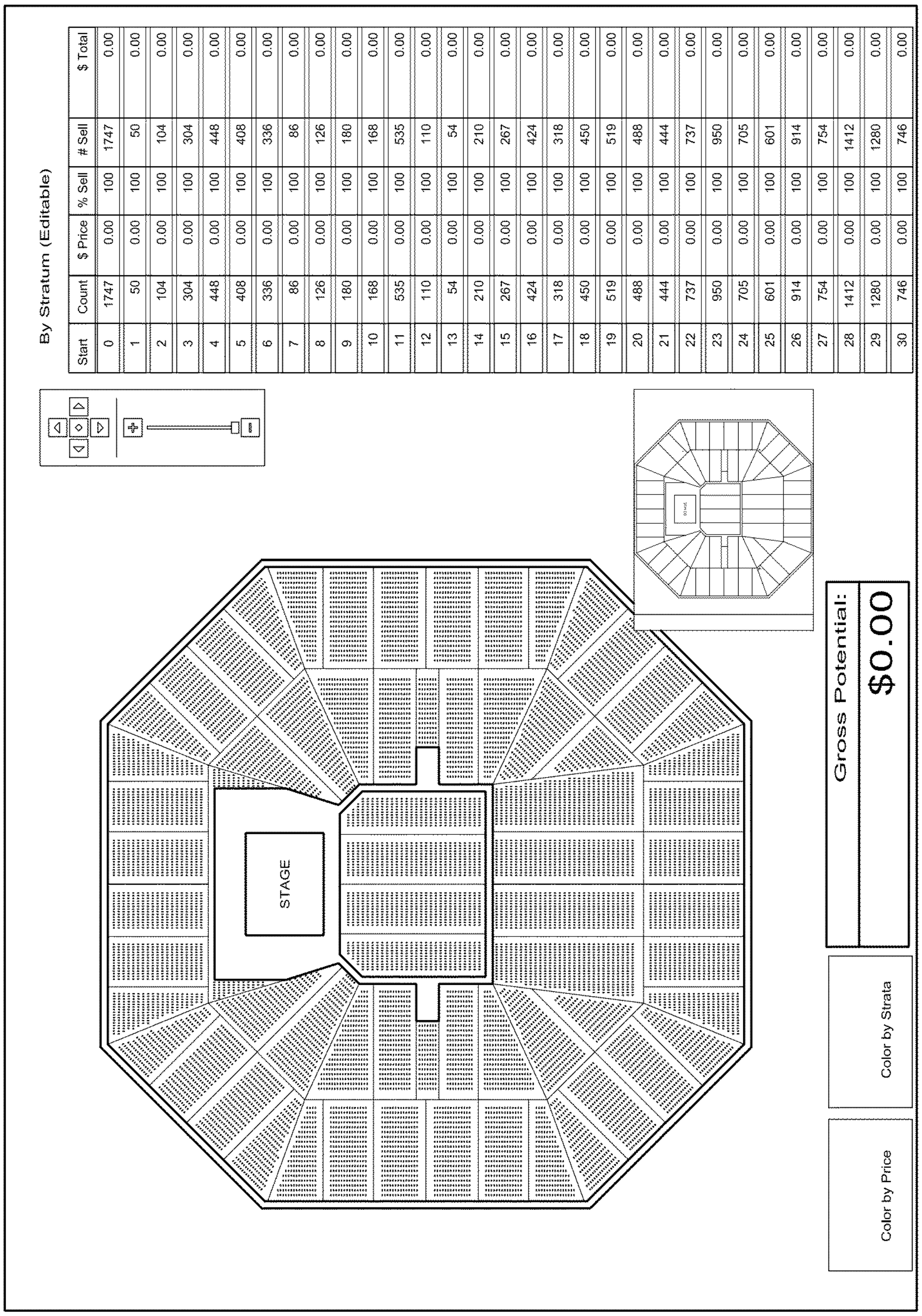
FIG. 2 illustrates an example user interface that enables a user to design an event and to view an event design.

An example graphical tool, illustrated in FIG. 2, is optionally provided via the system for display on a user terminal to enable a user (e.g., an authorized user having appropriate permissions) to view and set such price breaks. The tool may be hosted by the system 102. The graphical tool provides an interface that eases the definition and viewing of areas of like quality in the venue, using, for example, color coding. Different colors may be used to reflect different price break areas and/or different price levels applied to such price break areas. A price may be assigned to seats (e.g., via a field that associates a color, individual seats, specified rows, and/or specified sections/areas) via one or more fields.

For example, red, olive, green, blue, teal, orange, etc., may be used to indicate different price breaks. Optionally, more muted or pastel colors may be used to indicate relatively low grade/inferior seats, and brighter or primary colors may be used to indicate relatively higher grade/superior seats. Other visual indications may be used as well (e.g., flashing seat icons may be used to indicate higher grade/superior seats).

For many ticketed events, certain tickets are held by the artist, promoter, and/or venue, and so are not made generally available to the public (at least in conjunction with the initial ticket sales to the public). These tickets are sometimes referred to herein as "holds". Often held seats are among the more or most expensive and desirable seats.

The management of holds may significantly impact ticket sale revenue. This is because the initial hold setup is often not tightly coupled with event capacity and pricing decisions. Further, the practice of holds often eliminates or reduces public access to the highest priced seats, where on-sale price adjustments tend to be more relevant to meeting demand. Further, while many held seats are eventually released to the public (e.g., because the "holder" of the held seats is not going to use them), conventionally unused holds are often released to the market for purchase by the general public too late in the event life cycle to be consumed by the market place effectively. Thus, many of the valuable released held tickets remain unsold, or have to be sold at a discount relative to the face value or relative to what they could have been sold for at an earlier time. Additionally, because of lack of adequate tools and inefficient, time delayed communication, holds are often placed after capacity and pricing decisions are made, further leading to an inefficient sale of tickets.

In order to overcome some or all of the foregoing challenges, certain embodiments provide modeling tools that enable pricing and capacity decisions to be made with allowances for the number of holds in a given price level so that capacities can be appropriately expanded (e.g., additional seats may be added and/or certain held seats may be reassigned to be on-sale to the general public) to allow the public to access and purchase seats at more expensive price levels.

Figure 3:
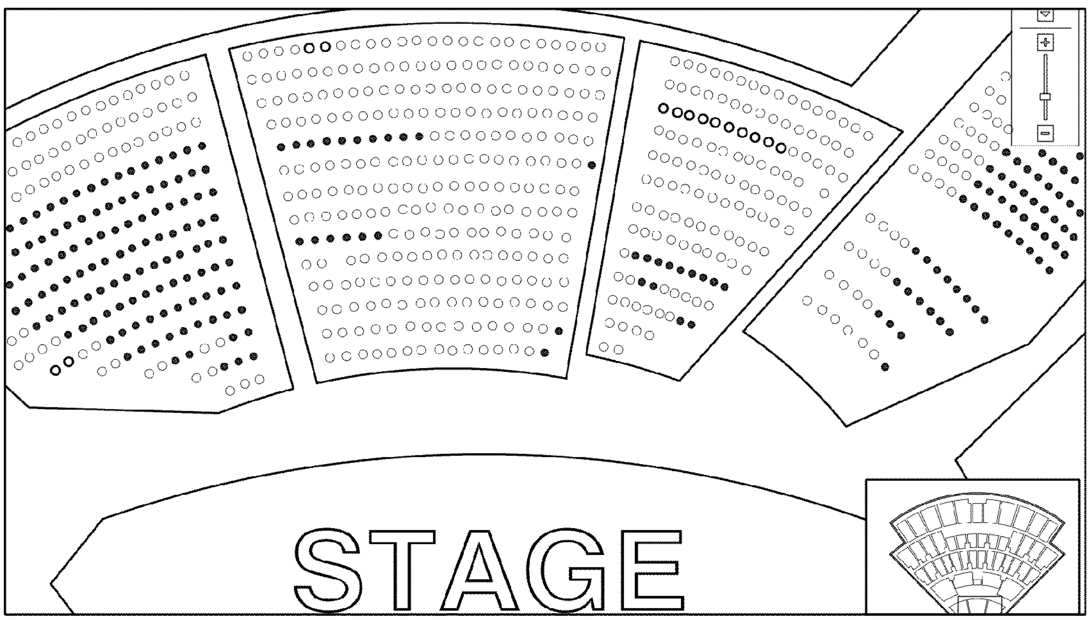
FIG. 3 illustrates an example user interface that visually provides held seat information.

FIG. 3 illustrates the graphical tool of FIG. 2, with "holds" visually indicated (e.g., in black). Thus, a user managing the assignment of held seats and the assignment of price breaks and price levels can view the location and concentration of held seats, as well as the price levels of adjacent, non-held seats. This enables the user to quickly evaluate which seats should be designated as held seats, and to change such designations so as to enhance revenue and/or access by the general public.

FIG. 4 illustrates a user interface that depicts a high level view of a venue seating chart, color coded to indicate price breaks and an editable yield calculation tool panel listing the price breaks and various example parameters, discussed in greater detail below. In this example, there are 28 price breaks/strata (although there can be greater or fewer price breaks), in contrast to the more typical four price breaks.

The example yield calculation tool panel enables a user to specify a seat count for a price break, the face value/price level of a ticket in a given price break, the "all in" cost of a ticket in the given price break, and an estimated percentage of tickets that will be sold for the given price break at the given face value/price level. Some or all of the foregoing values may also be read from a database (e.g., by activating an import control to import a file, such as a CSV (comma separated value) formatted file), or may be calculated (e.g., by a forecasting tool).

The yield calculation tool then calculates (e.g., in response to a user activating a "calculate" control or automatically in response to a user entering a parameter change) the total dollar value of the tickets that are predicted to be sold for a given price break, a total gross potential based on ticket face values, and a total gross potential based on all-in ticket values (although the tool may provide less or additional information). All-in ticket values or prices relate to the price that would paid by the ticket purchaser (e.g., the ticket face value, facility charge, shipping fee, etc.), or a subset thereof. Generally, although not necessarily, the all-in price will be greater than the face value of a given ticket. The calculated values can be exported to a file (e.g., a CSV file) upon activation of an export control by a user. Optionally, the reported percentage of tickets sold may be adjusted to take into account ticket holds (e.g., where the ticket holds are not included in determining the denomination of the following: (tickets sold for a give price break)/(total tickets available for the given price break)

Certain embodiments provide tools that shorten the timing gap between capacity decisions and holds management by allowing holds to be placed manually (e.g., wherein a user can click on a set to indicate it is a held seat). Further, such tools enable holds to be transferred from their owners and sold via the ticketing system through to the general public to increase revenue, optionally without the use of ticket brokers or scalpers, which typically buy and resell tickets. For example, certain embodiments provide a user interface via which an authorized user can select held seats via the interactive user interface, and change the designation to an on-sale designation.

Figure 5:
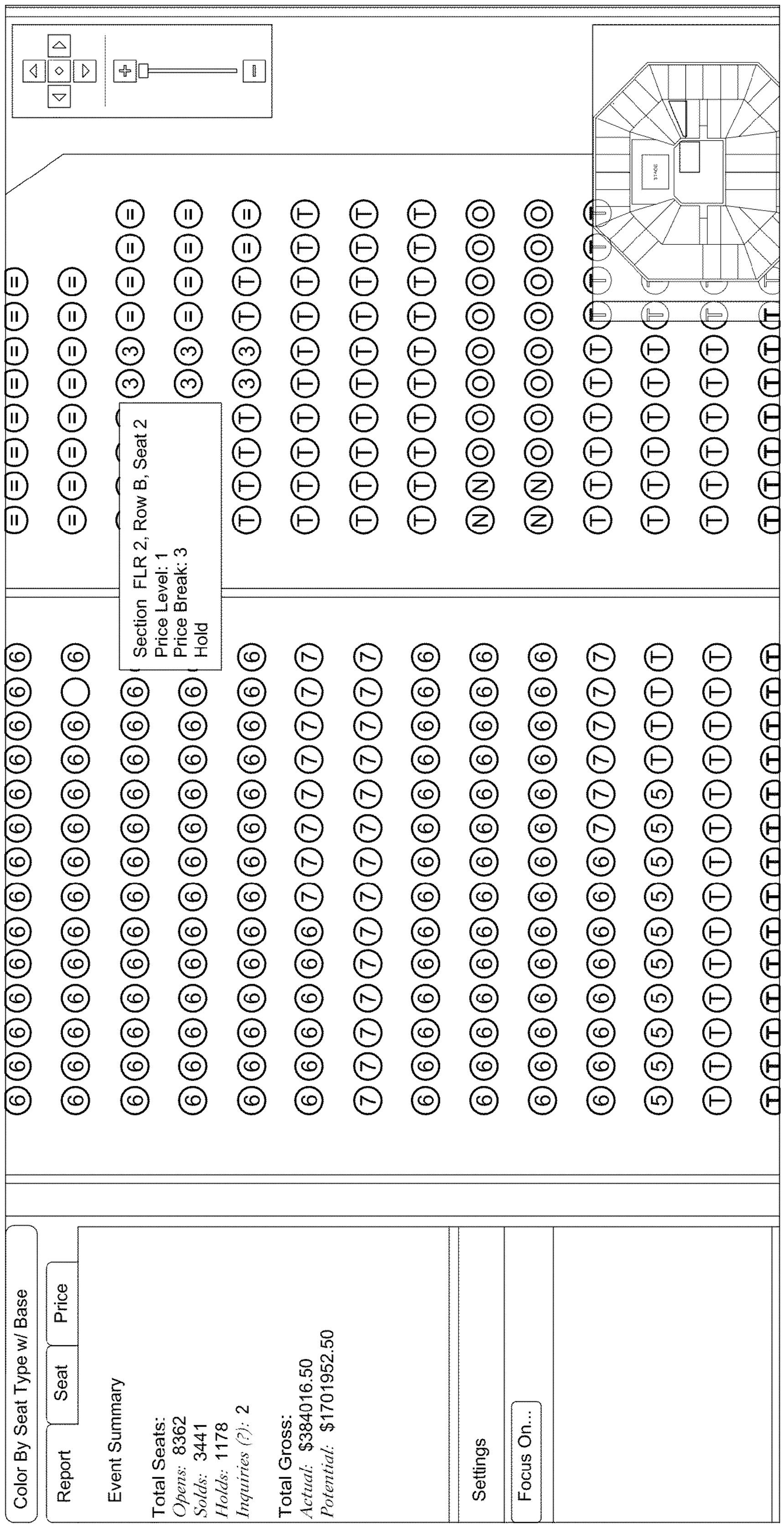
FIG. 5 illustrates an example user interface providing an event summary and a color coded seating chart providing seating information and status.

FIG. 5 illustrates an example user interface that further facilitates the management of holds. Optionally, in response to a user action (e.g., clicking on or hovering over a given seat icon, entering a seat identifier into a corresponding field, etc.), the user interface displays information accessed from a system database. For example, the user interface may display the section, row, seat number, price level, price break, and/or hold states for the corresponding seat or groups of seats. Further, a report is optionally generated in real time, reporting, for a given event or set of events, the total number of seats, the total number of open seats, the total number of sold seats, the total number of held seats, the total number of inquiries (e.g., tickets for which a purchase process has begun but has not yet been completed, such as seat tickets placed in a user online shopping cart), the total actual gross, and the total potential goal (assuming all the seats are sold).

Figure 6:
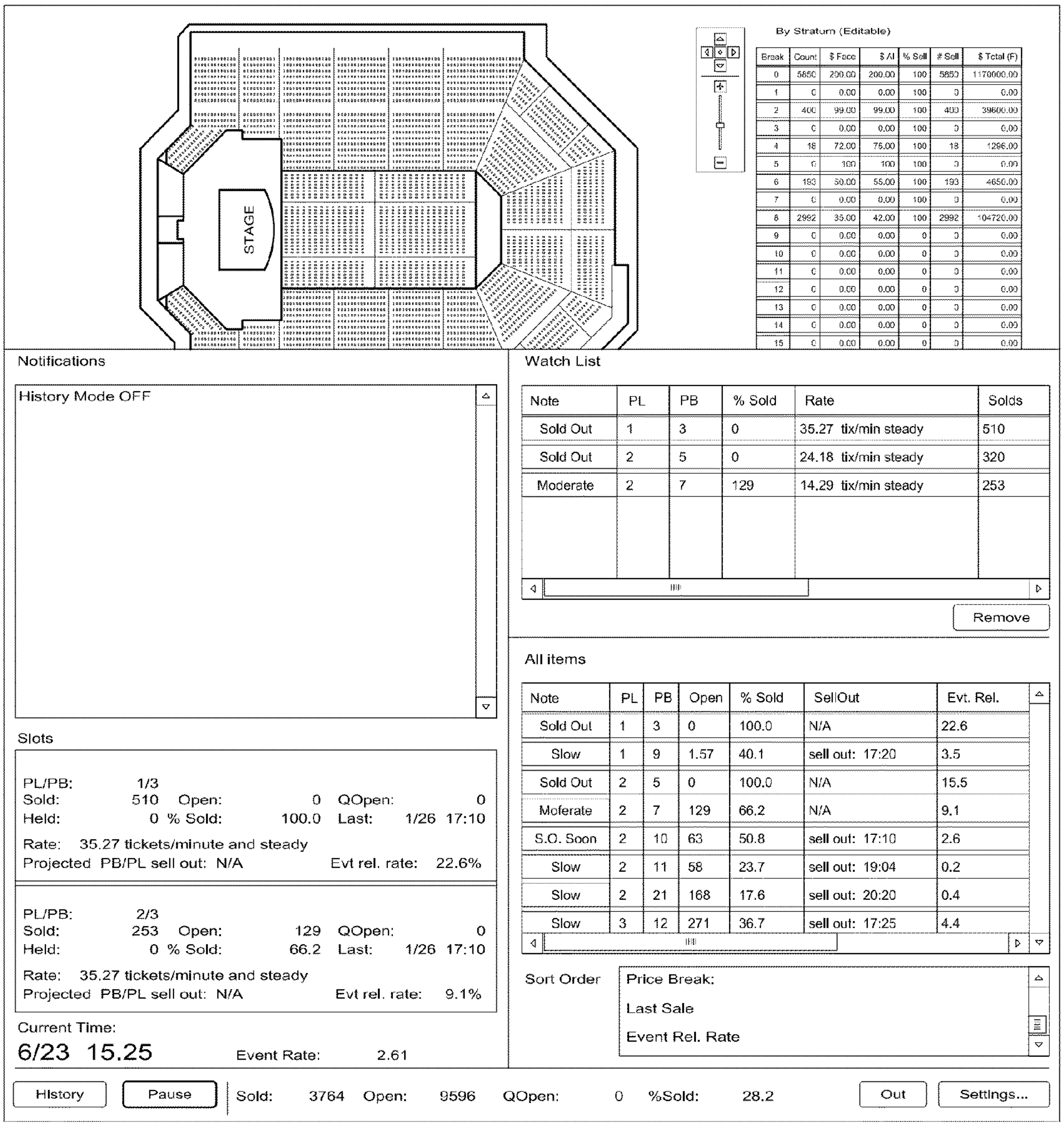
FIG. 6 illustrates an example user interface providing an event summary for multiple events and a color coded seating chart providing seating information and pricing information.

FIG. 6 illustrates another example user interface of a reporting tool that enables a decision maker to efficiently manage multiple events by providing the decision maker with direct access to the status of a venue seat (e.g., the price assigned to a ticket for the seat, an indication as to whether the seat is held by the venue or promoter, etc.) and to execute changes to the seat status directly, via a seat map. Thus, in certain embodiments, the decision maker can execute price changes directly, without having to issue requests for status from others involved in the ticketing process, such as box office executors.

Certain embodiments facilitate the processing and display of data for multiple events, as well as the management of ticket pricing, price breaks, and holds for multiple event. As illustrated in FIG. 6, an example online information distiller tool filters and/or aggregates ticket sales information and pricing information for multiple events. For example, the distiller can generate reports for multiple events including, on an event-by-event basis, and in aggregate across multiple events, some or all of the following information:

PL (Price Level)/PB (Price Break) ratio;

the number of seats for which tickets have been sold;

the number of open seats (seats available for purchase by the general public);

the number of QOpen (qualified open seats are seats available for purchase by public purchasers that have a specified access code or are using a specified brand of credit card); the number of held seats; the rate of ticket sales;

an indication as to the acceleration/deceleration of sales (e.g., sale rate increasing, decreasing, steady);

the date and time of last ticket sale;

the projected PB/PL sell out;

the event release rate/percentage (wherein certain seats may be displayed as held seats or sold seats until the sales rate reaches a certain or specified threshold, at which point some or all of such seats have their status change to open or qualified open (e.g., the tickets are released for purchase by the public). This technique enables a slow selling event to appear more popular as not as many seats are shown as available at a given point in time); and/or the event rate (as similarly discussed with respect to FIGS. 21P and 21Q, the event rate may be used to determine what type of user interface to display and/or the mechanism for letting users specify which tickets they would like to purchase).

In addition, a user can specify a watch list, which is then stored in memory. The system accesses the user's watch list, and then aggregates and reports the status of ticket sales for an event added to the watch list by the user. For example, the watch list report can indicate some or all of the following and/or other information:

- whether the event is sold out (e.g., based on the number of available seats and the number of tickets sold);
- whether the event will be sold out soon, such as within a specified period of time, such as within 12 hours, 1 day, 1 week, or other specified time frame (e.g., based on the number of available seats, the number of tickets sold, and the rate of ticket sales);
- whether the ticket sales for the event are moderate (e.g., based on the number of available seats, the number of tickets sold, and/or the rate of ticket sales);
- whether the ticket sales for the event are slow (e.g., based on the number of available seats, the number of tickets sold, and/or the rate of ticket sales);

PL for the event;

PB for the event;

opens;

the sales rate for the event;

the number of tickets sold for the event.

Similarly, the watch list report may generate and report information for all ongoing events being monitored, or a subset thereof, the information including some or all of the following: the status of ticket sales (e.g., sold out, almost sold out, moderate, slow, etc.), the PL, the PB, the number of opens, the percent of available tickets sold (including or excluding held tickets), the actual and/or predicted date/time of a sell out of an event, an event release rate.

Optionally, based on the ticket sale status and/or other information discussed herein one or more of the following actions may be taken (automatically and/or manually):

reduce the number of ticket holds (including determining which held seats are to be offered to the general public);

increase ticket prices for certain or all seats/price breaks;

decrease ticket prices for certain or all seats/price breaks;

offer free or for cost ticket upgrades, giving ticket purchasers tickets for relatively higher quality seats than those they had selected to purchase;

increase advertising/marketing expenditures related to the event;

decrease advertising/marketing expenditures related to the event; and/or select medium/channels/target demographics/segments for advertising/marketing for the event.

For example, if the one or more selected reported data items/information satisfies a specified threshold one or more of the above actions may be taken.

In addition, historical ticket sales information for past events and/or current ticket sales information for ongoing events may be used by a forecasting tool to determine the effect (e.g., "what if" scenarios) of raising or lowering ticket prices on overall gross sales potential and/or to determine the risk of the gross sales or other sales amount falling below a guarantee made by the ticket seller to the venue, the performer, the promoter and/or other entity.

Figure 7:
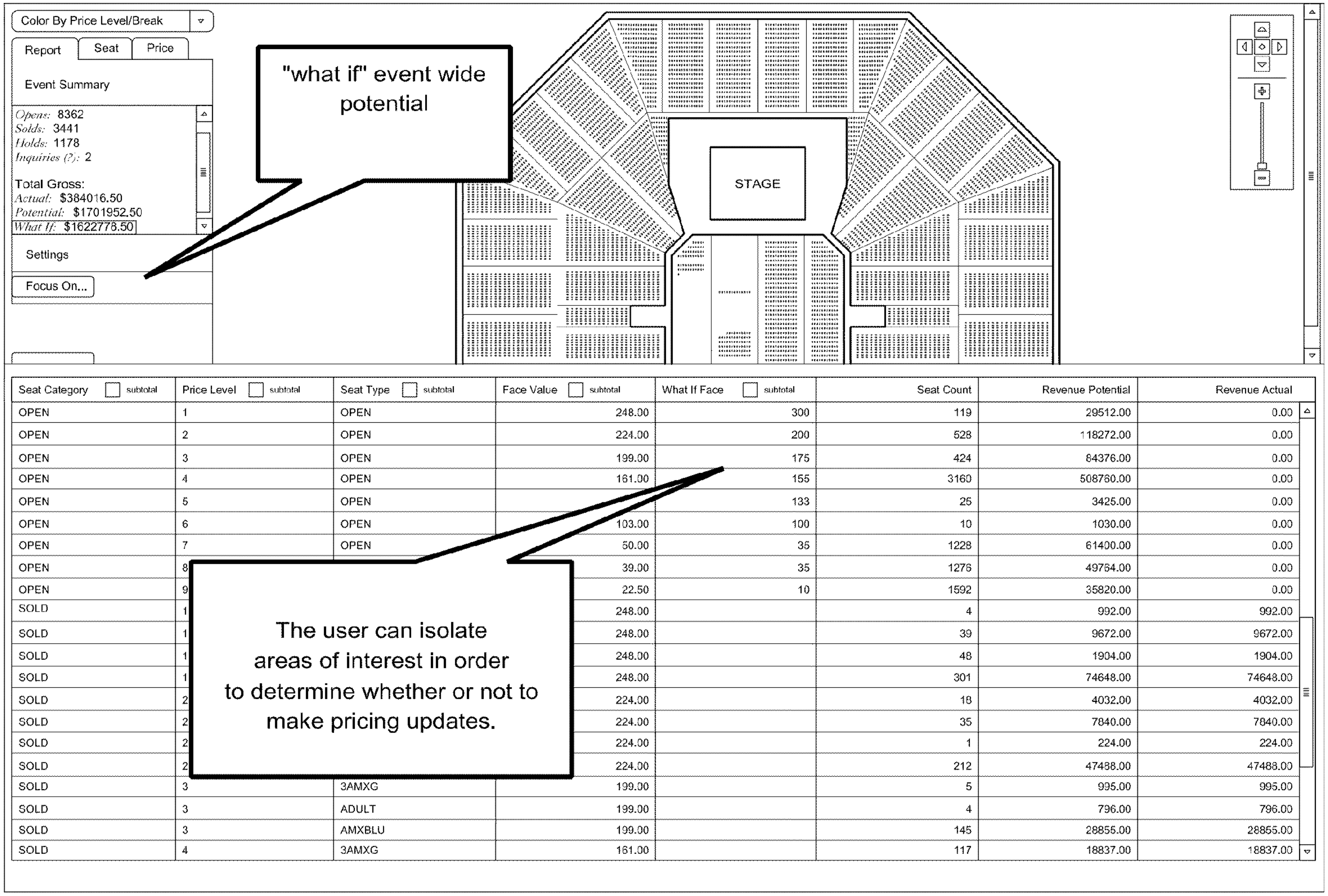
FIG. 7 illustrates an example user interface of an event modeling tool.

FIG. 7 illustrates an example forecasting tool user interface. A user can select predefined report formats that specifies what data is to be reported and the presentation format. For example, a report may specify the total number of seats, the total number of open seats, the total number of sold seats, the total number of holds, the total number of inquiries, the actual total gross, the potential total gross, and a "what if" total gross. The "what if" total gross may be calculated based on a user specified "what if" face value (wherein the "what if" face value may be specified to be higher or lower than a current face value), wherein the "what if" value may be specified via the grid. The grid may also be used specify and/or display a price level, a seat category, a seat type (e.g., adult, child, open, etc.), a face value, a seat count, a revenue potential, and an actual revenue. A navigation control enables a user to specify whether all or a zoomed portion of the seating chart is to be displayed.

When an event has been completed (e.g., after the conclusion of a concert that is part of a concert tour by a performer or after a sporting event), data leading up to the event and during the event may be stored in a centralized data store, and optionally utilized to make decisions on remaining dates of a concert tour or sports season, and/or the data may be extrapolated for use with a similar tour. For example, as elsewhere described herein, the data may be used to price tickets for one or more price breaks, to determine venue seating configurations, to determine how many shows to schedule at a given venue for a given performer, to determine which acts should be scheduled together for a given event (e.g., to pick an opening act for a headlining act), etc.

Figure 8:
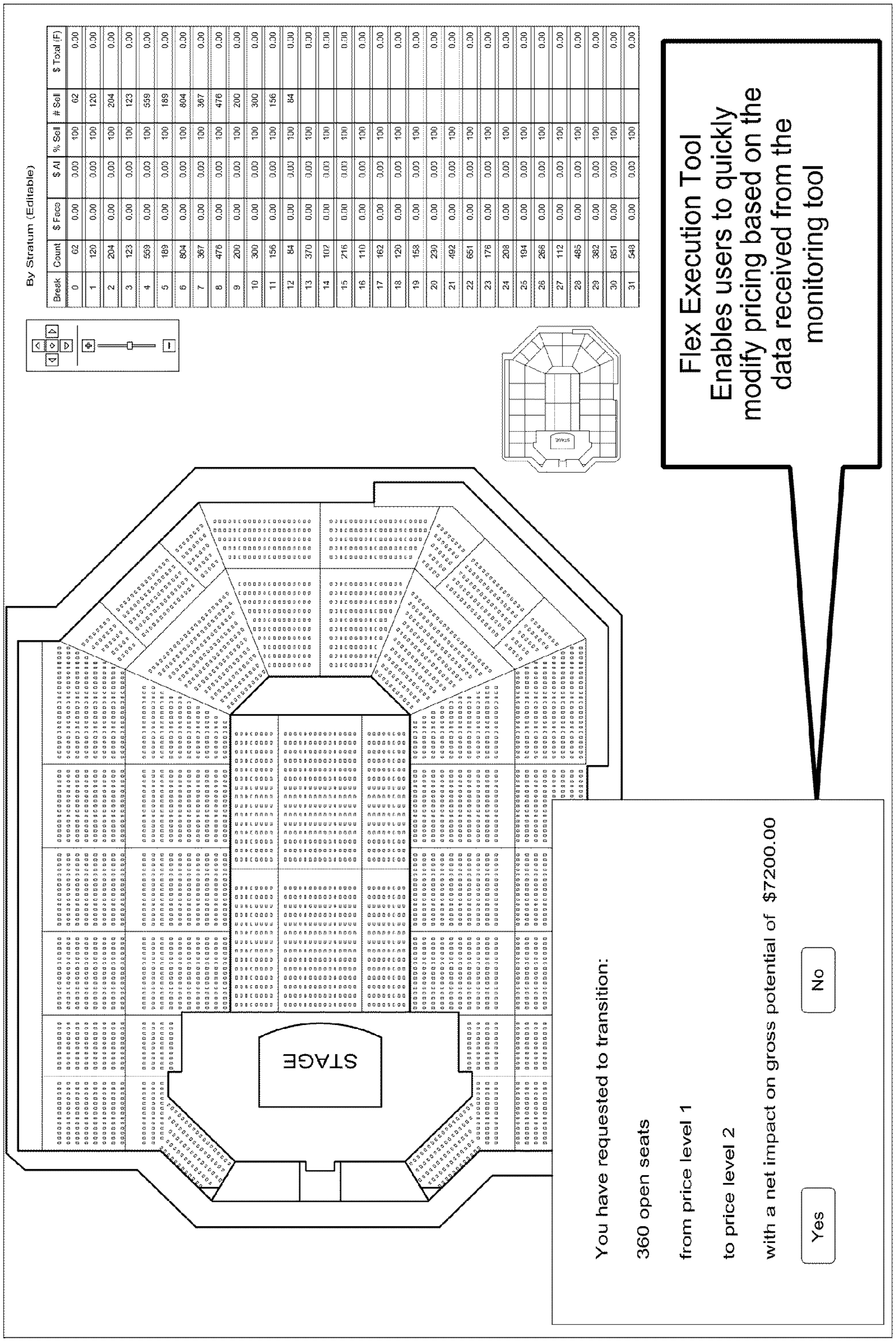
FIG. 8 illustrates an example flex execution tool user interface.

An example flex execution tool will now be described, with reference to FIG. 8, which illustrates an example flex execution tool user interface. Controls are provided via which a user (e.g., a promoter, performer, or other authorized entity) can change a price for a specific seat or a set of seats (e.g., for a price break). For example, the user can specify that the price level for a given price break is to be changed to another predefined price level. By way of illustration, there may be 32 different predefined price levels, and the user can change the price level for a given price break from price level 15 (e.g., $28 per ticket) to price level 16 (e.g., $32 per ticket). The tool calculates and displays the impact the price change will have on revenues (e.g., the net impact on the potential gross), optionally in substantially real-time. In conjunction with the report on the impact on revenues, the tool may report how many seats were affected by the instruction to change price level, the previous price level, and the proposed price level. Thus, the flex execution tool can be used by a user, such as a promoter, to modify price levels based at least in part on information received from monitoring tools described herein, and have the impact of such modification substantially immediately reported to the user.

Figure 9:
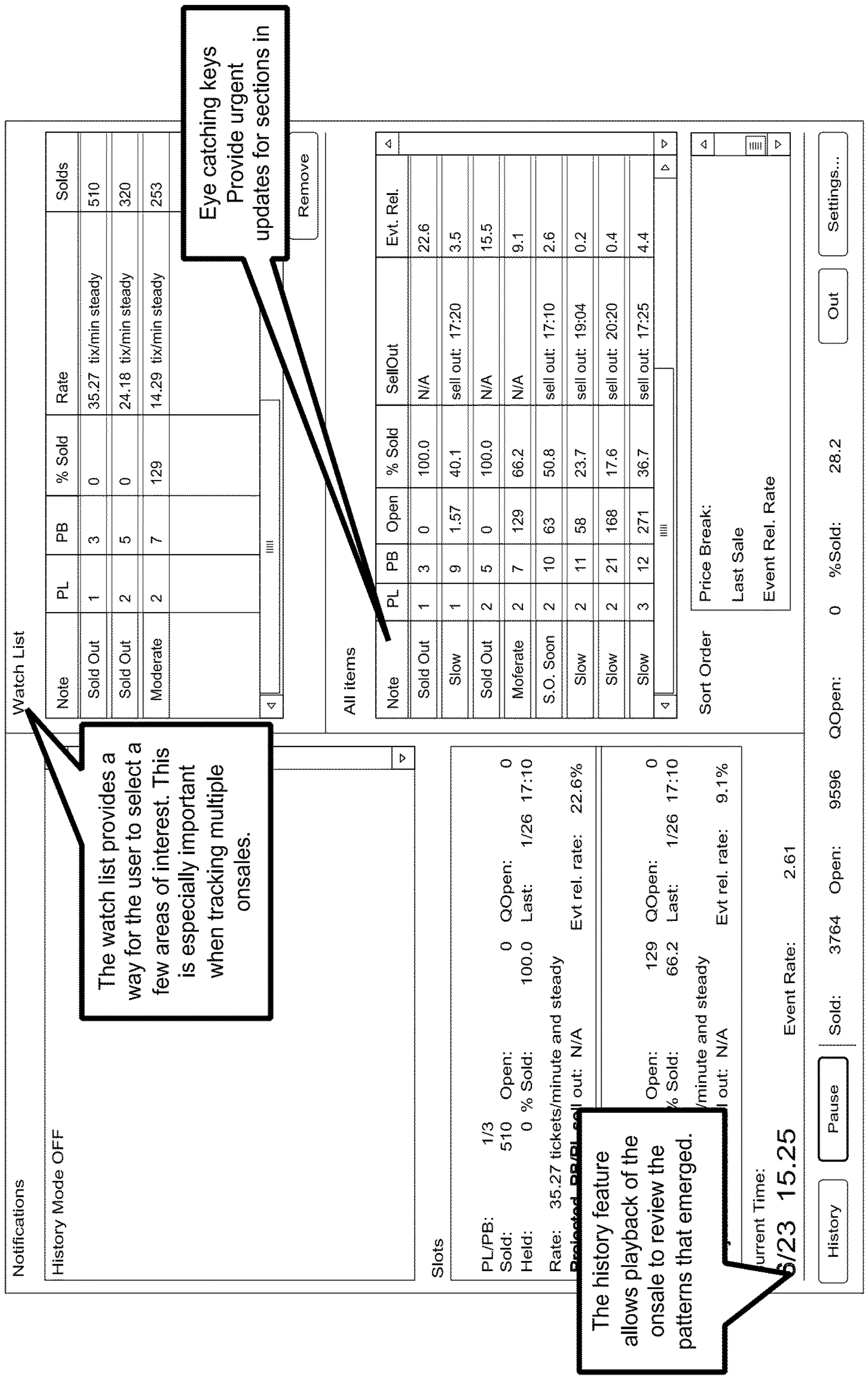
FIG. 9 illustrates an example on-sale distiller tool user interface.

FIG. 9 illustrates an example on-sale distiller tool user interface, similar to that illustrated in FIG. 6. The on-sale distiller tool user interface is configured to report, optionally in substantially real time, information regarding ongoing ticket sales, as well as historical ticket sale information. The user interface includes a notification area that alerts the user regarding actionable pricing recommendations (provided by another user and/or automatically by the system). For example, the recommendations may be based on sales rate and/or total information for an entire event and/or one or more selected seating sections of a venue from one or more ongoing and/or past events.

The example on-sale distiller tool user interface optionally includes a watch list user interface. A user can add one or more areas of interest for one or more events. For example, the user can specify that information (e.g., the sales rate, the number of open seats, the number of sold seats, a report as to whether the price break/price level is sold out, whether sales are moderate, whether sales are slow) regarding price level 1/price break 3, price level 2/price break 5, and price level 2/price break 7 is to be continuously updated in the watch list area.

Certain items of information, such as the alerts may be visually emphasized (e.g., a bright color, a bold graphic, flashing symbol or text, etc.) to better catch the attention of the user. For example, certain items of information can be color coded so that the information, or changes thereto, will be emphasized to catch the user's eye. For example, a "sold out" alert may be color coded in blue, a "sold out soon" alert may be color coded in orange, a "moderate" alert may be color coded in yellow, a "slow" sales alert may be color coded in red, and so on.

An "all items" area reports information on additional events, price levels/price breaks, etc. For example, the "all items" area may report some or all of the information types provided via the watch list report and/or additional information, such as percent of tickets sold, projected date/time of a sell out (if available) of all the corresponding tickets, the event ticket release rate, etc. The user can specify to the system that the report is to be sorted based on one of the information types.

As discussed above, the on-sale distiller tool user interface optionally also playback historical ticket sales information, thereby enabling the user to view sales patterns and trends. In the distiller, this sales information may be displayed and viewed with numbers and projections being independently indicated, thereby enabling a user to view seats changing status on the map.

A "pause" control is provided which enables a user to pause the updating of the reported information, which lets the user study the information at a given moment in time. The user then may resume the updating to enable the updating to resume.

FIG. 10 illustrates an example price break report. The report indicates, for a given price break, the price level(s), the face value at a given price level, and the all in face value (e.g., the face value of the ticket plus fees and service charges) at a given price level. An audit data stream on the system includes information about the quantity of tickets sold at each price break and at which price level. This provides the user with a historical record regarding the effectiveness of price flexing.

Real-time information may be provided as well (e.g., accurate to within 2 minutes or other time period, such as less than 1 minute or less than minutes). The real time information may be utilized to show where tickets are selling quickly and/or slowly so that prices can be adjusted appropriately. For example, if certain areas have ticket sales less than a desired amount and/or at less than a desired rate, the user performing pricing can adjust ticket prices in those specific areas downward to stimulate and increase ticket sales. By way of illustration, certain embodiments include a substantially real-time graphical sales report that displays some or all sales on a graphical seat map.

Figure 11:
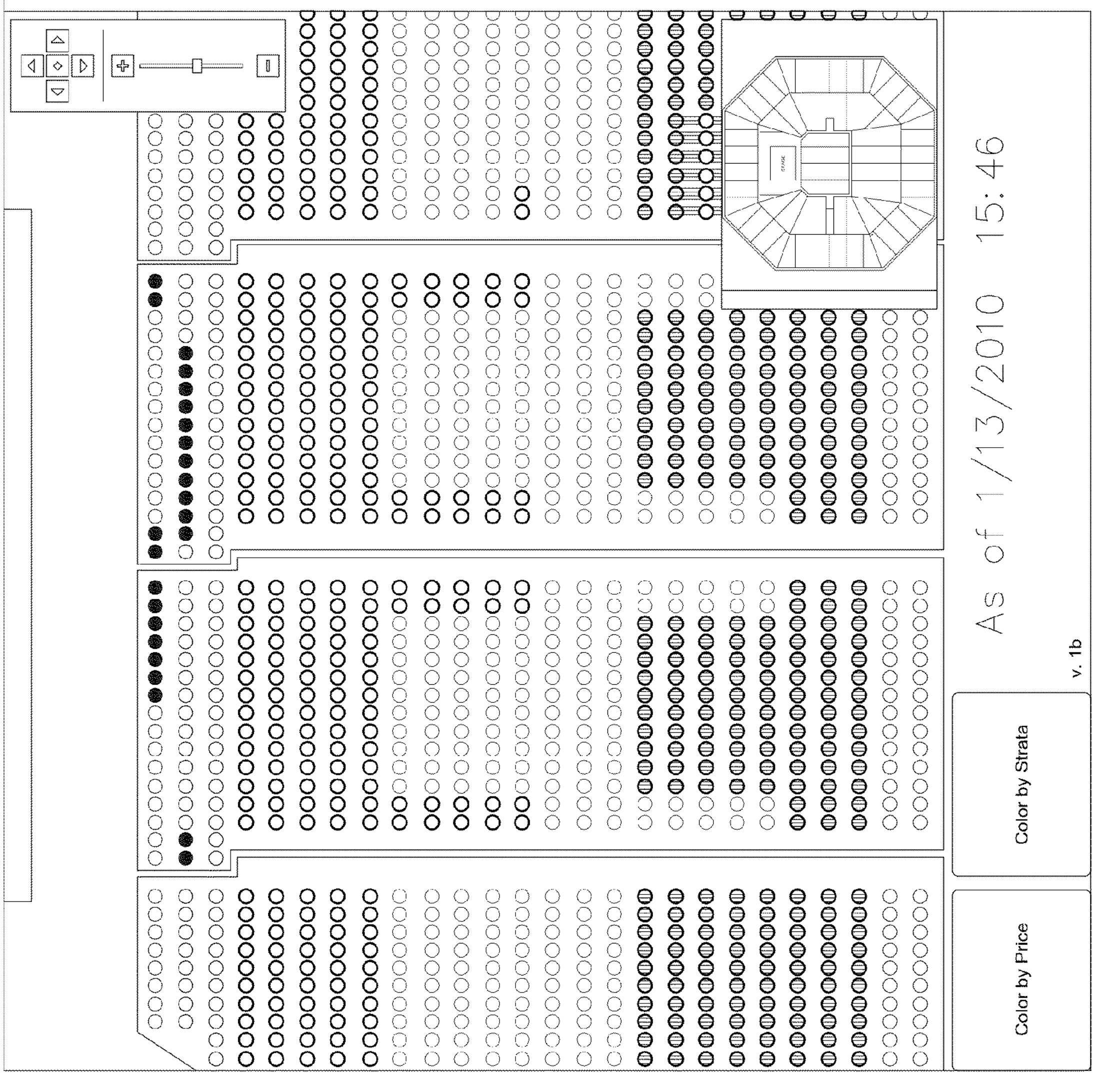
FIG. 11 illustrates an example real-time sales map.

FIG. 11 illustrates an example real-time sales map. The illustrated real-time sales map displays substantially current sales information on a venue map with a legend showing counts of sales, opens, and/or holds. Information may be provided on a price break-by-price break basis, and/or seating section by section basis and/or for the overall event on the percent of tickets sold, open, and/or held, the rate of ticket sales, the acceleration or deceleration of tickets sales, a projected amount of time the available tickets will be sold out, the sales rate of a price break or section relative to the entire event, etc. Individual seats may be color coded to show sale status (although textual, graphical, and/or other indicators may be used to show sales status, pricing, etc., may be used instead or in addition).

Figure 12:
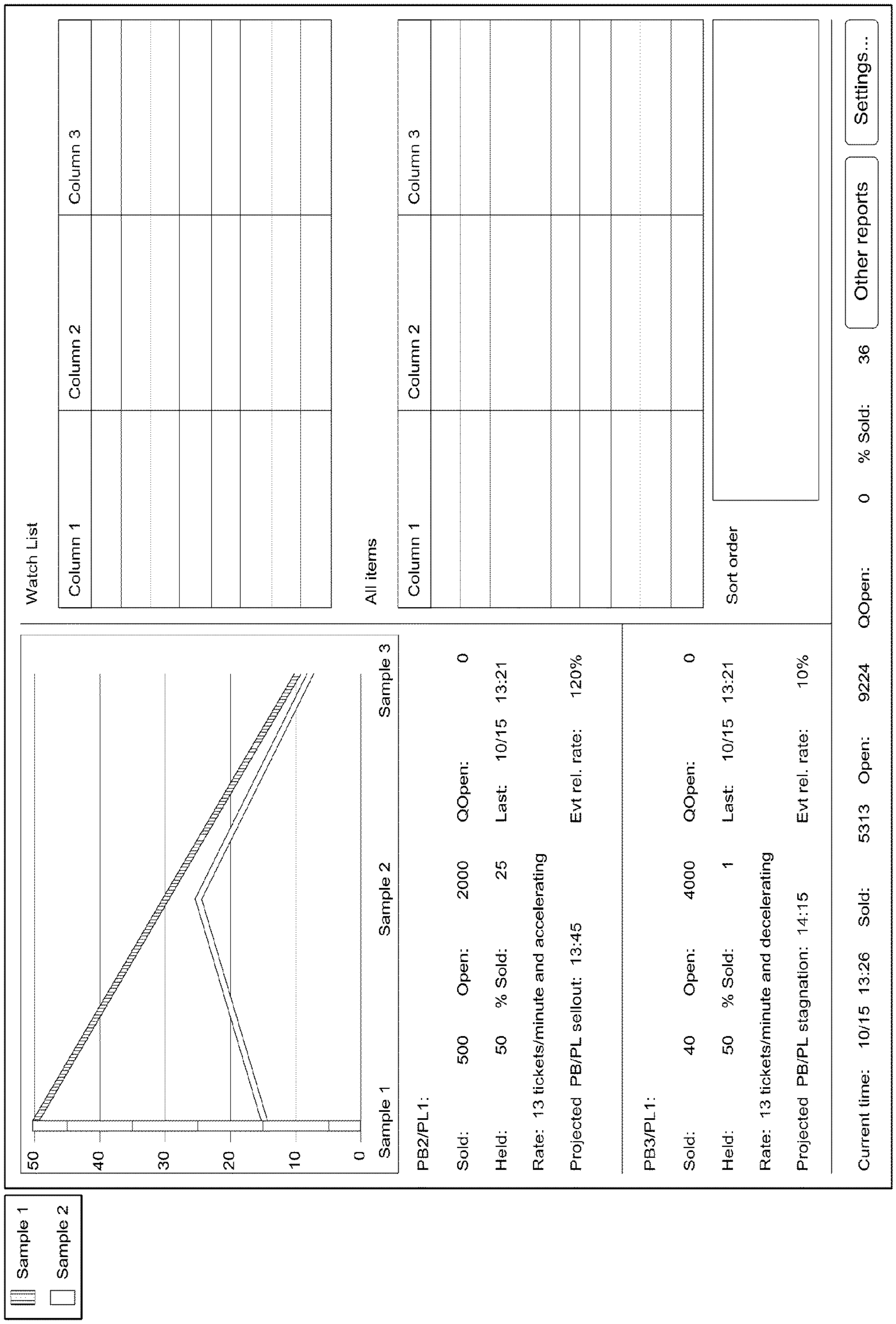
FIG. 12 illustrates another example user interface, providing, via a graph, substantially real-time sales rate information.

FIG. 12 illustrates another example user interface, providing, via a graph, substantially real-time sales rate information. In the example illustration, a ticket sales rate for a first price break (PB2) and a ticket sales rate for a second price break (PB3) are graphed by the system. Ticket sales rates for fewer or additional price breaks, price levels, and/or events may be selected by the user and then graphed by the system. In addition, the example user interface textually provides additional information for one or more price breaks, price levels, and/or events. For example, some or all of the following information may be displayed:

Number of tickets sold, open, and Qopen (qualified open, which may be an attribute applied on base status of seats, to thereby—sub-allocate inventory to public, wherein a user has to enter a promotional code or password, or use a certain brand of credit card in order to be entitled to purchased a qualified open seat;

Number of tickets held, the percent of tickets sold, the time/date of the last ticket sold;

Sales rate (e.g., tickets per minute), and a report as to whether sale are accelerating, decelerating, steady, etc.;

Projected date/time of a ticket sellout;

Projected date/time of ticket sales stagnation (wherein the system may extrapolate from a current rate of sales and a template curve of an expected sales curve (e.g., a decaying curve, which may be selected based on historical sale profiles of similar event), fit curve through event ticket sales data points, and if the sales fall below a certain threshold, project when sales rate will fall below a certain level, such as near zero event ticket sales per day or other relatively low rate that indicates that ticket sales are stagnating);

Event release rate.

In addition, the user interface illustrated in FIG. 12 provides a user-defined watch list, and an "all item" information display, as similarly discussed above.

Figure 13:
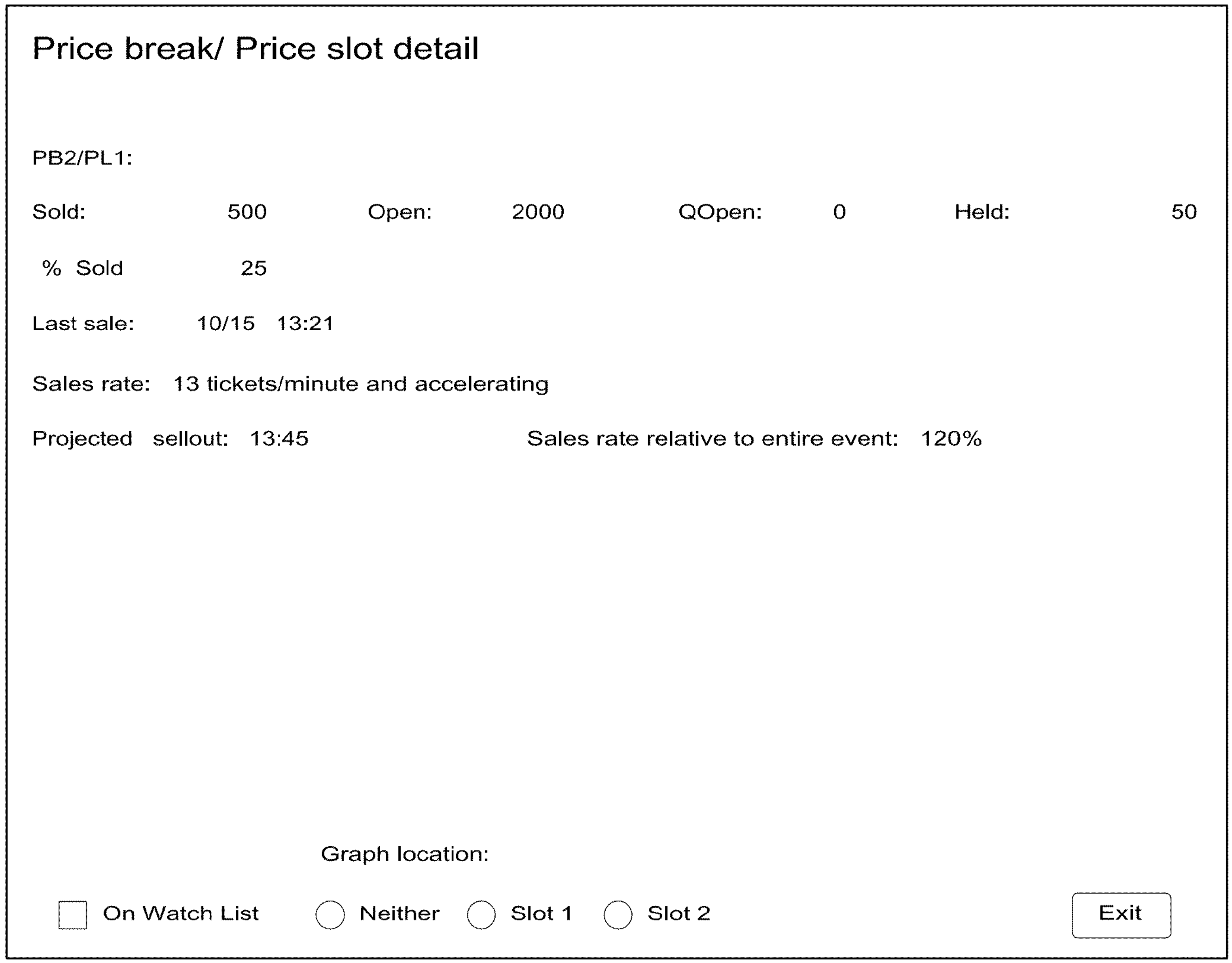
FIG. 13 illustrates an example price break report.

A price break/price slot detail report, such as that illustrated in FIG. 13, may be generated that provides, for a given price break, price level, and/or section the percent of tickets sold, open, and/or held, the rate of ticket sales, the acceleration or deceleration of tickets sales, a projected amount of time the available tickets will be sold out, the sales rate of a price break or section relative to the entire event, etc. In addition, controls are provided via which a user can instruct the system to add a graph to the user interface illustrated in FIG. 12 on the watch list or on particular slot (e.g., where a user can select a price level for which substantially real time sales activity is to be displayed).

Figure 14:
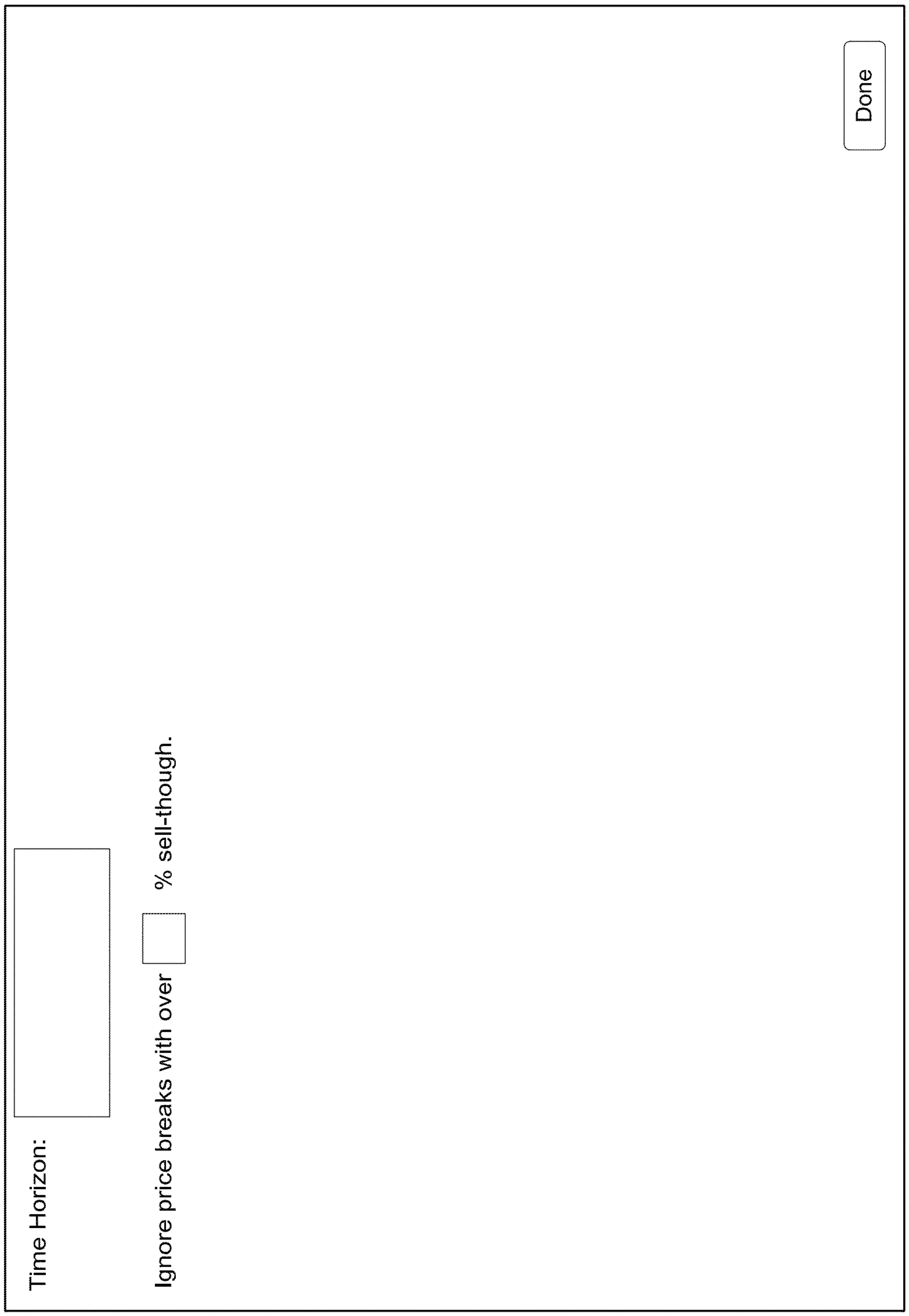
FIG. 14 illustrates an example report specification user interface.

FIG. 14 illustrates a user interface via which a user can specify a time period for which sales rate and/or other information is to be graphed or otherwise reported. In addition, an interface is provided via which the user can specify that price breaks having a greater than specified percentage of sell-throughs (e.g., the percentage of seats sold in a selected price level are to be ignored/not reported (e.g., if there are no or substantially no remaining seat tickets available at the selected price level).

Figure 15:
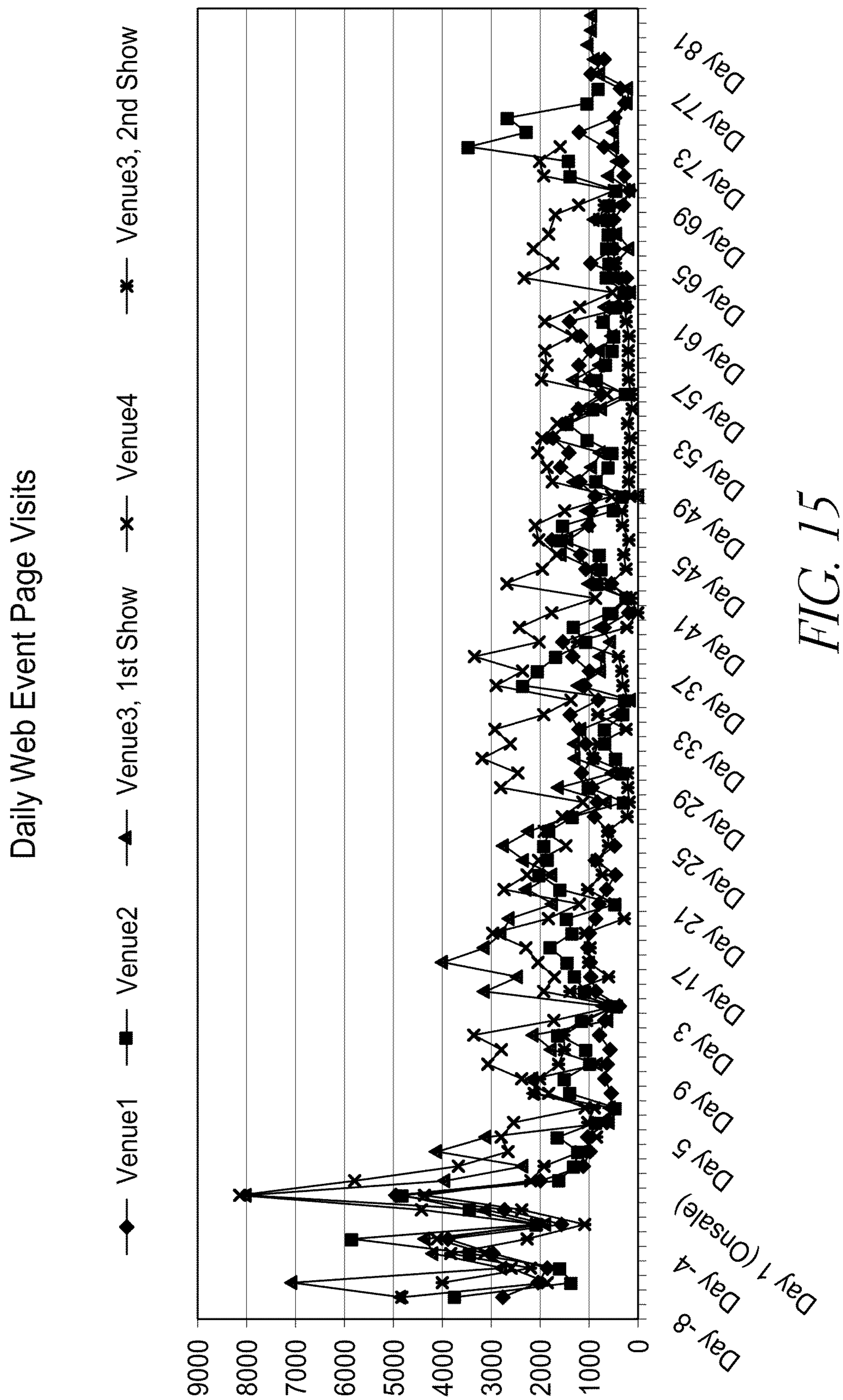
FIGS. 15-19 illustrate example reporting user interfaces.
Figure 16:
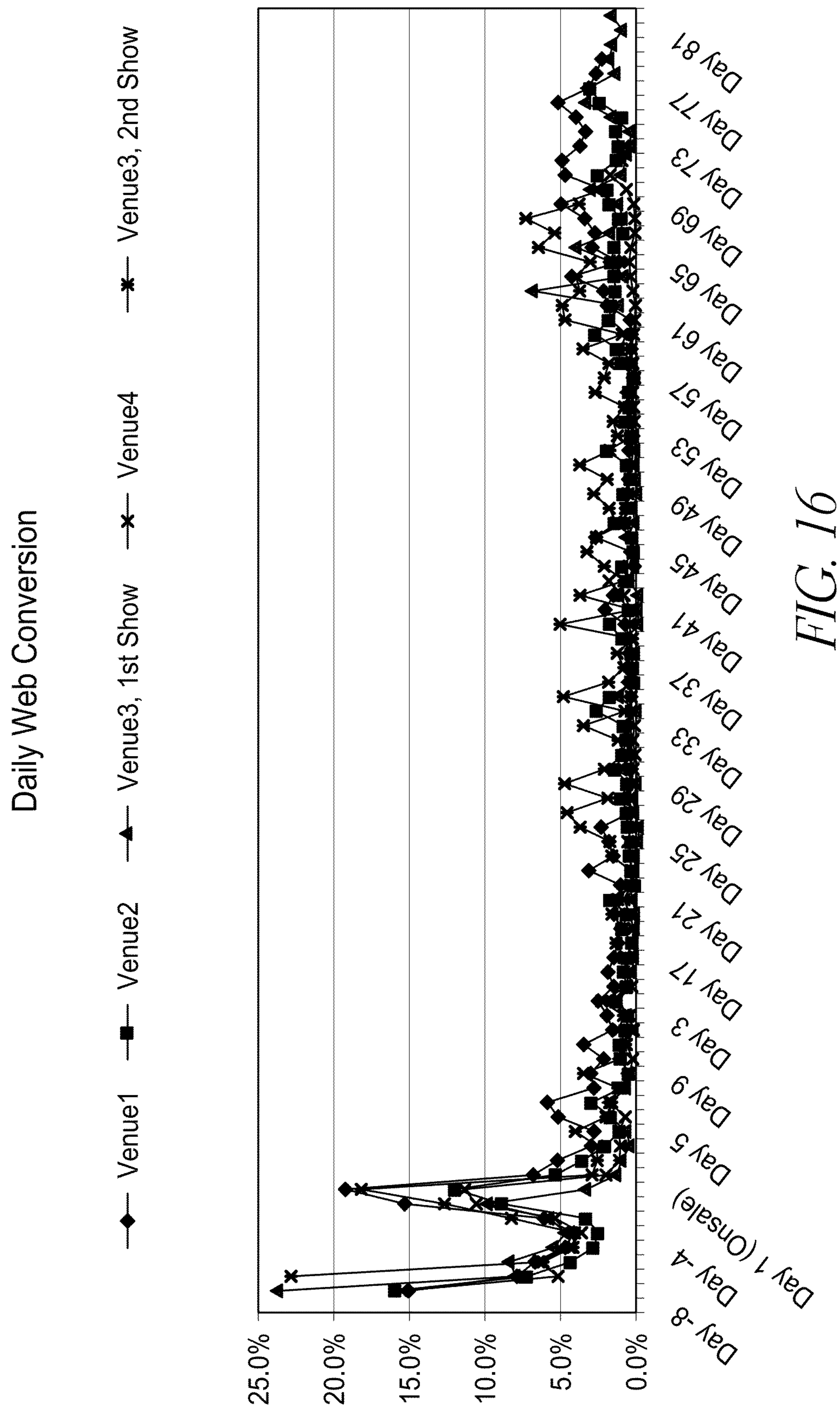
Figure 17:
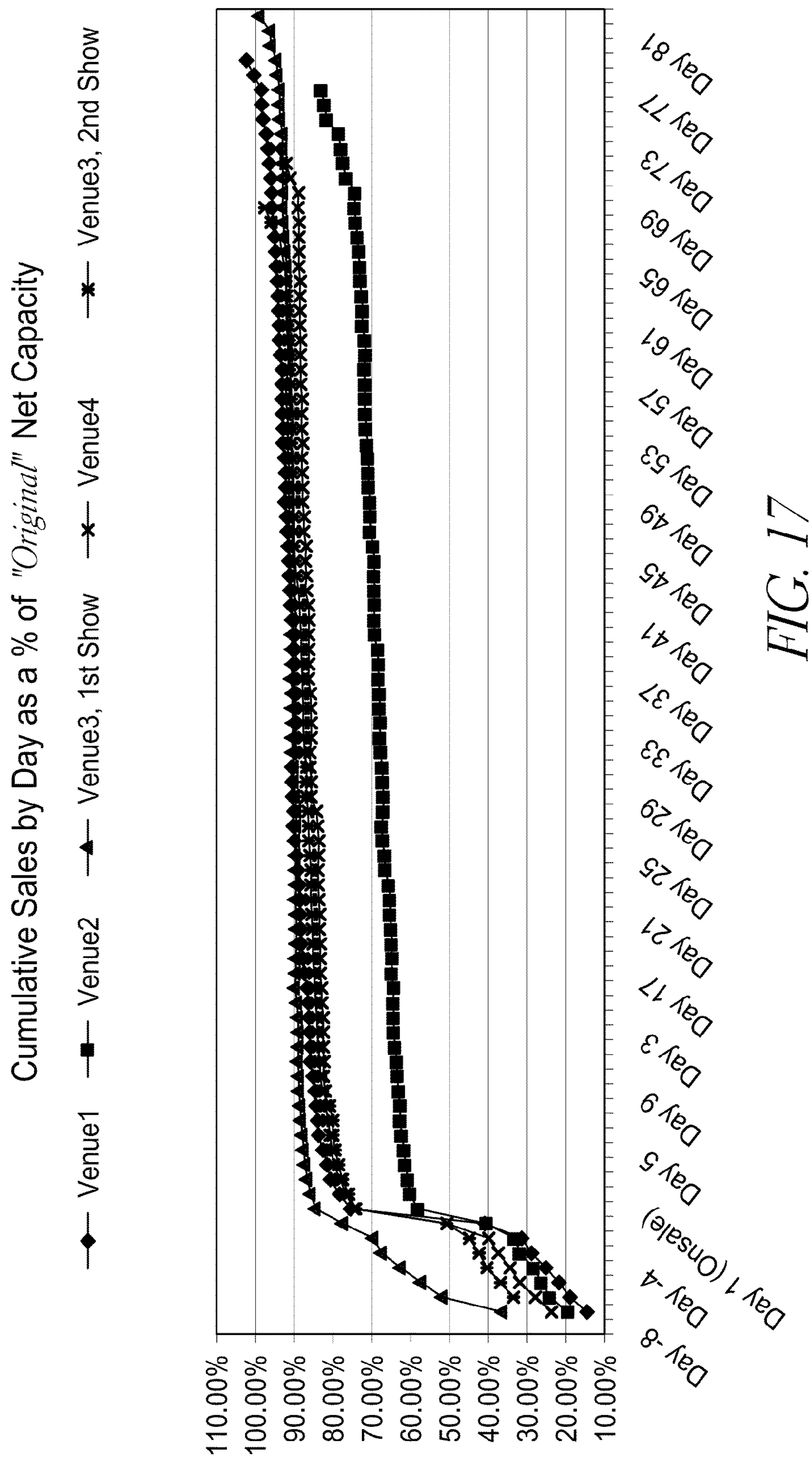
Figure 18:
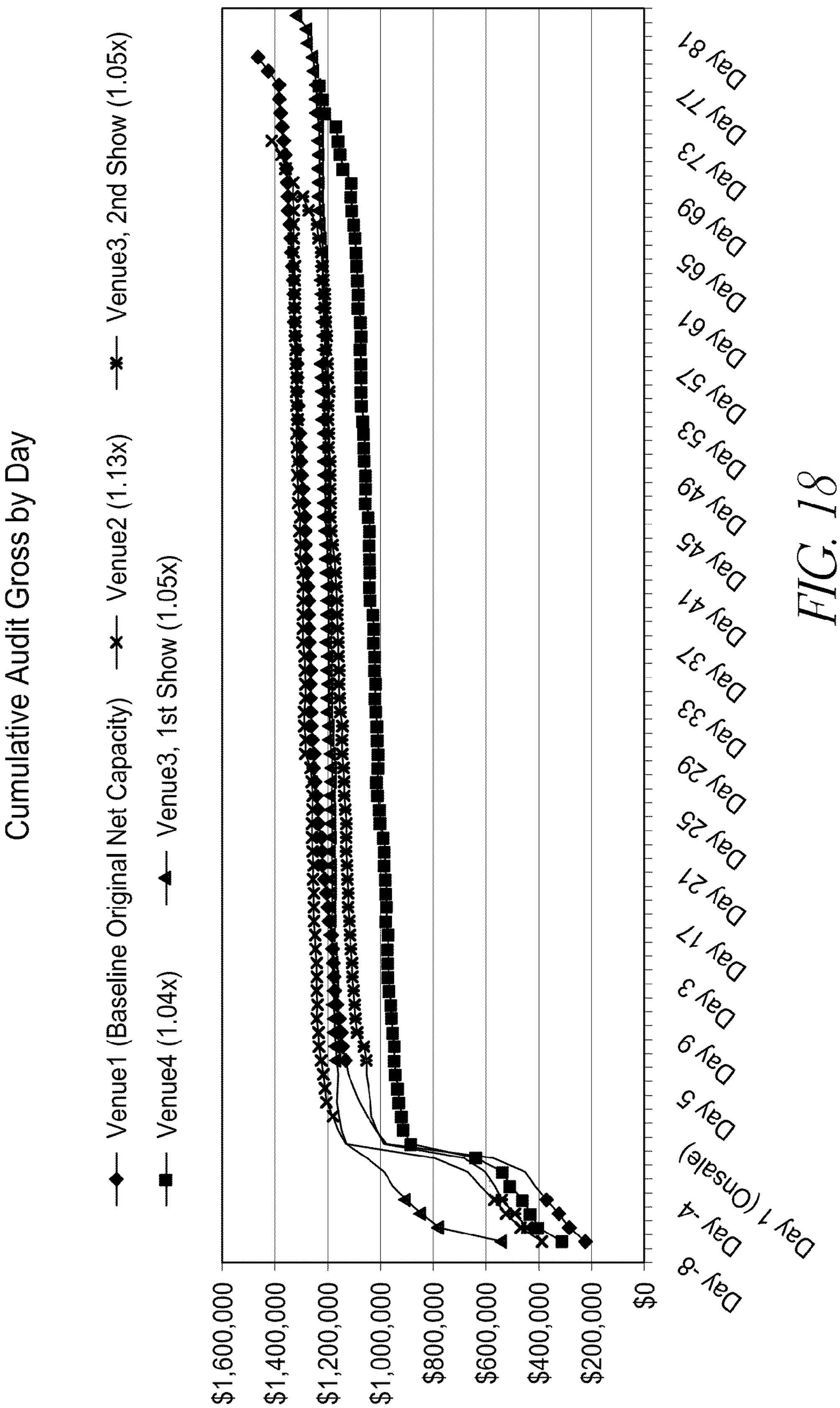
Figure 19:
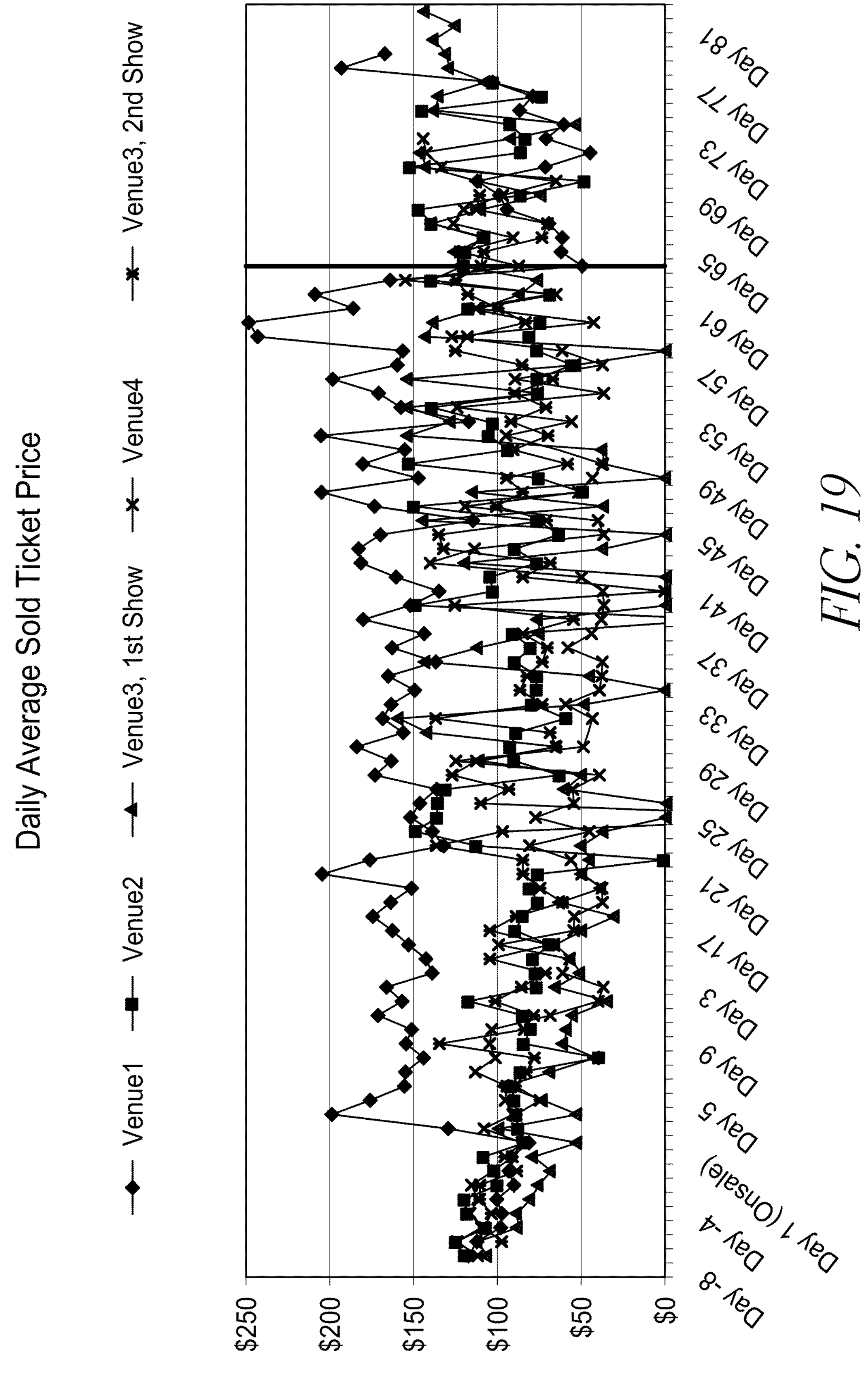

Other reports (provided in substantially real-time and/or after a delay, in non-real-time), can include graphs of, for one or more venues and/or one or more shows at a given venue:

- web page visits on a day-to-day basis (or other period of time), an example of which is illustrated in FIG. 15;
- web page conversions (where a web page visit resulted in a ticket sale), an example of which is illustrated in FIG. 16;
- cumulative sales by days as a percent of "original" net capacity, an example of which is illustrated in FIG. 17;
- cumulative audit gross by day, an example of which is illustrated in FIG. 18;
- daily average sold ticket price, an example of which is illustrated in FIG. 19;

As similarly discussed above, optionally the graphs can include graphs for multiple venues for events associated with a given performer and/or for multiple events/shows at a given venue, enabling a user to visually compare tickets sales for different venues and adjust ticket prices accordingly. For example, the graphs provide metrics to interested parties involved in ticket pricing (e.g., artists, promoters, venues) to provide an understanding of their events' performance and how price changes and inventory management affect sales. Thus, in certain embodiments, a user can simultaneously view sales and/or other event data for multiple events.

Further, reports can be generated that provide the number of seats sold, the total gross, and the average sold price per ticket, and the number and/or percentage of tickets resold for given venue section (e.g., floor, box, lower 1, lower 2, upper 1, upper 2, etc.).

Thus, seating pricing and price breaks may be dynamically set using the interfaces discussed above. Optionally, in addition or instead, the following techniques may be used for setting price breaks. In the example embodiment where there are multiple price breaks, an event is created from the price breaks within a given physical section and price break combinations being assigned to an individual seat block. A seat block is a group of seats with certain identical attributes (e.g., the same price level, near the same exit portal, having the same section name, in the same area of venue, in the same row, etc.). Thus, a seat block may be smaller than a physical venue section (e.g., may be smaller than a venue's orchestra, lodge, or balcony sections). Different price levels may be assigned to different seat blocks. Having more seat blocks than physical venue sections enables a higher degree granularity of section pricing, and thereby enables various seat blocks to be more appropriately priced. Seat blocks may optionally be large enough to handle all seats that potentially could be added to the manifest with those seats being in an open status. Thus, for example, if a venue event has about 280 degrees of visibility about the stage, with about 80 degrees behind the stage completely blocked, the seats behind the stage may be marked as unavailable, the seats in front of the stage may be marked as available, and the seats on the border between the available and unavailable areas may be marked a provisionally unavailable or provisionally available, subject to review of an appropriate authorized person (who may verify whether the stage visible or not from the border areas). Thus, there may be enough seat blocks defined to provide for seats in the border areas.

In addition to the process of defining seat attributes (e.g., common attributes, such as price level, venue area, etc.) for a given seat block, the price break identifier may be placed in a sub-price level field (also referred to as a price break field). The price break level field may be used to indicate that specified sections or seating areas at the same price level are to be separately reported with respect to ticket sales and/or ticket availability. For example, if seats in a balcony area and seats in a floor area are priced identically, a sales report requesting sales information on $100 seats may break out sales for the balcony and sales for the floor area. The count of seat blocks generated is recorded, and this information may be used in estimating the available event capacity of the venue/event data structure. After initial pricing is established, the sell order of the seat blocks may be determined.

Optionally, the seat blocks are defined or moved so that sequential seat blocks follow the natural or specified selling sequence of the venue. For example, the seat blocks may be assigned numbers sequentially if the corresponding seat blocks are to be put on sale sequentially. Optionally, the process is automated using a pre-existing chart with a given physical section assigned a unique seat block identifier. Additionally seat blocks may be defined in order to provide greater control of the selling order. Optionally, a unique identifier may be assigned to a given seat ticket price including any associated discount, to thereby enable a user to request a report on the given unique identifier, where a report is generated for the actual net pricing. In an example embodiment, once the initial event setup is performed, a pricing matrix may be defined.

A set of price levels is optionally established using event modeling statistics, artist manager/promoter experience, and/or other information in combination with the price break setting tool. Optionally, a range of price breaks may be set based at least in part on artist preferences or specifications. Optionally, some or all of the seats and/or price breaks may be designated for paperless ticketing (e.g., where a paperless ticket is associated, via a database entry, with a user identification item, such as a credit card or driver's license, which may then be used to gain admission at the event venue). For example, certain seats may have a relatively low ticket price set, but may be designated as paperless-only to ensure tickets got in the hands of true fans that will actually attend the ticketed event, rather than ticket brokers or others that purchase tickets with the intention of reselling them. By way of further example, other, more expensive tickets may be designated as paper or paperless, wherein the ticket purchaser can select the ticket format.

For example, as similarly discussed above, the tool user interface illustrated may display, using color coding and/or other notation to designate price breaks, held seats (e.g., seats held for the artist's use, the promoter's use, for the venue's use, and that are not available for sale to the general public), seats associated with paperless ticketing, etc. The user interface aids the person(s) entering the pricing information to visualize seat grouping and to see gross and/or net revenue potentials, as calculated by the system.

By way of illustration, the user can instruct the system, via a user interface control, to color seats by price and/or by price break. The user can instruct the system, via a user interface control, to calculate the average face value/price, the average all-in value/price, and the expected number of available seats and/or the expected number of seat tickets that will be sold. The user can instruct the system, via a user interface control, to calculate the total gross potential value for the sale of the event tickets based on face value of the tickets and/or the all in value of the tickets (the face value of the ticket plus fees and service charges).

A user editable table is optionally provided for defining a pricing matrix. The table includes rows for a give price break, and columns that include values for the ticket count of the price break, the face value of the price break tickets, the all-in value of the price break tickets, the percent of tickets expected to be sold, and the number of tickets expected to be sold, and the total value of the tickets expected to be sold (e.g., total face value and/or all in value). The user can change one or more entries (e.g., the face value and/or the percent of tickets expected to be sold), and the system will calculate the resulting values (e.g., the new total dollar sales for a given price break, the new total gross potential sales for face price and/or all-in price), etc. Controls are optionally provided via which the user can zoom in or out of a given seating section on the seating diagram.

Optionally, the system stores rules and permissions which are utilized to determine who may change ticket prices for a given event, venue, performer, and/or promoter, as similarly discussed above For example, in certain cases, price changes from a requester may need to be approved by a venue box office (or other entity). Optionally, a user, such as the artist's manager or promoter, can enter price changes, such as via the visual map. The price changes are automatically converted into an electronic message (optionally after receiving a corresponding instruction from the user). The electronic message is transmitted over a network to the box office system. The message may be stored in memory at the box office system for later retrieval and/or the message can be displayed via the box office system when it is received. An authorized user at the box office can retrieve and view the message, and can then approve or deny the requested price change. Optionally, a message regarding the approval or denial is automatically transmitted back to the requester.

If the price change is approved, the approval is communicated to the ticket system, and the price change is reflected, optionally substantially immediately (e.g., in less than 15 minutes, less than 10 minutes, less than 5 minutes, less the 15 seconds, less than 5 seconds) online via web pages presented to potential ticket purchasers. Thus, certain embodiments enable rapid approval of ticket price changes and the posting of the same to the ticketing website.

In certain embodiments, prior to final event creation, a matrix, such as the example matrix illustrated in FIG. 22, may be created. The example matrix is configured to indicate which price level may be initially assigned to each price break. Additionally, a list of potential price levels to which a price break could be flexed may be indicated.

The number of possible price level/price break combinations may optionally be limited by the number of sections in the venue and the average number of price breaks per section. The limitation on a particular event may, in certain circumstances, be difficult to predict prior to actually building the event, so the process is optionally performed iteratively. An estimate can be given based on the count of free seat blocks. Price levels may be assigned to some or all seat blocks.

Optionally, the initial event setup for a venue may need to be reviewed and approved, such as by a performer, event box office, or other entity. The approval may be viewed via a terminal of the approver, and the approval or disapproval of the event setup may be received over a network from the approver's terminal stored in memory in association with the initial event setup.

Figure 29A:
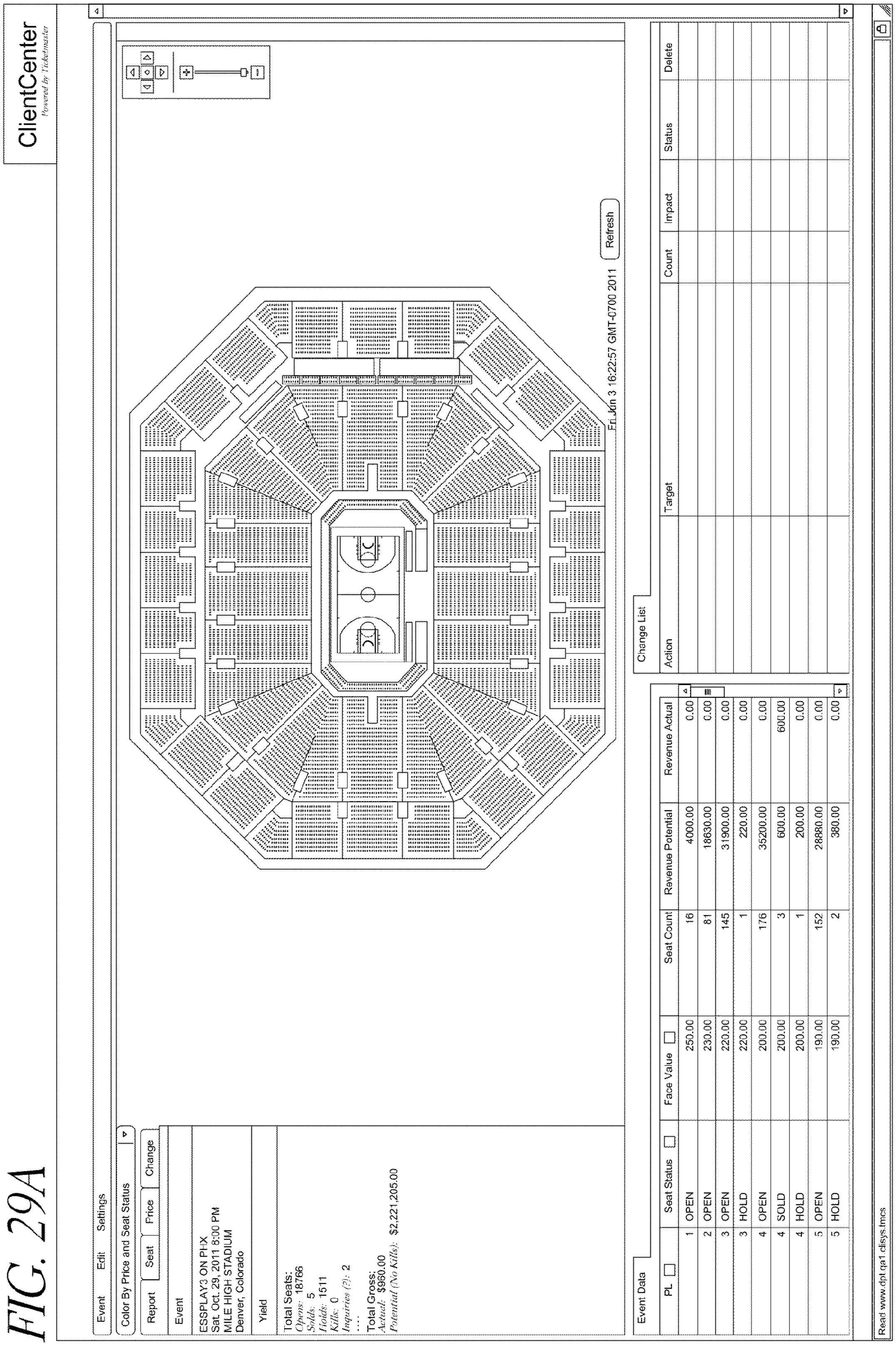
FIGS. 29A-H illustrate additional event creation user interfaces.

FIGS. 29A-H illustrate additional example event creation user interfaces for a ticketed event. FIG. 29A illustrates an example opening user interface which may be populated using data accessed from a ticket system database, and wherein values may be calculated (e.g., by the ticket system and/or the user's client computer). The illustrated example user interface includes the following functional areas (although other embodiments may have fewer or additional functional areas): a report area, an event data area, and seating map area, and a change list area.

The report area (on the left-hand side of the example user interface), displays the following event level summary information and/or other information:

- an event name;
- a system hosting the event model;
- an event date and time;
- an event venue;
- yield data, including:
  - the total number of open seats (e.g., if ticket sales have begun, the total number of seats available to the general public, and if ticket sales have not yet begun, the total number of seats to be made available to the general public, optionally including seats that are quasi-open in the sense that a special offer code or credit card associated with a specific brand/issuer may be needed in order to purchase respective seat tickets);
  - the total number of "solds" (the number of seats for which tickets have been sold and are no longer available for an initial sale);
  - the total number of holds (seats for which tickets are not available to the general public, even when ticket sales commence, but which could be later offered for sale to the general public (e.g., tickets held in reserve for band member families or for other private distribution));
  - the total number of "kills" (seats for which tickets are not to be sold because of a physical impediment, such as seats that are behind the stage and whose views of the performers are completely blocked);
  - the total number of "inquiries" (seats for which tickets a person is in the process of purchasing, such as by adding them to their online shopping cart, but for which the purchase is not complete (e.g., wherein if the purchase is not completed within a certain period of time, the seats status will be changed to "open" so that others may purchase the tickets)).
- Total Gross, including:
  - Actual gross ticket sales to date (the summation of the number of tickets sold multiplied by the actual sale price of the corresponding tickets);
  - Potential gross sales (e.g., the summation of, for each price level, the price of a standard adult ticket at a price level to which the seat is assigned, multiplied by the quantity of seats at that price (where the actual gross may be different than the potential gross where certain seat tickets are sold at a discount, such as at a child rate), optionally assuming no killed seats or instead, not including anticipated ticket sales for killed seats).

The event data area, on the lower left of the user interface, provides a grid that presents, and enables the user to view, detailed statistics and enables the user to decide what data and statistics are to be displayed. For example, a user may utilize column headings to organize and sort the data. By way of illustration, the first column may be used to define the sort basis. By way of example, in user interface illustrated in FIG. 29A, the first column lists the price levels (PL) by number (1, 2, 3, etc.), and so the data is sorted in price level order. In certain embodiments, a user may click on a column heading in order for that column's data to be used to determine the sort order.

Figure 29B:
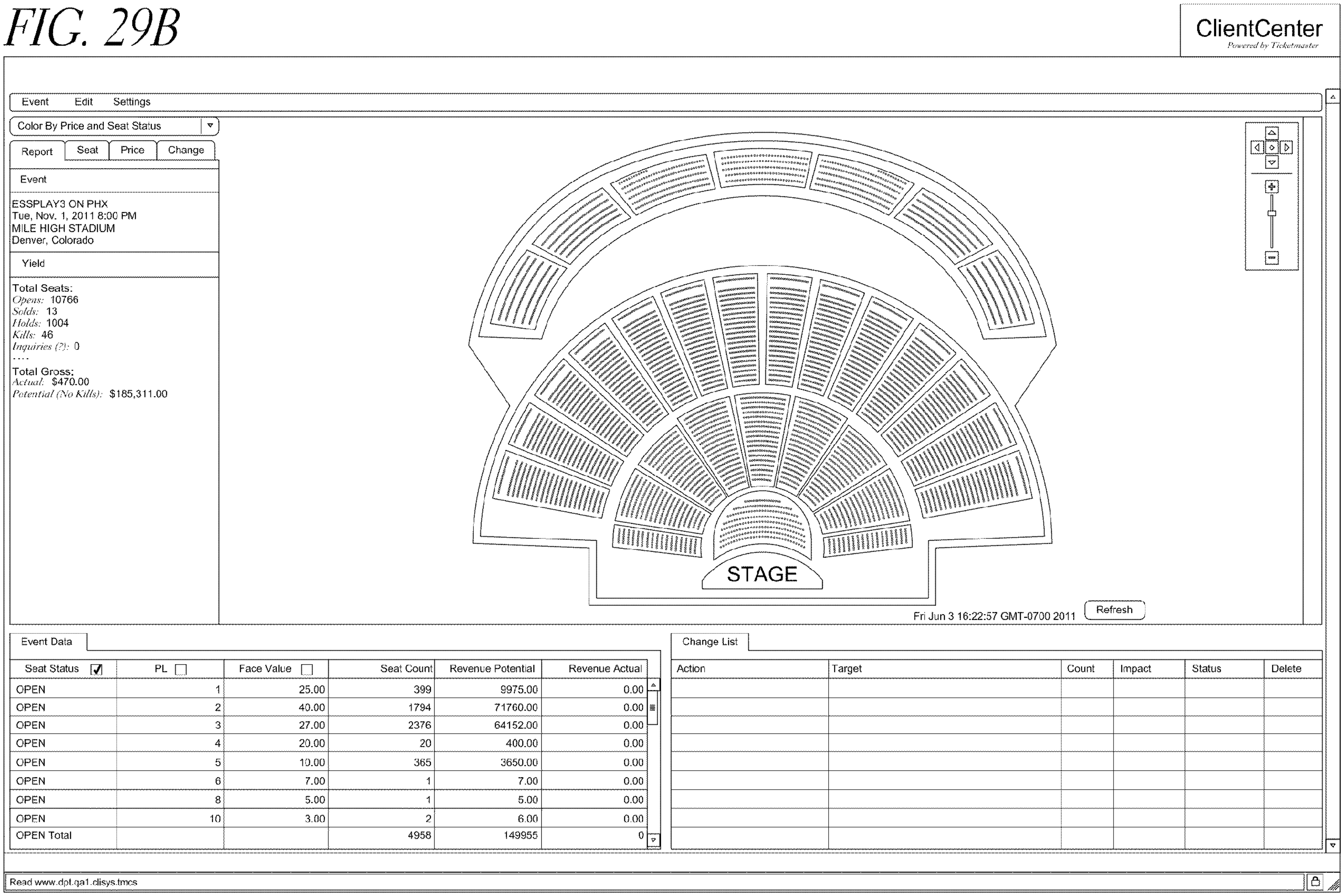
Figure 29C:
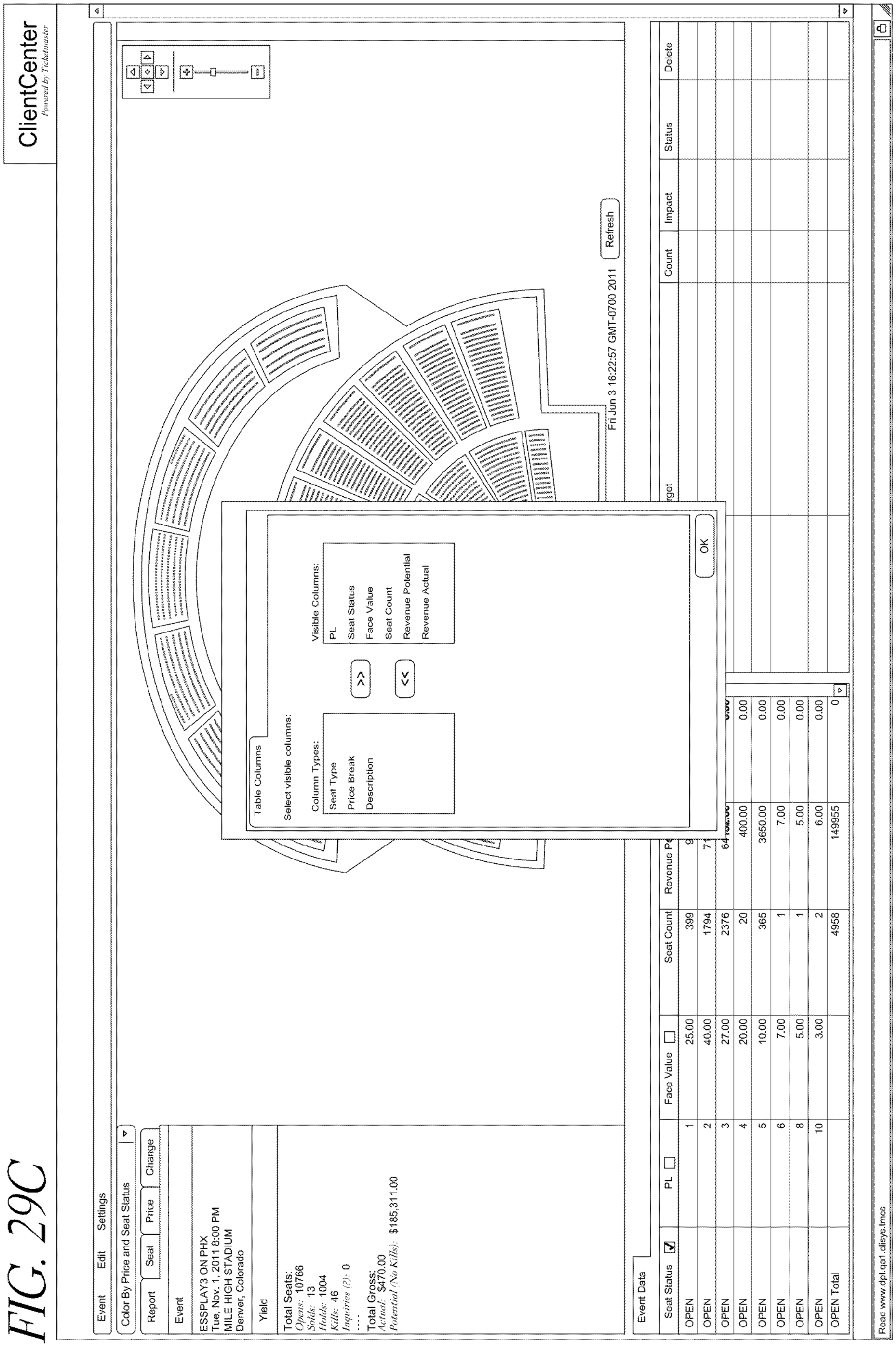

A user may drag and drop columns in order to organize how the data is represented, and optionally the sort basis. As illustrated in FIG. 29B, the first column has been changed to "seat status", and the data is sorted alphabetically according to the seat status spelling. In addition, the column headings include controls (check boxes) via which the user can specify what data is to be summarized. In the example illustrated in FIG. 29B, "seat status" is selected.

Referring back to FIG. 29A, the event data displays a listing of price levels, and for respective price levels, the following information is provided in respective columns: seat status (e.g., open, hold, kill, sold, in-cart, etc.) for seats at the respective price level, ticket face values (e.g., the non-discounted ticket prices) for seat tickets at the respective price level, the seat count at the respective price level, the revenue potential at the respective price level, and actual revenue (actual sales) at respective price level. Other example columns may include seat type, price break, description, qualified open seats, etc. The example user interface illustrated in FIG. 29C includes a control box via which columns may be added or deleted from the event data grid.

In certain embodiments, a user may manually enter data into a given field, and the system will calculate the effect on data in other fields, to thereby enable a user to perform a what-if analysis. For example, the user can change the ticket face value, seat count, and/or number of seats having a specified status (e.g., open, sold, held, killed), and the user interface will be updated to reflect the effect of the change on other types of data, such as on revenue potential. Thus, the user can see the effect of certain changes (e.g., on revenue, profitability, number of tickets that are likely to be sold, etc.) and decide whether or not to actually implement those changes.

Figure 29D:
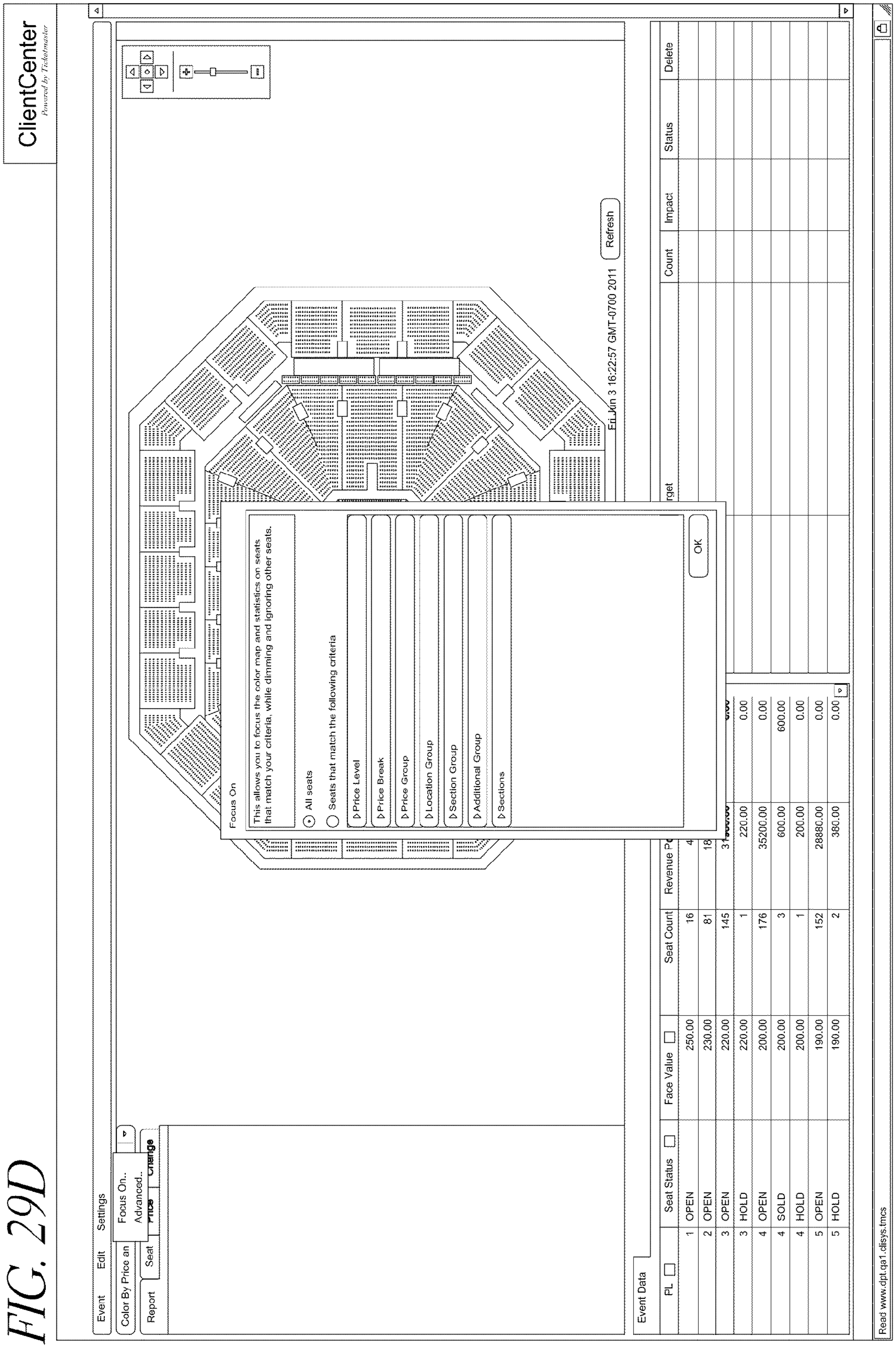
Figure 29E:
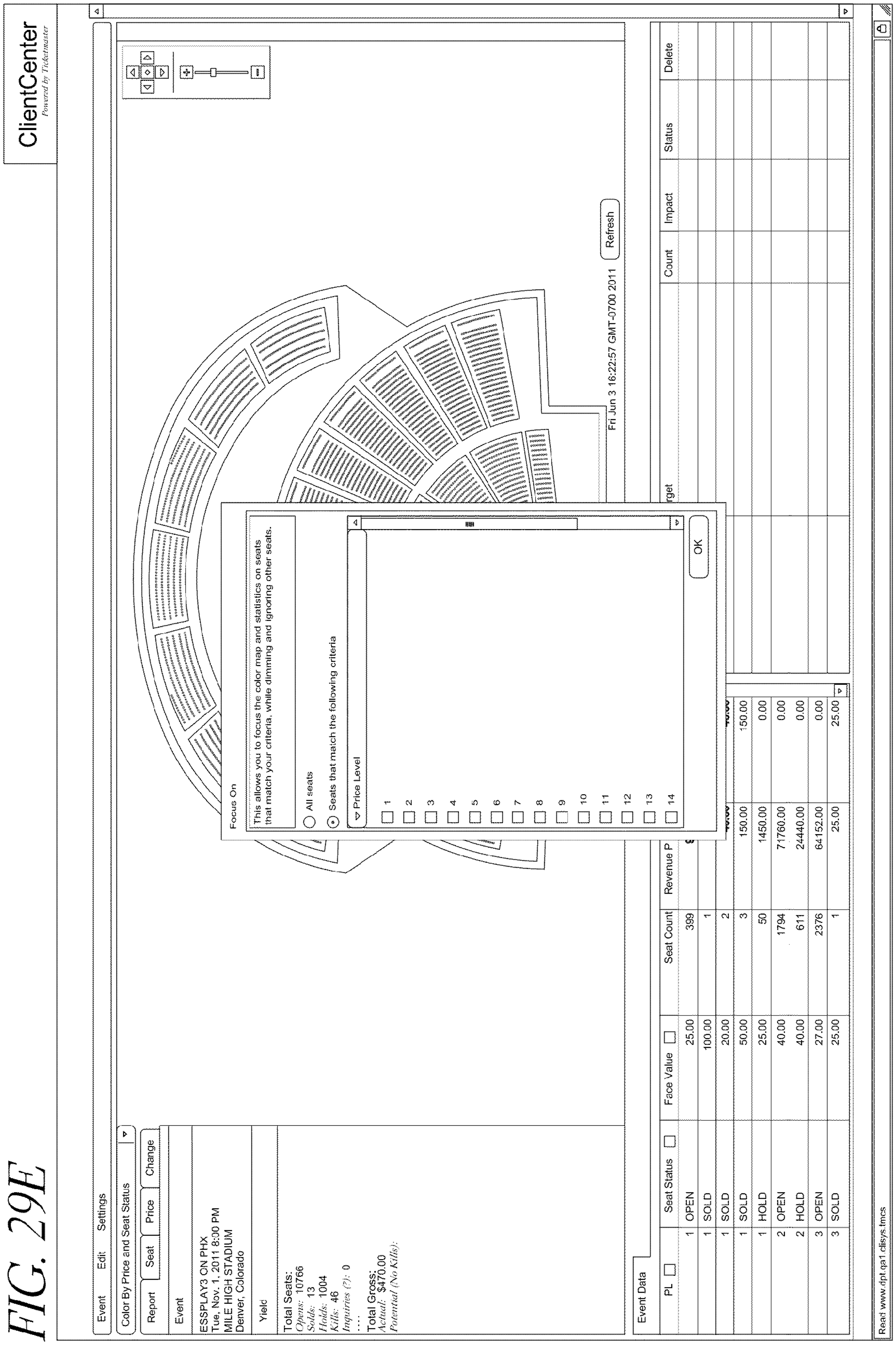
Figure 29F:
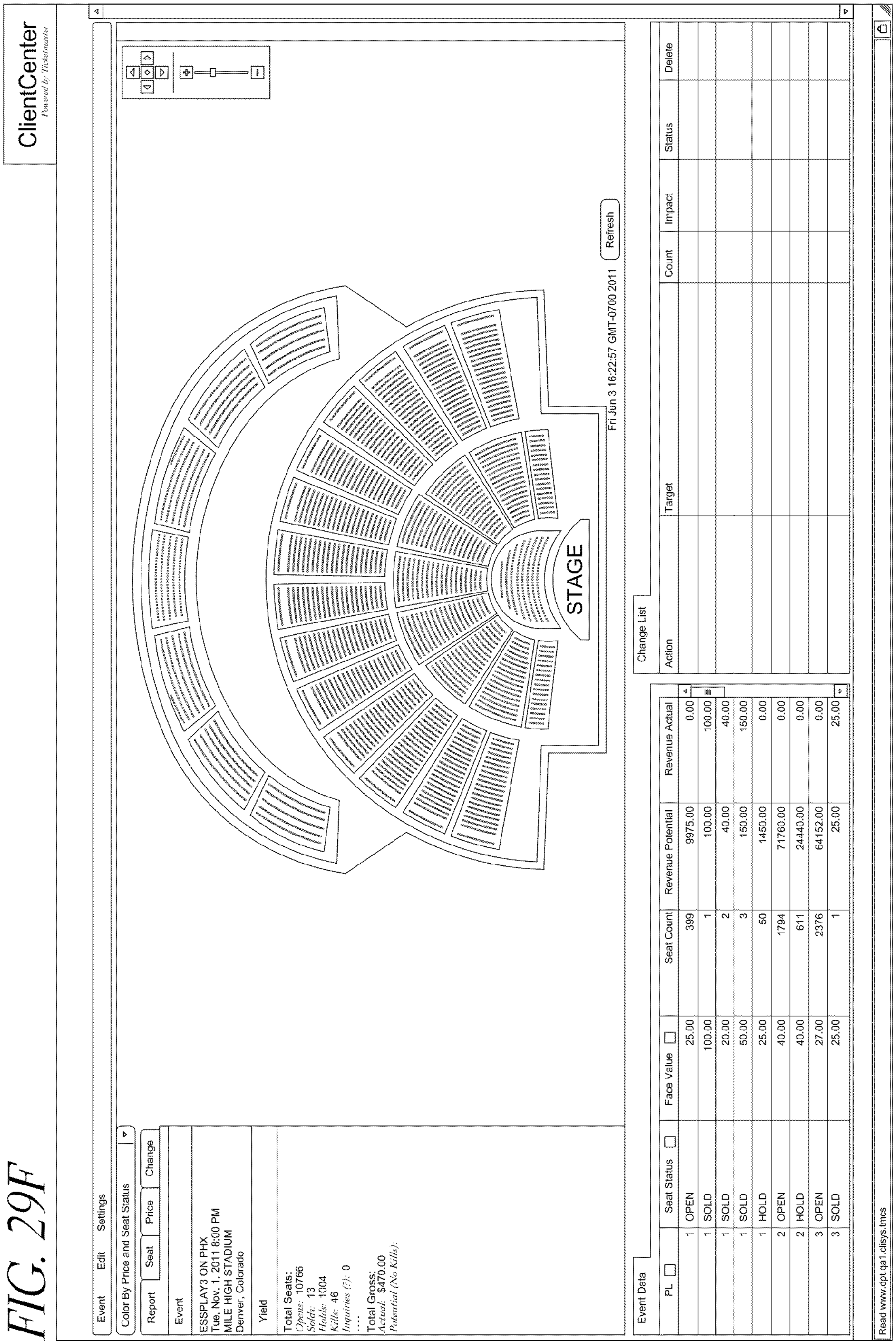

FIGS. 29D, 29E, and 29F illustrate example filtering operations. Referring to FIG. 29D, a user interface is provided via which the user can specify filtering criteria, such as some or all of the following and/or other filter criteria:

- price level (current pricing scheme associated with corresponding seats);

price break (set of seats logically grouped together, such as seats in a certain common area, which can be shifted as a set from one price level to another);

price group, location group, section group, additional group (which may be used to specify other seat groupings, where a given seat may belong to multiple groups, such as a "lower level" group, bleacher group, $1^{st}$ base side group, $3^{rd}$ base side group, etc., where a ticket purchaser may specify a desired seat by naming the groups without reference to a visual map (e.g., during a phone call with a ticketing agent or interactive voice response ticketing system), and where different seats within the same price level may be assigned to different groups for reporting purposes;

"sections" (wherein a given section may be specifically named (e.g., section 101)).

The seating map and the event data may then display/emphasize seats and related data that satisfies the user-specified filter. In addition, subtotals may be calculated for the selected items in the event data area.

FIG. 29E illustrates another example user interface, wherein the user can specify one or more price levels for the filtering operation. In the illustrated example, price level 3 is selected. FIG. 29F illustrates the results of the filtering operation for price level 3. The seating map emphasizes, via color, graphics, and/or icons, the seats that correspond to price level 3, and the event data only displays data corresponding to price level 3, and does not display data for other price levels.

Optionally, filtering criteria may be combined using Boolean functions (e.g., AND, OR, Exclusive OR, NOT, and/or other Boolean functions).

Figure 29G:
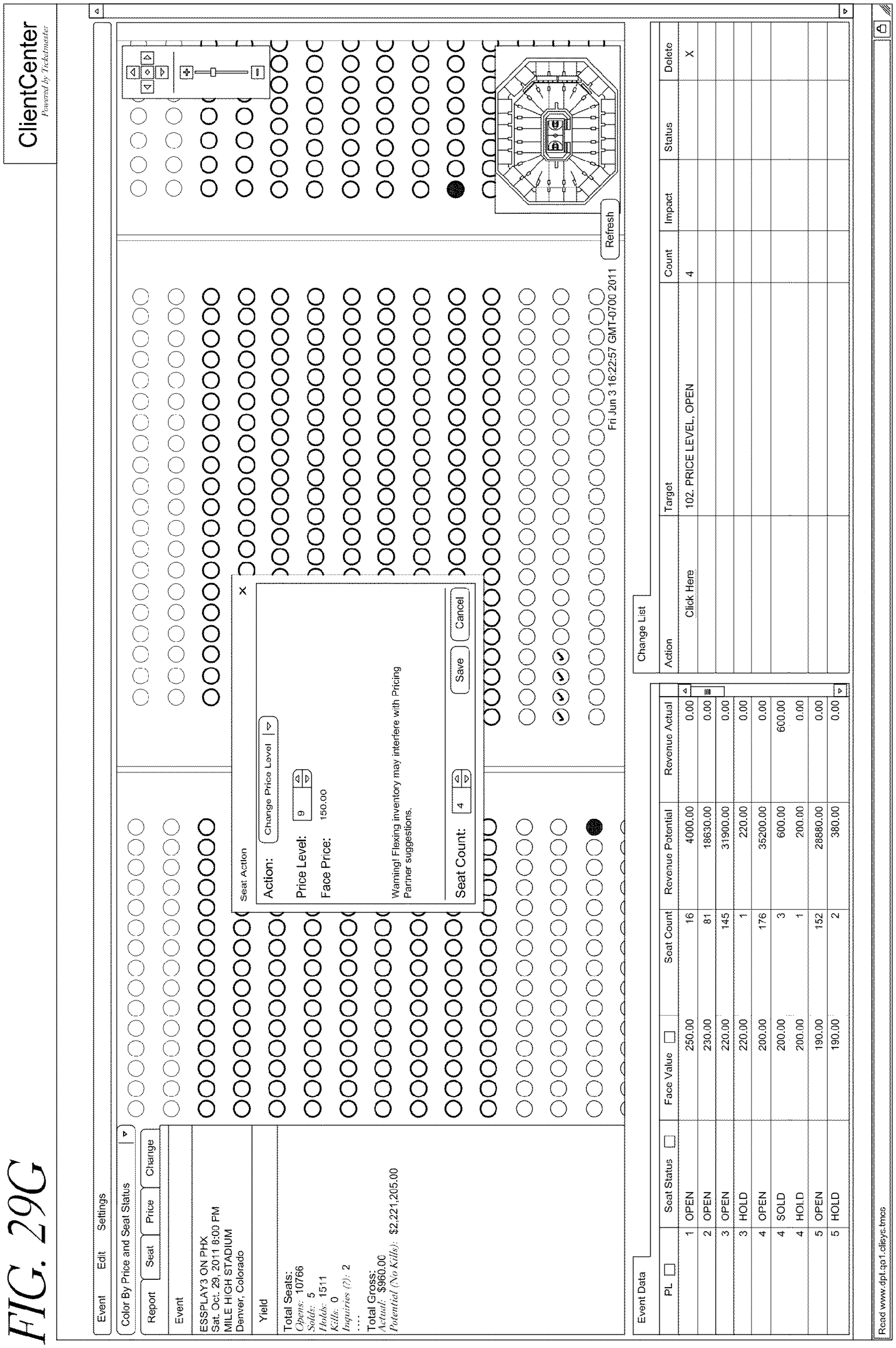

FIG. 29G illustrates an example user interface via which a user can select specific seats via a seat map and edit attributes associated with the selected seats on-the-fly. For example, a user can click on or otherwise select one or more individual seats or a group of seats. The number of seats selected is displayed via the seat count field in the dialog box. The user may change the price level associated with the selected seats (e.g., via the action menu) and/or change the face value associated with the tickets for the selected seats. By way of further example, the user may change the status of the selected seats (e.g., among "open," "hold," "kill," "sold," etc.). The changes may be reflected in the change list area (e.g., as a result of calculations based at least in part on the changes). For example, the change list area may list the action (e.g., change price level, change seat status), target (e.g., seat identifier, price level, status), the seat count, the impact, status of change, delete, etc. The changes may be stored in memory. Thus, the user can specify certain changes, see the effect on the event data, and then decide to accept/implement the change, or reject/delete the change. The acceptance or rejection of the changes may be stored in memory in association with the specified changes. The changes may be performed and implemented prior to placing tickets on sale for the event and/or after ticket sales have begun. Thus, the user interface may be used to dynamically change pricing, seat availability, etc., for an on-sale event.

In certain embodiments, the user interface enables the user to select one or more seats and assign the selected seats to a specific account/user prior to or after other tickets are put on sale to the public. For example, in certain instances a performer may instruct that tickets for certain seats are to be assigned to the user's mother or father, without the specified seat tickets ever being put on sale.

The management of seat tickets for a given event may be divided up among different entities, wherein different entities manage different subsets of seat tickets for an event. For example, in certain embodiments, the user interface enables the user to select one or more seats (e.g., a subset, but not all of the venue seats) and assign control/management of the selected seats (which may be initially assigned the status of "hold" seats) to a specified authorized entity, wherein the specified authorized entity does not control or manage tickets for other event seats. For example, in certain instances a governmental entity/city may own a venue, but may lease it to an operator, which still maintaining control over a relatively small subset of seats (e.g., 200 out of 18,000 seats) in order to decide how to allocate the seats (e.g., to visiting dignitaries, honorees, etc.). The governmental entity (or other party) and the venue operator may negotiate which sub-set of seats are to be controlled by the governmental entity, and the agreement may be implemented by an operator selecting seats and allocating management of the selected seats to the governmental entity (or other specified party). By way of further example, in certain jurisdictions, while multiple ticketing service providers may have the right to sell tickets for events at a given venue, the multiple ticketing service providers may divide up the venue seats, wherein a given ticketing service provider is allocated a certain subset of seat tickets to sell. The seating map may be used to allocate management of/authority to sell tickets for respective subsets of venue seats to different ticketing service providers.

The seat map may be used to assign event alerts and/or time alarms to individual seats and/or sets of seats. The event alerts may relate to a change in seat status (e.g., from open to sold, from hold to open, from killed to open, from open to killed, etc.). The event alert may be tied to a time criteria, wherein an alert is only provided if a specified event occurs (or does not occur) by a specified date/time.

For example, certain embodiments enable a user to assign an alert to one or more selected seats, wherein if a ticket for a seat associated with an alert is sold, an alert is transmitted to one or more specified recipients. By way of further example, certain embodiments enable a user to assign an alert to one or more selected seats, wherein if a ticket for a seat associated with an alert is not sold by a user-specified date (which may be a specified month/day/year, or wherein the date may be specified relative to the date of the event or initial offer for sale, such as 15 days before the event or 30 days after the seat ticket is offered for sale) and/or time, an alert (e.g., in the form of an email, SMS message, MMS message, automated voice call, application notification, or otherwise) is transmitted to one or more specified recipients. The seats may be selected for alerts as the sale of seat tickets for such seats indicate the overall performance of the ticket sales for the event. For example, the sale of tickets for certain seats may indicate that event sales are going well/satisfactorily, while the failure of such seats to sell by a certain date/time may indicate that sales are slower than desired. The seat alerts may indicate to the recipients that ticket prices should be raised or lowered in order to enhance revenues.

Further calendar entries, alerts/warning timers (e.g., with associated expiration times or calendared dates/times) may be assigned to one or more seats (e.g., a warning that certain seats initially allocated to governmental entity will be reallocated back to the box office which will have to sell them). A text message may be displayed by the system in association with the alert, the text message optionally identifying one or more seats associated with the alert and/or a message previously specified by a user (e.g., a text and/or graphic message including a reminder related to the seats, such as "Seats A-C will be reallocated to the box office today"). The user may specify one or more recipients and/or device/email addresses that are to receive the alert and associated message.

Figure 29H:
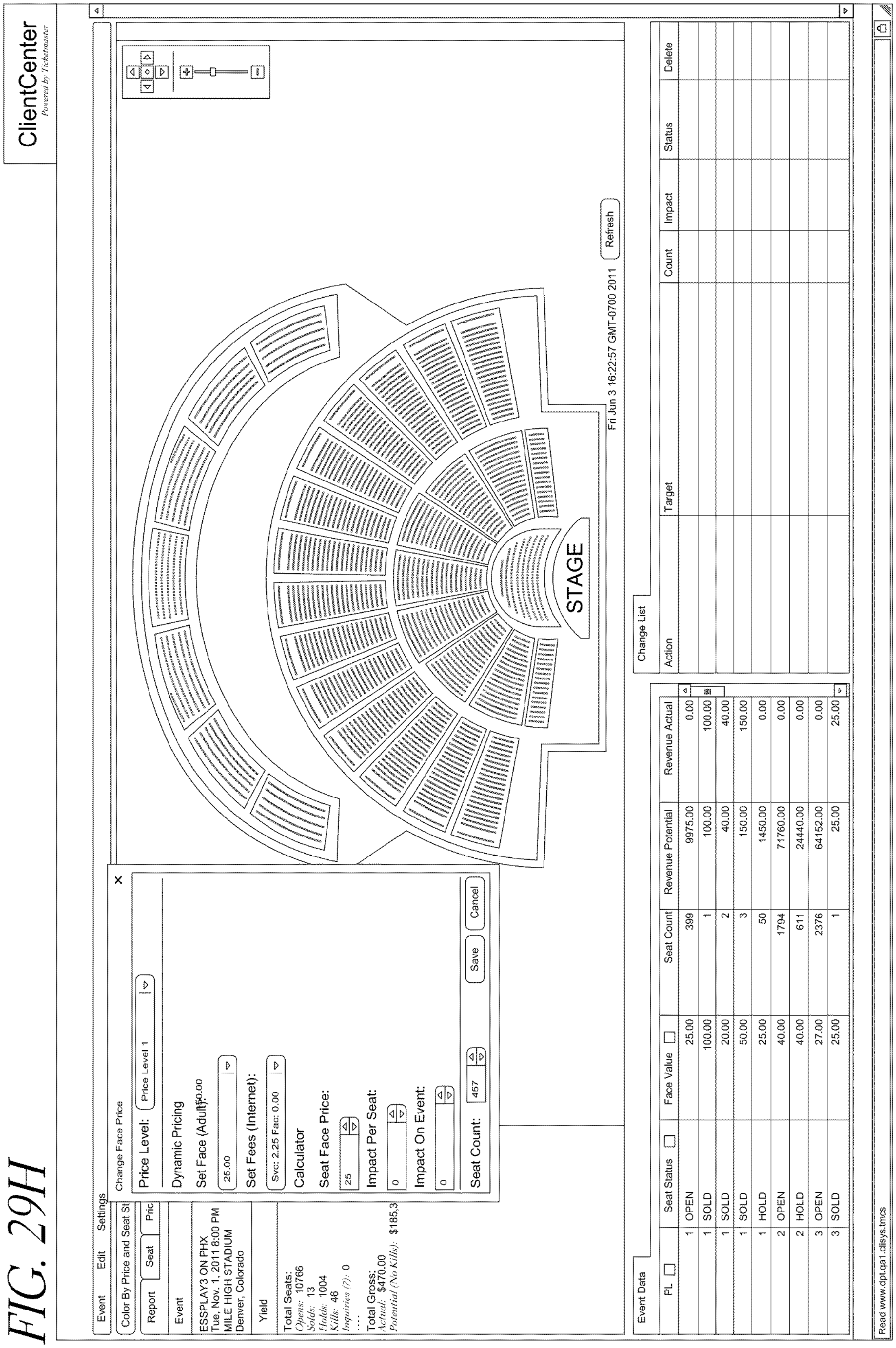

FIG. 29H illustrates an example user interface providing another mechanism via which a user can edit/change seat attributes (e.g., to enable dynamic pricing of seat tickets). In this example, a menu is provided via which the user can edit/change the previously set face value of seats in a selected price level (e.g., without moving changing the price level to which the seats are assigned). In addition, fields are provided via which the user can edit/change ticket-related fees (e.g., service fee, facility charge, etc.); impact per seat (wherein the user can enter a delta change in the face value price, or wherein the change is price/impact is calculated and displayed based on the user-specified change in the face value field); impact on event gross (the delta/change in expected event gross), etc. The changes may be reflected in the change list area, which lists the action (e.g., change price level, change seat status), target (e.g., seat identifier, price level, status), the seat count, the impact, status of change, delete. The changes may be stored in memory.

Thus, the user can specify certain event changes, see the effect on the event data and reports, and then decide to accept/implement the change, or reject/delete the change. The acceptance or rejection of the changes may be stored in memory. The changes may be performed prior to placing tickets on sale for the event and/or after ticket sales have begun.

While the user interface illustrated in FIG. 29G enables the user to specify changes for user-selected specific seats, the user interface of FIG. 29H lets the user specify change more ambiguously (e.g., via the pop-up dialog box or the event data grid). For example, the user can specify that 25 seats should be moved from one price level to another, without specifying specific seats that are to be moved to a different price level. The system can then calculate the effect on the event data. By way of further example, the user can specify a desired goal (e.g., an increase of $10,000 in gross revenues), and the system will calculate how many seats would have to be moved from a first price level to a second price level (higher than the first price level) in order to achieve the goal. The user may specify any of the event entries as a goal, and the system may calculate one or more ways to achieve the goal by varying one or more parameters, which may be displayed to the user.

An example event setup workflow will now be described. Many entities and people having different roles (e.g., advisor, decision maker, executor, etc.) and responsibilities may be involved in an event setup (e.g., in defining the physical layout of the event, the price structure of the event, in determining the number of held or killed seats, etc.). For example, there may be one or more performers (e.g., musical performer (s), team(s), actor(s), etc.), promoters, venue operators, box office managers, advisors, dynamic pricing generators, assistant managers, etc., involved in setting up a ticketed event. Certain embodiments described herein enable various entities to perform their roles with corresponding rights and abilities to perform setups, modifications, view data, etc.

As discussed above, different users may have different roles. For example, certain users may act as advisors with respect to an event setup. Such advisors may be granted access to view event data, such as that described herein, specify provisional changes (e.g., in ticket prices, the number of price levels, seat statuses, etc., via a change list or otherwise), view the calculated results of such changes prior to the changes being actually implemented, save the changes as one or more proposed event record change files, and/or designate a change file as a "recommended change" file. The advisor may also recommend what types of tickets should be issued for which seats (e.g., a physical ticket, an electronic ticket, and/or a virtual ticket). Thus, the advisor may make proposals with respect to changes to an event setup, but does not have the authority to actually instruct that the changes be implemented as an on-sale event. Thus, an advisor may be enabled to perform what-if analyses on various different event setups and provide recommendations on how the event should be setup to a decision maker (e.g., an event promoter) that has the authority to approve such changes, but without such approval, the event is not setup based on the advisor's recommendations or saved change files.

The decision maker may view the proposal file(s) and then approve disapprove such changes and/or may make further changes, wherein such approval, disapproval, and/or further changes are stored in memory. The decision maker automatically may be informed of a new or revised proposal from an advisor via an email, an electronic file notation, an alert displayed via one or more of the user interfaces described herein, or otherwise. For example, an advisor may activate a control instructing the system to transmit a proposal to a decision maker, and the system may provide the decision maker with the proposal, which may include one or more of the user interfaces discussed herein.

After viewing a proposal, the decision maker may then instruct an executor (e.g., a box office) to implement the changes (e.g., the change list defined by the advisor, as approved and/or modified by the decision maker). For example, the instructions may be provided via an email, an electronic file notation, an alert displayed via one or more of the user interfaces described herein, or otherwise. The executor may then implement the specified changes (e.g., using one or more of the user interfaces described herein), and the event will be setup accordingly (e.g., with the specified price levels, seat-to-price level assignments, ticket face values, discounts, and/or seat statuses, etc.). The executor may be provided with a certain degree of discretion in implementing changes. For example, the decision maker may instruct the executor to move 25 seats from price level 1 to price level 2, without specifying which of the seats in price level 1 are to be moved. The executor may select which 25 seats are to be moved, and then move the executor-selected seats from price level 1 to price level 2 accordingly. The decision maker may be automatically information by the system when the executor has implemented a change (e.g., where the system detects that the user has instructed the system to implement the change, and transmits an electronic notification to the appropriate recipients). The tickets may then be offered for sale to purchasers in accordance with the implemented event setup.

By way of further example, as similarly discussed above, certain users/entities may be provided with the authorization to control tickets and other setup properties for a subset of event seats, but not for all event seats.

The allocation of authority to perform and execute various tasks may be performed by a user that has the authority to assign roles and provides corresponding authority to users to execute those roles, optionally on an event-by-event basis. The foregoing tasks may be performed using one or more user interfaces provided via the ticket system or otherwise. The specified allocation of authority may be stored in memory in respective user and/or event records or otherwise.

For example, a given user may be provided with a userID and/or password to access the system, and the system may use the userID and/or password to identify the user logging in, access a user and/or event record to determine the user's rights to access certain event data, to create event models, and to implement event changes, and provide the user with corresponding authorized functionality. Of course, other techniques may be used to validate a user and enable the user to login, such as biometrics (e.g., fingerprints), smart identification cards, dongles, etc.

Optionally a given user assigned a corresponding role may be provided with the authority to designate another user or users as having a sub-authority to perform some or all of the tasks the delegating user has the authority to perform. For example, a box office manager may create a tree of authority, where the box office manager may authorize an assistant box office manager to make and/or implement certain types of changes (e.g., change the status of a seat from held to open), but not others (e.g., the ability to change ticket face values). By way of further example, a decision maker, such as promoter, can delegate decision making authority to other designated users.

Optionally, a given user can instruct the ticket system to enable someone to whom the user has provided such sub-authority to further grant sub-authority to still another user. Optionally, a given user can instruct the ticket system not to permit someone to whom the user has provided such sub-authority to further grant sub-authority to still another user. The system may then provide the user granted sub-authority with the specified degree of rights to view data, experiment with changes, and/or implement changes.

In certain embodiments, the system may keep records of each proposal and/or implemented change lists and may generate a report thereof with an associated timeline. The report may note who proposed a given change (e.g., change in price level, price break, face price, seat status), who approved the given change, who implemented the given change, when the foregoing tasks were performed, and what the changes were. The changes may be shown graphical and/or textually (e.g., beginning with a base event, and subsequent changes). In addition, the history of sales activity may be provided showing which seat tickets were sold when, changes in ticket sales rates, changes in the absolute number and/or percent of seat tickets sold, etc.

The history may be presented statically, such as using various screen shots, textual tables, graphs, or otherwise in a physical or electronic report. By way of further example, the history may be provided in a dynamic format. By way of illustration, the history may be replayed as a movie (e.g., a time elapsed movie where the user can control the speed of the history playback), with the seat map being sequentially re-colored to reflect the changes in the order made, and the text likewise being continuously updated to reflect the changes. The user may specify start and stop points for the playback by specifying start and stop dates/times or events (e.g., beginning when a first change in ticket pricing occurred and ending just before a second change is ticket pricing occurred; or beginning when a first specified percentage or number of seat tickets were sold, and ending when a second specified percentage or number of seat tickets were sold) to thereby more quickly focus on areas of interest.

Figure 30:
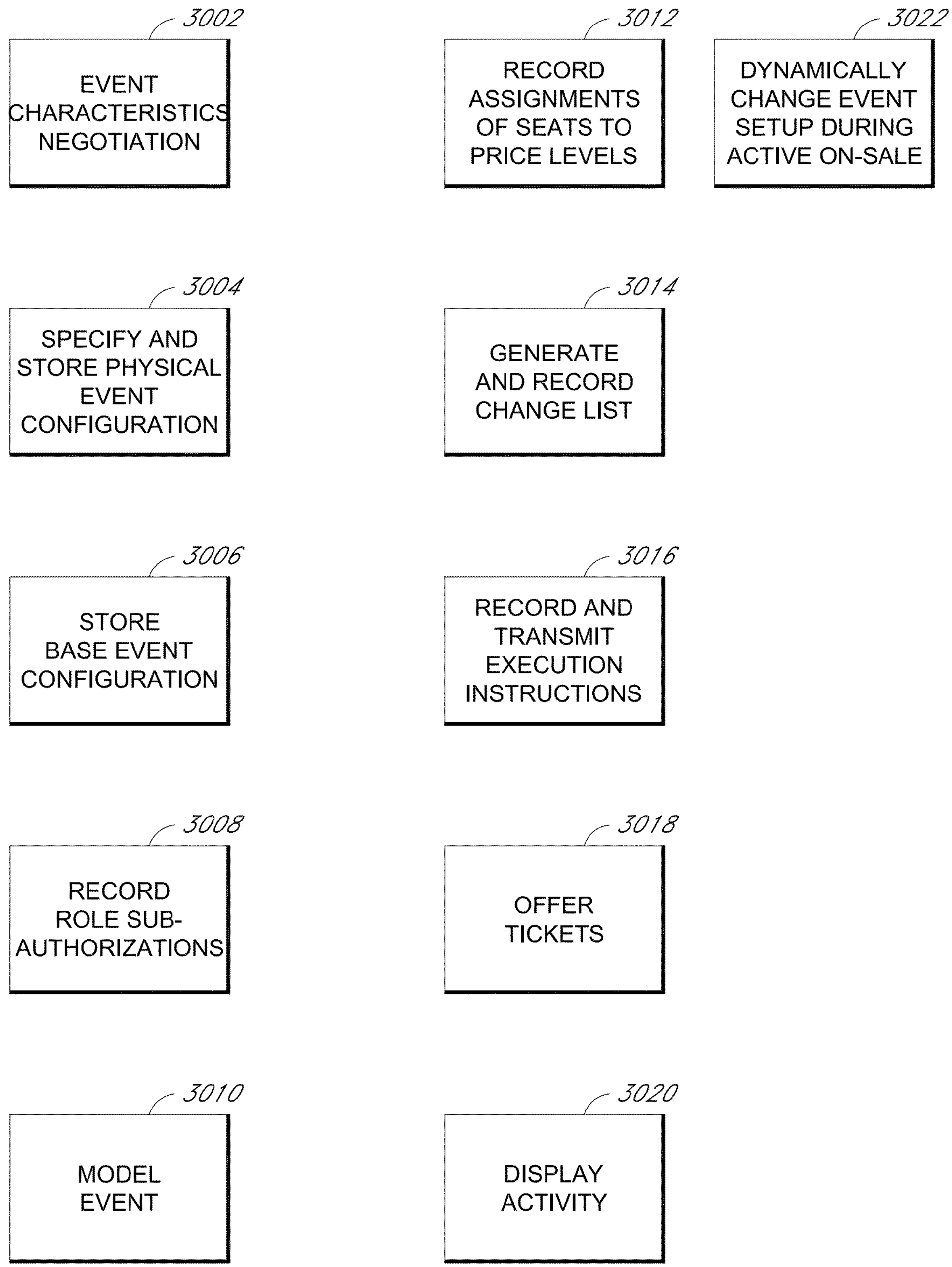
FIG. 30 illustrates an example event setup process.

FIG. 30 illustrates an example event setup process which may be executed by the ticket system and/or other system. At state 3002, entities involved in setting up an event (e.g., a performer manager, promoter, venue operator, etc.) negotiate regarding the characteristics of the setup for a new event. At state 3004, an agreed upon physical stage/event configuration is specified (e.g., end stage, 360 degree stage), and the configuration may be stored in a record associated with the event. At state 3006, a high level authorized user (e.g., the highest level executor, such as the box office manager) selects a template/venue layout from a menu of templates stored memory matching the specified physical configuration and creates a base event. The based-event may be stored in the event record. At state 3008, the high level authorized user/executor designates other users (e.g., box office staff) as executors, and designates another user, such as the promoter, as the highest level decision maker for the event and optionally for other events. The designations may be stored in the event record. The decision maker is provided the authority to designate other decision makers and advisors. At state 3010, one or more of the users model event income using the interfaces discussed herein (e.g., by experimenting with different numbers of seats at each price level and different base prices at each price level). At state 3012, the appropriate user select seats via a seat map or otherwise, and assigns them appropriate prices levels and set base prices. At state 3014, the foregoing changes may be recorded in change lists in the event record, which may displayed to a user.

At state 3016, once the decision maker approves the changes (wherein the approval may be stored in the event record), the decision maker instructs the executors to make the actual changes to the event (e.g., via an electronic communication transmitted by the system). At state 3018, the event is put on sale in accordance with the event setup (e.g., with tickets offered at the designated prices, using the designated event layout, with held and killed seats not being offered for sale), and the system may process ticket orders and deliver tickets (e.g., physical, electronic, and/or virtual tickets). At state 3020, the system displays the sales activity graphically (e.g., via seat maps, graphs, etc.) and textually (e.g. via the report and/or event data areas discussed above), optionally in substantially real-time. Users may setup on or more filters to select what is displayed and reported. At state 3022, based on the sales activity of the active event and/or other factors, users may generate additional changes reflected in corresponding change lists which executors can post to the ticket system during live sales.

Figure 20:
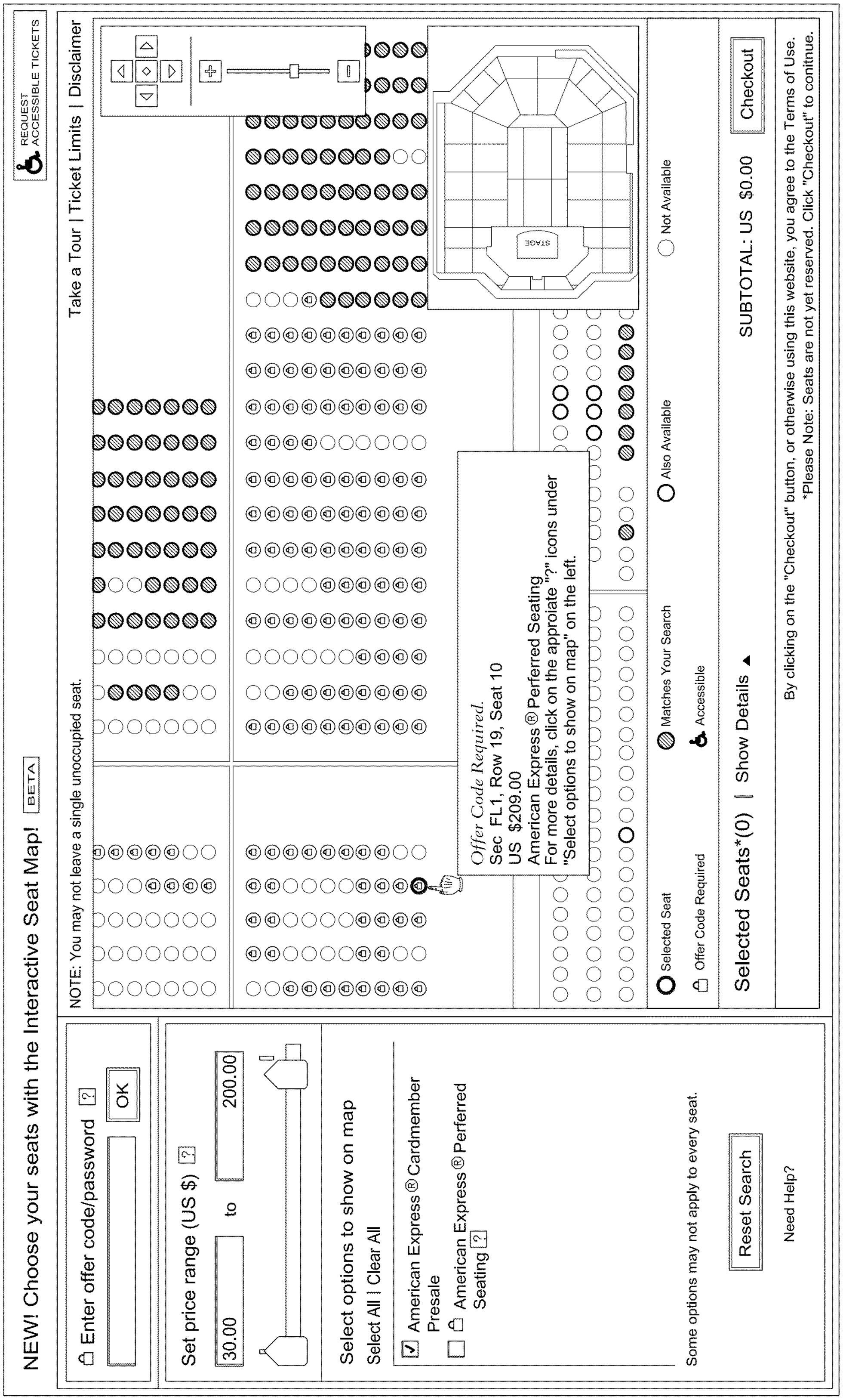
FIGS. 20, 21A-21Z, and 23-26 illustrate example interactive seat maps.
Figure 21A:
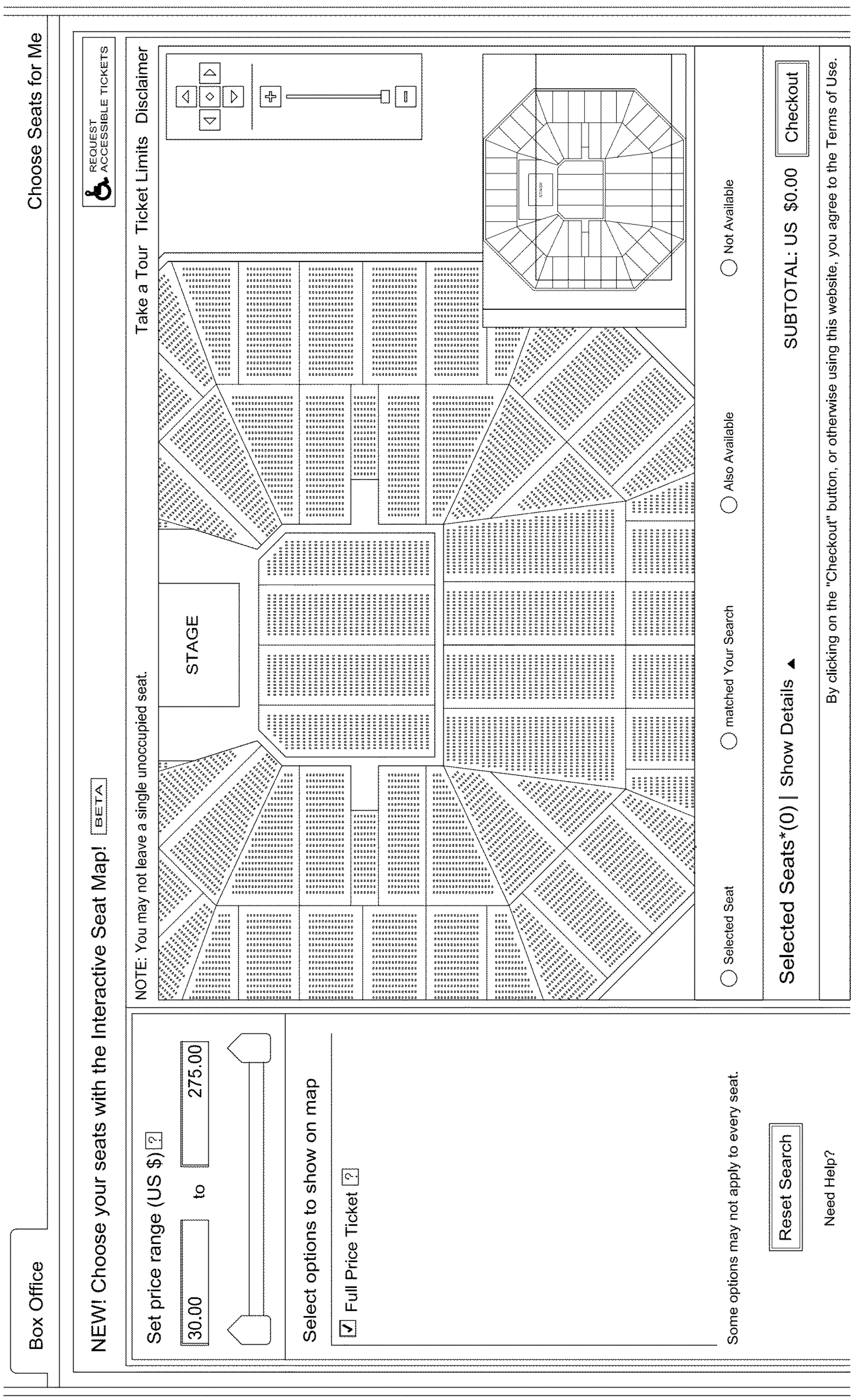

Interactive seat maps will now be discussed in relation to example embodiments illustrated in the figures. As illustrated in FIGS. 20 and 21A-21Z, interactive seat maps of a venue and/or event may be provided for display on networked user terminals (e.g., phones, personal computers, interactive televisions, or networked devices, etc.) of potential ticket purchasers.

A system, such as the ticket system discussed above, may access data from a database (such as one or more databases storing venue maps, seating maps and data, pricing data, event data, user account and preference information, social network information, photograph tagging information, event invitation and replies, other data displayed via the user interfaces described herein, and/or other data) and use such data to populate the user interfaces, including the interactive seat maps. The populated data may be dynamically changed in response to a user's actions (e.g., in response to some or all of the following: user searches, specified preferences, navigation instructions, seat selections, section selections, ticket purchase instructions, tagging instructions, control activations, etc.). The user interfaces, including the interactive seat maps, may be updated in substantially real-time in response to user actions and/or in response to updated data, such as updates in ticket pricing, seat availability, seat status, etc., as made or detected by the system.

In addition, in certain embodiments, the system will provide for display information as to the distance from the seat to seats of the user's friends who have tickets at the event (e.g., expressed as a number of seats, rows, sections, and/or in a unit of length, such as feet, meters, or yards).

A given seat may have different types of tickets available (e.g., adult, child, etc.). In certain instances, different ticket types for a given seat may be associated with different prices. Optionally, if there is only one seat type available (e.g. only "adult" or only "child"), and the user clicks on the seat to add the seat to the user's shopping cart or list of selected seats, the seat will be added immediately. However, if there are multiple seat types available, a user interface may be presented (e.g., via a pop-up dialog box), asking the user to choose the type of seat the user wants to purchase before the seat is added to the user's selected seats. A link may be provided in association with the additional information via which still further additional information may be provided.

The interactive seat maps may be configured to facilitate user understanding with respect to an event of the available seats, prices, available discounts, seating packages, other seat characteristics, which of their friends are attending and where they are sitting, etc., by, in certain embodiments, providing a coherent and/or unified view (including a graphical representation) of what may be a complex set of prices and promotions, and other seat and event related information. Further, certain embodiments may enable a user to select a seat or section, and have a photograph, video, or other representation (in two and/or three dimensions) of the view from that seat or section displayed to the user.

As illustrated in FIG. 20, the user interface may include a navigation map, and in another area, may include an expanded view of a section of the venue that indicates seats selected by the user, seats purchased by the user, seats that match user search criteria (e.g., price range, seating section (s), seat type, special offer(s) specified by the user, etc.), other seats that are available, seats that are not available.

Controls are provided via which the user can navigate around the map and/or zoom into a certain section of the map. For example, the map is configured to enable a user to click on an area of a map and drag the map to change the displayed map area. In certain embodiments, even when a user clicks or otherwise selects a particular seating area or section, to thereby expand the view of the selected area, the entire venue is still displayed in an area of the map, with the seat statuses indicated (e.g., via color and/or text). For example, if a user enters search criteria (e.g., seats having a ticket price between \$50-\$100), the user interface will highlight (e.g., via color coding or otherwise) the seats and/or sections that match the search criteria. If the user then selects a given highlighted section, the user interface will zoom in on the selected section, while still displaying an overall view of the venue (which may be reduced in size) in a corner or elsewhere, where the overall view still highlights the seats/sections matching the user's search criteria (e.g., seats between \$50-\$100).

Optionally, if the user hovers a pointer (e.g., a cursor) over a certain seat or seating area, or otherwise indicates a seat or seating section (e.g., by clicking on a specific seat or seating area), additional information is provided (e.g., via a pop-up window or overlay) regarding the corresponding seat or seating section. For example, the additional information may include an indication as to whether an offer code is needed, and if so, from which source, the specific seating information (e.g., section, row number, seat number, the ticket price, the type of ticket (e.g., adult-full price, adult-discounted, child, etc.) etc.), an indication as to whether the seating area only has single seats available (and not two or more available adjacent seats). Other information, such as whether the seat is in a covered area or an exposed area, in the shade or in direct sunlight, the distance of the seat to an exit, bathroom, concessions, parking lot, and/or other destination, how far the seat is from an aisle (e.g., expressed as a number of seats and/or in a unit of length, such as feet, meters, or yards), expected temperature at the seat during the event, whether there is waiter service to the seat, and/or other information may be displayed as well.

As illustrated in FIG. 21A, the user interface may include a map that graphically (e.g., via a drawing or a photograph) represents a seating chart of the entire venue (optionally with various sections identified graphically, via color coding, and/or via alphanumeric text), and an expanded view of the venue showing individual seats, wherein the user can move a navigation box over the seating chart of the entire venue to select the area that should be shown in the expanded view. Optionally, corresponding colors are used to indicate seat status with respect to availability (e.g., available, sold, on hold, etc.), but not to indicate price, which may be shown textually. Optionally instead, corresponding colors are used to indicate seat ticket price.

Figure 21B:
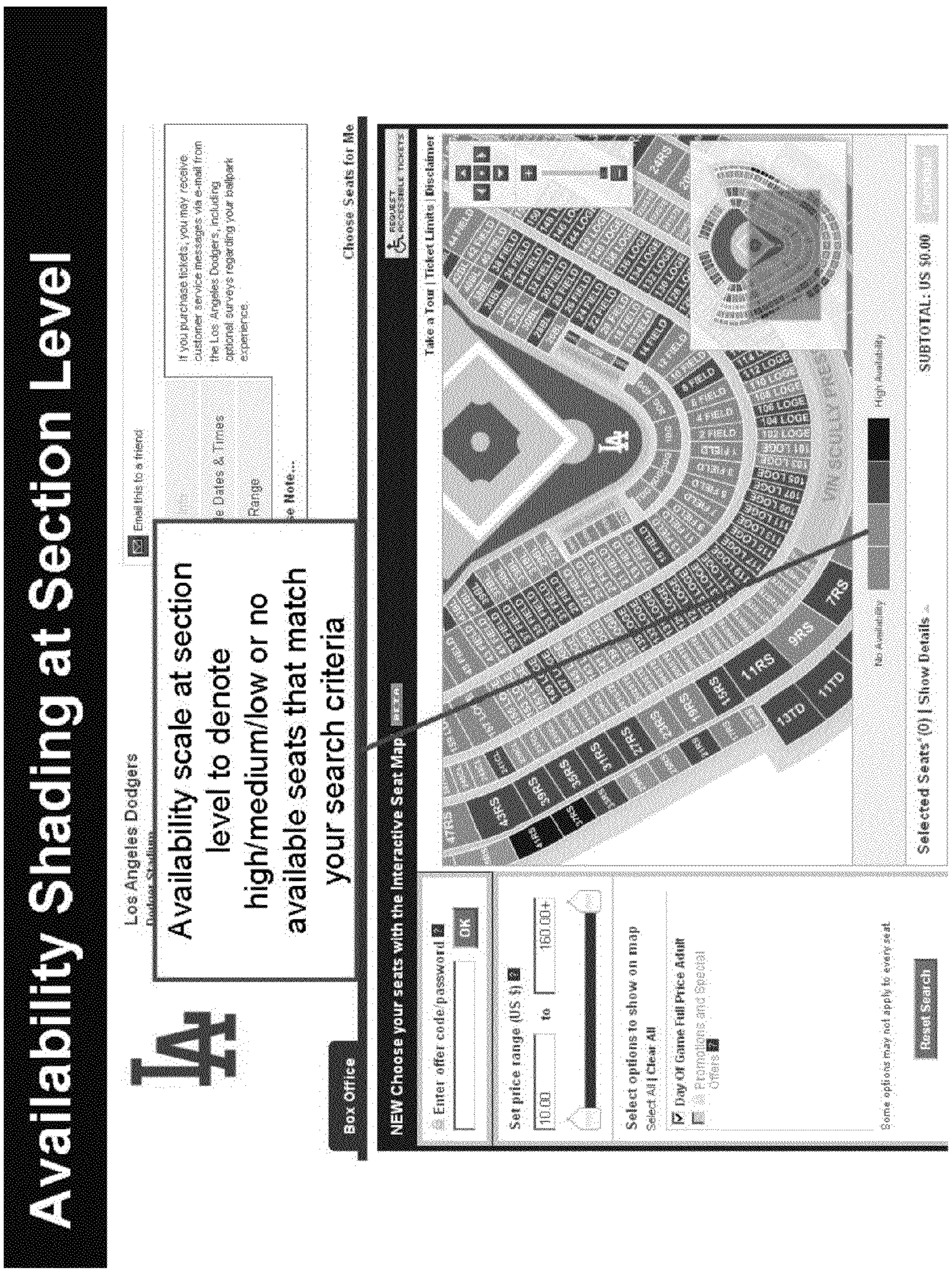

As illustrated in FIG. 21B, the user interface may include a map in a one area that graphically depicts a seating chart of the entire venue for navigation purposes (optionally with various sections identified graphically, via color coding, and/or via alphanumeric text), and in another area, depicts an expanded view of certain of the seating sections showing the certain sections in greater detail, but optionally without showing individual seats. As similarly discussed above, the user can move a navigation box over the seating chart of the entire venue to select the area that should be shown in the expanded view.

In an example embodiment, such as that illustrated in FIG. 21B, when the map is zoomed out, displaying the venue map in a main area of the user interface, sections of the venue may be color coded (e.g., gray, light blue, medium blue, and/or dark blue). For example, gray (or other color) may be used to indicate that a section is either completely sold out or does not contain any seats that match the user's selected price range and/or ticket options. Blue (or other color) may be used to indicate that there are at least some seats within the section that match the user's selected price range and/or ticket options. Variations of a color (e.g., the darkness or intensity) may be used to provide additional information. For example, the darker the blue, the more seats within the section that match the user's search criteria.

Figure 21C:
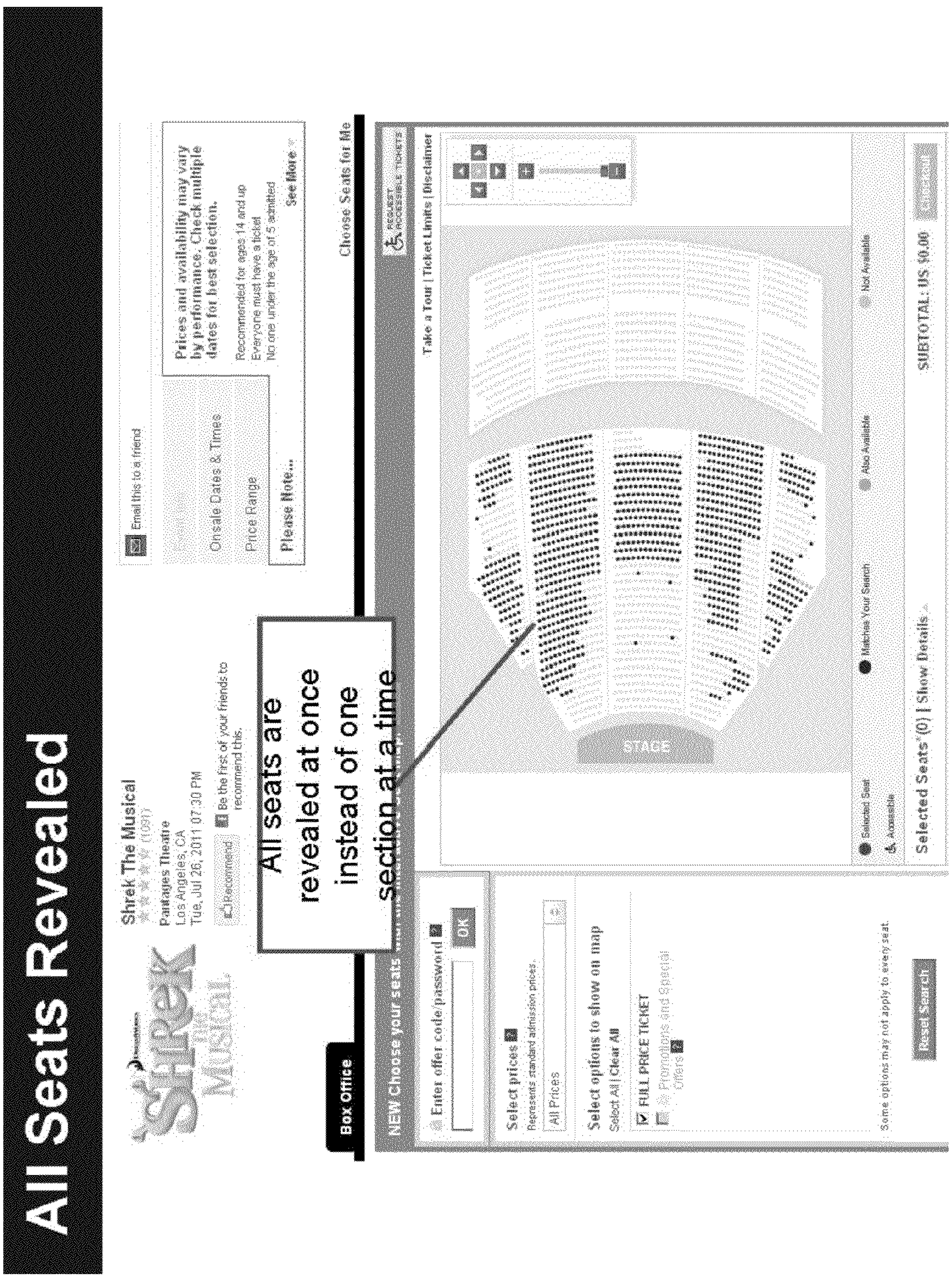

Depending on the size of the venue, the number of venue seats, and/or the size and/or resolution of the user's display, the interactive map may optionally display all of the seats in a venue at the same time, as illustrated in FIG. 21C.

Other information may be stored in the system database and included in the interactive map. By way of example and not limitation, seat shape, seat type (e.g., cushioned, non-cushioned, back rest, no back rest, etc.), and/or seat rotation angle may be included and displayed. Information may be conveyed via a seat icon (or other indicator) using a corresponding interior color, outline color, interior symbol/text/character, color of such symbol, one or more orbiting symbols that are optionally color coded, etc.

In certain embodiments, the software application used to configure the interactive seat map intended for display to consumer for the purchase of event tickets is optionally the same or substantially the same software application used for event creation. In certain embodiments, the shading, coding, and behavior of the user interface is controlled by a scripting language which is passed to the map allowing the behavior to be changed dynamically. For example, the scripting language may be used to control polygon rendering for the map (e.g., which may be used to indicate seating areas), seat rendering, hover-over message handling, and user interface control.

The example highly configurable map can be configured as desired. For example, the map can be configured to display a timed entry in a form similar to that of a calendar entry (e.g., a Microsoft Outlook calendar or Google calendar entry).

The map may be configured provide "view from the seat" images (e.g., movies, photographs, graphic renderings, etc.). For example, a user may select/click-on a seat/section and/or an associated icon (e.g., a camera symbol), and the view from the seat or section may be displayed. The image(s) may include one or more static images, a view from the seat, a view to the seat from the performance area, and/or an immersive virtual reality 360 degree or full sphere view.

Certain embodiments of the map are configured to display dynamic sub-content. For example, the image of the venue may be modified to display ads selected based on user characteristics (e.g., the user's location, the subject matter the user is viewing, etc.) on the map itself (e.g., on a playing field, stage, scoreboard, billboard, etc.). By way of illustration, the content may be a static advertisement including a static image and/or text, or a movie. The advertisements may be selected and/or served via an advertisement server operated by the operator of the ticket system, an advertisement trafficker, or otherwise.

Optionally, the map may be hierarchical and may embed hyperlinks. For example, the map may display a campus view, illustrating several buildings at the same time from a bird's eye or oblique view. If it is detected that the user is selecting (e.g., via a hover or click-on operation) a building including a venue used for ticketed events (e.g., an auditorium or sports arena), the map user interface may respond by accessing and displaying a corresponding seating map for the ticketed venue within the selected building.

By way of further example and as illustrated in FIGS. 21A and 21C, with respect to seat colors, dark blue (or other color) may be used to indicate that the seat is available for purchase and matches the user's selected price range and ticket options. Light blue (or other color) may be used to indicate that the seat is available for purchase, but is outside the user's selected price range and/or ticket options. Gray (or other color) may be used to indicate that the seat is not available for purchase. Orange (or other color) may be used to indicate that the cursor is over that seat or the user has already added the seat to the user's selected seats.

Optionally, in addition or instead of coloring coding, if the map is being viewed via a 3D terminal (e.g., a terminal that requires glasses to view the image in 3D (sometimes referred to as "active 3D"), or a terminal that does not require glasses to view the image in 3D), the amount of 3D effect may be used to provide information. For example, the closer the match with a user's search criteria, the more the 3D effect may be emphasized. By way of illustration, a matching section or seat may appear to project from the image in an amount corresponding to the degree of match.

Figure 21D:
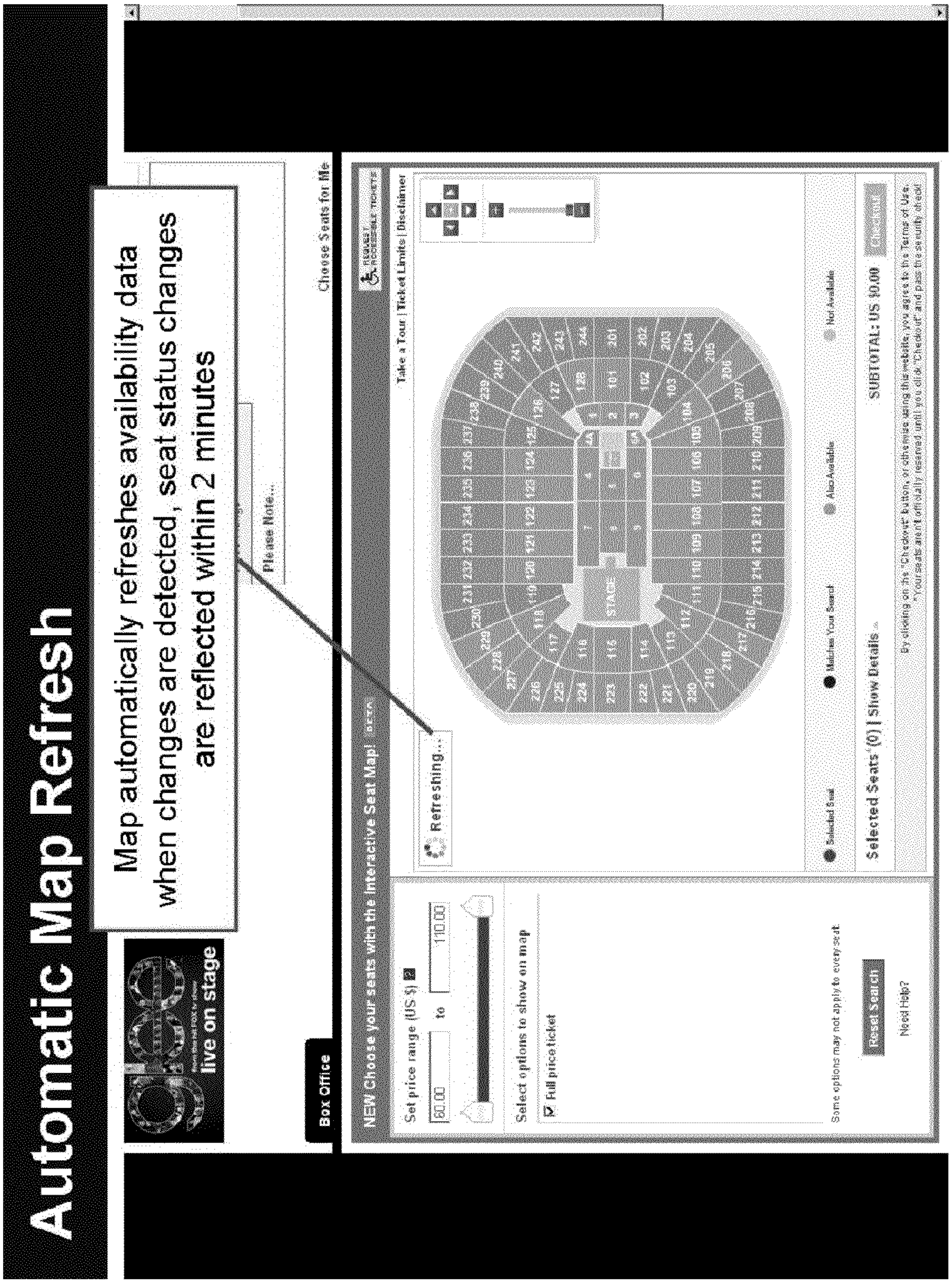

As illustrated in FIG. 21D, changes to the interactive seat map may optionally be updated in substantially real-time (e.g., in 2 minutes or less). For example, changes in seat availability, seat prices, sources of seat tickets, seat status, and/or other seat and event related information discussed herein, and so on, may be updated in substantially real-time.

Figure 21E:
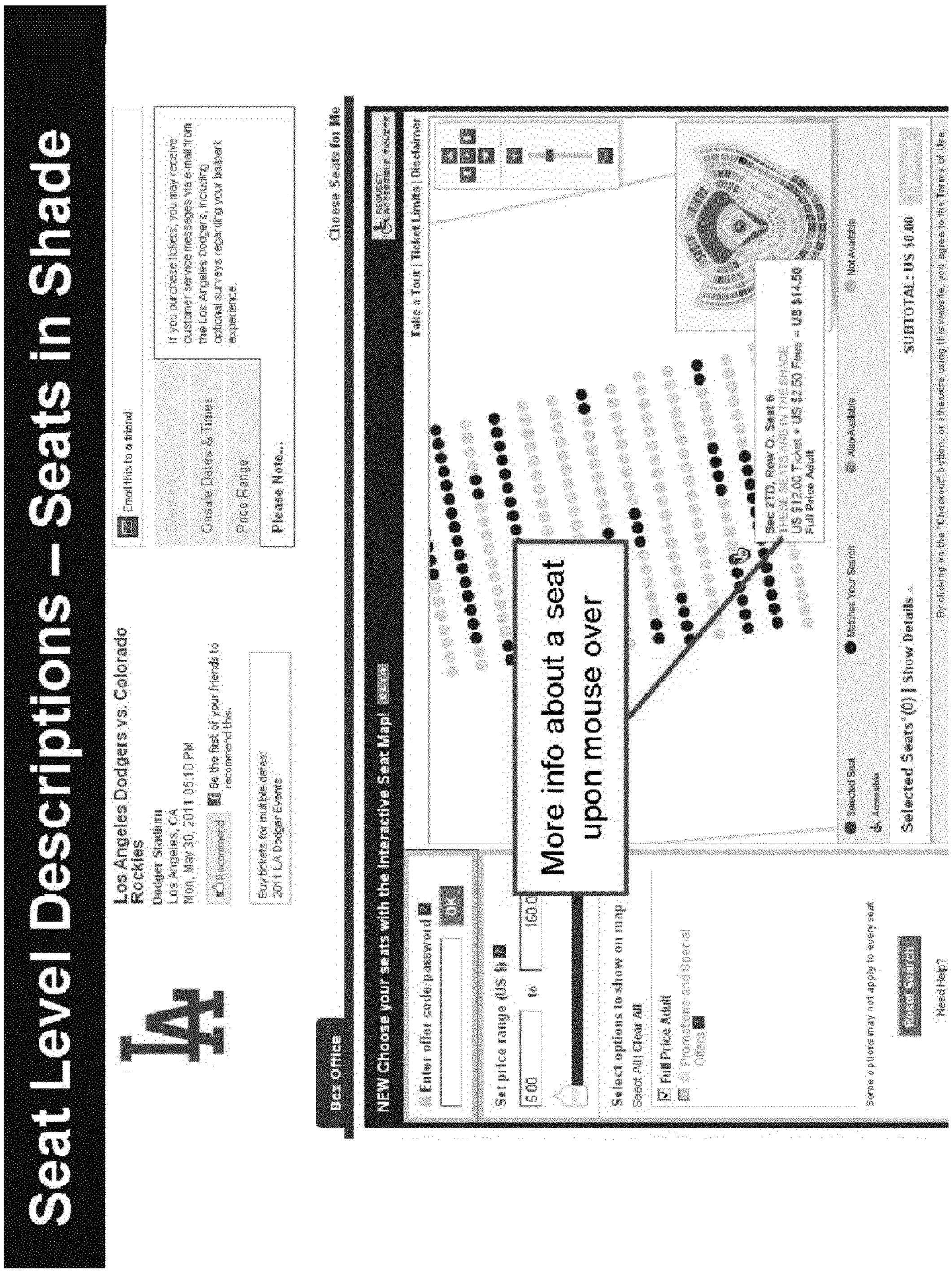
Figure 21F:
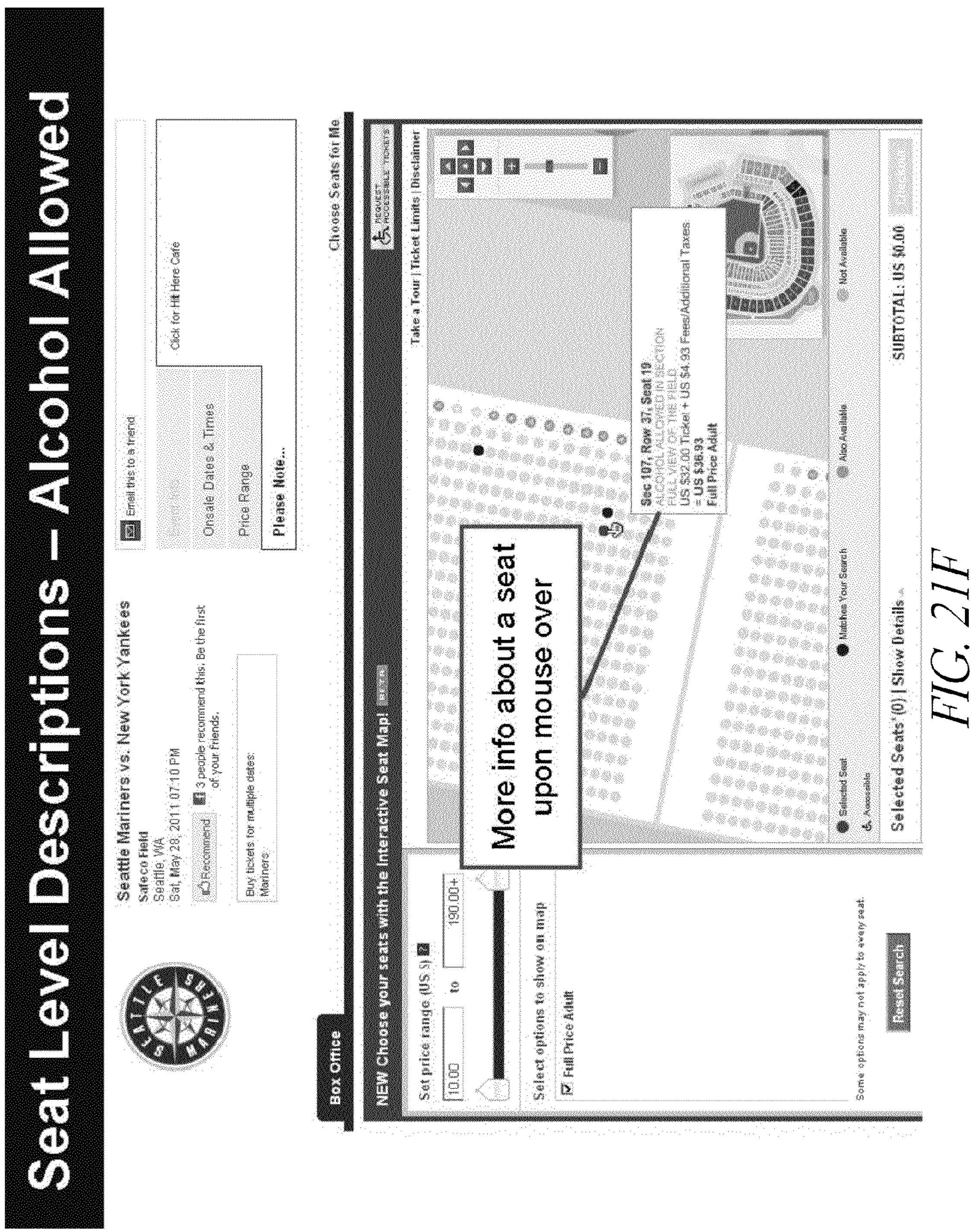

FIG. 21E illustrates an example user interface including an interactive seat map for an event. As similarly discussed above, if the user points at/hovers a cursor over a seat, additional information regarding the seat is presented (e.g., seat location information, an indication as to whether the seat is in the shade, ticket price, service fees, taxes, total cost, etc.). In addition, controls are provided via which a user can recommend the event to others. If the user activates the recommend control, the recommendation may be displayed on the user's social network page, the social network page of the user's friends, and/or notifications regarding the recommendation may be transmitted to the user's friends (e.g., via email, SMS, MMS, or otherwise). FIG. 21F illustrates an example user interface similar to that of FIG. 21E. In this example, if the user points at/hovers a cursor over a seat, additional information regarding the seat is presented (e.g., seat location information, an indication as to whether alcohol is permitted at that seat, an indication as to whether the view is a full view, a partially blocked via, a total blocked view, etc.).

Figure 21G:
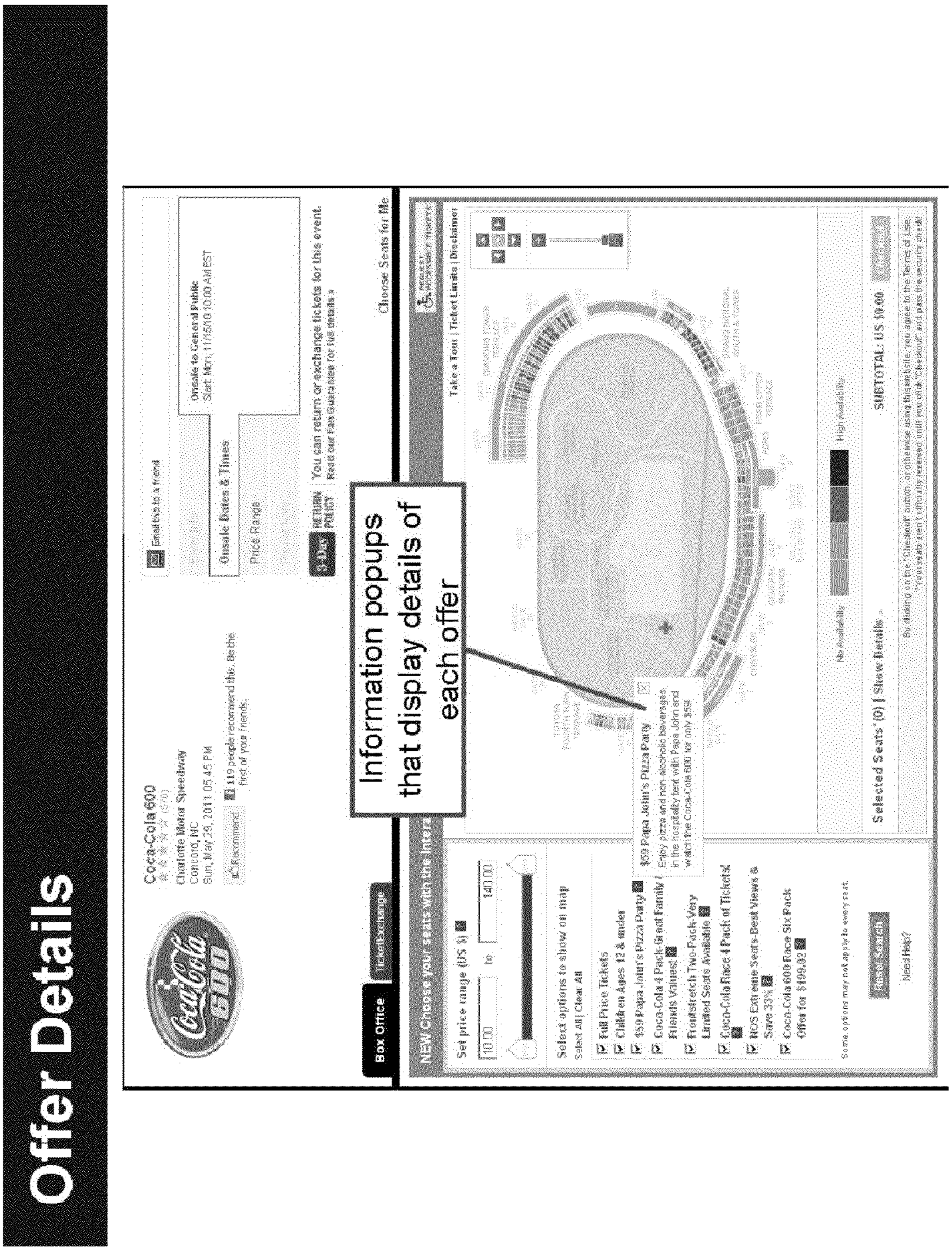

FIG. 21G illustrates an example user interface including an interactive seat map and an offer menu where the user can select one or more offers related to seat tickets (and which may be restricted to specific seats or specific groups of seats) and/or seat classifications (e.g., full price, children under 12) and the interactive seat map which highlights seats and/or seating areas corresponding to those offers. If the user points at or hovers over a corresponding seating area or over the offer, additional details regarding the offer may be presented. By way of example, the offers may be sponsored by one or more companies/advertisers and may offer ticket discounts, provide access to purchase seats not available to the general public, or provide an ancillary item (e.g., food, clothing, parking, travel) at a discount or for free with the purchase of seat ticket.

Figure 21H:
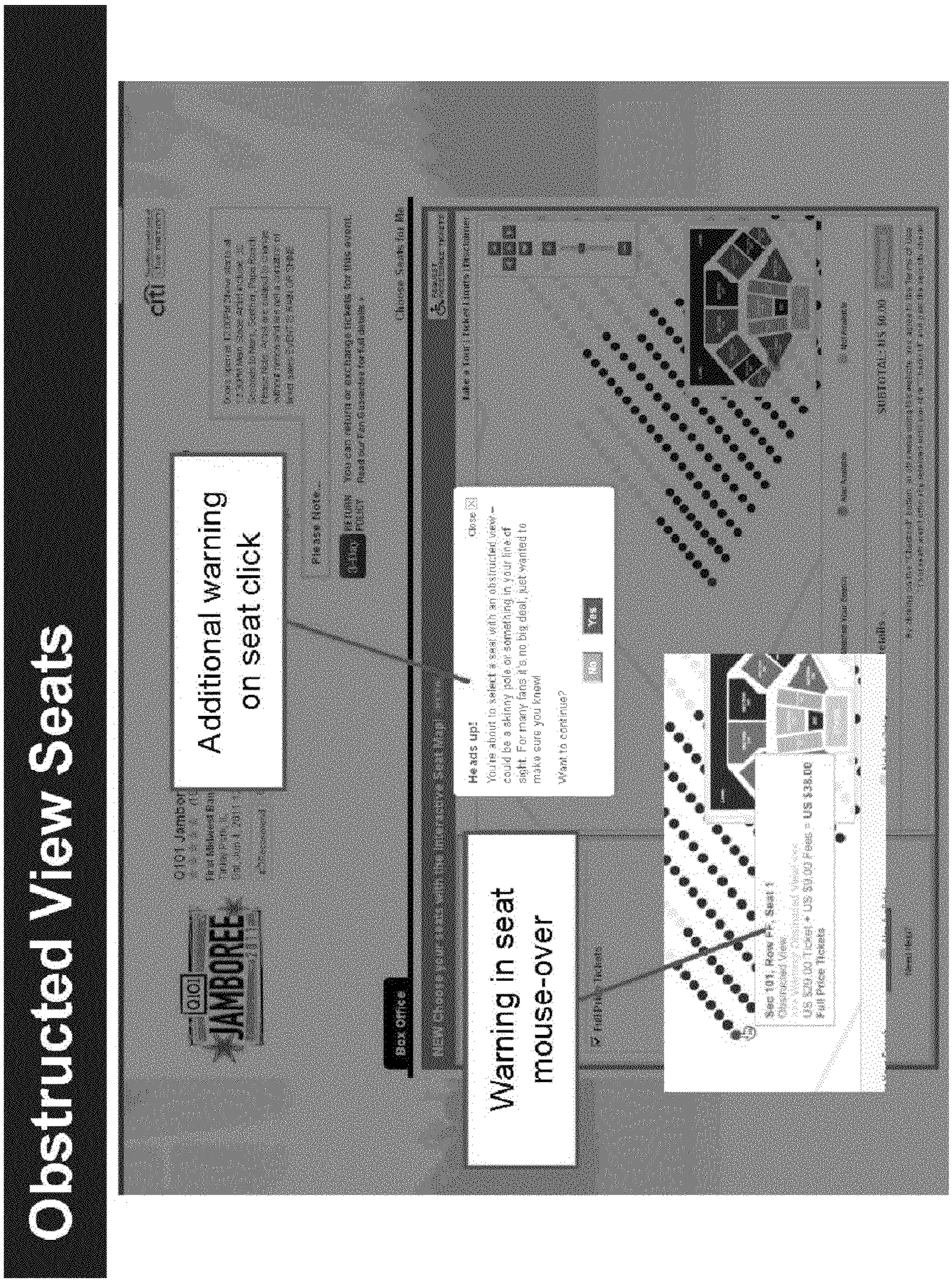

Additionally, certain embodiments will display warnings or other information in certain situations that the user needs to acknowledge viewing before being allowed to purchase a ticket via the map. For example, as illustrated in FIG. 21H, if a user hovers a cursor over or clicks on a seat that has an obstructed view, a warning regarding the obstructed view may be provided for display via a pop-up window or otherwise, and the warning may have an associated control (e.g., a "continue" or "agree" control) that the user needs to activate before the system or user interface will allow the user to add the seat to the user's seat ticket list and/or before the user is enabled to purchase a ticket for the seat.

Figure 21I:
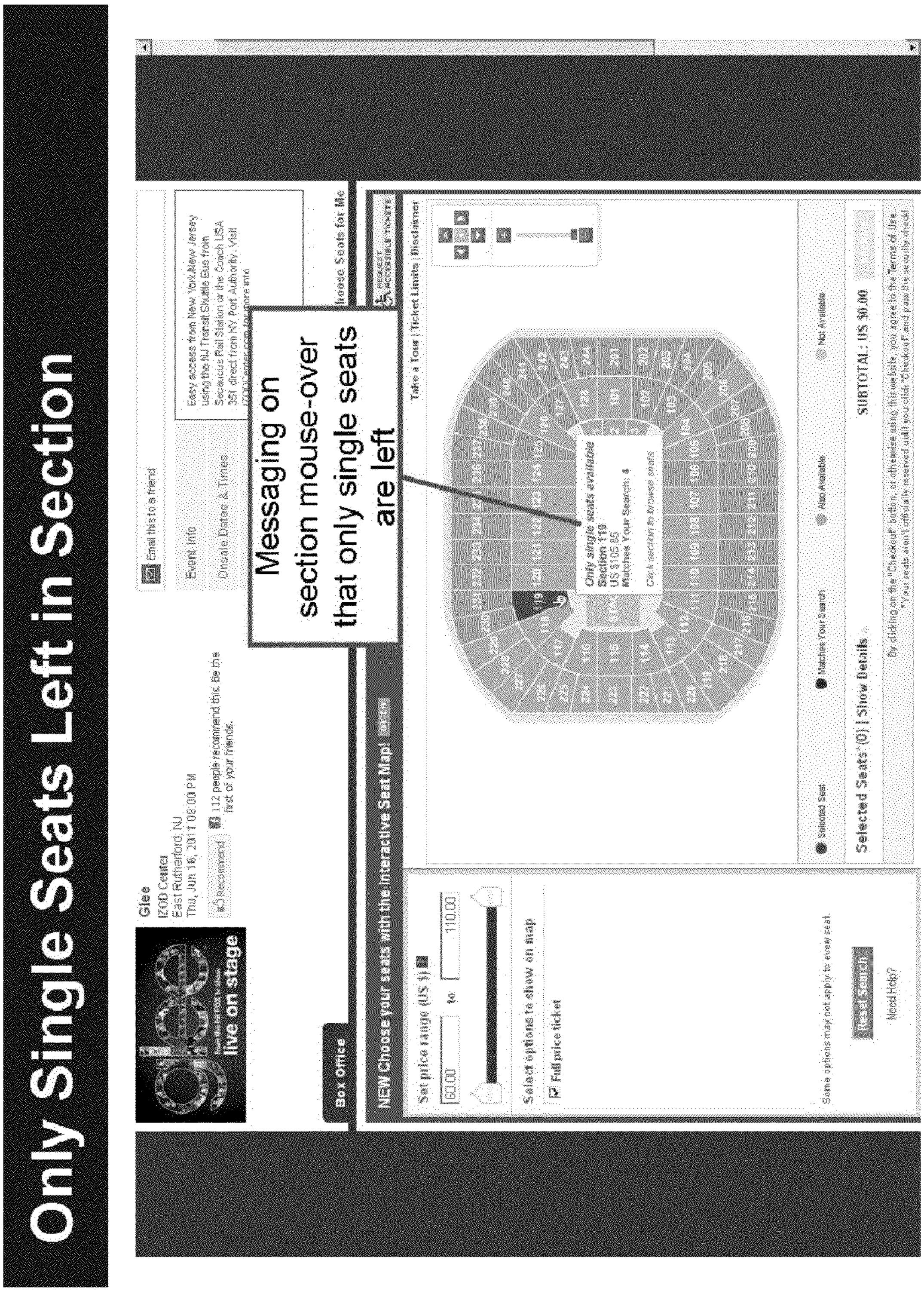
Figure 21J:
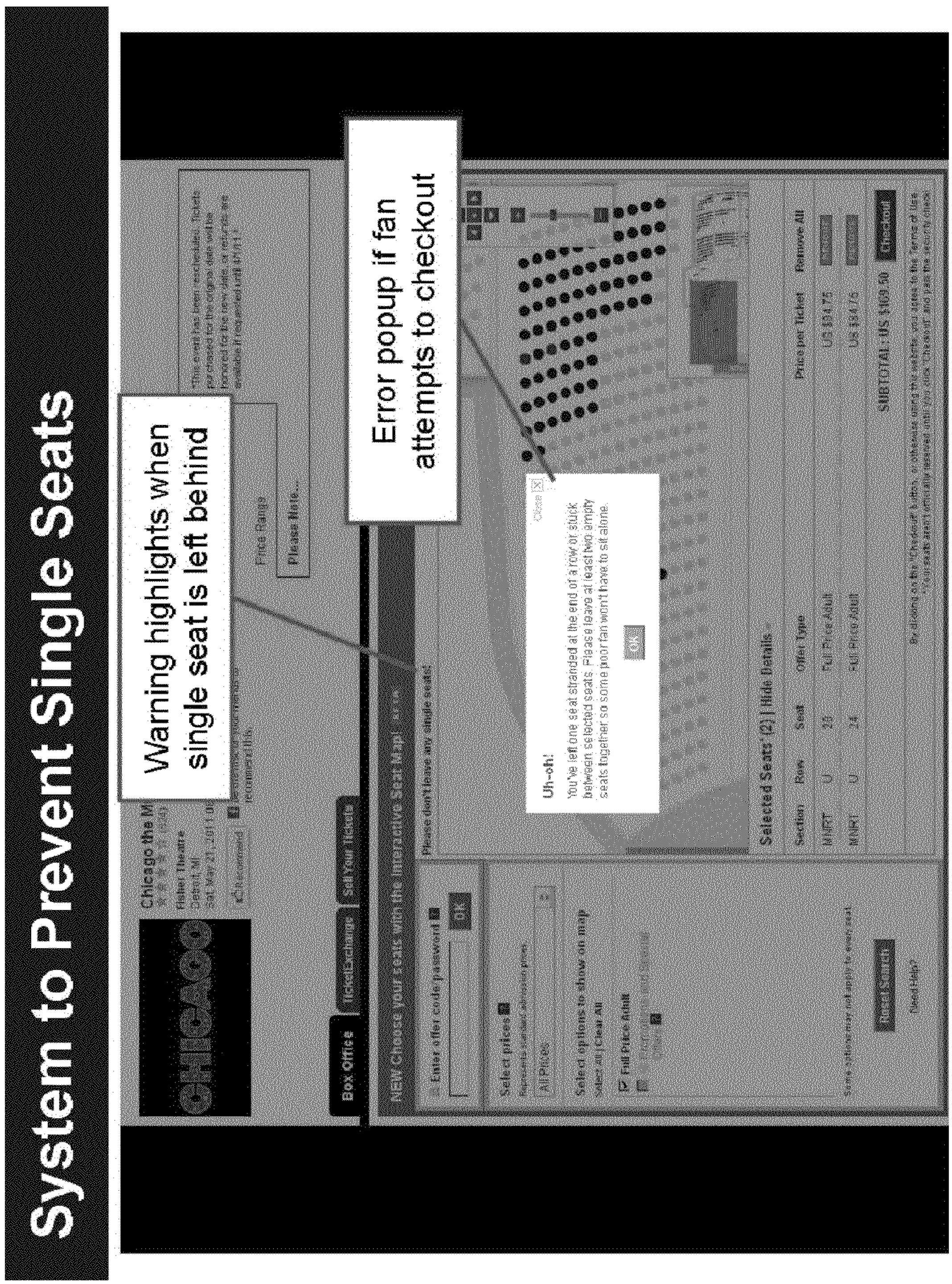

Optionally, as illustrated in FIG. 21I, the system or user interface detects if the user's seat selection of one or more seats would leave a "stranded" seat in row (a single available seat, rather than two or more adjacent available seats), where if the user selected a different set, but the same number, of adjacent seats in the row, there would not be a stranded seat, or there would be fewer stranded seats (e.g., one stranded seat instead of two stranded seats). If such a situation occurs, a notification regarding the foregoing may be provided to the user and the notification may inform the user that the user is required to or is asked to select a different set of seats so as to avoid or mitigate the occurrence of stranded seats, as illustrated in FIG. 21J. The notification may specify or suggest one or more comparable sets of seats that would eliminate or mitigate the number of stranded seats. The user may be asked to or required to activate a control acknowledging the notification. Optionally, if the user does not select a different set of seats and/or does not acknowledge the notification, the user may be prevented from proceeding with adding the tickets to the user's selected tickets and/or is prevented from purchasing the tickets. Optionally, instead, the user may be enabled to continue with the seat selection or purchase, even if a stranded seat results.

Figure 21K:
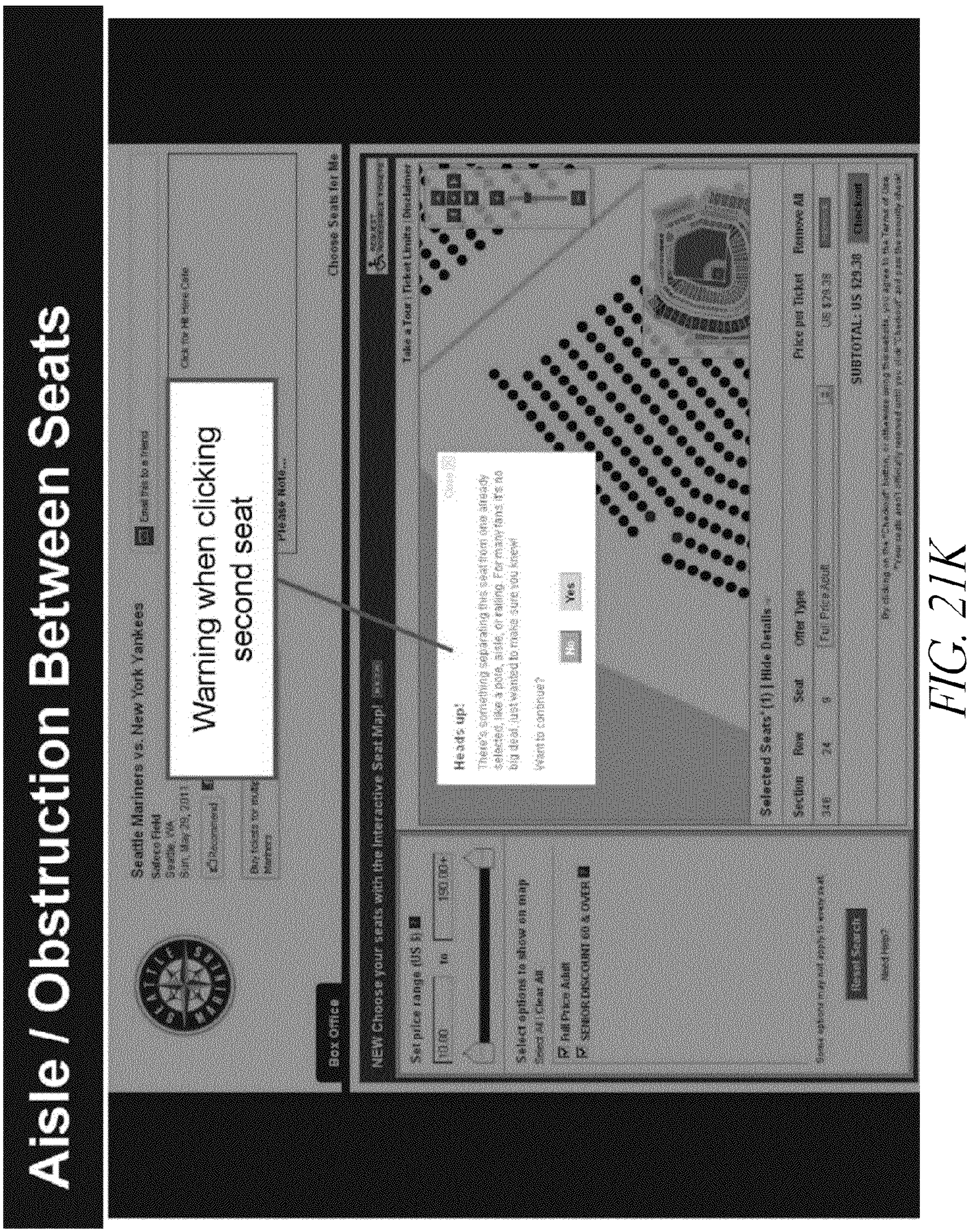

By way of further example, as illustrated in FIG. 21K, the system or user interface may detect if the user has selected a set of seats (e.g., two or more seats), where two seats are separated by an aisle or barrier (e.g., a pole). The user interface may provide a warning regarding the seat separation. The warning may have an associated control (e.g., a "continue" or "agree" control) that the user needs to activate before the system or user interface will allow the user to add the seat to the user's seat ticket list and/or before the user is enabled to purchase a ticket for the seat.

Optionally, as illustrated in FIG. 21K, a user's seat selection is displayed on the same user interface as the map (e.g., directly below the map). Optionally, a control is provided (e.g., a "Show Details" control) to display additional details regarding the selected seats (e.g., price, seat section, row, number, ticket type, total cost), wherein the user can modify the ticket list. The user can then continue browsing the map, or click a "Checkout" control to complete the purchase. Optionally, the selected seats are not reserved until the Checkout control is activated (at which point the tickets may be reserved for a certain period of time). Optionally, if the user does not complete the checkout process within a certain period of time, the checkout process is terminated, and the tickets are no longer designated as reserved (although optionally they may still be in listed in the list of user selected seats), thereby enabling other users to purchase the tickets.

Thus, for example, the user interface may report on the number of seats selected by the user and the subtotal cost (e.g., the total of the face value of the selected tickets, optionally with any discount applied, optionally without any discount applied). Optionally, the total cost, including any discounts, handling fees, venue fees, taxes, and/or shipping is displayed.

As similarly discussed elsewhere herein, in the illustrated example, a field is provided via which the user may enter an offer code or password. Fields and/or a slide bar are provided via which the user can set lower and/or upper bounds for tickets prices the user is interested in. Optionally, if the system determines that an event has only one standard admission price, the system will not offer a slider or other user interface for specifying pricing as a search criteria. A field is provided via which the user can instruct the system to highlight and/or only display seats that are part of a special offer (e.g., a presale for a credit card holder of a certain company, or a fan club presale).

Figure 21L:
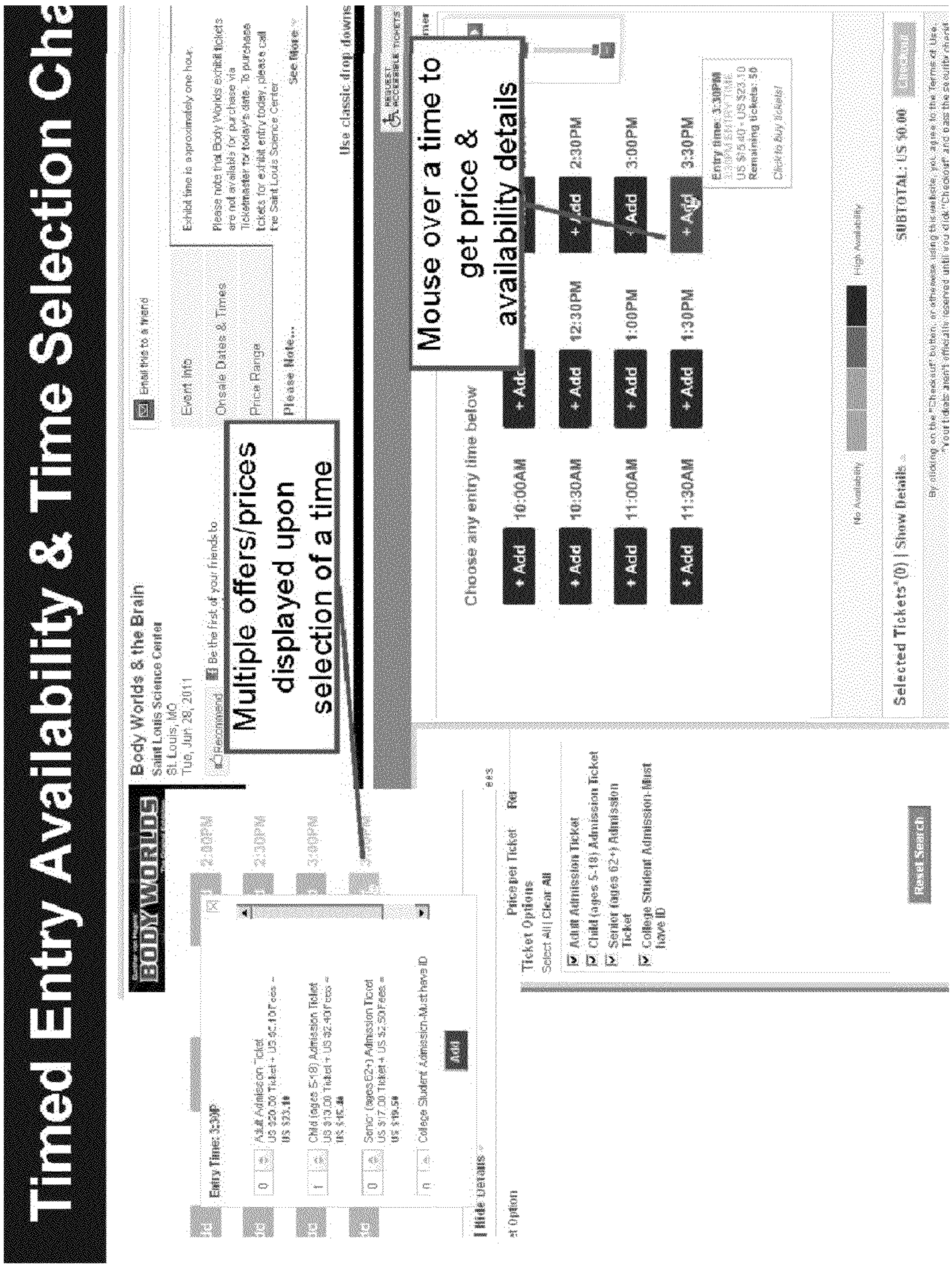

In certain embodiments, as illustrated in FIG. 21L, a user interface may be provided that enables a user to purchase or reserve a right (which may be represented by a physical or electronic ticket) to enter a venue (such as a museum or amusement park ride) at a certain time or to use a facility at a certain time (e.g., a golf course tee time). The user interface may list a plurality of time slots, with an associated "add" control. If the user activates an add control, the associated time slot is added to the user's list of selected time slots or, in certain embodiments, directly to the user's shopping card. If the user points at or hovers a cursor over a particular time listing, additional related information may be displayed (e.g., via a pop-up or otherwise). For example, the additional information may be an entry time, a price or price range, number of remaining tickets for the corresponding time slot.

Figures 21M, 21N:
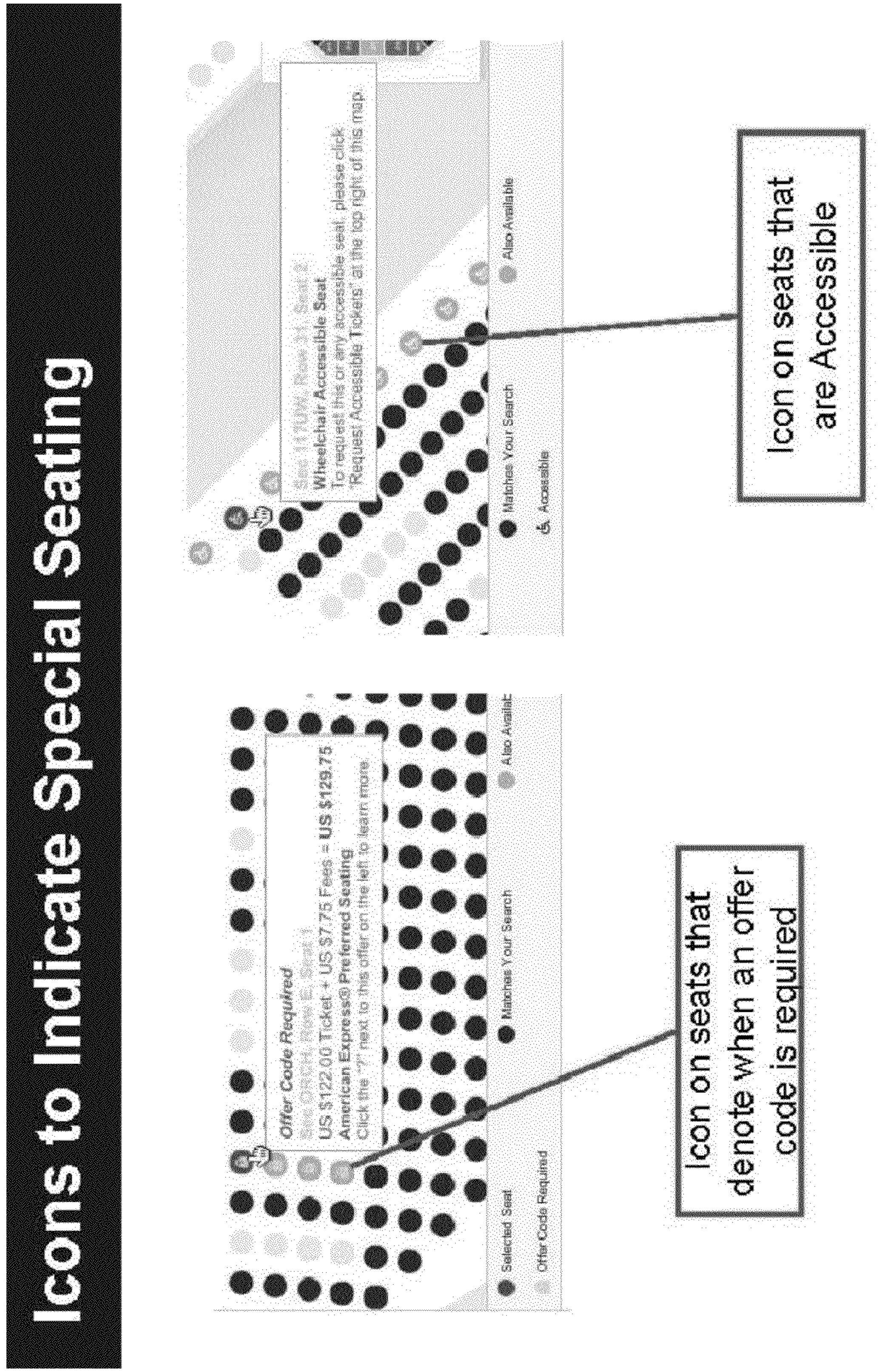

As illustrated in FIG. 21M, upon detection the a user is hovering a cursor over or has selected a seat that require a special offer code (e.g., from a specific credit card company, from a fan club, etc.), a notice may be presented via the user interface, listing a source of the offer code, a seat location/identifier, a ticket price and associated fees. as illustrated in FIG. 21N, the user interface may indicate, via icons or otherwise, seats that are handicapped accessible.

Figure 21O:
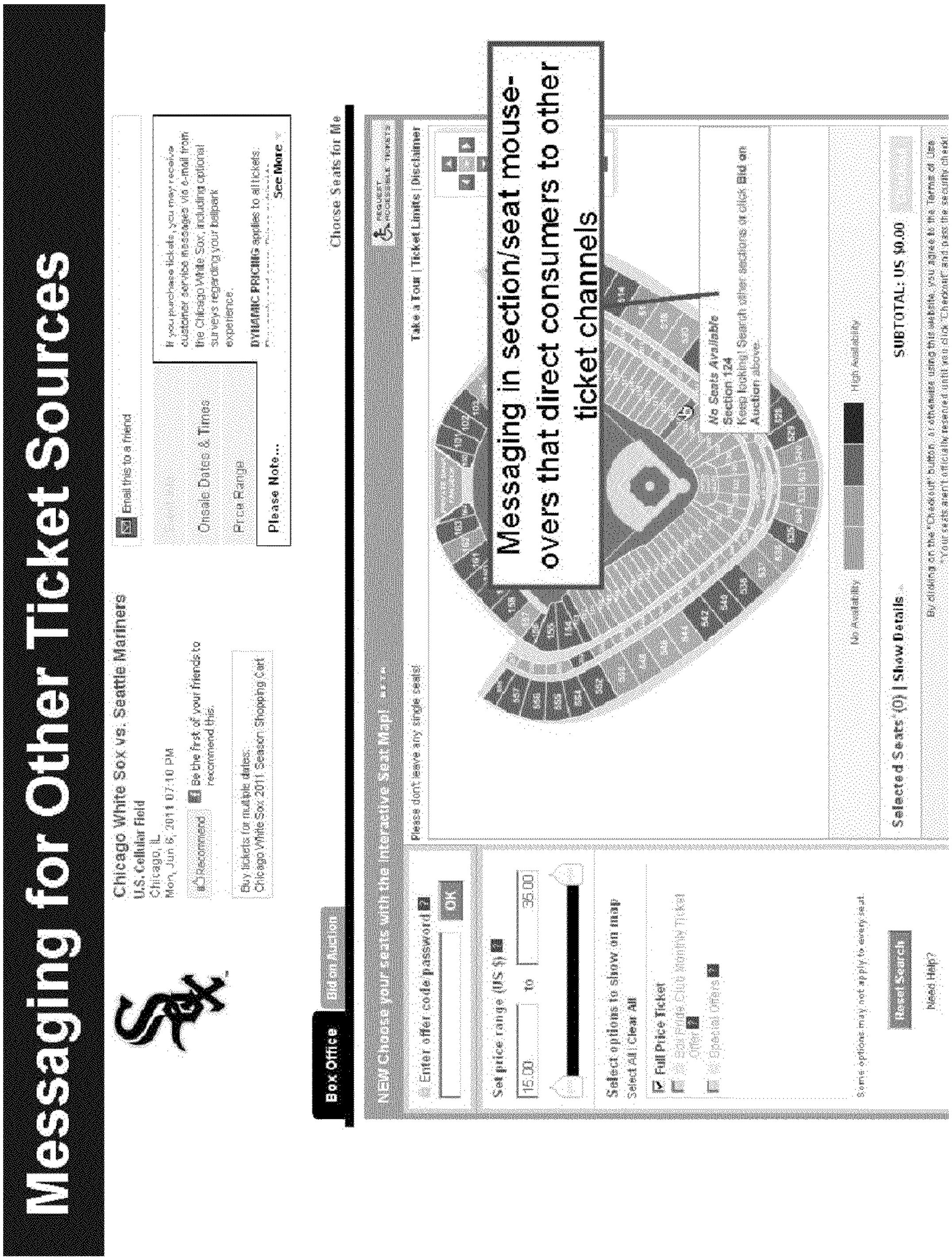
Figure 21Q:
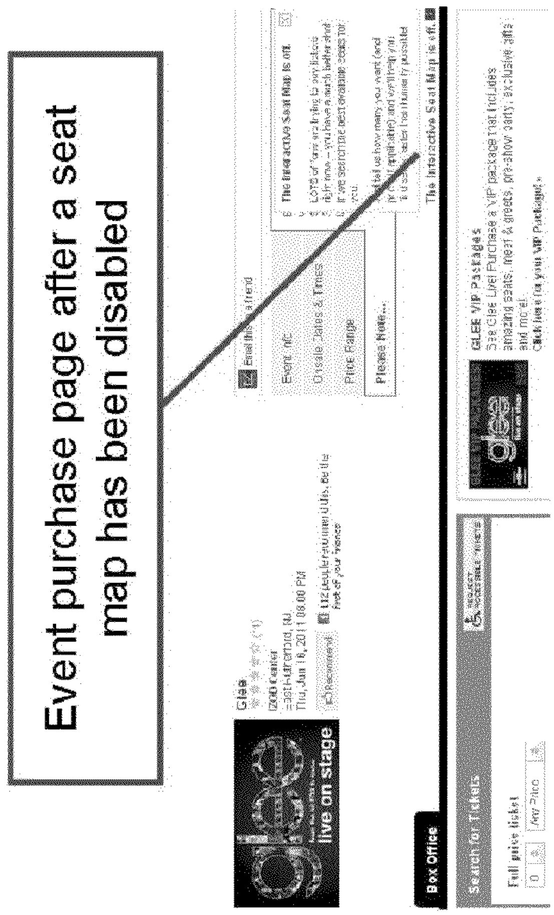
Figure 21P:
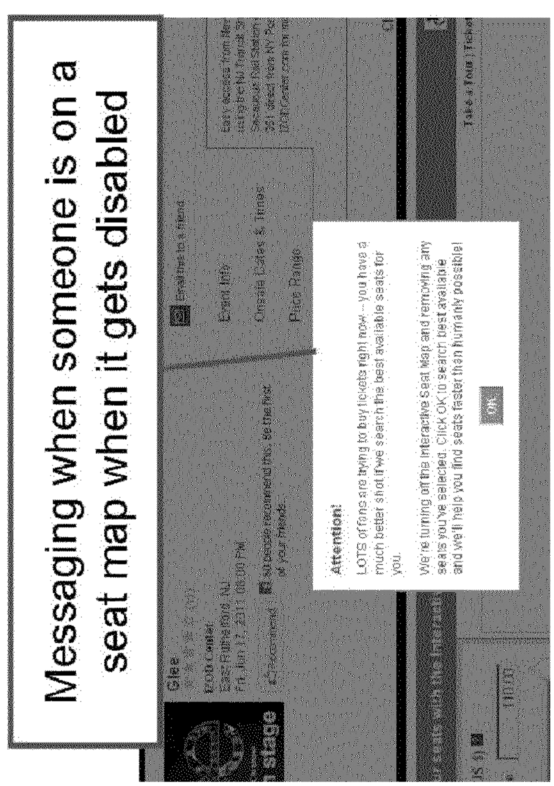

By way of further example, if no tickets are available in a given sales channel (an initial or primary sales channel) in a section pointed at or clicked on by the user, a notification may be provided as to the availability of tickets in the section via one or more alternate channels (e.g., a resale/secondary market channel, an auction channel, etc.) as illustrated in FIG. 21O. The notification may include a link to a purchase page or other user interface of the alternate channel(s).

FIGS. 21R-21U illustrate interactive seat maps enabling users to purchase tickets via an auction format and/or via where a user makes an offer at a user-specified price, which may or may not be accepted by the ticket seller (e.g., a primary market ticket seller making the initial ticket sale). Via the illustrated interactive seat maps, users are provided the flexibility to make an offer in different seating areas, enter different prices for different seating areas, tie an offer for one or more tickets together with their friend's offers, and set the relative priority rank of the user's preference. By way of further illustration, if the user makes an offer, the offer may be automatically evaluated by the ticket system, which may compare the user's offer with a specified minimum acceptable offer of the ticket seller. If the offer meets or exceeds the specified minimum acceptable offer, the offer may be automatically accepted, the user may be informed of the acceptance, the user may be charged for the ticket at the offer price (and any related service charges), the user payment (or an agreed upon portion thereof) may be transferred to the ticket seller, and the ticket may be delivered to the user. If the offer fails to meet the specified minimum acceptable offer, the offer may be automatically denied, and the user may be informed of the denial and optionally of the minimum acceptable offer price, and the user may have the option to provide another offer. Optionally, rather than having an offer automatically accepted or denied, the offer may be communicated to an authorized human operator who may manually inform the system whether the offer is accepted or denied, and the system may then process the acceptance or denial as similarly discussed above. The minimum acceptable offer may be a set amount or may be varied according to a formula which takes into account the number of seat tickets left unsold in a given seat area, the number of unsold seats for the event overall, and/or the number of days until the event is to take place.

If an auction format is used, the system may specify a minimum bid price and/or a minimum bid increment. Users may then submit bids, which are received by the system. The system may determine the highest bidder for a given ticket, and the highest ticket may then be awarded and delivered to the highest bidder. The winning user may be charged for the ticket at the winning bid amount and the user payment (or an agreed upon portion thereof) may be transferred to the ticket seller.

If the user submitted multiple relative priority order, once the user is awarded tickets through one of the user's relative priority offers, then the rest of the relative priority offers/seating areas the user made an offer on may be ignored and/or removed from a ticket request data store so that the user only wins one set of tickets. When determining which user wins which ticket, the relative priority rank the user indicates for the associated seating area will also be taken into consideration.

In certain embodiments, the auction may be a ranked seat auction, where there can be multiple winners within the same auction. By way of illustration, in certain auctions, a user does not bid for tickets to a particular seat. Instead, the user may be simply bidding for tickets to see the event in a seat that will later be determined by comparing the user's bid with other bids that are submitted before the auction ends. The seat tickets within an auction may have been ranked according to what the event providers or the ticket seller have determined to be from greater to lesser desirability and matching it against bids submitted by users optionally while taking into consideration the relative priority rank users associate with the different seating areas. At the end of the auction, tickets may be assigned to winning bidders based on those rankings so that those winning bidders who bid higher than the user are assigned higher ranked seats and those winning bidders who bid lower than the user will be assigned lower ranked seats, with ties optionally broken in favor of those who submit their final bid earlier than other bids.

Optionally, tickets different seats may be made available for purchase using different techniques. For example, some seat tickets may be available at a preset price (e.g., wherein the user simply agrees to purchase the ticket at the preset price and the purchase is automatically processed by the system), some seat ticket may be available via an auction, some tickets may be available where a user makes a purchase offer at a specified price which the current ticket holder may accept or refuse or reply to with a counter-offer. Some seats may be made available using two or techniques. For example, a tickets for a seat may be available at a set price, wherein if a user pays the set price, the purchase will be completed, or the user may make an offer for the set at less than the set price, where the ticket owner may accept or decline the user's offer, and the purchase will not be completed unless the ticket owner accepts the user's offer. The interactive seat map may include coding (e.g., color, icon, and/or text coding), which indicates the purchasing technique for a given seat, so that a user can decide not just what seats they wish to acquire tickets for, but can also decide what purchase technique is acceptable to the user and make ticket purchase decisions accordingly.

Figure 21R:
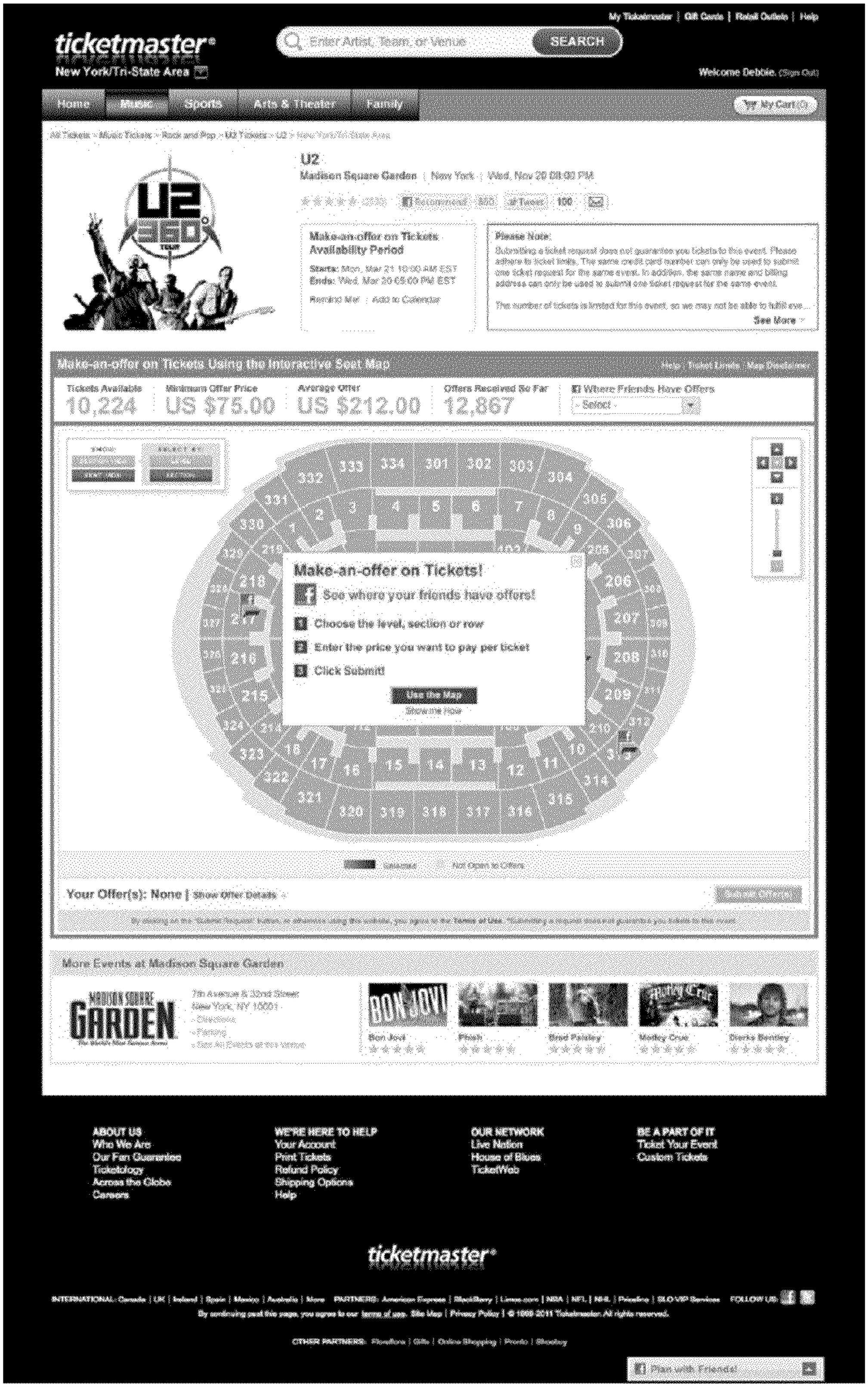

FIG. 21R illustrates an example interactive seat map listing the number of event tickets available, a specified minimum offer price, an average offer amount corresponding to offers may for event tickets, and the number of event ticket offers received. The user may also activate a control to have the seat map indicate where a user's friends have made offers. Via the interactive seat map, the user may choose a section, level, row, and/or seat, enter an offer price, and activate a submit control. The offer may then be processed as similarly discussed above.

Figure 21S:
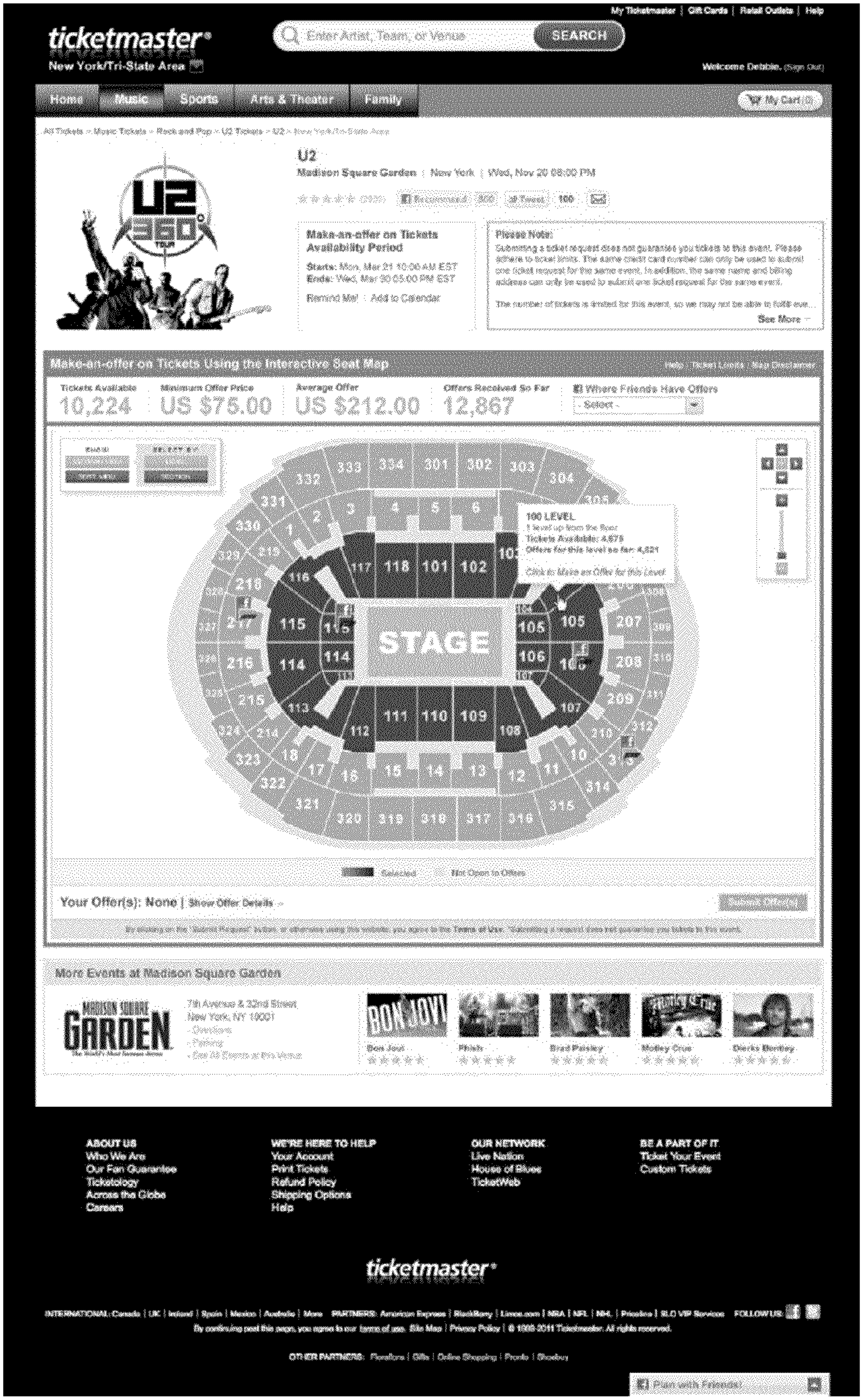

FIG. 21S illustrates an example interactive seat map, similar to that of FIG. 21R, wherein a level (level 100) has been selected by the user. A pop-up window is displayed providing addition information regarding the selected level (e.g., the distance from the floor, the number of tickets available for the selected level, the number of offers made for the selected level).

Figure 21T:
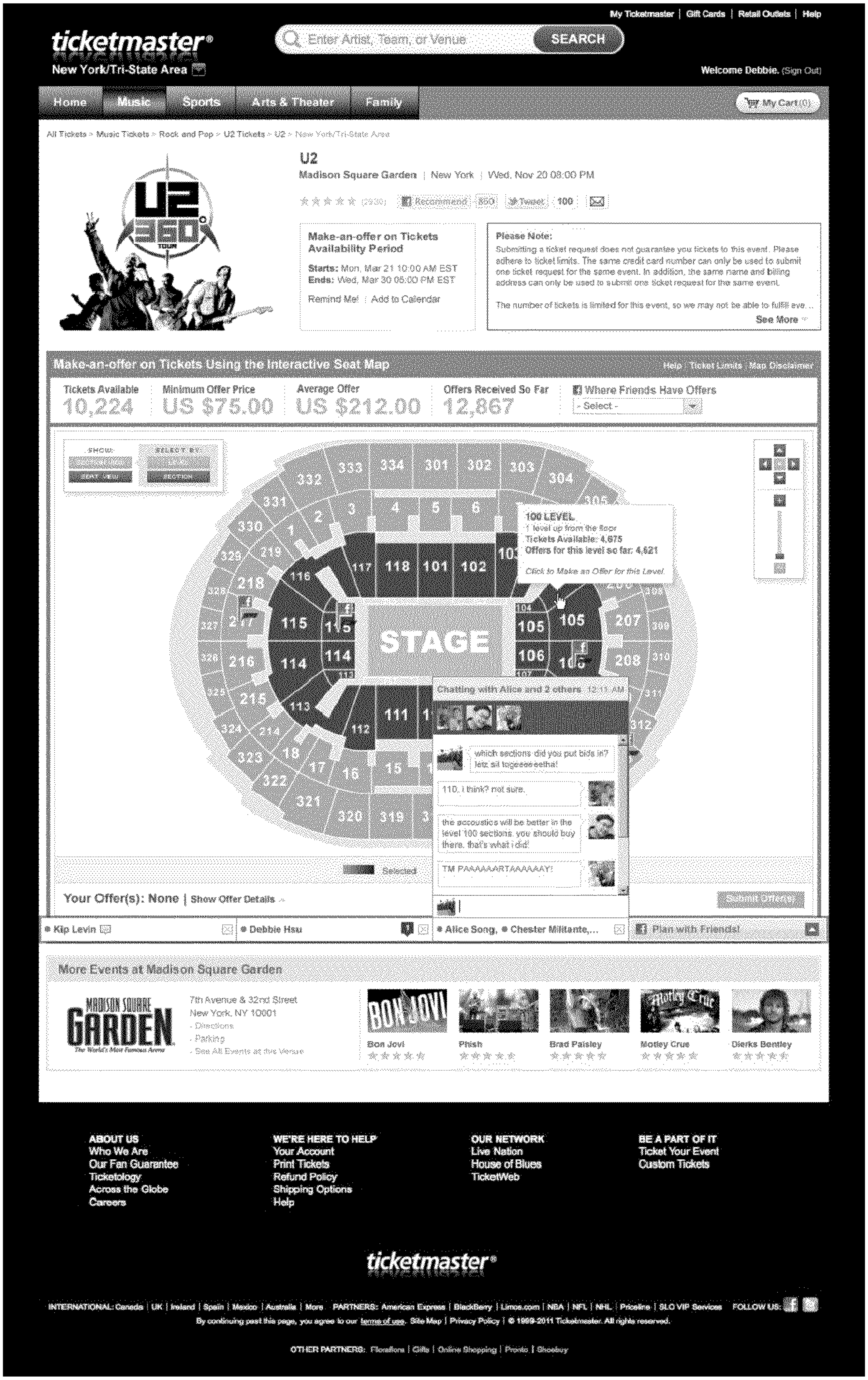
Figure 21U:
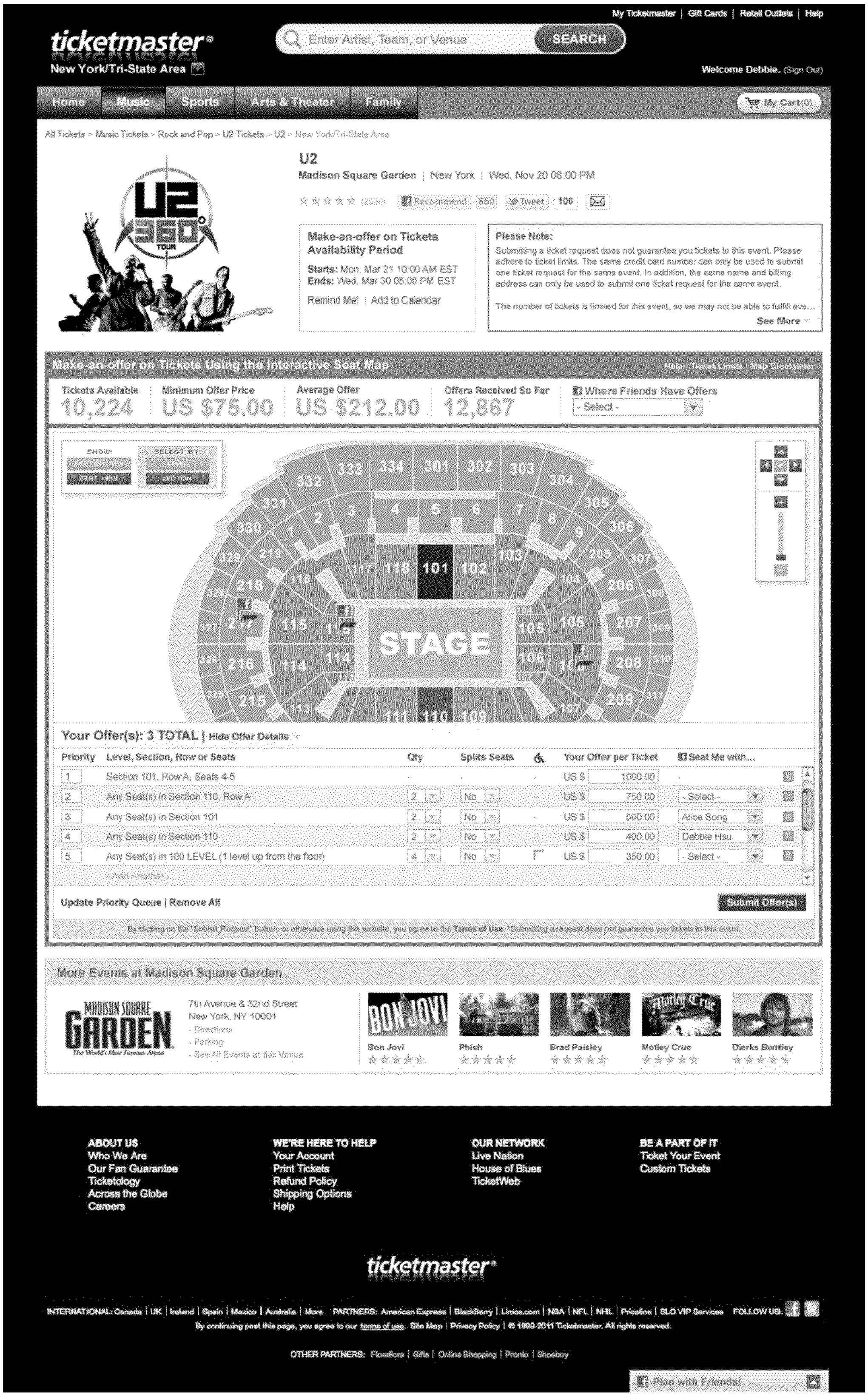

As illustrated in FIG. 21T, a chat user interface may be provided enabling a user to textually and/or via voice chat in substantially real-time with other users/friends regarding which seats to make an offer on, how much to offer for the seats, sitting together, etc. The selections may then be listed on the user interface, as illustrated in FIG. 21U. A priority field may be provided, once the auction or offer period ends, the first highest priority offer will be considered first by the system before the second highest priority offer is considered by the system, and so on, until one of the offers is accepted or until there are no more selections of the user. Optionally, users can tie their ticket offer to that of their friends. As illustrated in FIG. 21U, for individual offer line items, the "seat me with" user interface enables the user to select from a list of the user's social networking site friends (e.g., with the user's friends identified as similarly described elsewhere herein) which friend(s) the user wants that specific offer line item to be tied together with. The system determines if both the user's offer and that of the user's selected friends' are accepted. In such instance, the system will not award the user the ticket (the user's offer will not be accepted) unless the selected friend(s) offer(s) are also accepted for that same seating location.

Figure 21V:
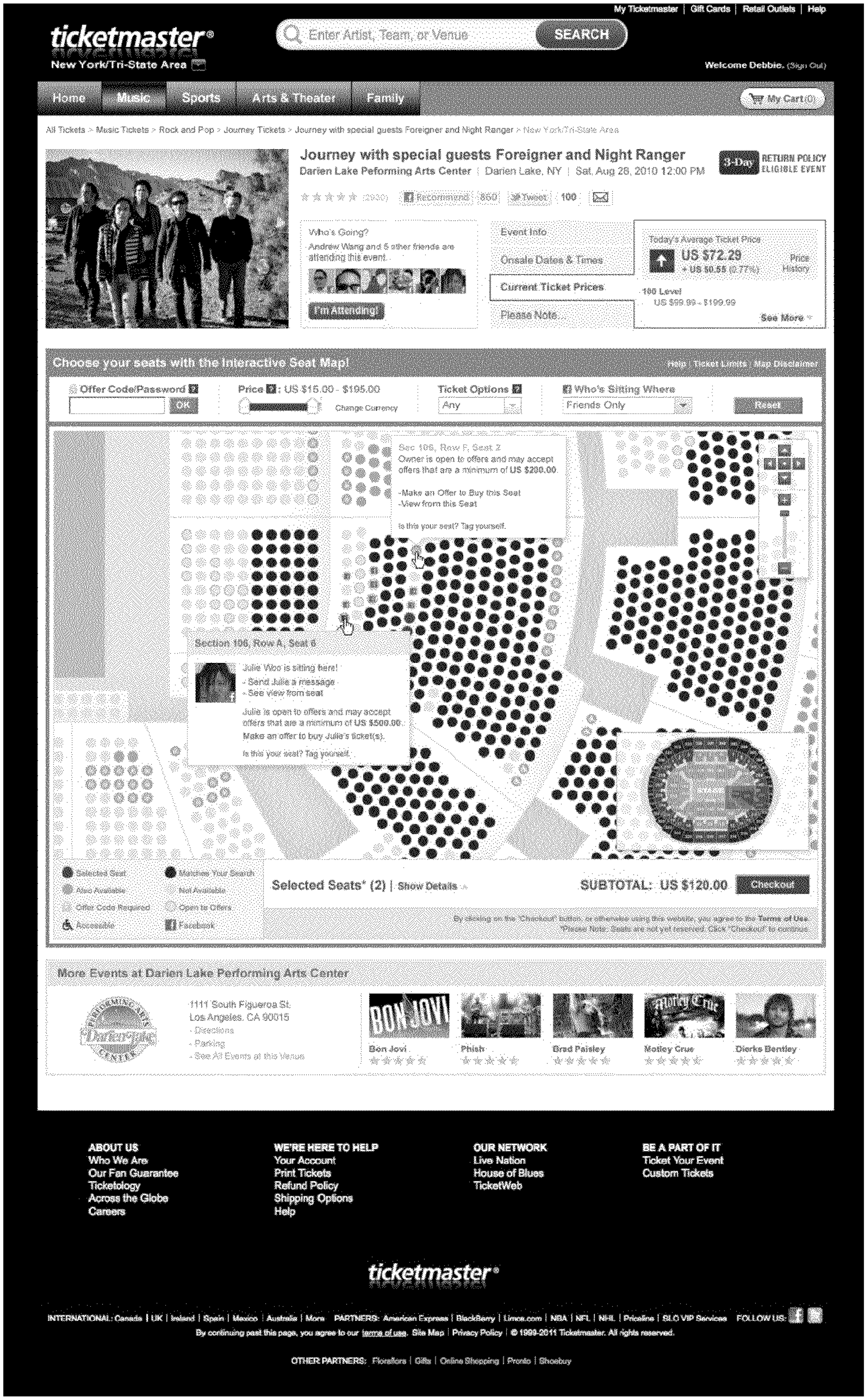
Figure 21W:
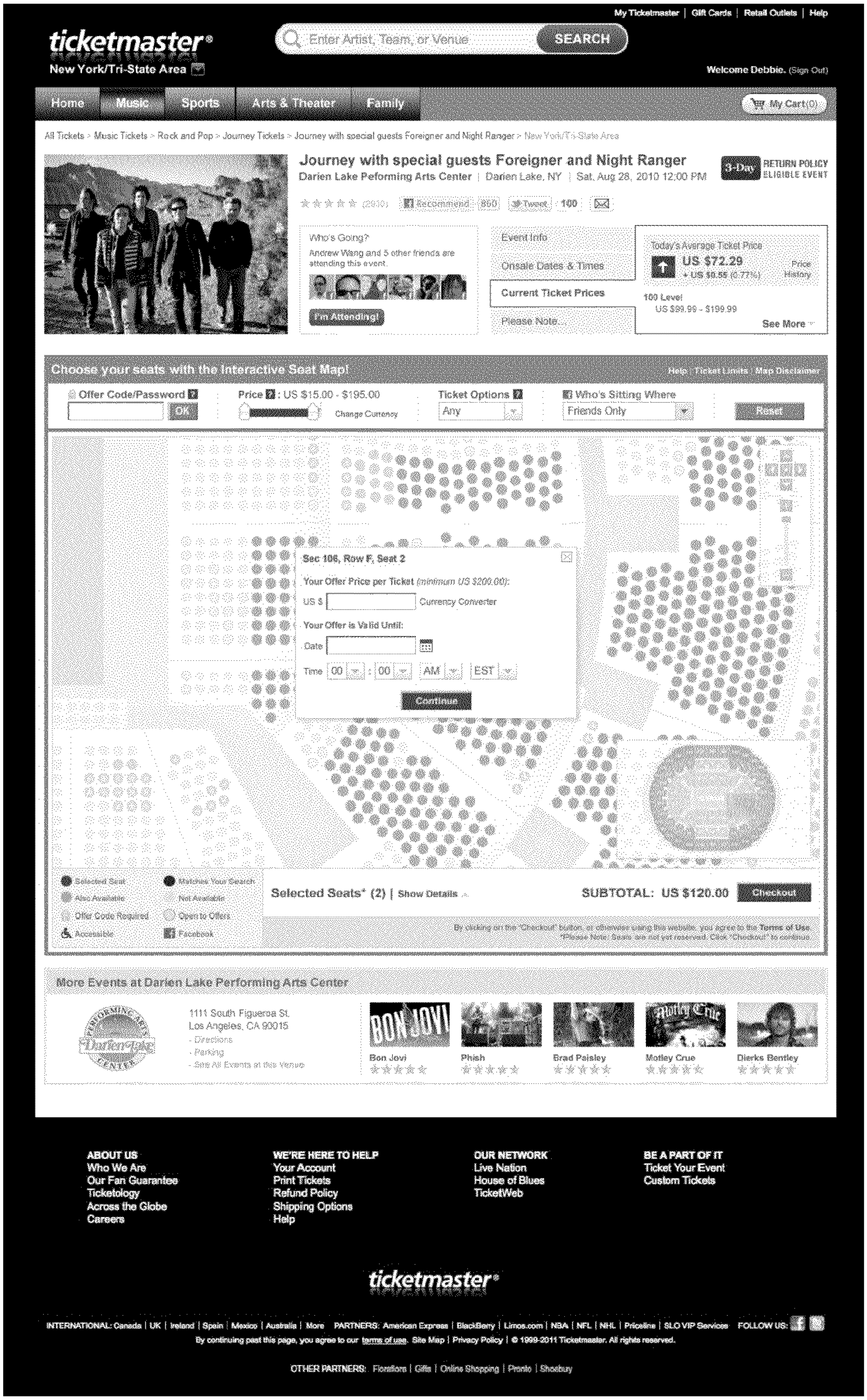

An example embodiment provides user interfaces, illustrated in FIGS. 21V-21W, that enable a user to make an offer to purchase a ticket from another user that had previously purchased the ticket. For example, the user interface may include a venue map, such as the map illustrated in FIG. 21V. The user may select a section or specific seats for which the user wants purchase tickets that may be held or owned by other users. If a determination is made that a ticket holder is willing to accept or entertain ticket purchase offers from other users (e.g., based on an indication provided by the ticket holder to the system via a user interface, wherein the indication is associated with the corresponding seat, where the ticket holder may also specify a minimum price which may likewise be stored), the system may cause the ticket holder's seat icon to include a corresponding indication (e.g., a corresponding icon, border, color, etc.). The system may transmit the offer in an offer notification (e.g., via email, SMS message, MMS message, voice message, seat map, web page, phone app, or otherwise), including a price, submitted by the user to the ticket holder via a purchase offer interface, which may include a field to receive a user specified offer price. The system may receive an acceptance or refusal of the offer from the ticket holder (e.g., wherein the ticket holder activates an access control or refusal control including in the notification or via a page accessed by clicking on a link or other control including in the offer notification), and transmit an indication of such acceptance or refusal to the user (e.g., via email, SMS message, MMS message, voice message, seat map, web page, phone app, or otherwise). If the ticket holder accepts the offer, the system may store an indication corresponding to the acceptance, process the purchase (e.g., charge the user's credit card or other financial instrument, and charge the user and/or ticket holder a service fee), and transfer the ticket (which may be a physical or electronic ticket) to the user. The system may store an indication in a ticket database that the ticket has been transferred to the user in association with a record for the corresponding seat. The system may cancel or otherwise invalidate the original ticket holder's ticket to prevent use thereof (e.g., by recording in memory an indication that the original ticket holder is invalid, so that if it is used and scanned at the event venue, the admission system will access the ticket database and determine that the original ticket is not valid). Optionally, if the ticket holder refuses an offer, the ticket holder may submit a counteroffer, which the system may communicate to the user, who in turn may accept or refuse the counteroffer, and may couple a refusal with a counter-counter offer.

FIG. 21V illustrates an example user interface including controls via which a user may make an offer to purchase tickets from other users for one or more seats. In addition, controls are provided which enable the user to select a seat, and have a photograph, video, or other representation of the view from that seat or section displayed. Further, the user interface identifies the current ticket holder (e.g., via name, nickname, photograph, or otherwise), of a user selected seat, and provides indications (in the form of text, color, graphics, etc.) that indicate whether the current ticket holder is open to receiving ticket purchase offers, and provides the minimum price the current holder expects or requires if the ticket holder is to sell the ticket. In addition, various search and filtering controls and fields (offer/password entry field, price range controls, ticket option menu, who is sitting where menu, etc.), and event and venue information (e.g., name of performer, venue name, address, event date/time, user ratings/recommendations, number of user communications regarding the event, who is attending, on-sale dates/times for tickets, etc.) are provided as similarly discussed above with respect to other example user interfaces.

In addition, the example user interface displays the average ticket prices (or other statistical calculation) for event tickets sold, as calculated by the ticket system or other system. For example, the user interface may display the average price and/or price range for tickets in a specified period of time, such as the current day. Optionally, the ticket sale price information may be provided for a section or other seating area specified by the user. A control is provided via which the user can instruct the system to provide historical event ticket sale prices for other time periods (e.g., past days or weeks).

FIG. 21W illustrates the user interface of FIG. 21V with a price submission user interface. The user can enter an offer price per ticket and a day and time until the offer expires. Optionally, the user is instructed that there is a minimum required price and if the user enters a price below the minimum, the system may so detect, and inform the user that the offer is not accepted because the offer is below the minimum specified amount.

Figure 21X:
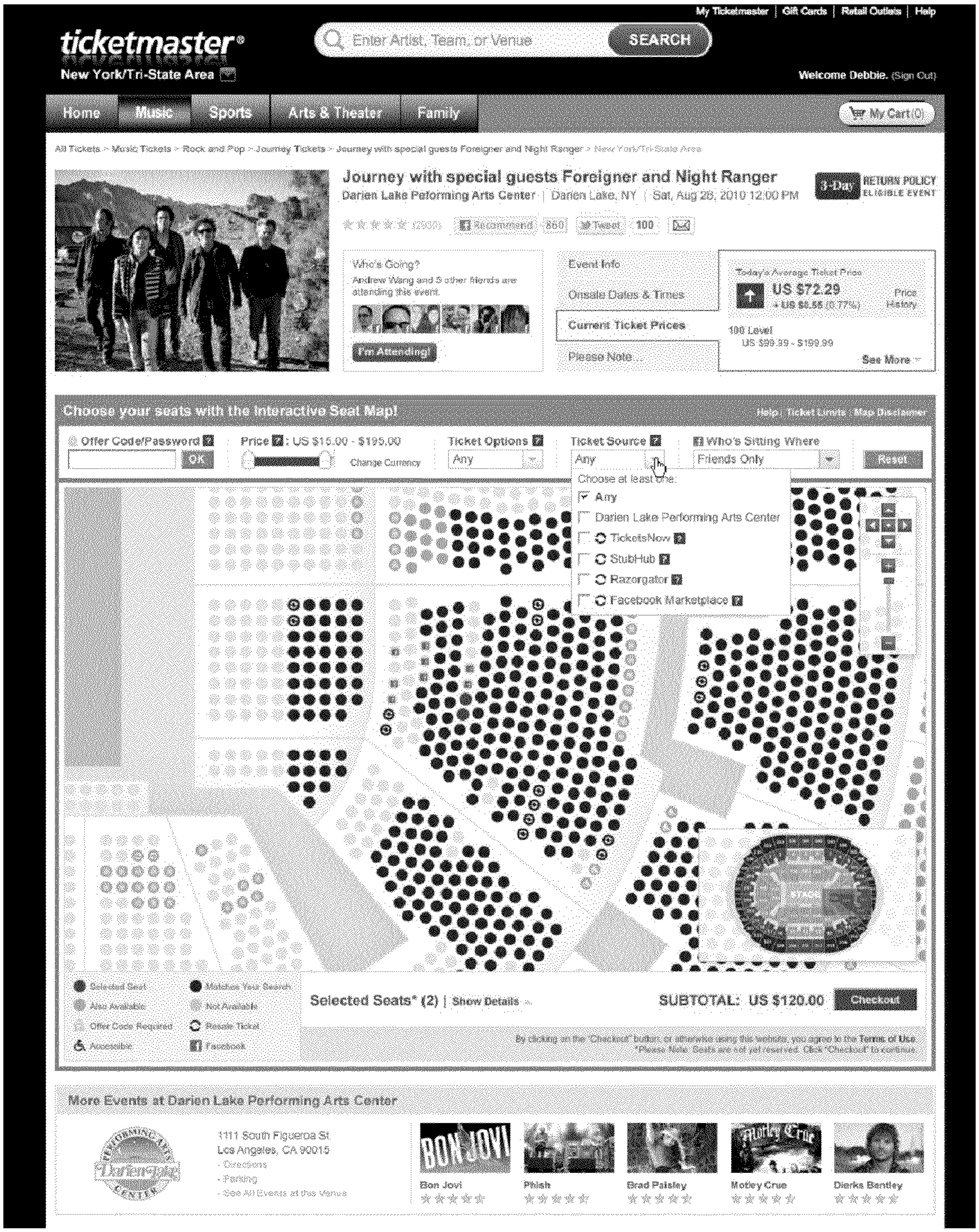
Figure 21Y:
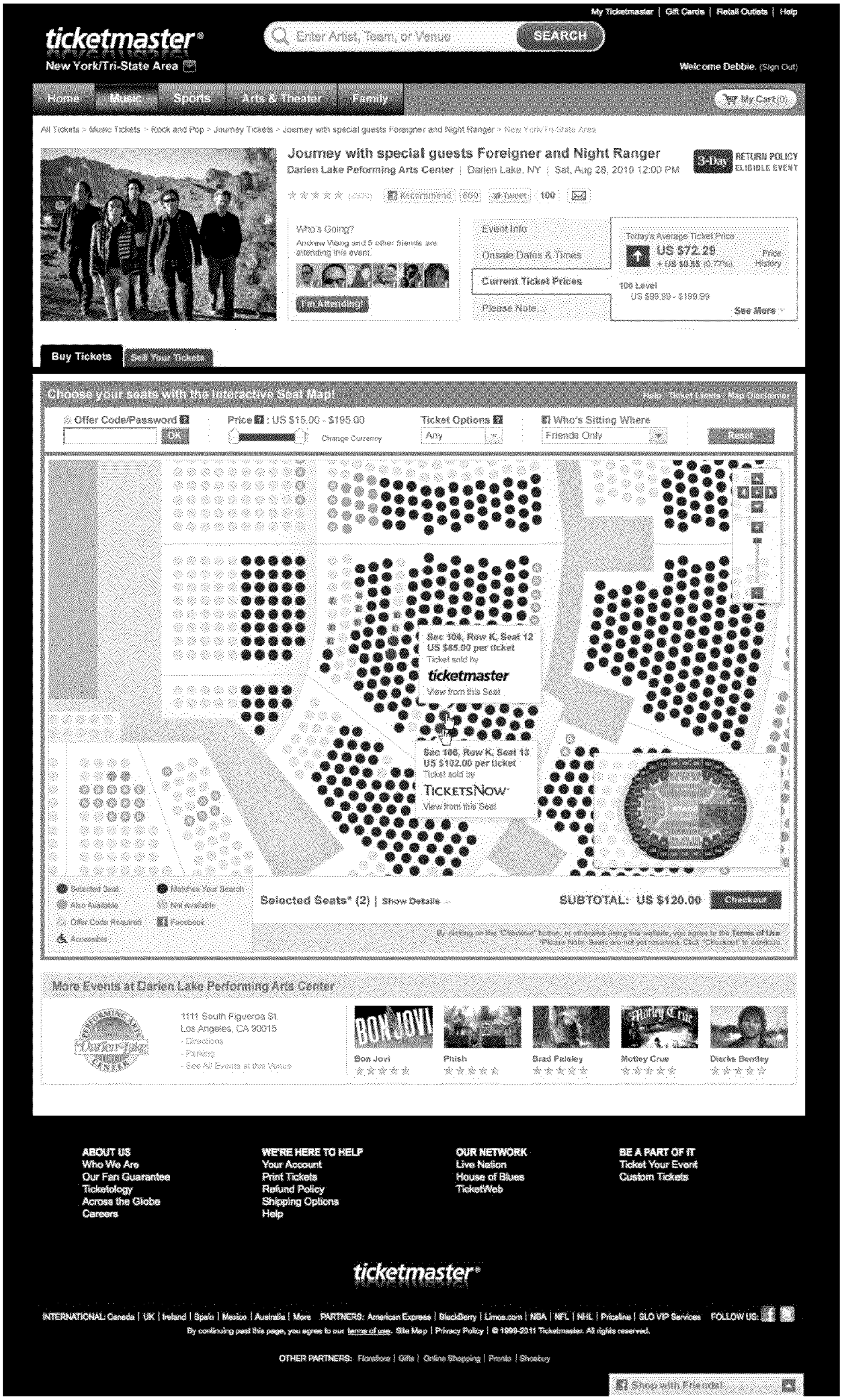
Figure 21Z:
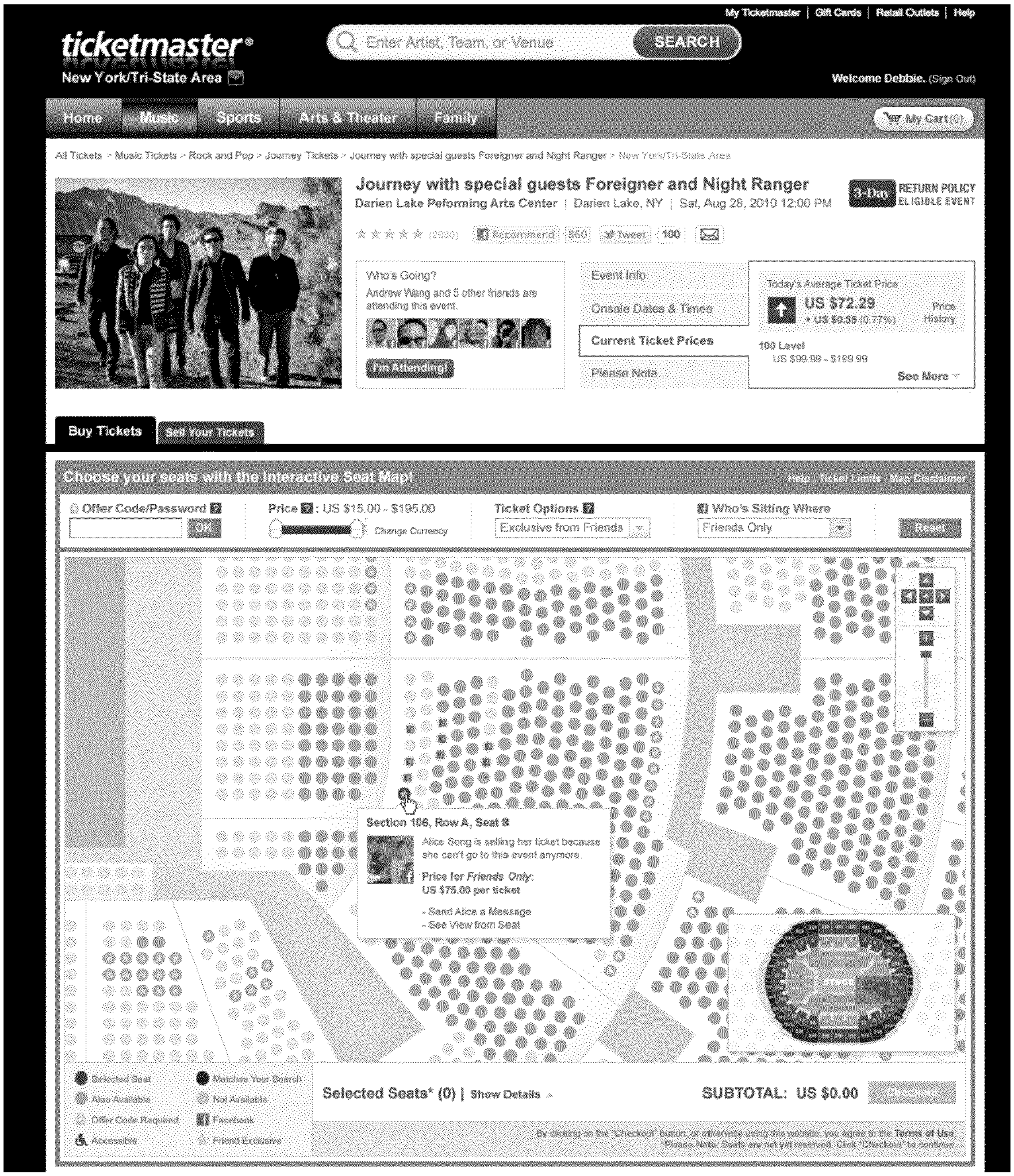

FIGS. 21X-21Z illustrate user interfaces, including interactive seat maps, that provide a unified presentation of event seat tickets in both the primary market (initial sale of an event ticket) and the secondary market (ticket resales from prior purchasers. The information used to populate the user interface may be obtained from a plurality of systems associated with respective primary and secondary ticket sellers. Some ticket sellers may be engaged in both the primary and secondary markets, while other ticket sellers may be only primary market ticket sellers or only secondary market ticket sellers.

As illustrated in FIG. 21X, a user interface is provided via which the user can select one or more ticket sources, which may include primary and secondary market sellers. The seat map is then updated to highlight the seats whose tickets are available from the selected sources. The seat icons may be coded differently (e.g., different internal graphics, different colors, different borders, etc.) to indicate the source of the ticket for a given seat and/or an indication as to whether the source is a primary market source or a secondary market source. The user interface includes various other fields, controls, and information, as similarly discussed above with respect to certain other user interfaces.

FIG. 21Y illustrates an example user interface (such as the user interface illustrated in FIG. 21X) including seats selected by the user. When the user hovers over or points at the selected seats, additional information regarding the seats is presented, including the source of the seat ticket and/or an indication as to whether the source is a primary market or secondary market source.

In certain embodiments, a ticket holder reselling a ticket can specify to which other users or category of users the ticket holder is willing to resell a ticket to. For example, in some instances, a ticket holder may not want to sell a ticket to a ticket broker, but is only willing to sell the ticket to someone the ticket holder has designated a friend or that may be a friend of a friend (or that may be a member of a specified group, such as a fan group of the performer performing at the event). The ticket holder can also enter, via an electronic form or otherwise, a requested price per ticket and a reason the ticket holder is not using the ticket. The ticket system may then determine whether a user seeking to purchase tickets fits the ticket holder specified designation, and if not, prevent or inhibit the user from purchasing the ticket. For example, the system may indicate that the seat ticket is not available for purchase to users that do not fit the ticket holder specified designation.

On the buyer side, a seat map may indicate which seat tickets being offered for resale are being offered by a friend of the buyer (which may be determined from information accessed from a social network database). Further, a buying user may specify that the user wants to filter the seat map to indicate which seats tickets being offered for resale are being offered by a friend (or other specified seller-type). FIG. 21Z illustrates such an example user interface. In this example, the user has selected, under ticket options, "Exclusive from Friends." The seat map has been updated to indicate via a star which seats are associated with tickets being offered for resale by a friend. If the user hovers the cursor over such a seat, additional information is presented, such as the seat location, the reason provided by the user for selling the ticket, the requested price, and an indication that the ticket holder is only selling the ticket to friends. Controls are provided via which the user can send the ticket holder a message.

In certain embodiments, a ticket may be transferred (e.g., resold), without a ticket seller having to manually send a physical ticket to a ticket buyer, For example, ticket holders can electronically transfer a ticket to recipient via the ticket system. The ticket holder may identify the ticket being sold by selecting the ticket from a menu provided by the ticket system of tickets held by the ticket holder (e.g., based on the ticket holder's account information) or by providing to the system identifying information relating to the ticket (e.g., a unique code printed on the ticket if the ticket is a physical ticket). When the purchase is complete or when otherwise instructed by the ticket holder, the system can then cancel the ticket held by the ticket holder The ticket system can keep a record of each transaction so that the system can track who the current ticket holder is, as well as who has previously held the ticket.

In certain embodiments, the interactive map may disabled if the ticket system is so loaded that it cannot adequately support one or more instances of the interactive map (e.g., where the system cannot provide updates regarding which seats are available quickly enough (e.g., in substantially real time), resulting in seats that have become unavailable still being displayed as available) as illustrated in FIG. 21P. For example, if consumer activity on a given event spikes (e.g., during the first hour or other time period event tickets are first put on sale), the system may automatically disable the interactive seat map and users may instead be presented with or directed to an alternative ticket purchase user interface, such as that illustrated in FIG. 21Q. For example, the alternative user interface may not enable a user to select specific seats. By way of illustration, the alternative user interface may instead enable a user to specify a price level or best available seats, where the system, rather than the user, then selects the specific open seats that match the user's criteria and rankings or quality assignments with respect to the open seats (e.g., the system may locate the seats with the highest ranking or quality assignments that are open and that meet the user's price and/or section selection criteria). The system then enables the user to purchase the system selected seats via the alternative ticket purchase user interface. A notification may be provided for display to the user regarding the disablement of the interactive map. Optionally, a notification may first be provided indicating that due to detected system loading, the performance of the interactive map may be significantly degraded (e.g., very slow), and the user may be offered the option to continue using the interactive map or to use the alternative user interface. Then, the selected user interface is presented to the user.

By way of example, consumer activity may be measured by one or more of the following factors:

a. the amount of web traffic that is arriving on an event's purchase page;

b. the number of seats that are simultaneously reserved on the ticketing system.

additionally, thresholds for these factors may vary depending on the event lifecycle (e.g. If an on-sale is coming up, the thresholds may be set relatively lower to be more sensitive to traffic and purchase activity.

Example processes for obtaining and utilizing social network data and social network sites will now be discussed in further detail.

As previously discussed, in certain embodiments, the system (e.g., the ticket system) determines (e.g., from information accessed from a social network database and/or a ticket system database) and provides for display an indication as to which seats are assigned to "friends" of the user via the interactive map. A friend may be someone that the user has identified as a friend to the system or to a source providing information to the system, or that the system has inferred from data (e.g., the user's contact database) is a friend of the user. A friend may be a personal friend, a business partner, or other person that the user wants to (or, in certain embodiments, that the system infers may want to) share ticket/seat related information with. This enables a user to determine which friends have purchased tickets for the event, and further enables the user to purchase (or attempt to purchase) tickets for seats next to or close to one or more of the user's friends' seats. For example, event seats for which the user's friends have purchased tickets, or for whom tickets have been purchased, can be colored in green (or other color), designated with a special icon, or otherwise emphasized.

The system may obtain information regarding who the user's friends are using one or more processes. For example, the user may agree (e.g., via an opt-in control) or instruct a social networking site to share information with the ticket system regarding relationship information of the user. The relationship information may identify who the user has indicated are the user's friends and/or who others have indicated that they are friends of the user. The system may access such relationship information via an application programming interface (API) associated with the social networking site or may access the information from other sources.

In addition to determining who the user's friends are, the system may determine whether the friends have purchased tickets for the event, have received tickets for the event, and/or have been tagged into a seat for the event. For example, the system may have ticket records indicating the identity of purchasers, ticket holders, and seat tagging information, and may map the names or other identifiers associated with the user's friends (e.g., obtained from the relationship information) to the event venue seats using ticket records identifying the current ticket holder. In cases where the current ticket holder is not the original purchaser of the ticket, the system may use contact information, such as names/addresses (e.g., email, SMS, MMS, or other address(es)) of those to whom tickets have been electronically or physically sent to), to identify who the current ticket holder is, even if the current ticket holder is not the original ticket purchaser. The relationship information and the ticket holder information may then be used to generate a seat map for the user, indicating where the user's friends are sitting or may be sitting. The seat map may be dynamically updated to include and display the user's friends' comments, photographs, and/or videos submitted via a ticket system website, a social network site, a computer/phone application, a short messaging service, or otherwise.

Optionally, the ticket system may receive such relationship information directly from the user instead of or in addition to receiving relationship from a social network site. For example, a form may be presented to the user asking the user to identify other users that the user considers friends. For example, the user may be asked to identify friends by providing the friends' names, email addresses, physical addresses, phone addresses, and/or unique identifiers assigned by the system or selected by the friend, or otherwise identify the friends. By way of further example, the user may be asked to provide the system with access to the user's contact database, which may be used to determine who the user's friends are or might be.

In an example embodiment, if a user connects to a social network site, the ticket system receives from the social network system a user identifier (user ID) from the social network system. The ticket system may then use the user ID to request and retrieve from the social network system information regarding the user, such as the user's profile and an identification of those that are designated as friends of the user. Some or all of the retrieved information may then be displayed to other users as discussed elsewhere herein.

If a user indicates that the user will be attending an event (e.g., by responding, via an RSVP or otherwise, to an invitation to attend the event from another user or by purchasing a ticket) for which tickets are being sold via the ticket system, the ticket system stores the indication may transmit the indication (e.g., the RSVP) to the social network system, which may post the indication. An event for the ticketed event may then be established on the social network site, wherein selected users or all users may be provided with access to event information via the social network site, as described below.

For example, the event may include a description of the ticketed event, and the date, time, venue, and address of the event. Privacy settings may be set for the event, which specifies who can view the event information, and an invitation list may be defined as well. Invitations to attend the event may be transmitted by the social network system and/or ticket system to members of the invitation list. An entry regarding the event (including some or all of the foregoing event information) may be displayed on one or more users' pages (e.g., in the form of a wall post), on a page associated with the ticket system operator, and/or may be otherwise provided for display.

As similarly discussed above, the ticket system may also store user-to-seat information. For example, if a user has opted to tag the user's seats to an event (indicating who will be sitting in the seats purchased by the user), the user-to-seat data may be stored. The stored data may include an account identifier/userID of the user for an account stored by the ticket system and/or an account identifier/userID associated with the user's social network site account, stored in association with seat identifiers for the user's seats. Optionally, such user-to-seat tag data is not transmitted to the social network system, although in certain embodiments, it may be transmitted to the social network system.

When a user accepts an invitation or tags seats and friends to an event, the ticket system may construct a wall post and transmit the wall post to the social network system. In turn, the social network system may return a wall post identifier, which is received by the ticket system and which may be used to track the wall post and to recall or delete the wall post if necessary or if desired.

By way of example, a constructed wall post may include some or all of the following information 1. Event details: name (e.g., performer name), date, time venue, address, webpage/URL of event page and/or of performer/artist page.

2. Names of friends that were tagged for the event (optionally, excluding or including the friends' social network site user IDs).

In an example embodiment, if a user tags her/his friends to an event, or invites the user's friends to an event, the ticket system constructs a social network site user-to-user application ("app") request for a social network site app of the ticket system for the appropriate domain or, in addition or instead, the ticket system may construct a social network site user-to-user inbox message or other mechanism to deliver a message to the recipient user. In turn, the social network system returns an app request ID which is received by the ticket system. The ticket system may use the app request ID and/or inbox message ID to track the request to thereby track individual app request and inbox message statuses and act accordingly, or to recall the app request invitation or inbox message when necessary or desired. The ticket system may store the individual user-to-user app requests or inbox message in a database.

An example app request or inbox message may include some or all of the following information:

1. Event details: name (e.g., performer name), date, time venue, address, webpage/URL of event page and/or of performer/artist page.

2. An identifier (e.g., a userID) of the social network site user initiating or transmitting the request.

An indication that the user has purchased seats for the event and/or a seat location identifier (e.g., section, row, seat number) may be posted by the ticket system and/or the social network system for display on the user's social networking site page or other page/document associated with the user (e.g., the user's own blog or website). This enables other users that have permission to view the user's page and/or activity updates to view or be notified (by email, SMS message, MMS message, physical mail, automated voice message, or otherwise) of the user's ticket purchase and/or the seat assigned to the user.

Optionally, a link may be provided on the user's social network site page, which, if activated, will cause a ticket purchase user interface, which enables the viewer to purchase tickets for the event, optionally for seats near the user's seats. Optionally, the system tracks when purchases have been made by users that navigated to the event ticket page via a link associated with another user's page, and made ticket purchases, and provides a benefit (e.g., a discount, a credit, a payment, a free musical item (e.g., a CD, MP3 song, etc.), a article of clothing, etc.) to such user whose page included the link.

Figure 23:

FIG. 23 illustrates an example user interface that enables a user to indicate to others that the user is attending an event. In this example, a share control ("Attending") is presented to a user substantially immediately after the user has purchased a ticket for an event, during the same session and at the same site at which the user purchased the ticket. Optionally, in addition or instead, the share control (which could be a link) may be emailed or transmitted to the user via SMS, MMS, a telecommunications device application, a webpage, an interactive seating map, or otherwise, sometime after completion of the ticket sale. In this example, the user interface instructs the user to activate the share control ("Attending") if the user wants to inform others (e.g., whom the user has designated as friends, other groups of people, or everyone), via a social networking webpage or otherwise, that the user will be attending the event. If the user activates the sharing control ("Attending"), an indication that the user will be attending the event is posted to the user's social network webpage and/or the indication is otherwise provided to other users via email, SMS, MMS, a telecommunications device application, a webpage, an interactive seating map, or otherwise. The indication may optionally include the name of the event, the date of the event, the time of the event, the event venue, and/or the venue location.

Figure 24:

FIG. 24 illustrates another example user interface enabling a user to indicate to others that the user is attending an event, as similarly discussed above with respect to FIG. 23. In this example, a share control ("Attending") is presented to a user substantially immediately after the user has purchased a ticket for an event, during the same session and at the same site at which the user purchased the ticket. Optionally, in addition or instead, the share control (which could be a link) may be emailed or transmitted to the user via SMS, MMS, a telecommunications device application, a webpage, an interactive seating map, or otherwise sometime after completion of the ticket sale. In this example, the user interface includes a field via which the user can enter content (e.g., text, images, graphics, and/or videos) to be published in association with an indication that the user is attending the event. The indication may optionally include the name of the event, the date of the event, the time of the event, the event venue, and/or the venue location. If the user activates a "publish" control, the indication that the user will be attending the event and the user entered content are posted to the user's social network webpage and/or the indication is otherwise provided to other users via email, SMS, MMS, a telecommunications device application, a webpage, an interactive seating map, or otherwise.

Figure 25A:

FIG. 25A illustrates another example user interface enabling a user to indicate to others that the user is attending an event and enabling the user to indicate which of the user's friends will be attending and/or the user would like to invite to attend. In this example, images of the user's friends (which may have been accessed from a social network site) are presented in association with the friends' names/identifiers. Optionally, the user can limit the friends presented via the user interface by searching for one or more particular users. For example, the user can search by name, geographical location, group membership, interests, music preferences, etc. The user can select (e.g., by clicking on the names/pictures of the friends) which of the friends are attending the event and/or the user would like to invite to attend. A field is provided via which the user can designate who is permitted to view, via a seat map, which seats the user purchased tickets for. For example, the user may be able to designate that the seating information is to be viewable by "everyone", "friends", pre-specified groups of people, specific individuals, etc. As similarly discussed above, in this example the user interface is presented to a user substantially immediately after the user has purchased a ticket for an event, during the same session and at the same site at which the user purchased the ticket. Optionally, in addition or instead, the user interface may be later provided to the user via one or more of the techniques described above or otherwise.

Figure 25B:
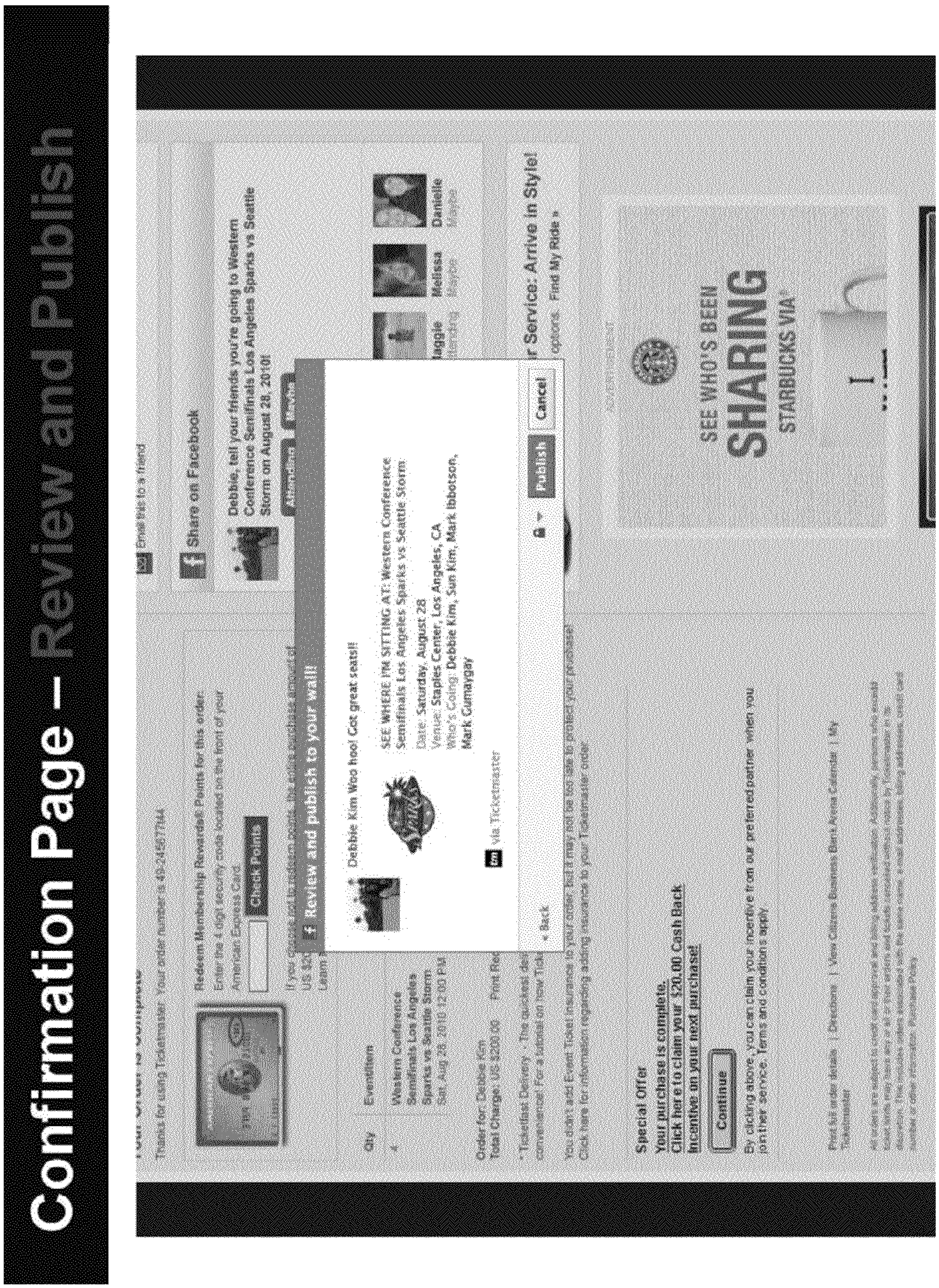

Once the user tags other users via the user interface illustrated in FIG. 25A, the user activates a "next" control, and the example user interface illustrated in FIG. 25B is provided for display. The example user interface presents a preview of what will be posted on the user's social network page/document (which may be presented via a browser, telecommunications device application, or otherwise). The user can then activate a publish control to publish the attendance information, or activate a cancel control to prevent such publication.

Figure 25C:

FIG. 25C illustrates an example social network page with the notification illustrated in FIG. 25B presented thereon. A notification may be provided via the social network site or otherwise to the users tagged/selected via the user interface of FIG. 25A, inviting them to attend the event. The notification may include a link, which if activated, will cause a ticket purchase user interface for the event to be presented to the invited user. The ticket purchase user interface may be hosted by the ticket system discussed above.

FIG. 26A illustrates an example ticket purchase user interface via which a user can select specific seats for an event and can view which of their friends have purchased tickets or otherwise have tickets for the event, and where they will be sitting. In this example user interface, the user can activate a link, which will initiate a connection to a social network site and/or database that stores information on who the user has designated as friends. To encourage the user to activate the link, the user interface presents a seat identifier (e.g., section, row, seat designations) and indicates that if the user wants to know who is sitting at seat corresponding to the seat identifier, the user should activate the link.

FIG. 26B illustrates an example user interface provided for display to the user if the user activates the link discussed above with respect to FIG. 26A. As illustrated, icons ("f" in this example) are displayed on the interactive seat map, indicating in which seating section the user's friends will be sitting. The icon may indicate the source of the identification of friends (e.g., "f" may indicate Facebook®). Different icons may be used to represent different social networks. If the user points at or hovers a cursor over a section where a friend is sitting (e.g., which includes one of the foregoing icons), the names and/or pictures and/or of the friends and/or a count as to the number of friends sitting in the section will be displayed. This information enables the user to quickly find out which friends are attending the event (or intend to attend) and where they are sitting (or intend to sit), which may affect the user's decision as to whether or not to purchase a seat ticket for the event, and which seat to purchase a ticket for. The user can then purchase tickets via ticket purchase controls displayed in conjunction with the interactive seat map.

FIG. 26C illustrates a zoomed view of the interactive map of FIG. 26B, wherein individual seats may be viewed. If the user points at or hovers a cursor over a seat where a friend is sitting (e.g., which includes one of the foregoing icons), the name (which may be the friends legal name or a nickname/alias) and/or photograph of the friend will be displayed. A control is provided via which a user can tag herself/his self into the seat map (e.g., indicating that the user intends to or is considering purchase a ticket for the seat) so that when the user's friends via the seat map for the event, the seat map will display the user's name and/or image. The user can then purchase tickets via ticket purchase controls displayed in conjunction with the interactive seat map.

FIG. 26D1 illustrates a user's social network apps page (via which third party content may be displayed) indicating that a ticketing app has received an invitation to attend an event, including an "accept" control via which the user can accept the invitation. If the user accepts the invitation, a ticket purchase user interface of for the event pay be presented via the user's browser or other application and the user can purchase a ticket for the event.

Figure 26E:
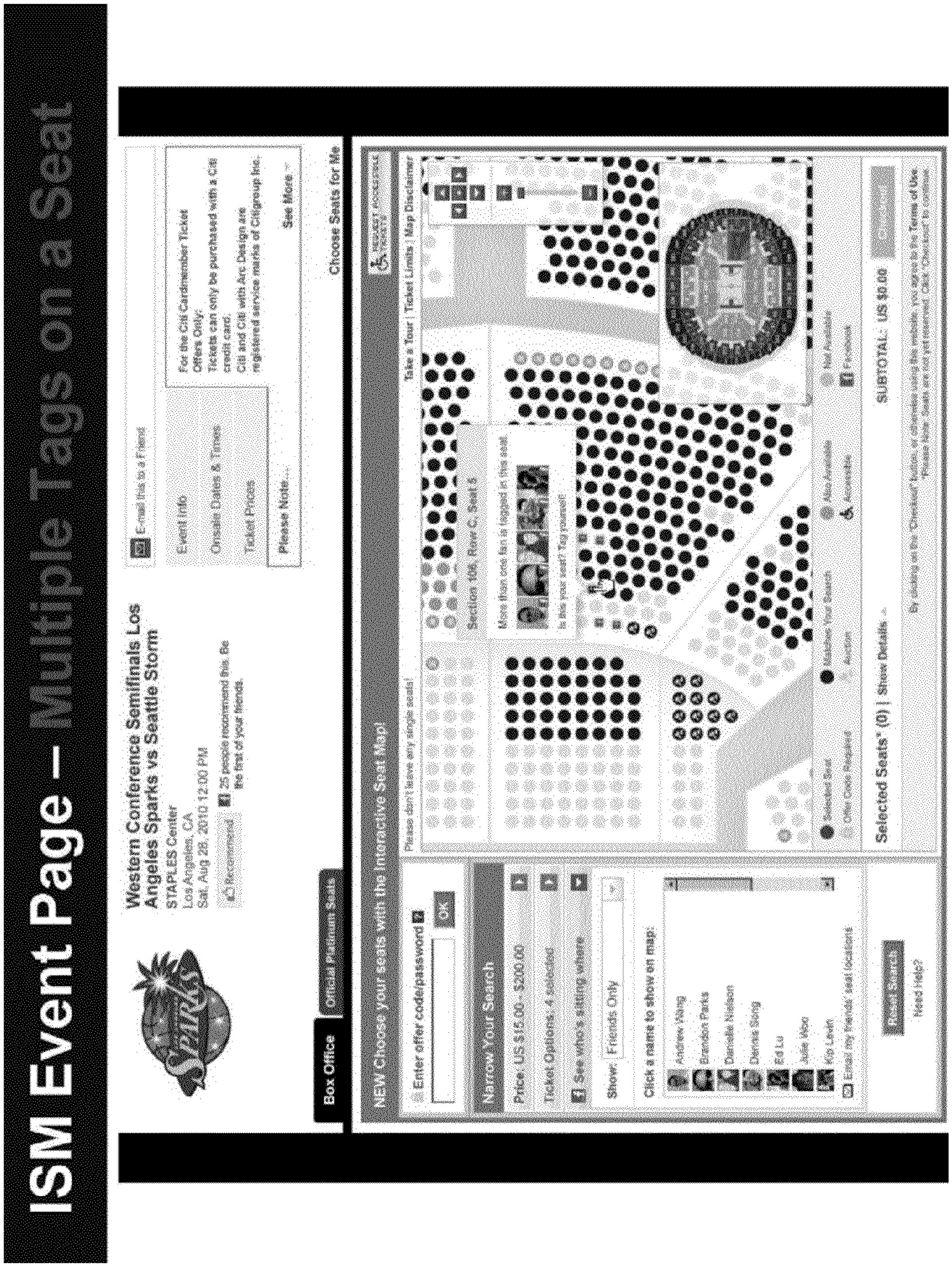

FIG. 26D2 illustrates an interactive seat map including a user interface providing a tagging control via which the user can tag herself/himself into the seat map so that when the user's friends views the seat map for the event, the seat map will display the user's name and/or image (or other identifier). FIG. 26E illustrates an interactive seat map including a user interface indicating that more than one user has been tagged in a given seat. The user interface presents photographs and/or names of users that have been tagged for the given seat, and enables the user to tag herself or himself at that seat (e.g., indicating that the user intends to or is considering purchase a ticket for the seat) so that when the user's friends via the seat map for the event, the seat map will display the user's name and/or image (or other identifier).

Figure 26F:
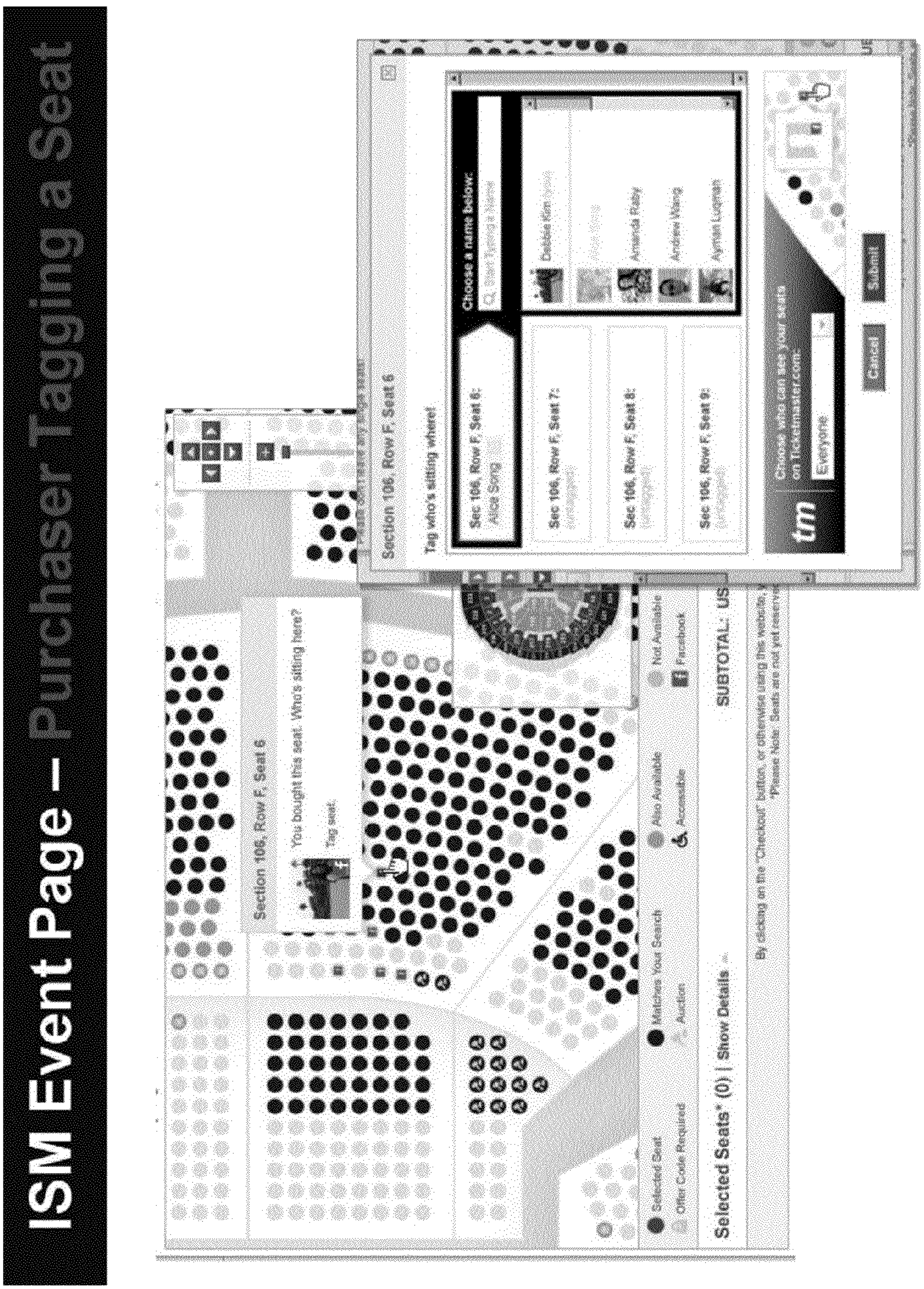

FIG. 26F illustrates an interactive seat map presented to a user after purchasing a ticket for an event. The user may have brought a ticket for himself/herself or for another person. A user interface is provided for display which lists a seat identifier (e.g., seat section, row, number) corresponding to the purchased ticket and asks the user who is sitting in the seat. The user interface provides a control via which the user can indicate who is sitting in the seat (e.g., by entering/selecting the name and/or photograph of the person that will be sitting in the seat). If the user purchased several seat tickets for the event, a user interface may list each of the corresponding seat identifiers and may optionally present the names/photographs of the user's friends (e.g., accessed from a social network site). The user can select friends from the list and indicate which friends will be sitting in which seat. In addition, a user interface is provided via which the user can specify who or which groups of people can view the tagging performed by the user.

Figure 27:
FIG. 27 illustrates an example augmented reality user interface.

FIG. 27 illustrates an example augmented reality user interface that provides a view of a physical venue augmented by computer-generated visual and/or audio information. In this example, an application is downloaded and hosted on a user's telecommunications device (e.g., a camera equipped phone). As the user points the device camera at a view of the venue, the application and/or a remote server in communication with the application utilizes information from the device to determine (e.g., estimate) what is in the view of the camera. The determination can be based at whole or in part, on:

GPS location information, cell tower location information,

WiFi location information, a compass internal to the device that provides heading information (e.g., relative to magnetic north), an accelerometer internal to the device (which can also be used to provide tilt information), gyroscopic orientation information from a gyroscope (e.g., a 2 or 3 axis gyroscope which may provide two or three dimensional attitude information (e.g., pitch, roll, and yaw) and, in combination with the accelerometer output, rotation rate) located within the device, object recognition performed by analyzing the image to identify landmarks (which may be structural landmarks, such as walls, columns, doorways, seats, and/or may be active or passive beacons, such as coded signs (e.g., where each sign has a unique visual code and the signs are strategically placed are columns, walls, etc.), etc.), faces, etc., and/or other information.

In order to make the determination, some or all of the foregoing information may be used in combination with a 3D map of the venue (which may include beacon placement location information, if such exist and/or other landmark identifications and locations) and/or photographs and/or what is actually physically present in the venue as captured via a rear-facing camera lens on the user's smart phone, PDA device, or tablet device. In particular, some or all of the forgoing information may be used to determine the device's pose (position and orientation). For example, GPS information can be used to determine the latitude and longitude location of the user device, and gyroscopic orientation information can be used to determine the lens angle with reference to ground or other reference point or plane. Upon receiving an indication (e.g., via the application) that the device's camera is active (capturing images), and by knowing the user device pose, and the system can determine what is being displayed on the device's display.

The application and/or server can also obtain seating information (e.g., including identifiers/names associated with ticket holders) and user friend information (e.g., identifiers/names associated with the user's friends obtained from the ticket system and/or a social network system data stores) which may be compared to determine where and in which seats the user's friends are sitting. The server can forward to the application information as to where in the device display such seat and friend information are to be displayed. The application can then overlay onto the image captured by the camera names, photographs, and/or seat identifiers of the user's friends so that the user can visually see where the user's friends are located. Optionally, the system may receive comments, photographs, and/or videos posted by event attendees during the event.

For a given user, the system may determine who the user's friends are, and then stream the user's friends' comments, photographs, and/or videos submitted via the application, a short messaging service interface, a social network interface, or otherwise, (and received by the system) in substantially real-time to the user's device for display via the augmented reality user interface. In addition, other types of information may be overlaid onto the camera view, such as highlights or other emphasis around entrances to bathrooms, concessions, other amenities, exits, the user automobile, etc. The emphasis may be visually coded (e.g., color coded, icon coded, etc.), where different codes may be used to identify different features or types of information (e.g., the type of service provided by an amenity (e.g., food, a bathroom, a water fountain, an automated teller machine).

In addition, the system may determine which of the user's friends have arrived at the venue based on an indication that their ticket (which may be a physical ticket, an electronic ticket in their phone, a credit card used to purchase the right to attend, etc.) has been scanned at the venue, via a presence signal received from the friends' mobile communication devices while at the venue (e.g., GPS information provided via a phone app hosted on the friends mobile communication devices), via an affirmative action by the friend (e.g., by activating an "I have arrived" control via an app hosted on the friend's mobile communication device), or otherwise (the system may similarly determine if the user is at the venue). When the user's device is pointing at a friend's seat, the system may code (e.g., color code, icon code, text code, etc.) the seat to indicate the friend has arrived (or that a friend has not arrived if their presence has not been detected). In addition or instead, a list may be presented to the user via an application or web page indicating which of the user's friends have arrive and which have not yet arrive.

In certain embodiments, the ticket system may determine if the user's view includes a performer, may access information regarding the performer, and cause the accessed information to be displayed via the user's device in association with the image of the performer.

In certain embodiments, the ticket system may determine if the user's view includes seats for which event tickets have not yet been purchased. The system may optionally identify the seats as being available to the user via an augmented reality indication overlaying the view (e.g., textually, graphically, or otherwise). A control may be provided via which the user can purchase at a specified price, via their device, a ticket/upgrade for the seat, which then may be electronically delivered to their device to be displayed or otherwise communicated to others (e.g., to an usher) to indicate that the user has a right to utilize the seat. Optionally, before indicating to the user that a seat is available, the system may first determine if the seat is a better seat than the user's current seat (e.g., have a better view, is closer to the stage or playing field), based on rankings or other information stored in a database. If the seat is not better (e.g., has a similar, the same, or lower ranking than the user's current seat), optionally the system does not identify the seat as being available to the user.

Figure 28:
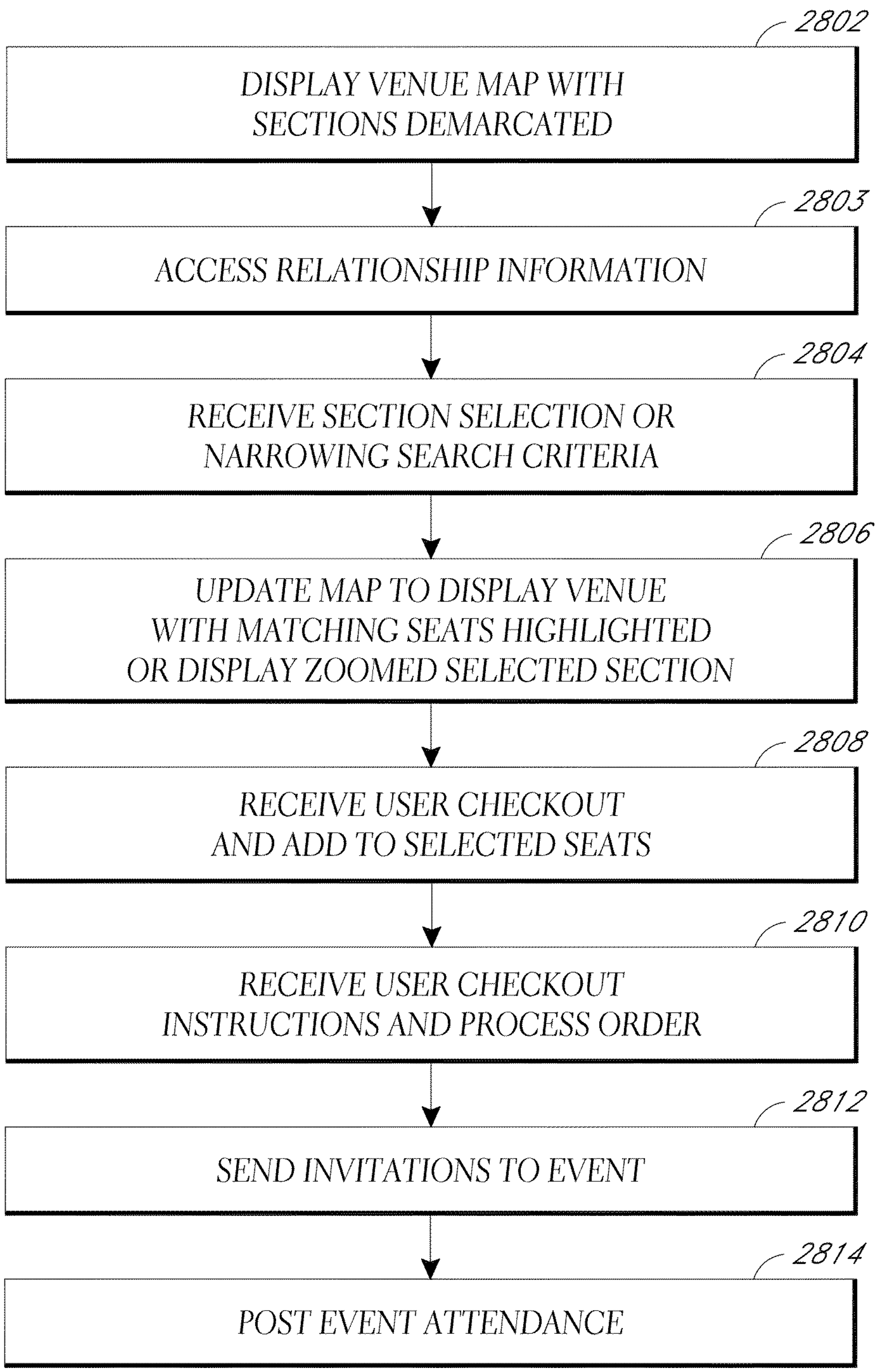
FIG. 28 illustrates an example ticketing process.

FIG. 28 illustrates an example ticket selection and checkout process which may be executed by a computing system, such as system 102 discussed above. At state 2802, the process receives a user selection of an event (e.g., via a menu selection, a user initiated search, activation of an event link, or otherwise), and the process causes a map of the event venue to be displayed on the user's terminal (e.g., laptop, desktop, tablet computer, cell phone, television, etc.). By way of example, the map may be provided for display via a ticketing website or a ticketing application hosted on a computing device. The venue map may have seating sections demarcated (e.g., using polygons). The sections and/or seats may be color coded and/or otherwise coded (e.g., using icons, text, animations, 3D effects, etc.) via to provide information regarding the sections and/or seats (e.g., location information, seat status information, prices, offer code requirements, view information, etc.), as discussed above.

The process may cause a field to be presented via which the user may enter an offer code. For example, the offer code may entitle the user to purchase seats that are not available to the general public or to certain people absent the offer code. In addition or instead, the offer code may entitle the user to reduced prices/discounts on some or all seat tickets and/or may entitle the user to a package (e.g., a musical recording, food, and/or an item of clothing, in addition to the event ticket).

If the user has been identified by the system (e.g., via a login process at a ticketing website, a social network website, via a token, a unique user terminal identifier, or otherwise identified), the map may be customized for the user. For example, at state 2803, automatically or in response to a user instruction to show where the user's friends are sitting, the process may identify certain other people as having a social relationship with the user (which, for convenience, will be referred to as "friends) from information accessed from a social network account of the user. The database may be part of a social network site hosted by the ticketing system or separately hosted and operated. In addition, information regarding such friends (e.g., names, email addresses, wall postings, activities, etc.) may be accessed from the social network account of such people. The process may use identifying information regarding the friends (e.g., their names, emails addresses, etc.) to locate, in a ticketing database, user records that include some or all of such identifying information. A ticketing database user record may indicate which seat tickets for which events are being held by the respective user. The process may then determine which friends are ticket holders for the event and determine for which seats the friends hold tickets. The map may then be generated or modified to include indicators as to where friends of the user are sitting (e.g., at a section level and/or at a seat level). The indicators may be in the form of color coding, icon, friend name, friend photograph, or otherwise. Different indicators may be used depending on how detailed the map being presented to the user is.

At state 2804, the process receives from the user a selection of a venue section (e.g., by the user clicking on or hovering a cursor over the section in the map) or a modification of the user's search criteria (e.g., by the user specifying or modifying a desired price range, ticket type, package type, seating area, shade seating, seating in the sun, covered seating, aisle seating, bathroom adjacent seating, concession adjacent seating, exit adjacent seating, friends seating, etc.).

At state 2806, the map provided for display to the user is updated, optionally in substantially real-time, to reflect the section selection, the modified search criteria, and/or system initiated modifications (e.g., to reflect the change in status of seats). For example, if the user selected a section, the process may provide, via the user terminal, a zoomed view of the section so that seats can be individually viewed and selected. If the user modified the search criteria, the map coloring (or other indicator) may indicate which sections and/or seats match the user's search criteria and/or the degree to which the sections and/or seats match the user's search criteria. At state 2808, a user seat selection is received (e.g., by a user clicking on a seat icon in the map or by entering a seat identifier into a field), and the selected seat(s) are added to the user's selected seat list and are assigned a reserved status. In this example embodiment, when the seats are in a reserved state, other users may not purchase the tickets, although optionally they can be wait-listed for the tickets, wherein the wait-listed user may be notified when the reserved seats become available for purchase (and are no longer reserved by another user). In certain embodiments, the reserved seats may be released for others to purchase (wherein the status is changed from reserved to available), if the user does not complete the ticket purchase and/or certain stages of the ticket purchase, within a specified period of time.

At state 2810, the user activates a checkout control, and the process processes the order (e.g., obtains or retrieves payment information, shipment information, etc.), and causes the ticket(s) to be delivered to the user (e.g., electronically or as a physical ticket) and/or enables an existing user physical or electronic document (e.g., a credit card, license, membership card, etc.) to be used as a ticket. The user may be automatically be tagged into a seat selected by the user and/or purchased by the user, or the user may manually instruct the process to tag the user into the seat. Optionally, a user interface is provided via which the user can tag others into one or more seats.

At state 2812, the process may receive an instruction from the user to transmit invitations to attend the event to one or more people and/or a group of people designated by the user. The process may then transmit such invitations to those so designated directly via the system 102 or via another system (e.g., via the social network system 122 illustrated in FIG. 1). The invitation may indicate by user name and/or photograph that the user is attending the event (e.g., wherein the invitation includes the event name, date, time, venue, and/or user seat location), and may provide a control, which when activated will cause a ticketing interface to be presented to the invitation recipient via which the user may purchase a ticket for the event (e.g., using the process illustrated in FIG. 28).

At state 2814, the process may post to one or more pages (e.g., to a social network wall pages of the user, to an event-specific page for the event, to the user's friend's pages, and/or other pages), an entry indicating that the user is attending the event, wherein the posting optionally includes some or all of the following information: event name, date, time, venue, user seat location, number of people attending, number of seats available, etc.

Optionally, once at the venue to attend the ticketed event, the system can provide for display on a mobile communications device of the user (or other terminal), a mapping showing where friends of the user have seats, and may further color code (or otherwise indicate) the seats to indicate which friends have already arrived at the venue. For example, seats may be colored green to indicate seats that are assigned to the user's friends, and seats may be colored gold to indicate which seats are assigned to the user's friends that have arrived at the event. The system may determine which friends of the user have arrived via information scanned from physical or electronic tickets of the user's friends upon entry to the venue and/or via location information provided via a mobile terminal of the user (e.g., a cell phone). For example, a scanner may scan:

- a ticket barcode or other code on a physical ticket;
- a ticket barcode or other code displayed via a user phone display or other terminal display;
- a near field communication device embedded in the user's phone or other device;
- an RFID (Radio-frequency identification) tag; and/or
- a user identification document (e.g., a driver's license, credit card, fan card, membership card, etc.) associated with an admission right (e.g., where the user can utilize a credit card used to purchase a ticket as the ticket, or where the user has a driver's license on file on the system which is associated with an admission right when the user purchases a ticket).

In addition or instead, a gate keeper, attendees, or other person may manually key in, via a terminal, an indication as to who has arrived at the event venue.

The system may store an indication as to who has arrived at the event based at least in part on the scanned information. Then, when a user views a map via a terminal, the system identifies the user (e.g., via log in information, a unique identifier associated with the user's terminal, a unique identifier associated with the user's viewing application, or otherwise), identifies friends of the user that have tickets for the event, identifies which of those friends have arrived, and displays corresponding information on the map. The map may be updated, optionally in substantially real time, to indicate changes in the friends' statuses. For example, when a friend arrives at the venue or purchases a ticket, the map may be accordingly updated to so indicate. The map may indicate (via text or otherwise) at what time a friend arrived, the current location of the friend, and/or other information.

In certain embodiments, the system may track a user's location at an event venue and/or outside an event venue to thereby provide location based services. For example, the user's location may be tracked at the venue (e.g., via GPS, cell tower, and/or WiFi information received by the user's mobile device, and transmitted via a ticket-related application hosted on the mobile device to the system; or via a transceiver that receives information from a near field communication device carried by the user). Such information may be used to determine a user's location at the event venue, and to provide information for display to the user (via a map, text information, and/or otherwise) that may be of interest to the user related to the user's current location and/or direction of movement. For example, the system may utilize the user's location information, in conjunction with venue layout information stored in a database, to determine the nearest restrooms, concessions, and/or exits relative to the user, and to provide directions to such destinations and/or display a map of such destinations while showing the user's current location on the map.

By way of further example, a map mode may be changed based on the user's location. By way of illustration, a map of a venue may be displayed in a ticket purchase mode or in an at-the-venue mode, wherein different information may be displayed depending on the mode. For example, when in a ticket purchase mode, a venue event map may display information on ticket pricing and seat availability, and may provide ticket purchase controls, as discussed above. Optionally information regarding the location of concessions, bathrooms, etc., is not displayed or is hidden (although optionally such may still be accessible if the user activates a corresponding control). When in an at-the-venue mode, the ticket pricing and seat availability information and/or the provide ticket purchase controls may be removed or not displayed (although optionally they may still be accessible if the user activates a corresponding control). However, in the at-the-venue mode, information as to who has arrived may be displayed and other information of interest to an attendee may be displayed (e.g., locations of exits, concessions, bathrooms, etc.). Optionally, the mode is automatically switched from ticket purchase mode to at-the-venue mode when the user enters the venue on the day of the event (as detected when the user's physical or electronic ticket is scanned or via information transmitted from the user's terminal, such as GPS or WiFi location information).

Optionally, when the user is at the venue for an event (as may be determined using one or more of the location determination techniques described herein), an application installed on the user's terminal will automatically display the venue map for the event, without requiring the user to manually select the specific map for the venue (although the user may need to open initiate the application and/or may need to indicate that the user wants to view a venue map without having to name the venue or select the specific venue from a list of venue—such as by activating a "show current venue" control). The map may be transmitted to the user terminal via a ticket system.

In addition, such user location information may be used to determine line lengths/wait times at concessions, bathrooms, exits, or other locations/destinations selected by the user and/or the system. For example, if the system determines, from user location information and a venue layout, that a user is standing within a certain distance of a facility (e.g., a bathroom, concession stand, or exit) and appears to be moving in the direction of the facility within a certain speed range (e.g., slower than 0.2 feet/second), the system may infer that the user is waiting in line for the facility. The system may further use the foregoing location and movement information to estimate the length of the line, as expressed in time (e.g., a 4-5 minute wait) and/or distance (e.g., a 20 foot line). Such line length information can be transmitted for display on the user's terminal (e.g., via a map, textually, and/or via an email, SMS, MMS message(s)) and/or on other users' terminals. A map and/or text listing may be provided for display via a user terminal, providing line wait information for a plurality of destinations of a given type (e.g., bathrooms), so that the user can select a destination with an acceptable or shortest line length. Optionally, the system determines from the line lengths, a user's current location and/or movement information, and the locations of destinations of a given type, which of the destinations of the given type the user will likely reach/be able to utilize the quickest, and may so identify the corresponding destination to the user as being the fastest available.

For example, if a bathroom within 100 feet of a user has a 5 minute line, and a bathroom within 200 feet of the user has a 1 minute line, the system may determine that the bathroom located 200 feet from the user will be usable by the user quicker than the closer bathroom. The system may transmit for display to the user such time information (via a map and/or text listing) for a plurality of destinations of the given type and may rank and/or list the destinations in order of the estimated relative speed the destinations may be reached or usable.

In addition, communications may be transmitted to a given event attendee before, during, and/or after an event, requesting information and/or offering goods and services. For example, the communication may be transmitted to a terminal (e.g., computer, phone, television) of an attendee the same day or the day after the event, while the event is still fresh in the attendee's mind, asking the attendee to submit a review of the event, which may then be posted online in association with an offer to sell tickets to another event by the same performer. In addition or instead, the communication may offer musical recordings (e.g., in the form of a CD, DVD, Blu-ray disk or digital download) of the performer (e.g., a live recording of the concert event the attendee attended or another recording of the performer) for sale or at no charge to the user.

While certain embodiments may be illustrated or discussed as having certain example components, additional, fewer, or different components may be used. Process described as being performed by a ticket system may be performed by a user terminal or other system or systems. Processes described as being performed by a user terminal may be performed by a ticket system or other system or systems. Data described as being accessed from a given source, such as a ticket system database, may be stored by and accessed from other sources, such as a user terminal or social network database. Further, with respect to the processes discussed herein, various states may be performed in a different order, not all states are required to be reached, and fewer, additional, or different states may be utilized. While certain embodiments may refer to coding certain information (e.g., information regarding seats on a seating chart) using a particular technique, other techniques, including color, textual, graphical, animations, video, audio, and/or other indicators may be used instead or in addition. User interfaces described herein are optionally presented (and user instructions may be received) via a user computing device using a browser, other network resource viewer, or otherwise. For example, the user interfaces may be presented (and user instructions received) via an application (sometimes referred to as an "app"), such as an app configured specifically for ticket-related activities, installed on the user's mobile phone, laptop, pad, desktop, television, set top box, or other terminal. Various features described or illustrated as being present in different embodiments or user interfaces may be combined into the same embodiment or user interface.

While the disclosure may reference to a user hovering over or pointing at a particular item, such as a section or seat, other techniques may be used to detect an item of user interest. For example, the user may click on such an item to show interest, touch the item via a touch screen, or otherwise indicate an interest.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A system for controlling an image display on a remote mobile device, comprising:
- a computing system, including computing hardware;
- a non-transitory medium storing instructions that when executed by the computing system, cause the computing system to perform operations comprising:
  - detecting the presence of the remote mobile device at an event venue, the event venue including a plurality of seats and the remote mobile device including a display and an imaging device;
  - identifying a first user associated with the remote mobile device;
  - determining what part of the event venue is being displayed by the remote mobile device display associated with the first user based at least in part on a detected position and orientation of the remote mobile device and a configuration of the event venue,
  - wherein what is being displayed by the remote mobile device display includes a real-time image captured by the imaging device;
  - accessing relationship information from a social network repository for the first user, the relationship information identifying at least a second user with whom the first user has a relationship;
  - identifying a seating location in the event venue that is associated with the second user while the first user is at the event venue;
  - determining whether the seating location associated with the second user is included in the part of the venue of the real-time image being displayed by the remote mobile device display associated with the first user; and
  - at least partly in response to determining that the seating location associated with the second user is included in the part of the venue of the real-time image being displayed by the remote mobile device display associated with the first user, causing computer generated data to be displayed in association with the seating location associated with the second user included in the real-time image being displayed by the remote mobile device display, the computer generated data including:
    - an identifier of the second user, and/or
    - an indication that the first user has a relationship with second user.

2. The system as defined in claim 1, wherein the system is configured to determine what part of the event venue is being displayed by the remote mobile device display associated with the first user using orientation information from a gyroscope included in the remote mobile device.

3. The system as defined in claim 1, wherein the system is configured to:
- determine which friends of the user have arrived at the event, and
- provide one or more corresponding arrival indications for display on the remote mobile device associated with the first user.

4. The system as defined in claim 1, wherein the user previously identified one or more people as friends and such identification was stored in memory for later access.

5. The system as defined in claim 1, wherein the system is configured to provide for display on the remote mobile device associated with the first user:
- a photograph transmitted from a remote mobile device associated with the second user while the remote mobile device associated with the second user is located at the event venue;
- a text message transmitted from the remote mobile device associated with the second user while the remote mobile device associated with the first user is located in the venue.

6. A system for controlling an image display on a remote mobile device, comprising:
- a computing system, including computing hardware;
- a non-transitory medium storing instructions that when executed by the computing system, cause the computing system to perform operations comprising:
  - detecting the presence of the remote mobile device at an event venue, the event venue including a plurality of seats and the remote mobile device including a display and an imaging device;
  - identifying a first user associated with the remote mobile device;
  - determining what part of the event venue is being displayed by the remote mobile device display associated with the first user, wherein what is being displayed by the remote mobile device display includes a real-time image captured by the imaging device;
  - accessing relationship information for the first user, the relationship information identifying at least a second user with whom the first user has a relationship;
  - identifying a seating location in the event venue that is associated with the second user while the first user is at the event venue;
  - determining whether the seating location associated with the second user is included in the part of the venue of the real-time image being displayed by the remote mobile device display associated with the first user; and
    - at least partly in response to determining that the seating location associated with the second user is included in the part of the venue of the real-time image being displayed by the remote mobile device display associated with the first user, causing computer generated data to be displayed in association with the seating location associated with the second user included in the real-time image being displayed by the remote mobile device display associated with the first user, the computer generated data including:
    - an identifier of the second user, and/or
    - an indication that the first user has a relationship with the second user.

7. The system as defined in claim 6, wherein the system is configured to access the relationship information from a social network database.

8. The system as defined in claim 6, wherein the system is configured to determine what part of the event venue is being displayed by the remote mobile device display associated with the first user based at least in part by determining the position and orientation of the remote mobile device.

9. The system as defined in claim 6, wherein the system is configured to determine what part of the event venue is being displayed by the remote mobile device display associated with the first user using orientation information from a gyroscope included in the remote mobile device.

10. The system as defined in claim 6, wherein the system is configured to:
- access the relationship information from a social network database, determine which friends of the user have arrived at the event, and provide one or more corresponding arrival indications for display on the remote mobile device associated with the first user.

11. The system as defined in claim 6, wherein the system is configured to provide for display on the remote mobile device associated with the first user:

a photograph transmitted from a remote mobile device associated with the second user while the remote mobile device associated with the second user is located at the event venue;

a text message transmitted from the remote mobile device associated with the second user while the remote mobile device associated with the first user is located in the venue.

12. The system as defined in claim 6, wherein the system is configured to determine if a venue exit and/or a venue amenity is being displayed by the remote mobile device display associated with the first user; and at least partly in response to determining that the exit and/or the amenity is being displayed by the remote mobile device display associated with the first user, causing, at least in part, second computer generated data to be displayed in association with the display of the exit and/or the amenity.

13. The system as defined in claim 12, wherein the second computer generated data is configured to identify the service being provided by the amenity.

14. The system as defined in claim 6, wherein the system is configured to determine if an available seat is being displayed by the remote mobile device display associated with the first user; and at least partly in response to determining that the available seat is being displayed by the remote mobile device display associated with the first user, causing an indication to be displayed via the remote mobile device indicating that the user may acquire a right to occupy the available seat.

15. The system as defined in claim 6, wherein the system is configured to:

determine if a performer is being displayed by the remote mobile device display associated with the first user; and at least partly in response to determining that the performer is being displayed by the remote mobile device display associated with the first user:

causing information, including textual information, regarding the performer to be displayed via the remote mobile device associated with the first user.

16. A method, comprising:

detecting, by a computing system, the presence of a remote mobile device at an event venue, the event venue including a plurality of seats and the remote mobile device including a display and an imaging device;

identifying, by the computing system, a first user associated with the remote mobile device;

determining, by the computing system, what part of the event venue is being displayed by the remote mobile device display associated with the first user based at least in part on a configuration of the event venue, wherein what is being displayed by the remote mobile device includes a real-time image captured by the imaging device;

accessing, by the computing system, relationship information for the first user, the relationship information identifying at least a second user with whom the first user has a relationship;

identifying, by the computing system, a seating location in the event venue that is associated with the second user while the first user is at the event venue;

determining whether the seating location associated with the second user is included in the part of the venue of the real-time image being displayed by the remote mobile device display associated with the first user; and at least partly in response to determining that the seating location associated with the second user is included in the part of the venue of the real-time image being displayed by the remote mobile device display associated with the first user: causing, by the computing system, at least in part, computer generated data to be displayed in association with the seating location associated with the second user included in the real-time image being displayed by the remote mobile device display associated with the first user, the computer generated data including an identifier of the second user and/or an indication that the first user has a relationship with the second user.

17. The method as defined in claim 16, the method further comprising accessing, by the computing system, the relationship information from a social network database.

18. The method as defined in claim 16, the method further comprising determining, by the computing system, what part of the event venue is being displayed by the remote mobile device display associated with the first user based at least in part by determining the position and orientation of the remote mobile device.

19. The method as defined in claim 16, the method further comprising determining, by the computing system, what part of the event venue is being displayed by the remote mobile device display associated with the first user using orientation information from a gyroscope included in the remote mobile device.

20. The method as defined in claim 16, the method further comprising:

accessing, by the computing system, the relationship information from a social network database, determining, by the computing system, which friends of the user have arrived at the event, and providing, by the computing system, one or more corresponding arrival indications for display on the remote mobile device associated with the first user.

21. The method as defined in claim 16, the method further comprising:

providing for display on the remote mobile device associated with the first user:

a photograph transmitted from a remote mobile device associated with the second user while the remote mobile device associated with the second user is located at the event venue;

a text message transmitted from the remote mobile device associated with the second user while the remote mobile device associated with the first user is located in the venue.

22. The method as defined in claim 16, the method further comprising:

determining, by the computing system, if a venue exit and/or a venue amenity is being displayed by the remote mobile device display associated with the first user; and at least partly in response to determining that the exit and/or the amenity is being displayed by the remote mobile device display associated with the first user, causing, by the computing system, at least in part, second computer generated data to be displayed in association with the display of the exit and/or the amenity.

23. The method as defined in claim 22, wherein the second computer generated data is configured to identify the service being provided by the amenity.

24. The method as defined in claim 16, the method further comprising:

determining, by the computing system, if an available seat is being displayed by the remote mobile device display associated with the first user; and at least partly in response to determining that the available seat is being displayed by the remote mobile device display associated with the first user, causing, by the computing system, an indication to be displayed via the remote mobile device indicating that the user may acquire a right to occupy the available seat.

25. The method as defined in claim 16, the method further comprising:

determining, by the computing system, if a performer is being displayed by the remote mobile device display associated with the first user; and at least partly in response to determining that the performer is being displayed by the remote mobile device display associated with the first user, causing, by the computing system, information, including textual information, regarding the performer to be displayed via the remote mobile device associated with the first user.

26. A non-transitory medium storing instructions that when executed by a computing system, cause the computing system to perform operations comprising:

detecting the presence of a remote mobile device at an event venue, the event venue including a plurality of seats and the remote mobile device including a display and an imaging device;

identifying a first user associated with the remote mobile device;

determining what part of the event venue is being displayed by the remote mobile device display associated with the first user, wherein what is being displayed by the remote mobile device display includes a real-time image captured by the imaging device;

accessing relationship information for the first user, the relationship information identifying at least a second user with whom the first user has a relationship;

identifying a seating location in the event venue that is associated with the second user while the first user is at the event venue;

determining whether the seating location associated with the second user is included in the part of the venue of the real-time image being displayed by the remote mobile device display associated with the first user; and at least partly in response to determining that the seating location associated with the second user is included in the part of the venue of the real-time image being displayed by the remote mobile device display associated with the first user, causing computer generated data to be displayed in association with the seating location associated with the second user included in the real-time image being displayed by the remote mobile device display associated with the first user, the computer generated data including:

an identifier of the second user, and/or an indication that the first user has a relationship with the second user.

27. The medium as defined in claim 26, the operations further comprising accessing, by the computing system, the relationship information from a social network database.

28. The medium as defined in claim 26, the operations further comprising determining what part of the event venue is being displayed by the remote mobile device display associated with the first user based at least in part by determining the position and orientation of the remote mobile device.

29. The medium as defined in claim 26, the operations further comprising determining what part of the event venue is being displayed by the remote mobile device display associated with the first user using orientation information from a gyroscope included in the remote mobile device.

30. The medium as defined in claim 26, the operations further comprising:

accessing the relationship information from a social network database, determining which friends of the user have arrived at the event, and providing one or more corresponding arrival indications for display on the remote mobile device associated with the first user.

31. The medium as defined in claim 26, the operations further comprising:

providing for display on the remote mobile device associated with the first user:

a photograph transmitted from a remote mobile device associated with the second user while the remote mobile device associated with the second user is located at the event venue;

a text message transmitted from the remote mobile device associated with the second user while the remote mobile device associated with the first user is located in the venue.

32. The medium as defined in claim 26, the operations further comprising:

determining if a venue exit and/or a venue amenity is being displayed by the remote mobile device display associated with the first user; and at least partly in response to determining that the exit and/or the amenity is being displayed by the remote mobile device display associated with the first user, causing, at least in part, second computer generated data to be displayed in association with the display of the exit and/or the amenity.

33. The medium as defined in claim 26, the operations further comprising:

determining if an available seat is being displayed by the remote mobile device display associated with the first user; and at least partly in response to determining that the available seat is being displayed by the remote mobile device display associated with the first user, causing an indication to be displayed via the remote mobile device indicating that the user may acquire a right to occupy the available seat.

34. The medium as defined in claim 26, the operations further comprising:

determining if a performer is being displayed by the remote mobile device display associated with the first user; and at least partly in response to determining that the performer is being displayed by the remote mobile device display associated with the first user, causing information, including textual information, regarding the performer to be displayed via the remote mobile device associated with the first user.

* * * * *